United States Patent [19]

Neave et al.

[11] Patent Number: 5,774,133
[45] Date of Patent: Jun. 30, 1998

[54] COMPUTER SYSTEM WITH IMPROVED PIXEL PROCESSING CAPABILITIES

[75] Inventors: John Walter Neave, Los Altos, Calif.; Neil F. Trevett, Kingston-upon-Thames, United Kingdom; Jonathan David Salkild, deceased, late of Worcester Park, United Kingdom; David Joseph Salkild, heir, Weybridge, United Kingdom; Iain Stuart MacNaughton, Sutton, United Kingdom

[73] Assignee: 3Dlabs Ltd., Egham Surrey, United Kingdom

[21] Appl. No.: 88,725

[22] Filed: Jul. 7, 1993

Related U.S. Application Data

[63] Continuation of PCT/GB92/00044 published as WO92/12496 Jan. 9, 1992, abandoned.

[30]       Foreign Application Priority Data

| Jan. 9, 1991 | [GB] | United Kingdom | .................... | 9100357 |
| Jan. 9, 1991 | [GB] | United Kingdom | .................... | 9100358 |
| Jan. 9, 1991 | [GB] | United Kingdom | .................... | 9100359 |
| Jan. 9, 1991 | [GB] | United Kingdom | .................... | 9100360 |
| Jan. 9, 1991 | [GB] | United Kingdom | .................... | 9100361 |
| Jan. 9, 1991 | [GB] | United Kingdom | .................... | 9100362 |

[51] Int. Cl.$^6$ .................................................. G06F 15/80
[52] U.S. Cl. .......................... 345/505; 345/501; 345/503; 345/522; 345/441
[58] Field of Search ................................... 395/128–130, 395/133–139, 141–143, 123, 501–526

[56]              References Cited

U.S. PATENT DOCUMENTS 4,914,729  4/1990  Omori et al. ............................ 395/118
5,136,664  8/1992  Bersack et al. .......................... 395/141
5,170,468  12/1992  Shah et al. ............................. 395/501
5,392,385  2/1995  Evangelisti et al. .................... 395/131
5,457,775  10/1995  Johnson, Jr. et al. .................. 395/141

FOREIGN PATENT DOCUMENTS 0 145 821   6/1985  European Pat. Off. .
0 314 335   5/1989  European Pat. Off. .
WO 89.06031 6/1989  WIPO .

*Primary Examiner*—Mark R. Powell
*Assistant Examiner*—U. Chauhan
*Attorney, Agent, or Firm*—Robert Groover; Betty Formby; Matthew S. Anderson

[57]                ABSTRACT

A computer system having a pixel processing unit with multiple subprocessors receives positional data defining graphical objects from the CPU and writes pixel data into the image memory, and a display driver produces an image which partially includes the rendered pixels. The pixel processor is used to access patches of multiple contiguous pixels at a time, and process them in parallel. The patches used are defined, within the overall geometry of the image, to have aligned corners. The unit is also connected to receive synchronization signals from the display driver, conditioned on whether the current line being accessed by the driver is within a specified range of lines in the image space. The unit is operable to command the pixel processing unit to write pixel data corresponding to all pixels covered by a polygon, and in response traverses portions of the image space by scanning portions of one row of patches of pixels at a time, and for some of the patches, testing only the pixels at the leading edge of the patch in the direction of scanning.

25 Claims, 52 Drawing Sheets

FIG. 11A1
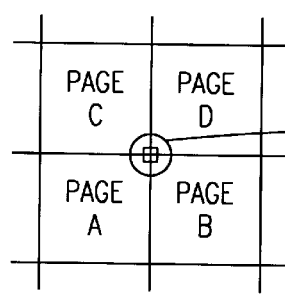
FIG. 11A2
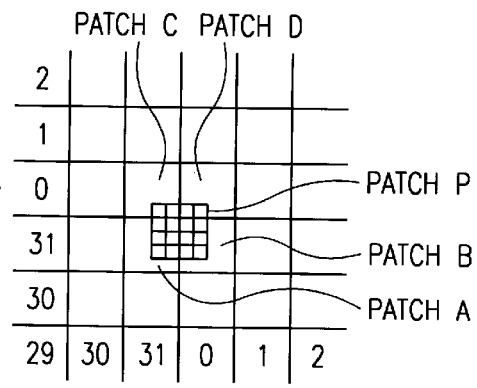
VIRTUAL MEMORY SPACE
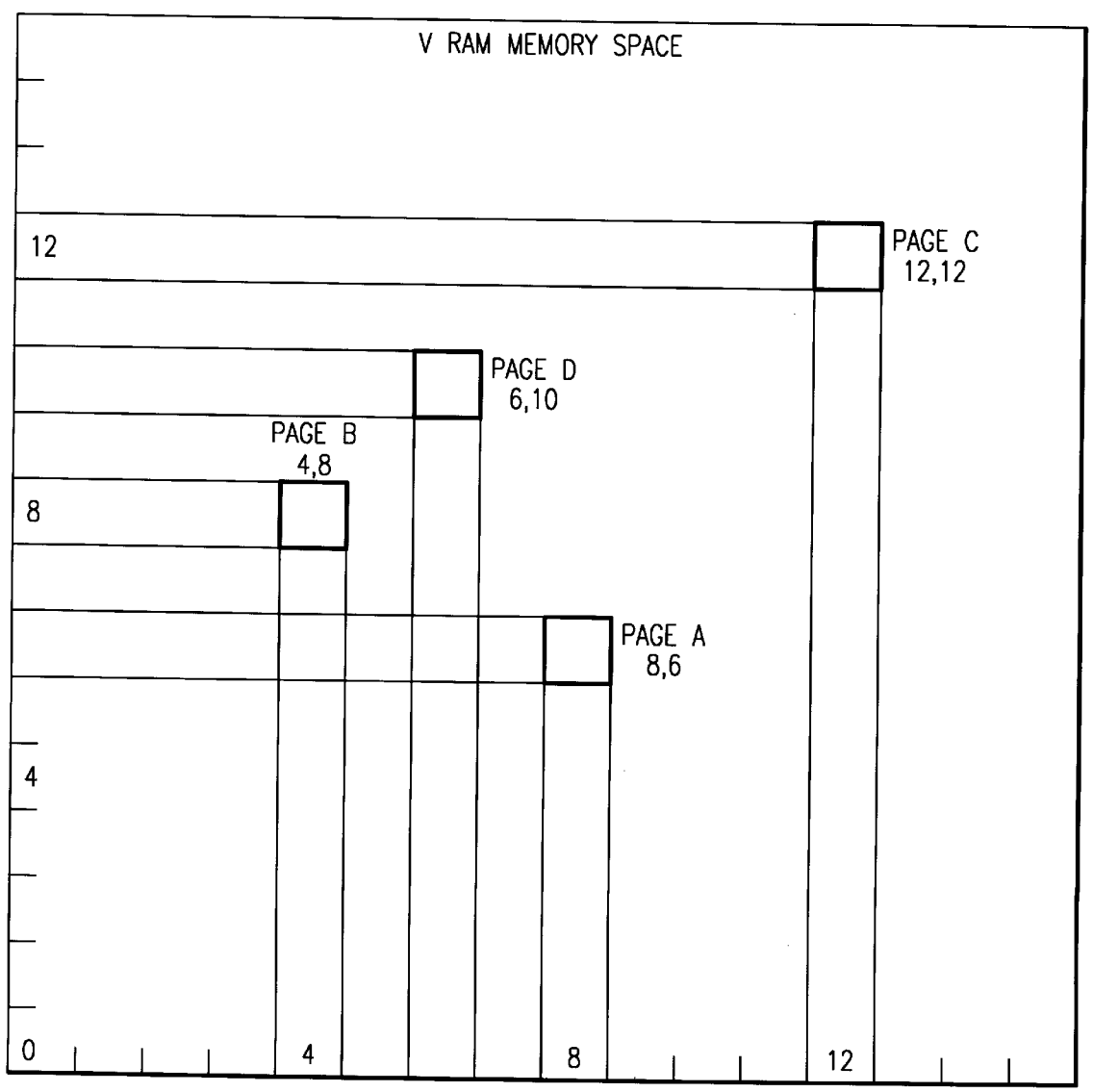
FIG. 11B

PAGE SELECTION

|  | IF 4px+mx<125 AND 4py+my<125 | IF 4px+mx>124 AND 4py+my<125 | IF 4px+mx<125 AND 4py+my>124 | IF 4px+mx>124 AND 4py+my>124 |
|---|---|---|---|---|
| IF bx≥mx AND by≥my | A | A | A | A |
| IF bx<mx AND by≥my | A | B | A | B |
| IF bx≥mx AND by<my | A | A | C | C |
| IF bx<mx AND by<my | A | B | C | D |

FIG. 12

PATCH ADDRESS INCREMENT SELECTION

X ADDRESS

| CONDITION | PATCH X ADDRESS |
|---|---|
| bx≥mx | px |
| bx<mx | px+1 |

FIG. 13A

Y ADDRESS

| CONDITION | PATCH Y ADDRESS |
|---|---|
| by≥my | py |
| by<my | py+1 |

FIG. 13B

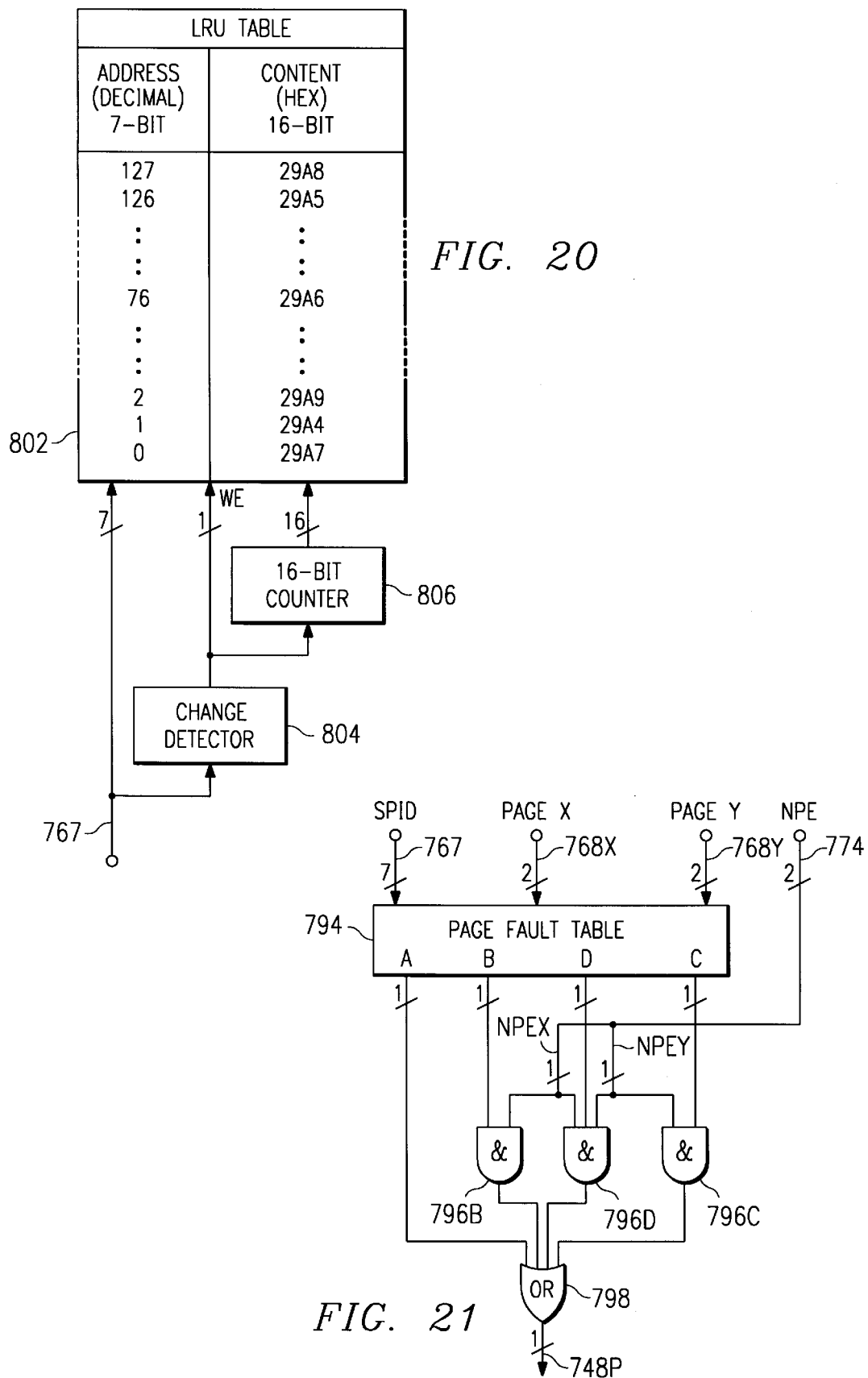

FIG. 24

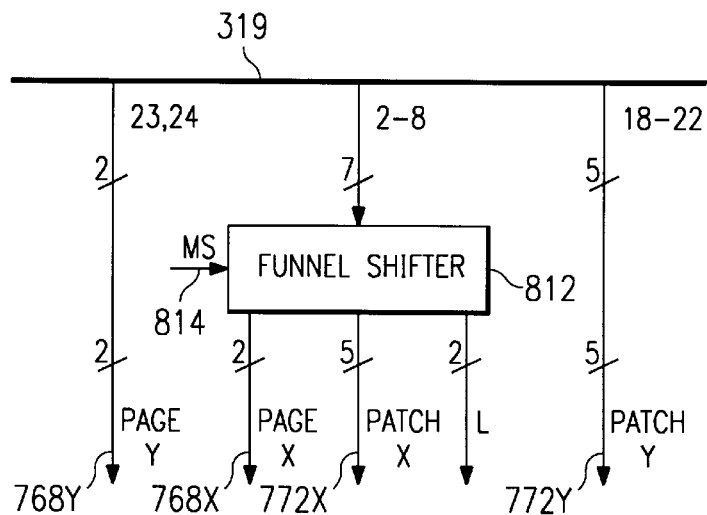
FIG. 30A
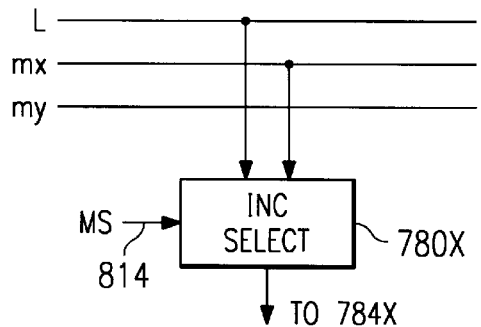
FIG. 30B
| CONDITION | | | PATCH X ADDRESS |
|---|---|---|---|
| 32-BIT L IGNORED | 16-BIT L=0 OR 1 | 8-BIT 0≤L≤3 | |
| bx≥mx | L=0 OR bx≥mx | L<>3 OR bx≥mx | px |
| bx<mx | L=1 AND bx<mx | L=3 AND bx<mx | px+1 |
FIG. 30C

| VIRTUAL ADDRESS BITS | | | | | | | |
|---|---|---|---|---|---|---|---|
| MODE | 8 | 7 | 6 | 5 | 4 | 3 | 2 |
| 32-BIT | PAGE PX (2) | | patch px (5) | | | | |
| 16-BIT | PX (1) | px (5) | | | | | L (1) |
| 8-BIT | px (5) | | | | | L (2) | |

GENERAL ZSFT TABLE

|  | 8-BIT MODE | | | | 16-BIT MODE | | 32-BIT |
|---|---|---|---|---|---|---|---|
|  | IF L=0 | IF L=1 | IF L=2 | IF L=3 | IF L=0 | IF L=1 |  |
| IF mx+x<4 | 0 | 1 | 2 | 3 | 0 | 2 | ALWAYS |
| IF mx+x>3 | 1 | 2 | 3 | 0 | 2 | 0 | 0 |

ZSFT TABLE 818b (x=1)
ZSFT (1), (5), (9), (13)

| mx \ L | 8-BIT MODE | | | | 16-BIT MODE | | 32-BIT |
|---|---|---|---|---|---|---|---|
|  | 0 | 1 | 2 | 3 | 0 | 1 |  |
| 0 | 0 | 1 | 2 | 3 | 0 | 2 |  |
| 1 | 0 | 1 | 2 | 3 | 0 | 2 | ALWAYS |
| 2 | 0 | 1 | 2 | 3 | 0 | 2 | 0 |
| 3 | 1 | 2 | 3 | 0 | 2 | 0 |  |

| CONDITION | | | |
|---|---|---|---|
| 32-BIT L=0 | 16-BIT L=0 OR 1 | 8-BIT 0≤L≤3 | |
| 4px+(4L)+mx<125 | 8px+4L+mx<253 | 16px+4L+mx<509 | NPEx=0 |
| 4px+(4L)+mx>124 | 8px+4L+mx>252 | 16px+4L+mx>508 | NPEx=1 |
| 4py+my<125 | 4py+my<125 | 4py+my<125 | NPEy=0 |
| 4py+my>124 | 4py+my>124 | 4py+my>124 | NPEy=1 |

GENERAL PWE TABLE

| | 8-BIT MODE | | | | 16-BIT MODE | | 32-BIT |
| --- | --- | --- | --- | --- | --- | --- | --- |
| | IF L=0 | IF L=1 | IF L=2 | IF L=3 | IF L=0 | IF L=1 | |
| IF bx≥mx | 0001 | 0010 | 0100 | 1000 | 0011 | 1100 | ALWAYS 1111 |
| IF bx<mx | 0010 | 0100 | 1000 | 0001 | 1100 | 0011 | |

PWE TABLE (bx=2)

| mx \ L | 8-BIT MODE | | | | 16-BIT MODE | | 32-BIT |
| --- | --- | --- | --- | --- | --- | --- | --- |
| | 0 | 1 | 2 | 3 | 0 | 1 | |
| 0 | 0001 | 0010 | 0100 | 1000 | 0011 | 1100 | ALWAYS 1111 |
| 1 | 0001 | 0010 | 0100 | 1000 | 0011 | 1100 | |
| 2 | 0001 | 0010 | 0100 | 1000 | 0011 | 1100 | |
| 3 | 0010 | 0100 | 1000 | 0001 | 1100 | 0011 | |

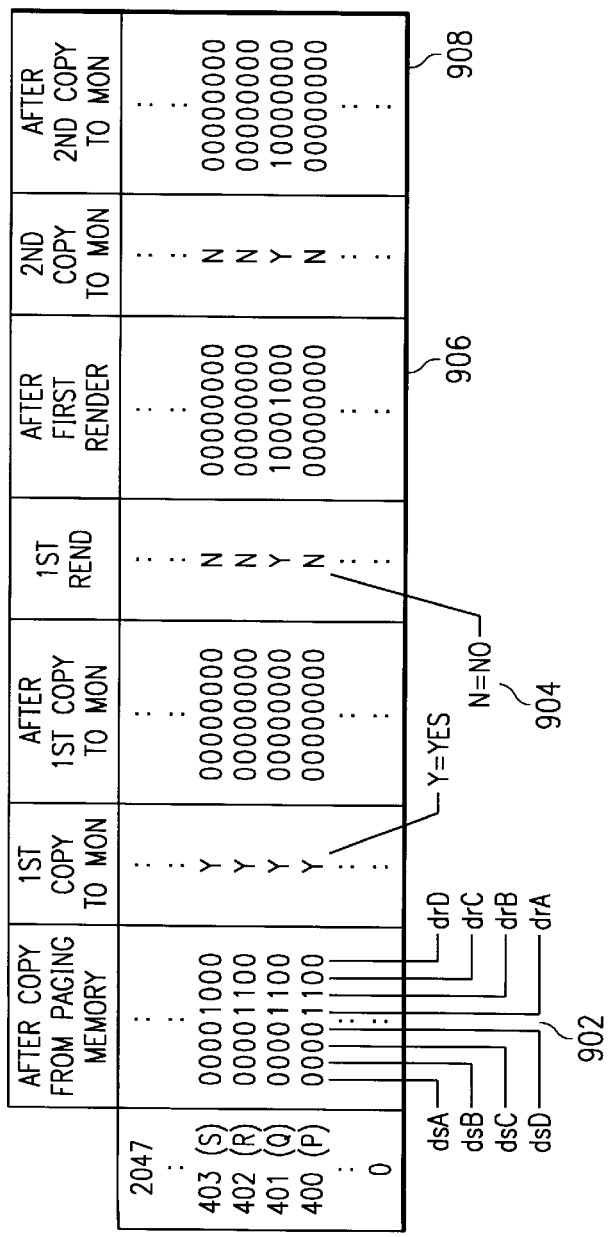
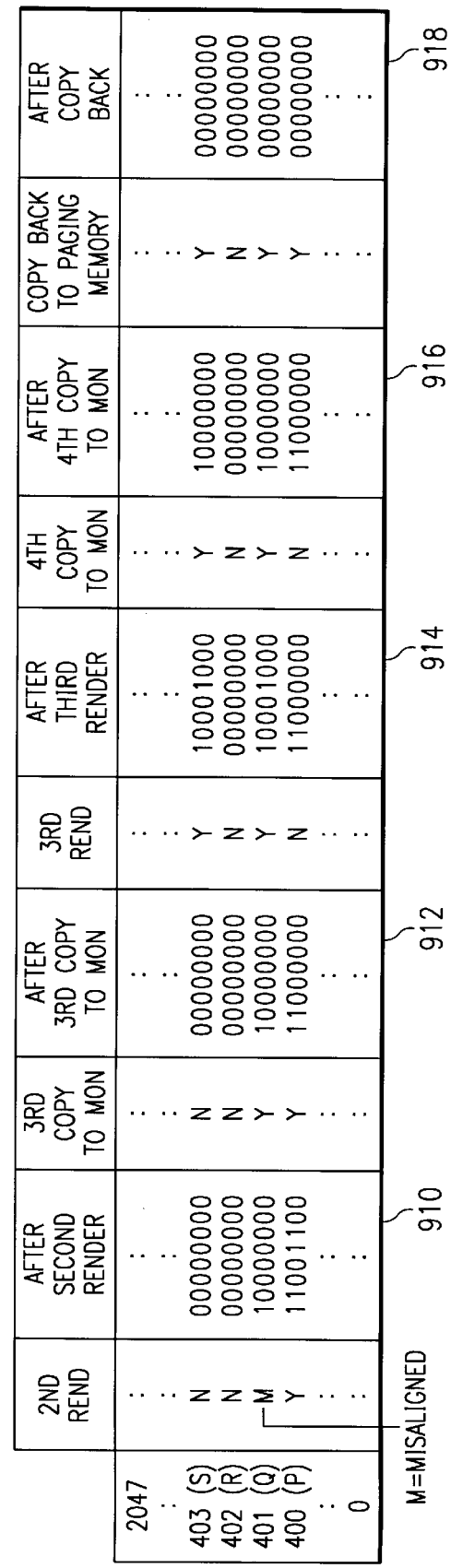
FIG. 44

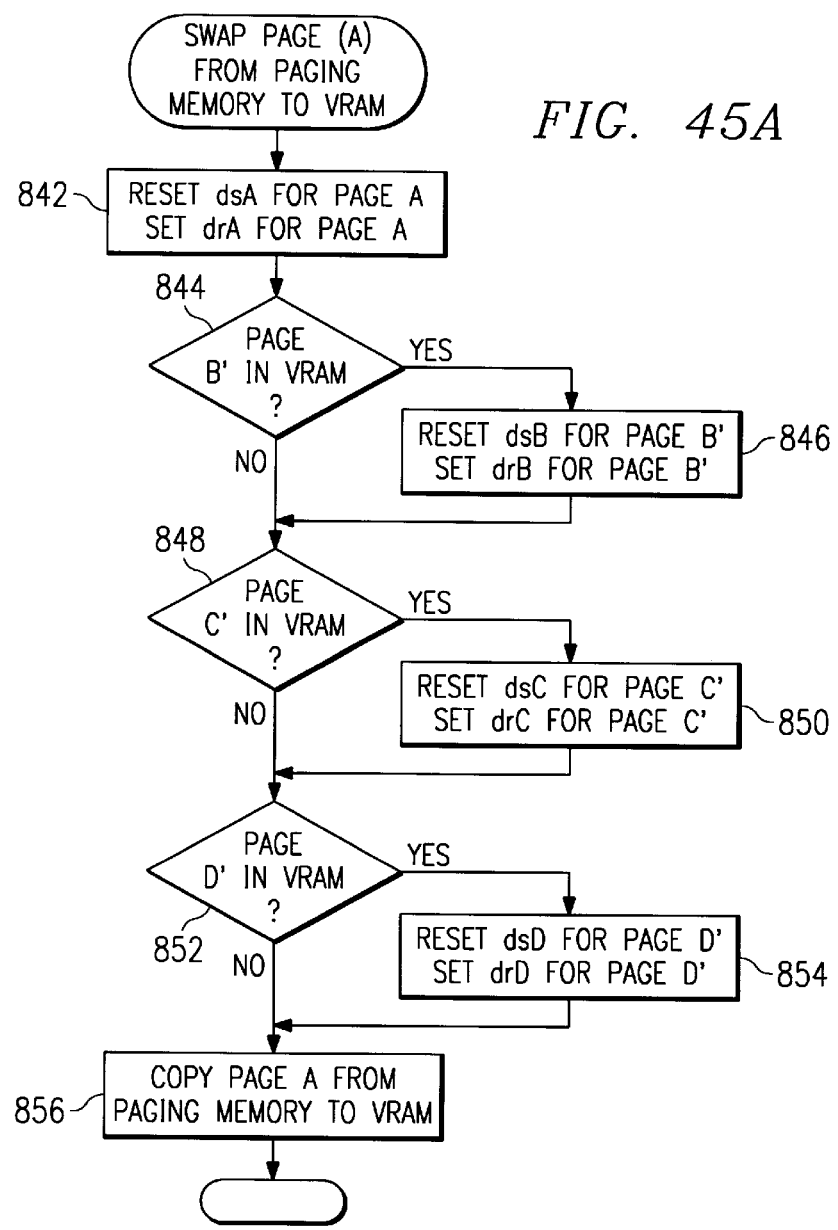

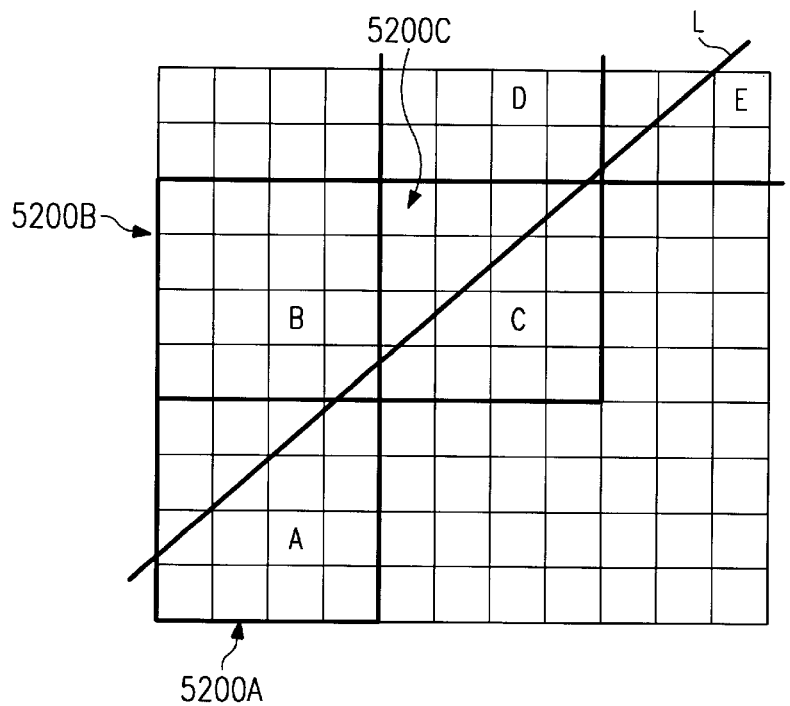
*FIG. 52*
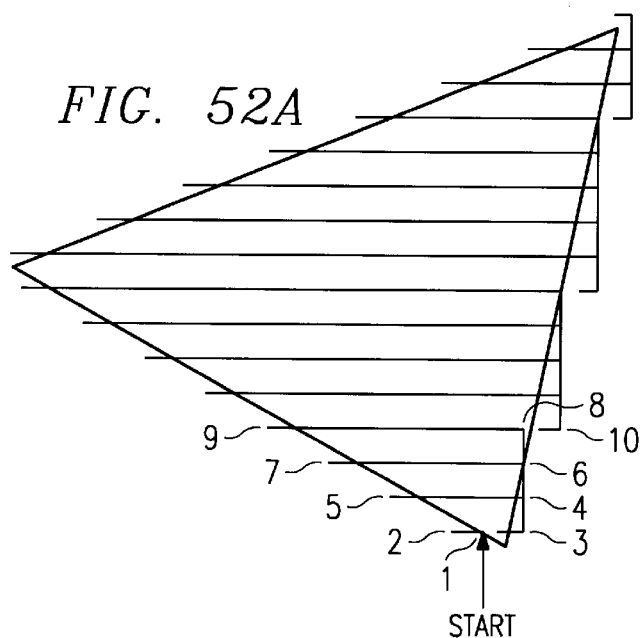
*FIG. 52A*
*FIG. 52B*

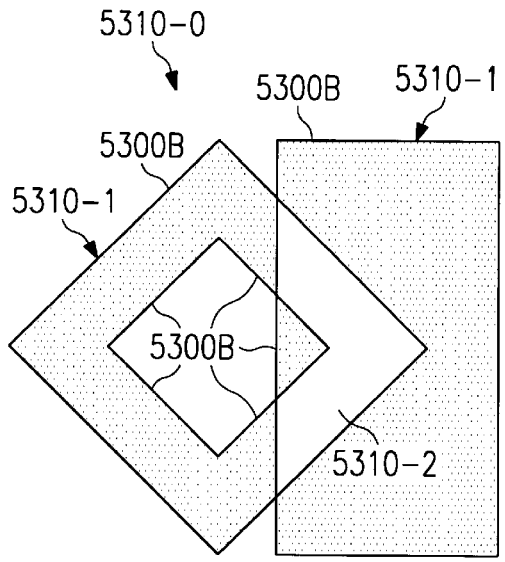
FIG. 53A1
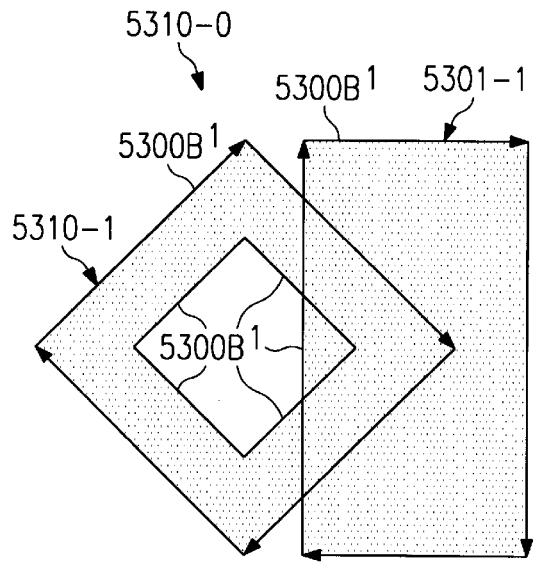
FIG. 53B1
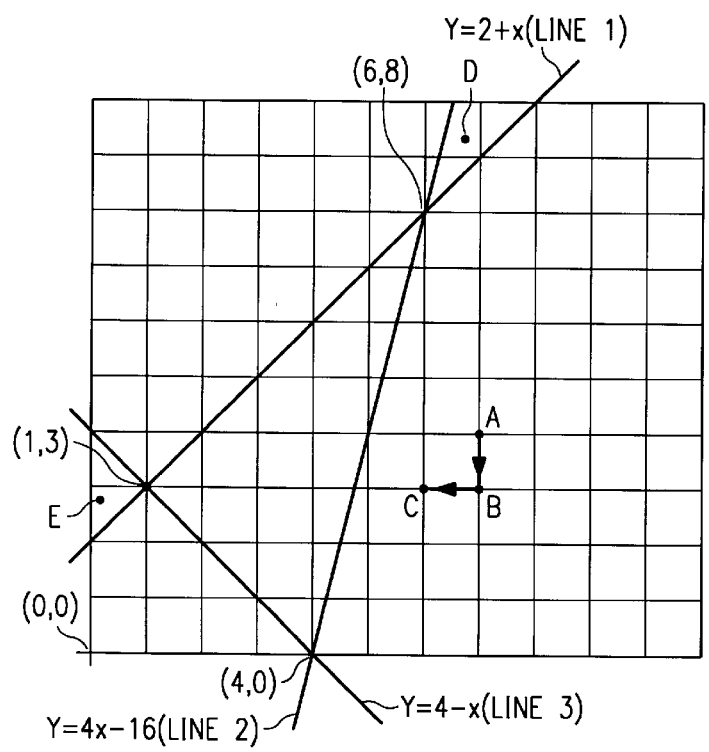
FIG. 54

COMPUTER SYSTEM WITH IMPROVED PIXEL PROCESSING CAPABILITIES

CROSS REFERENCE TO RELATED APPLICATIONS

This application claims priority from PCT/GB92/00044, filed Jan. 9, 1992 (now abandoned), and from UK applications 9100357.4, 9100358.2, 9100359.0, 9100360.8, 9100361.6, and 9100362.4, all filed Jan. 9, 1991 (all now abandoned).

BACKGROUND AND SUMMARY OF THE INVENTION

The present invention relates to computer systems with high-performance graphics and/or image manipulation capabilities, and to subassemblies and methods for use in such systems.

Parallel-Processing Architectures

The huge rate of computations which may be required in sophisticated graphics and image systems make parallel processing attractive. However, it is easier to wire up processors than to use them efficiently. The present application discloses several new methods of implementing and using parallel architecture for such applications.

The preferred hardware architecture provides a parallel-process graphics architecture, with a pixel processing unit which includes multiple subprocessors operating in parallel. These subprocessors are configured for parallel memory access to aligned patches of pixels (i.e. to groups of pixels which are aligned in the image space).[1] However, there are substantial difficulties in exploiting such an architecture for rendering. The disclosed innovations provide improved performance in this and in other architectures for image and/or graphics processing.

Required Data Rates

The data rates required for control of a high-resolution display can be substantial. For example, the NEC 5D™ monitor, as sold in the US in 1990, has a refresh rate of 60 Hz. Thus, each of the electron guns (one for each primary color) illuminates each of the 1.3 million pixels 60 times per second. If the color information is only 4 bits per pixel, the net data rate is hundreds of millions of bits per second. For high-resolution displays, this data rate is supplied from a dual-port frame memory, which can be accessed independently by the processor and by the display driver. The processor can access any randomly selected location in the frame memory (to change the pixel-attribute values), and the display driver reads out the pixel data, serially, at high speed, continually as needed.

Thus, if the display is unchanging, no demand is placed on the rendering operations. However, some common operations (such as zooming or rotation) will require every object in the image space to be re-rendered. Slow rendering will make the rotation or zoom appear jerky.

Differences Between Images and Graphics

A basic distinction which is necessary to full understanding of at least some of the innovations disclosed here is the distinction between images and graphical objects. These terms are not sharply distinguished in everyday speech, but they represent an important difference in computing.

Modern computer systems tend to manipulate graphical objects as high-level entities. For example, a circle may be described simply as having a certain radius and a certain center point, or a straight line segment may be described by listing its two endpoints. Such high-level descriptions are a necessary basis for high-level geometric manipulations, and also have the advantage of providing a compact format which does not consume memory space unnecessarily.

By contrast, when an image corresponding to graphical objects is to be displayed, a very low-level description is needed. For example, in a conventional CRT display, a "flying spot" is moved across the screen (one line at a time), and the electron beams are switched on or off (or to a desired level in between) as the flying spot passes each pixel. For example, suppose that an image is to be displayed on a NEC 5D™ monitor. This particular monitor has a specified resolution of 1280×1024 pixels. (That is, the screen has 1024 scan lines; and, across the width of the screen, there are 1280 locations which can all have different displayed colors.) Thus there are a total of about 1.3 million pixels in this display. If this monitor is to be used for a display of 16 colors, then four bits of information are needed, for each pixel, each time the pixel is addressed. Thus, more than 5 million bits of data are needed to describe one screen on the display.

Other display technologies have similar pixel-by-pixel addressing requirements.

Rendering

Thus, even if the computing operatings manipulate graphical objects, the data format actually used by the display is a pixel-by-pixel description of the pixel attributes (color and/or gray level). Therefore, at some point, it is necessary to translate the high-level descriptions of graphic objects into a low-level pixel-by-pixel description which can be used by a display driver.

This process is called "rendering" or "drawing" the graphical objects, and imposes a significant computational burden.

Example: Drawing a Line

For example, consider the simple case of drawing a straight line segment. The high-level description of this object may be merely the locations of the two endpoints ($x_1$, $y_1$) and ($x_2$, $y_2$).

Brute-Force Approach

A straightforward way to compute a pixel-by-pixel representation of this line would be:

1) solve for the line's equation y=mx+b;
2) and repeatedly, for a series of $x_i$ starting with $x_1$:
   a) calculate $y_i$=m$x_i$+b,
   b) calculate which available pixel row $\bar{y}_i$ is vertically closest to $y_i$,
   c) turn on pixel ($x_i$, $\bar{y}_i$), and
   d) increment $x_i$ and repeat, until $x_2$ is reached.

This simple method is computationally intensive, and requires the use of real-number arithmetic for each pixel. This makes it impracticable for many applications.

Bresenham's Algorithm

The normal method for line-drawing is referred to as "Bresenham's algorithm." See Bresenham, "Algorithm for computer control of digital plotter," 4 *IBM Systems Journal* 25 (1965), which is hereby incorporated by reference. This method uses integer arithmetic to rapidly calculate the individual pixels to be turned on. By carry an error term, the average slope of the line is followed exactly, without having to perform multiplies at each pixel.

The rendering operation is often performed separately from the main computations, by a separate processor. However, rendering operations can still impose a large computational burden.

The disclosed hardware architecture provides a parallel-processing graphics architecture, with a pixel processing unit which includes multiple subprocessors operating in parallel. These subprocessors are configured for parallel memory access to aligned patches of pixels (i.e. to groups of pixels which are aligned in the image space).[2] However, there are substantial difficulties in exploiting such an architecture for rendering. Since the computations for each pixel depend on those for an adjacent pixel, it is obviously impossible to perform such computations simultaneously.

Innovative Rendering of Lines (1)

The present application discloses a new method for rendering lines in a parallelized graphics-processing architecture. A sequential method, which is somewhat analogous to Bresenham's algorithm, is used to incrementally identify the patches of pixels to be accessed for manipulation, together with a starting and ending error term for each patch. The identified patches are then retrieved, and the pixels of each patch are processed in parallel, using an interpolation calculation to identify the correct pixels to be turned on. This interpolation calculation is more time-consuming than Bresenham's algorithm; but since this calculation is performed by multiple processors in parallel it does not add unacceptable delay.

Innovative Rendering of Lines (2)

The present application discloses a new method for rendering lines in a parallelized graphics-processing architecture. A sequential method, which is somewhat analogous to Bresenham's algorithm, is used to incrementally identify the patches of pixels to be accessed for manipulation, together with a starting and ending error term for each patch. The identified patches are then retrieved, and the pixels of each patch are processed in parallel, using an interpolation calculation to identify the correct pixels to be turned on. This interpolation calculation is more time-consuming than Bresenham's algorithm; but since this calculation is performed by multiple processors in parallel it does not add unacceptable delay.

The disclosed system provides improved rendering speed, by performing line drawing and tracking with reference to patches of pixels, and processing all pixels of each patch in parallel. The patches are preferably aligned in one direction, but not in the other. That is, when it is necessary to choose a new patch of pixels, the new patch of n×n pixels will have a left edge which coincides with the right edge of the old patch; but the bottom edge of the new patch may displaced from that of the old patch by −1, 0, 1, 2, or more pixels in the vertical direction. The amount of displacement of the new patch in the vertical direction is selected so that the line being tracked will strike one SPECIFIC line segment in the new patch.

Innovative Rendering of Polygons

One of the most commonly used types of high-level graphical objects is the polygon.[3] Two-dimensional shapes are usually described as polygons, and thus the rendering process must be able to tender polygons efficiently.

The high-level description of a polygon is often provided by an ordered list of its vertices[4]. However, another (known) high-level description format, which can be more advantageous for traversal of convex polygons, describes each of the boundary lines of the polygon by a function $f_i(x,y)$, with a sign such that all of the functions $f_i(x,y)$ are positive at every point in the interior of the polygon.[5]

The disclosed system includes several innovations which provide rapid polygon traversal, with efficient exploitation of hardware parallelism.

In accordance with one of the innovative teachings herein, the polygon is traversed, patch by patch, in a sort of raster-scanning. (That is, all portions of the polygon in one row of patches are mapped out, before the next row of patches is scanned.) Each patch is tested, to detect whether the edge of the polygon (in the current row of patches) has yet been reached; but this test is performed by testing only the pixels on the leading edge of the current patch.

After one row of patches is finished, the next row of patches is started at the same root position; but the direction of movement is selected to minimize the chances of stepping through many blank patches before finding the polygon.

In accordance with another innovative teaching set forth herein, the interior of the polygon is found by tracking the spatial derivatives of the boundary functions (or at least of those boundary functions which are not already negative).

Fill Area Set

One of the more commonly used rendering operations is the "fill area set" operation. In this operation, the starting point is typically a set of points which define the boundaries of one or more areas,[6] and the area must be "painted" by rendering all pixels within it.

There are actually two commonly used varieties of fill area set operation. In the first type, it is acceptable not to render areas which are covered twice. Where this is acceptable, the fill area set operation is often performed very simply, scan-line by scan-line, simply by rendering all pixels which are separated from one edge of the image space (in the direction of the scan line) by an odd number of boundary lines.

However, in some cases it is not acceptable not to render areas which are covered twice. Where this is the case, the normal method of computation is to specify a direction for each of the boundary line segments, so that each boundary crossing occurs with a positive or negative sign. By summing positive and negative contributions, the conventional method permits a distinction to be drawn between pixels which are not interior to the boundary set (sum=0), and pixels which are interior (sum=±1, ±2, etc.)

The rendering operation is often performed separately from the higher-level computations, by a separate processor. However, rendering operations can still impose a large computational burden.

The disclosed hardware architecture provides a parallel-processing graphics architecture, with a pixel processing unit which includes multiple subprocessors operating in parallel. These subprocessors are configured for parallel memory access to aligned patches of pixels (i.e. to groups of pixels which are aligned in the image space).[7] However, there are substantial difficulties in exploiting such an architecture for rendering.

The disclosed innovations provide a system with far faster computation of fill area set operations. This improvement exploits the parallel graphics processing capabilities of the presently preferred embodiment.

According to the disclosed innovations, each of the boundary lines is used as one line of a respective polygon. (The other lines of the polygon are provided simply by extending lines from the endpoints of the bounding line out to an edge of the bounding box. For convenience, these other lines are preferably made to run along the direction of the scan lines.)

Each of these polygons is then rendered, in a parallelized rendering operation. However, for each polygon, the pixels found to be interior are not simply turned on: instead, a low-level operation is performed to replace the value previously stored at that pixel location with a modified value which is partly dependent on the previously stored value.

Where winding numbers do not have to be counted, a simple XOR operation is performed, so that the stored value of any pixel found to be interior to the current polygon is reversed.

Where winding numbers must be counted, the sense of the boundary line determines whether the current polygon is counted as having positive or negative area. Accordingly, the stored value of any pixel found to be interior to the current polygon is incremented or decremented. After these simple binary arithmetic operations have been performed for each of the boundary-line polygons, pixels found to have a net non-zero coverage are rendered.

Note that, if desired, the separate polygon rendering operations can all be performed, in parallel by separate processors. (In this case, memory access must be arranged so that each of the processors can secure exclusive access to a patch of pixels for long enough to do a read-modify-write cycle.) Thus, two levels of parallelism can be exploited, if sufficient hardware parallelism is available.

Outlining

One common rendering problem is to find the outline of a geometrically described shape. For example, it may be desired to draw the outline of a circle (or other shape), or to ascertain whether two shapes intersect.

The disclosed innovation provides a rapid and parallelized method for deriving the outline of a convex graphical primitive. A set of n boundary offsets is added onto each of the m points in the set of pixels to be outlined. The resulting n×m calculated pixel positions will contain many duplications; but only those of the resulting calculated pixel positions which have been duplicated fewer than n times are considered to be boundary pixels. (For a dense set of imaged pixels, this constraint will filter out the pixels in the interior.) This calculation is parallelized over the set of image pixels, not over the set of boundary offsets.

The present invention is most accurately applicable to rendering of shapes which are convex (or nearly so). However, the disclosed methods can be applied more broadly if desired.

Of course, various methods may be used to divide the original image into related sets of pixels which are sought to be bordered. For example, color information may be tracked, or sharp transitions in brightness may be tracked, or a match may be sought for pattern recognition templates.

Image Manipulation

During the 1980s, the techniques of computer image manipulation have stayed separate from those of computer graphics. Computer graphics methods have achieved great progress in generating synthetic images which look fairly realistic; but, as of 1990, there are essentially no available methods for generating a synthetic image which looks completely real (as opposed to looking more or less realistic).

Until recently, graphics and imaging were seen as two divergent disciplines. Just as graphics was a peripheral in the early 1970s, during the 1980s imaging was viewed as an attachment to most workstations and not as an integral necessity. Graphics and computing meanwhile have become one and the same, though imaging has been lagging in achieving that fusion.

When one is talking about graphics, the starting point (internally) is typically a mathematical model, and the displayed pixel is the visual result. A typical graphics application would be 3-D modelling. In contrast, imaging starts with a pixel set which is often a digitized representation of real-world information, such as a scanned photograph. The end result may be another pixel set (as in a remote sensing application) or even a mathematical model (as in computer vision). In other words, imaging manipulates pixel sets either to alter the shape of a picture or to extract analytical information from it, while graphics synthesizes pixel sets from geometric information, such as lines, surfaces, etc.

There are many differences in the way graphics and imaging information are processed. For example, consider a simple shape such as a blue square. In graphics, this can be represented by four connected vertices and a fill operation. To shrink this square, all that is necessary is to reposition (transform) the four vertices, and then fill the resulting square again. In other words, the transformation is applied only to the vertices.

However, the process is quite different if the real image of a blue square must be manipulated. In order to shrink it, it is necessary to apply a transformation to every pixel in the square. Thus, for a 10,000 pixel blue square, manipulation of the imaged representation may require 2,500 times as many transformations as would be required for the graphical representation. The reason for this is that you do not know that this imaged object is a square at all! All there is to know is a bunch of pixels and nothing more.

To make problems worse, transformations of images are likely to be destructive. In the above example, if the imaged object is known to be a simple blue square, it could be restored to its original size; but this is not so simple if, for example, the image corresponds to a blue square with pink dots. By contrast, this problem does not exist in graphics, because transformations on the mathematical model are (typically) reversible.

This simple example illustrates the basic differences between graphics and imaging from a processing viewpoint. Imaging needs much more storage (to keep copies at least) and processing power. Also, the processing element must be very tightly coupled to the individual pixels. Whereas with graphics, the processing element must be tightly coupled to the mathematical model (vertices), and can be fairly well decoupled from the final pixels which are generated for visual consumption. That is why graphics oriented systems typically employ pipelining, and provide only a low bandwidth path between the processing element and the pixels. In order to combine graphics and imaging capability, the processing element must be tightly coupled both to the pixel set and also to the mathematical model simultaneously.

It is no wonder that, until recently, these two disciplines used radically different architectures with minimal cross-fertilization. The existence of separate exhibitions for graphics and for imaging, with very few common participants, is a living example of this dichotomy.

However, in the early 1990s, it appears that a convergence of these technologies has begun. Emerging applications, such as visualization, simulation, interactive video, electronic publishing, etc., require both disciplines. However, it takes a lot more than just attaching a video camera to make a fused graphics and imaging platform. Showing images is one thing; being able to process them effectively is something altogether different.

Take mapping for example. The trend there is to overlay the real images of a terrain with the graphical map information to achieve better correlation. In simulation, synthetic scene generation is giving way to backdrops to achieve better realism. High-end color electronic publishing systems also provide an example of the synergy of graphics and imaging. For example, one can start with a digitized face of a person, make it thinner by warping (imaging), and then add some make-up using a brush (graphics) to produce a final product.

The term photorealism has been widely used to refer to graphical synthesis of life-like pictures from mathematical models. The attempts to achieve this have been heroic, but the results so far have not been convincing. Any viewer who sees them can tell that they are generated by a computer: they would all fail the Turing test.

It is unlikely that such mathematical models can ever be perfected. However, there is a much easier way. Instead of trying to create reality from scratch, reality can be borrowed from the world around us, in the form of images. Graphics and imaging techniques can then be combined to rapidly arrive at a photorealistic picture.

To give an example from another industry, this is analogous to what happened with electronic music synthesizers. For many years, a pure mathematical model was pursued to achieve tonal realism, but this never really succeeded. Then came samplers—these are analogous to imaging machines and sample real world sounds. These sounded acceptable but lacked the expressive dynamics of acoustic instruments. It was not until the fusion of synthesis and sampling that the breakthrough took place. The nature of the problem is similar in the visual domain, but visual information requires much more processing power than its auditory counterpart.

Thus, for at least the near future, it will be necessary to use images (obtained, directly or indirectly, from scanners or cameras of some type), in combination with graphics manipulation techniques, in order to produce the highest-quality artificially manipulated output.

However, an image is far more unwieldy than a graphics representation. For example, a square, which can be very compactly described in a high-level graphics representation, appears in an image merely as a collection of pixels.

Computer systems have begun to rapidly improve their capabilities for image and graphics processing. In the late 1980s and early 1990s, it appears that rapidly increasing hardware capability is continuing to appear at the same time that users are learning to demand continually greater capability. This mixture of technology-push and demand-pull suggests that a technological revolution is in progress.

However, one key piece is missing. The available user interfaces do not permit users—even very sophisticated users—to adequately exploit this power. Thus, even though impressive "showpiece" works are displayed, the labor required to produce these works is immense.

The disclosed innovations provide a computer system which has very powerful capabilities for image and graphics manipulation, and which also has greatly improved capabilities for user programming. The disclosed computer system relieves the programmer of much of the housekeeping effort of writing programs for image and graphics manipulation. This results in a more useful and flexible programming interface, and the advantages of this are considerable.

Significant efforts have been devoted to developing object-oriented graphics languages (often as an extension of C++), for convenience in manipulating graphical objects. See generally P. Wisskirchen, OBJECT-ORIENTED GRAPHICS (1990), which is hereby incorporated by reference.

The disclosed system does preferably use an object-oriented language with special provisions for graphical objects. However, the disclosed system makes special provision for parallelism: whatever degree of hardware parallelism may be available is efficiently exploited, in a way which permits the user to ignore the problems of parallel organization. (In fact, the user can treat certain operations as being infinitely parallel.) Moreover, the disclosed system makes special provision for image manipulation (even if the image has not been modelled by graphical object).

In the preferred programmable computer graphics system, the programmer can manipulate images and/or very complex graphics objects using Stencil, Translator, Clipper, and pixel attribute modification commands. The Stencil commands set the envelope set of pixels, within the total defined image space, which may be operated on; the Translator commands replicate and extend the envelope set defined by a Stencil command; and the Clipper commands select or deselect pixels of the envelope set, in parallel, for pixel-attribute operations.

All the addressing and selection of data in Crackle is achieved via Shapes. A Shape is one of a number of geometrically defined image regions. A Shape can be used in a number of different ways: as a Stencil; as a Translator; or as a Clipper.

A Stencil uses a Shape to define a Region of Interest within an image: a Stencil Region. Typically, imaging operations can only occur within the context of a Stencil, and only pixels within the Stencil Region are affected. A Stencil can be regarded as a loop specifier that defines all pixels within the Stencil Region, although in execution all pixels are regarded as being processed in parallel. Nested Stencils are not allowed. It is important to realize that the only method of writing to the image store is to use the Stencil Region. The Stencil Region therefore normally corresponds to the area of the destination image to be written. If an operation uses more than one output with different shapes, then such an operation has to be carried out in multiple passes.

A Translator is another method of establishing a looping operation, again using a Shape. A Translator interacts with a Stencil: causing the Stencil to be offset by, and executed for, each pixel in the Translator's shape. Thus a translator is only legitimate within a stencil.

A Clipper again uses a Shape, but acts as a further qualifier for pixels within a Stencil Region. When used within a Stencil the Clipper's Shape is combined with the Stencil's Shape: the logical combination of shapes defines the affected pixels within the Stencil Region. Data operations occur within a specified Region using a Load/Store type register mode.

Frame Store Technology

In modern computer systems with bit-mapped graphics capabilities, the common approach is to use a special dual-port memory, referred to as a "frame store," to facilitate the interface between the programmable processor (or processors) and the display driver. Such a memory permits the processor to randomly access any location in the frame store, while the display driver incessantly continues to read out the stream of data which defines the color and brightness for each pixel in the display. The frame store must be at least large enough to bold one frame of pixel data, i.e. data to the full desired resolution for all pixels addressible in the display.

The techniques for implementing a single-buffered[8] multiport frame store are well-known. As with any multiport memory, problems of access collision must be considered: what happens when the CPU and the display driver try to access the same line of the image space at the same time? With frame stores, the simple answer is to always give priority to the display driver (which must operate serially and synchronously, or else the display will be disrupted).

However, even assuming that access conflicts are not a problem at the lowest level, there can still be a problem with time-domain aliasing. With a simple conventional architecture, it may happen that the CPU has written only part of a complex object to the frame store when the raster scan comes along. In a worst case, this can produce flicker when the display is changed. This can be a particular problem for animation.

Some prior systems have made provision for writes into frame store to be synchronized with the scan timing produced by the display driver. For example, the GiP processor, from DuPont Pixel Systems, permitted writes into the frame store to be synchronized to the vertical blanking interval. The TMS34010 graphics processor chip, from Texas Instruments, permits synchronization to a specific line in the frame.

However, both of these approaches suffer limitations. Synchronization to one specific line could (in a worst case) cause almost an entire frame of wait states, which is tremendously wasteful. Moreover, these approaches are not necessarily well adapted to complex programs, where a number of operations may all have needs for screen synchronization.

The disclosed computer graphics system also permits internal commands to be synchronized to a range of scan lines. This permits screen synchronization needs to be precisely stated, and avoids unnecessary waits for synchronization.

BRIEF DESCRIPTION OF THE DRAWING

The present invention will be described with reference to the accompanying drawings, which show important sample embodiments of the invention and which are incorporated in the specification hereof by reference, wherein:

FIG. 11A is a 2-D representation of four pages in a virtual memory, showing a non-aligned patch which crosses the page boundaries, and including an enlargement of the circled part of the page boundary intersection.

FIG. 11B is a 2-D representation of the physical memory, illustrating locations of the four pages shown in FIG. 11A.

FIG. 12 is a truth table showing how page selection is made for patches which cross page boundaries.

FIG. 13 shows two truth tables for selecting, respectively, X and Y patch address incrementation.

FIG. 20 is an illustration of the operation a least-recently-used superpage table which may be used with the address translator of FIG. 5.

FIG. 21 is a schematic diagram showing a page fault table which may be used with the address translator of FIG. 15.

FIG. 24 is a table giving an example of the operation of the priority encoder of FIG. 22.

FIGS. 30A to 30C show modifications of the address translator of FIG. 15 used in the split patch system.

FIG. 44 illustrates the setting and resetting of flags in a table of the circuit of FIG. 43.

FIGS. 45A to 45C are flow diagrams illustrating the copying operations and FIG. 45D shows the notation used in FIGS. 45A to 45C.

FIG. 52 shows how a line is mapped onto a sequence of patches of pixels accessed by the renderer.

FIG. 52A is an overview of a polygon traversal operation.

FIG. 52B shows how only pixels at the leading edge of a patch are tested for the presence of the polygon, in the presently preferred embodiment.

FIG. 54 shows an example of how a polygon is defined by three linear functions.

FIGS. 53A1 and 53B1 show how two different fill area set operations produce different results on a similar graphics object: if a simple method, as in FIG. 52C, is used, then areas which are doubly covered will not be rendered (FIG. 53A1); but if oriented line segments are used for the boundaries, then winding number computations can be used to assure that pixels which are doubly covered will be rendered (FIG. 53B1).

FIGS. 55A through 5SD show the parallelized XOR operations which are used to perform a fill area set operation, on a graphical object like that of FIG. 54A, without winding number computations.

DESCRIPTION OF THE PREFERRED EMBODIMENTS

The hardware context of the claimed inventions will first be described in detail, and then the innovative features will be described in further detail.

HARDWARE OVERVIEW

Figure 1:
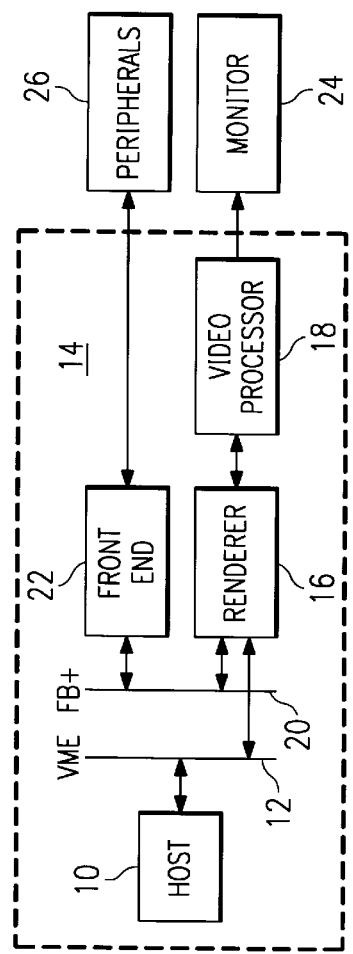
FIG. 1 is a high-level schematic illustration of an innovative computer system used in the presently preferred embodiment.
Figure 2:
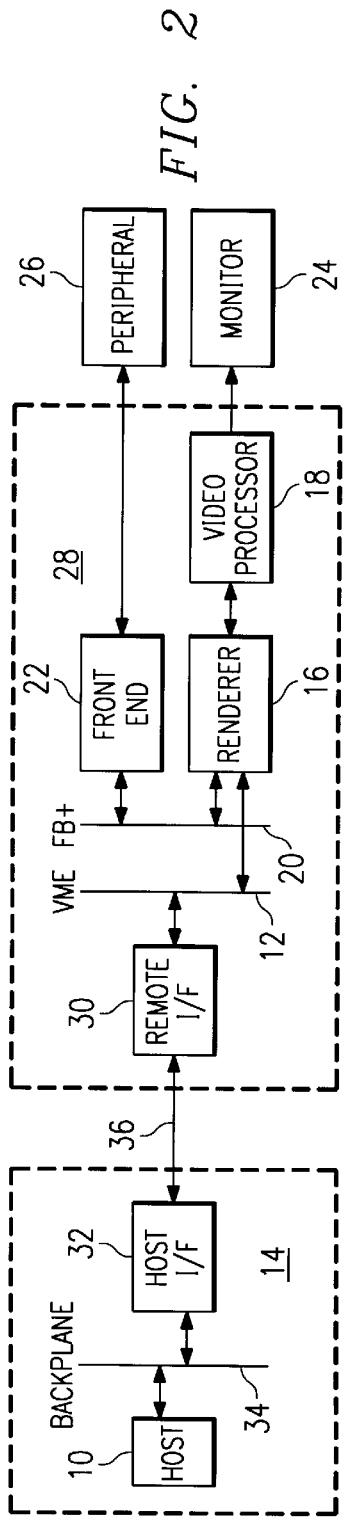
FIGS. 2 and 3 are illustrations of modified forms of the system of FIG. 1.
Figure 3:
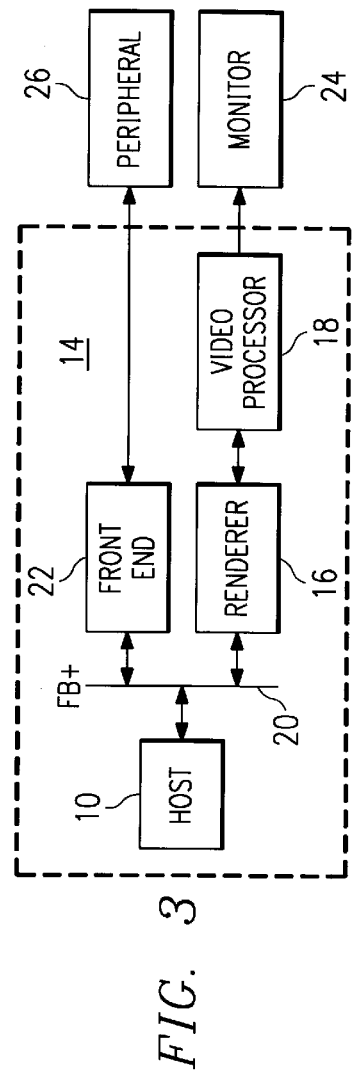

FIGS. 1 to 3 show three different hardware configurations of computer systems embodying the invention. Referring firstly to FIG. 1, a host computer 10 has its own backplane in the form of a VME bus 12 which provides general purpose communications between various circuit boards of the computer, such as processor, memory and disk controller boards. To this known configuration, and within a standard housing 14 for the computer 10, there is added a board on which is provided a renderer 16 and a video processor 18, a Futurebus+ 20, and a front-end board 22. The renderer 16 is connected to the VME bus 12 and the Futurebus+ 20, and also communicates with the video processor 18, which in turn drives an external colour monitor 24 having a high-resolution of, for example, 1280×1024 pixels. The front-end board 22 is also connected to the Futurebus+ 20 and can communicate with a selection of peripherals, which are illustrated collectively by the block 26. The configuration of FIG. 1 is of use when the host computer 10 has a VME backplane 12 and there is sufficient room in the computer housing 14 for the renderer 16, video processor 18, Futurebus+ 20 and front-end board 22, and may be used, for example, with a "Sun Workstation".

In the case where the computer housing 14 is physically too small, or where the host computer 10 does not have a VME or Futurebus+ backplane, the configuration of FIG. 2 may be employed. In FIG. 2, a separate housing 28 is used for the renderer 16, video processor 18, front-end board 22 and Futurebus+ 20, as described above, together with a VME bus 12 and a remote interface 30. In the host computer housing 14, a host interface 32 is connected to the backplane 34 of the host computer 10, which may be of VME, Qbus, Sbus, Multibus II, MCA, PC/AT, etc. format. The host interface 32 and remote interface 30 are connected by an asynchronous differential bus 36 which provides reliable communication despite the physical separation of the host and remote interfaces. The configuration of FIG. 2 is appropriate when the host computer 10 is, for example, an 'Apple Mackintosh', 'Sun Sparkstation', 'IBM-PC', or Du Pont Pixel Systems bRISC[1].

In the event that a host computer becomes available which has a Futurebus+ backplane and sufficient space in its housing for the additional components, then the configuration of FIG. 3 may be employed. In FIG. 3, the renderer 16 and the front-end board 22 are directly connected to the Futurebus+ backplane 20.

The general functions of the elements shown in FIGS. 1 to 3 will now be described in more detail. The host computer 10 supplies data in the form of control information, high level commands and parameters therefor to the renderer 16 via the VME backplane (FIG. 1), via the backplane 34, host and remote interfaces 32, 30 and the VME bus 12 (FIG. 2), or via the Futurebus+ backplane 20 (FIG. 3). Some of this data may be forwarded to the front-end board via the Futurebus+ 20 (FIGS. 1 and 2), or sent direct via the Futurebus+ backplane 20 (FIG. 3) to the front-end board 22.

The Futurebus+ 20 serves to communicate between the renderer 16 and the front-end processor 22 and is used, in preference to a VME bus or the like, in view of its high bit width of 128 bits and its high bandwidth of about 500 to 800 Mbytes/s.

As will be described in greater detail below, the renderer 16 includes an image memory, part of which is mapped to the monitor 24 by the video processor 18, and the renderer serves to perform image calculations and rendering, that is the drawing of polygons in the memory, in accordance with the commands and parameter supplied by the host computer 10 or the front-end board 22.

The front-end board 22 serves a number of functions. It includes a large paging RAM, which also interfaces with external disk storage, to provide a massive paging memory, and pages of image data can be swapped between the paging RAM and the image memory of the renderer 16 via the Futurebus+ 20. The front-end board also has a powerful floating-point processing section which can be used for graphics transformation and shading operations. Furthermore, the front-end board may provide interfacing with peripherals such as a video camera or recorder, monitor, MIDI audio, microphone, SCSI disk and RS 232.

Overall, therefore, the renderer 16, video processor 18 and front-end board 22 can accelerate pixel handling aspects of an application, and also accelerate other computation intensive aspects of an application.

Figure 4:
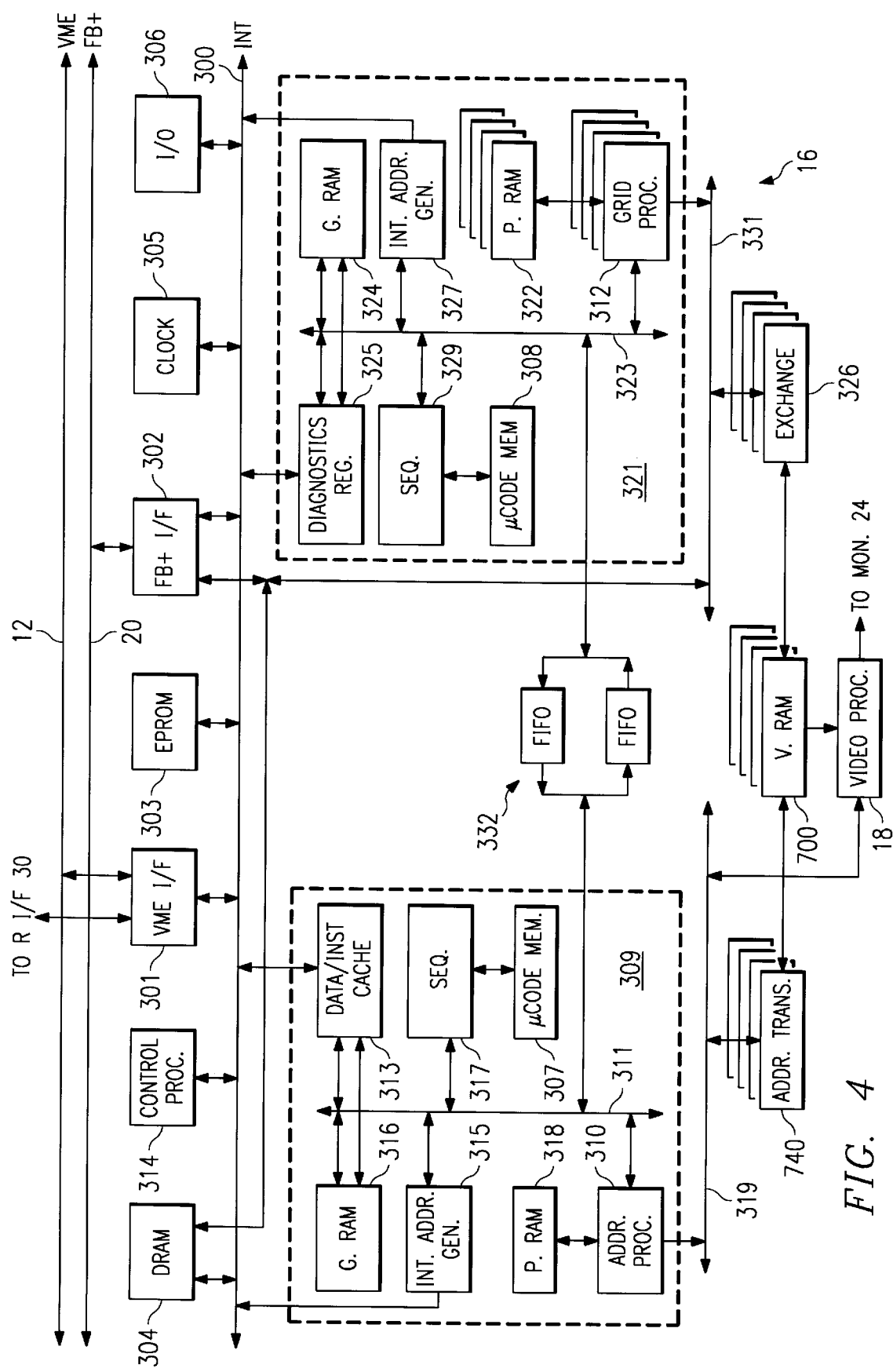
FIG. 4 is an illustration in greater detail of a renderer module preferably employed in the systems of FIGS. 1 to 3.

The renderer 16 and video processor 18 will now be described in greater detail with reference to FIG. 4, which shows the main elements of the renderer 16 and the main data and address pathways.

The renderer 16 includes a 32-bit internal bus 300, a VME interface 301 which interfaces between the VME bus 12 (FIG. 1) or the remote interface 30 (FIG. 2) and the internal bus 300, and a Futurebus+ interface 302 which interfaces between the Futurebus+ 20 and the internal bus 300. Also connecting to the internal bus 300 are a control processor 314 implemented by an Intel 80960i, an EPROM 303, 4 or 16 Mbyte of DRAM 304, a real time clock and an I/O block 306 including a SCSI ports. The functions of the control processor 314 and the associated DRAM 304 and EPROM 303 are (a) to boot-up and configure the system; (b) to provide resource allocation for local PRAM 318, 322 of address and grid processors 310, 312 (described in detail below) to ensure that there is no memory space collision; (c) to control the loading of microcode into microcode memories 307, 308 (described below); (d) to run application specific remote procedure calls (RPCs); and (e) to communicate via the I/O block 306 with a diagnostics port of the host computer 10 to enable diagnostics information to be displayed on the monitor 24. The DRAM 304 can also be used as a secondary image page store for the VRAM 700 described below.

The renderer 16 also includes an address processing section 309 comprising an address broadcast bus 311 to which are connected 64 kbyte of global GRAM 316, a data/instruction cache 313 which also connects to the internal bus 300, an internal bus address generator 315 which also connects to the internal bus 300, an address processor 310 with 16 kbyte of local PRAM 318, and a sequencer 317 for the address processor 310 which receives microcode from a microcode memory 307. The address processor 310 also connects to a virtual address bus 319. The main purpose of the address processing section 309 is to generate virtual addresses which are placed on the virtual address bus under control of microcode from the microcode memory 307.

Also included in the renderer 16 is an address translator 740 (described in further detail below) which receives the virtual addresses on the virtual address bus 319 and translates them into physical addresses of data in the video RAM 700, if the required data is present, or interrupts the address processor 310 to cause the required data to be swapped in from the paging RAM 304 or other page stores on the external buses, if the required data is not present in the VRAM 700.

The renderer 16 furthermore includes a data processing section 321 which is somewhat similar to the address processing section 309 and comprises a data broadcast bus 323, to which are connected 64 kbyte of global GRAM 324, a diagnostics register 325 which also connects to the internal bus 300 and which may be used instead of the I/O block 306 to send diagnostics information to the host computer 10, an internal bus address generator 327 which also connects to the internal bus 300, a grid processor 312 having sixteen processors each with 8 kbyte of local PRAM 322, and a sequencer 329 for the grid processor 312 which receives microcode from a microcode memory 308. The processors of the grid processor 312 also connect to a data bus 331. The main purpose of the data processing section 321 is to receive data on the data bus 331, process the data under control of microcode from the microcode memory 308, and to put the processed data back onto the data bus 331.

The physical VRAM 700 connects with the data bus 331 via an exchange 326 which is described in detail below, but which has the main purposes of shuffling the order of the sixteen pixels read from or written to the VRAM 700 at one time, as desired, to enable any of the sixteen processors in the grid processor 312 to read from or write to any of the sixteen addressed locations in the VRAM 700 and to enable any of the sixteen processors to transfer pixel data to any other of the sixteen processors.

The last main element of the renderer 16 is a bidirectional FIFO 332 connecting between the broadcast buses 311, 323 of the address and data processing sections 309, 321, which enables virtual addresses to be transferred directly between these two sections.

Figure 5:
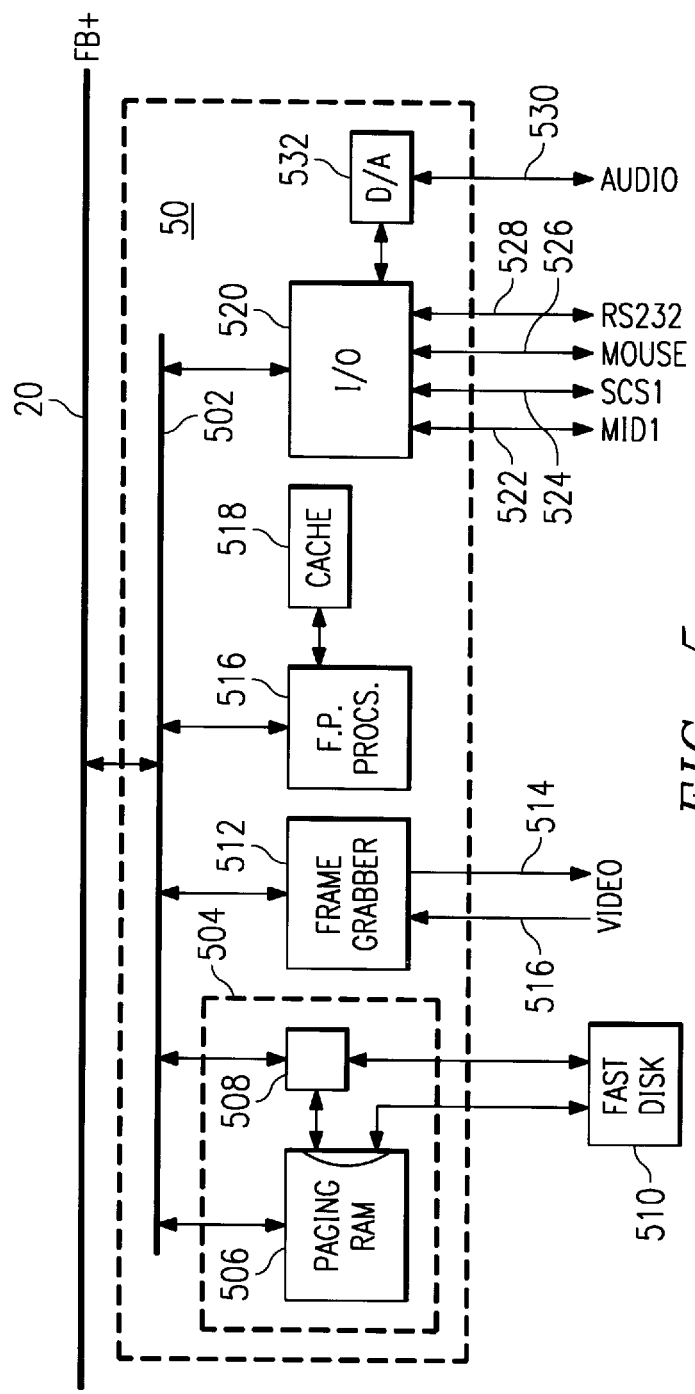
FIG. 5 is an illustration, in greater detail, of a front-end processor board preferably employed in the systems of FIGS. 1 to 3.

The front-end board 22 will now be described in greater detail with reference to FIG. 5.

The front-end board 22 has an internal bus 502 which communicates with the Futurebus+ 20. A paging memory section 504 is connected to the internal bus 502 and comprises a large paging RAM 506 of, for example, 4 to 256 Mbytes capacity which can be used in conjunction with the DRAM 304 of the renderer, a paging memory control processor 508, and connections to, for example, two external high speed IPI-2 disk drives 510 (one of which is shown) each of which may have a capacity of, for example, 4 Gbytes, and a data communication speed of 50 Mbytes/s, or two external SCSI drives. The paging RAM 506 enables an extremely large amount of pixel data to be stored and to be available to be paged into the renderer 32 as required, and the fast disk 510 enables even more pixel data to be available ready to be transferred into the paging RAM 506.

Floating point processing is provided by 1 to 4 Intel 80860 processors 516, each rated at 80 MFlops peak. The general purpose processing power can be used on dedicated tasks such as geometric pipeline processing, or to accelerate any part of an application which is compute-intensive, such as floating point fast Fourier transforms. Each of the floating point processors 516 has a 128 KByte secondary cache memory 518 in addition to its own internal primary cache memory.

The front-end board 22 may also, if desired, include a broadcast standard 24-bit frame grabber connected to the internal bus 502 and having a video input 514 and output 516 for connection to video camera or television-type monitor.

The front-end board 22 may also, if desired, include an input/output processor 520 which provides interfacing with MIDI on line 522, SCSI disk on line 524, at least one mouse on line 526, RS232 on line 528, and audio signals on line 530 via a bidirectional digital/analogue convertor 532.

VIDEO RAM AND ADDRESSING THEREOF

Now that an overview of the hardware of the whole system has been set out, the image memory configuration will be described in more detail.

Figures 6A, 6B:
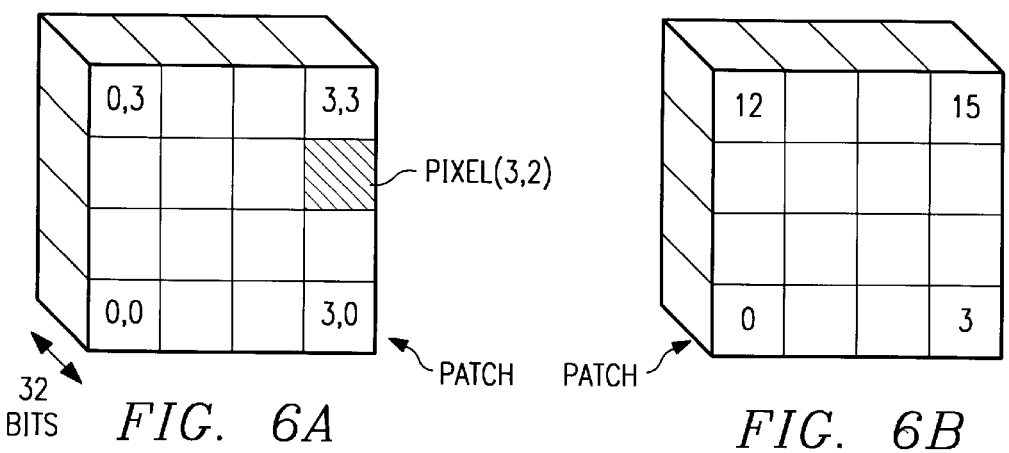
FIG. 6A and 6B show how patches of pixel data are made up.
Figure 7A:
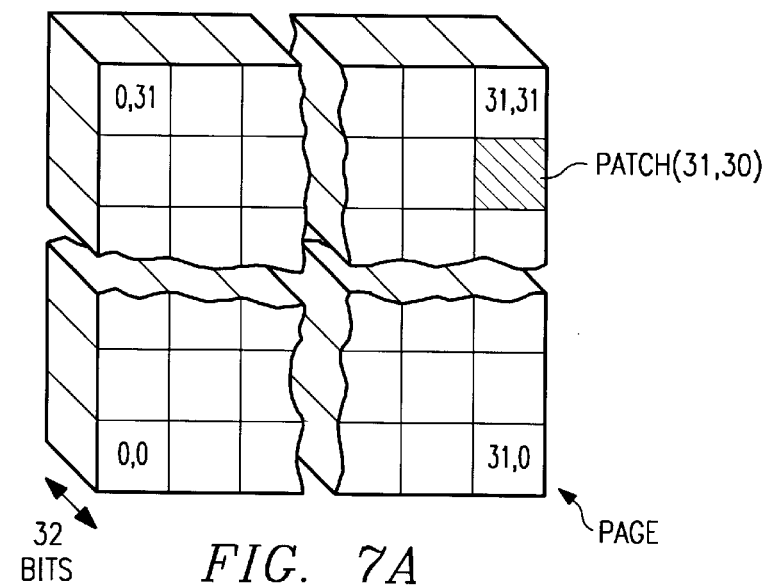
FIGS. 7A and 7B show how pages of patch data, and groups or "superpages" of page data are made up.
Figure 7B:
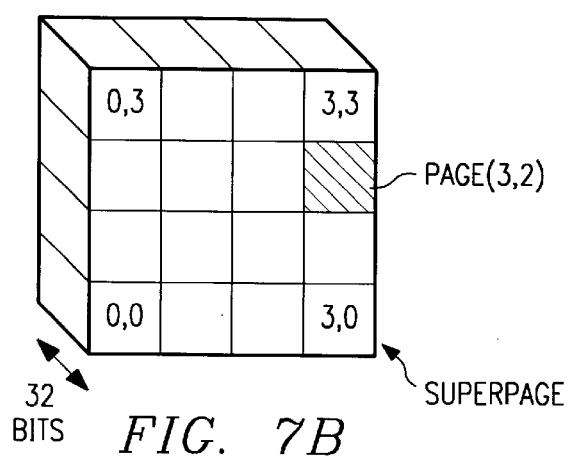

As mentioned above, the VRAM has a of 16 Mbyte capacity. The system is capable of operating with 32-bit pixels, and therefore the image memory has a capacity of 16M×8/32=4 Mpixels. As illustrated in FIGS. 6A and 6B, pixels are arranged in 4×4 groups referred to as 'patches'. FIGS. 6A and 6B show, respectively, two-and one-dimensional notations for designating a pixel in a patch, as will be used in the following description. In turn, as illustrated in FIG. 7A, the patches are arranged in 32×32 groups referred to as 'pages'. Furthermore, as illustrated in FIG. 7B, the pages are arranged in 4×4 groups referred to as 'superpages'. The VRAM therefore has a capacity of 4 Mpixels, or 256 k patches, or 256 complete pages, or 16 complete superpages. However, not all pages of a particular superpage need be stored in the memory at any one time, and support is provided for pages from parts of up to 128 different superpages to be stored in the physical memory at the same time.

Figure 8:
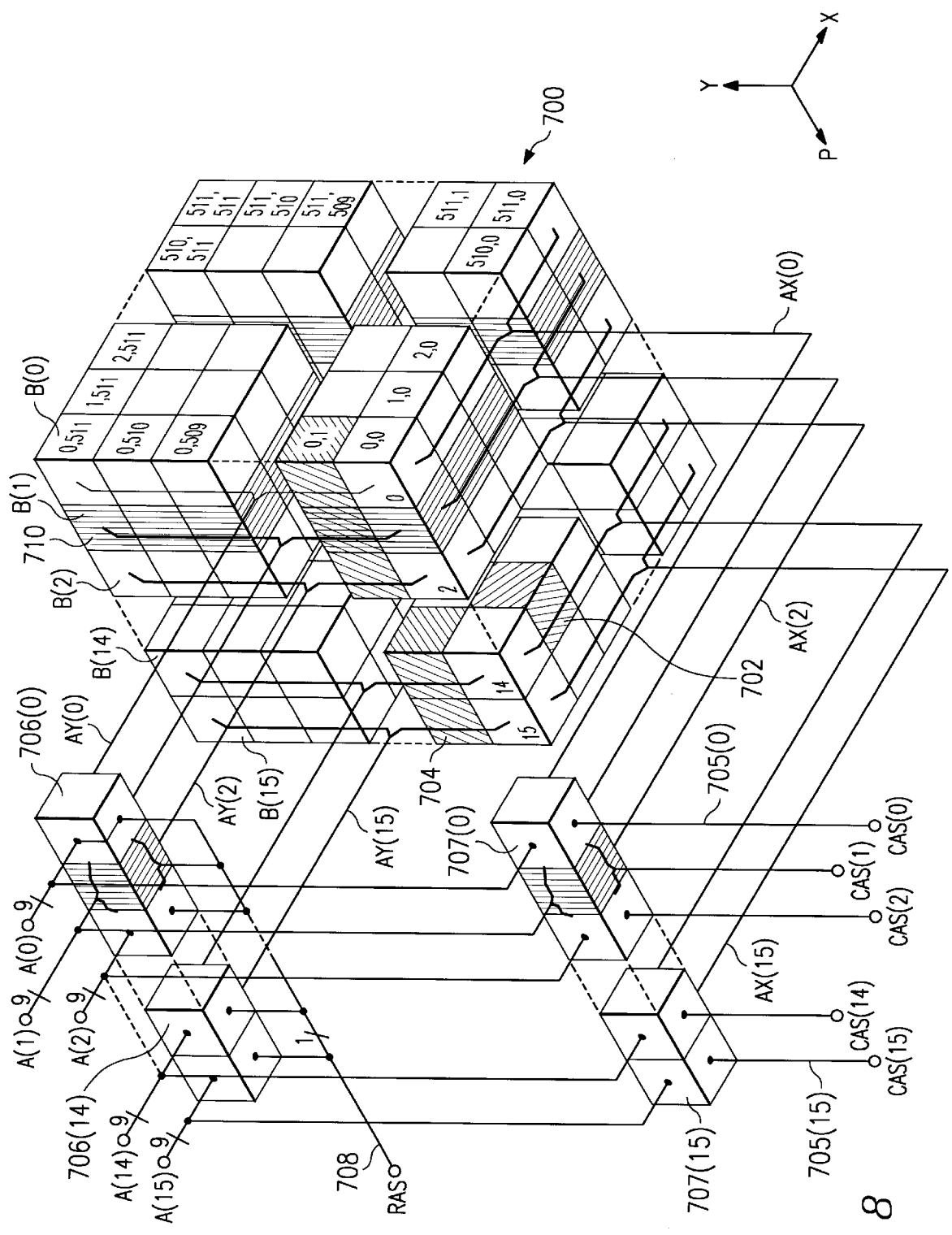
FIG. 8 is a schematic illustration of a physical image memory and the address lines therefor, as preferably used in the renderer of FIG. 4.

The VRAM 700 and addressing lines therefor are shown schematically in FIG. 8. Each small cube 702 in FIG. 8 represents a 32-bit pixel. The pixels are arranged in 512 pixel×512 pixel banks B(0)–B(15) lying in the XY plane, and these pixel banks are 16 pixels deep (in the P direction). A line of 16 pixels in the P direction provides an aligned patch 704. The pixels in each bank are addressable as to N address by a respective one of 16 9-bit X address lines AX(0) to AX(15) and are addressable as to Y address by a respective one of 16 9-bit Y address lines AY(0) to AY(15). The Y and N addresses are sequentially supplied on a common set of 16 9-bit address lines A(0) to A(15), with the Y addresses being supplied first and latched in a set of 16 9-bit Y latch groups 706-0 to 706-15 each receiving a row address strobe (RAS) signal on 1-bit line 708, and the X addresses then being supplied and latched in a set of 16 9-bit X latch groups, 707-0 to 707-15 each receiving a respective column address strobe signal CAS(0) to CAS(15) on lines 709(0) to 709(15), respectively.

The memory for each XY bank of pixels (512 pixels×512 pixels×1 pixel) is implemented using eight video-RAM (VRAM) chips 710, each 256K (4-bit) nibbles. Each chip provides a one-eighth thick slice of each pixel bank, whereby 8×16=128 chips are required. Each Y latch group and X latch group comprises eight latches (shown in detail for Y latch group 706(1) and X latch group 707(1) and a respective one of the X and Y latches is provided on each VRAM chip 710.

In this specification, the banks of memory will sometimes be referred to by the bank number B(0) to B(15) and at other times by a 2-dimensional bank address (bx,by) with the correlation between the two being as follows:

| Bank Number | (bx,by) | Bank Number | (bx,by) |
|---|---|---|---|
| B(0) | (0,0) | B(8) | (0,2) |
| B(1) | (1,0) | B(9) | (1,2) |
| B(2) | (2,0) | B(10) | (2,2) |
| B(3) | (3,0) | B(11) | (3,2) |
| B(4) | (0,1) | B(12) | (0,3) |
| B(5) | (1,1) | B(13) | (1,3) |
| B(6) | (2,1) | B(14) | (2,3) |
| B(7) | (3,1) | B(15) | (3,3) |

When a location in the memory 700 is to be accessed, a patch of 16 pixels is made available for reading or writing at one time. If the Y address and X address for all of the VRAMs 710 is the same, then an "aligned" patch of pixels (such as patch 704) will be accessed. However, it is desirable that access can be made to patches of sixteen pixels which are not aligned, but where various pixels in the patch to be accessed are derived from two or four adjacent aligned patches.

Figure 9A:
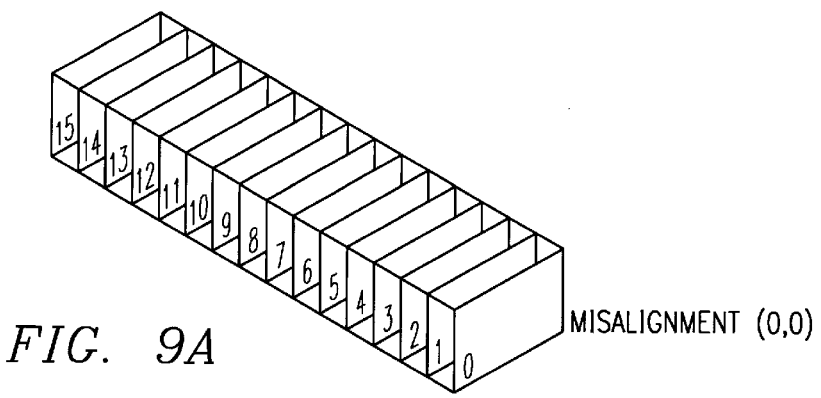
FIG. 9A is a 3-D representation of an aligned patch of data within a single page in the image memory.
Figure 9B:
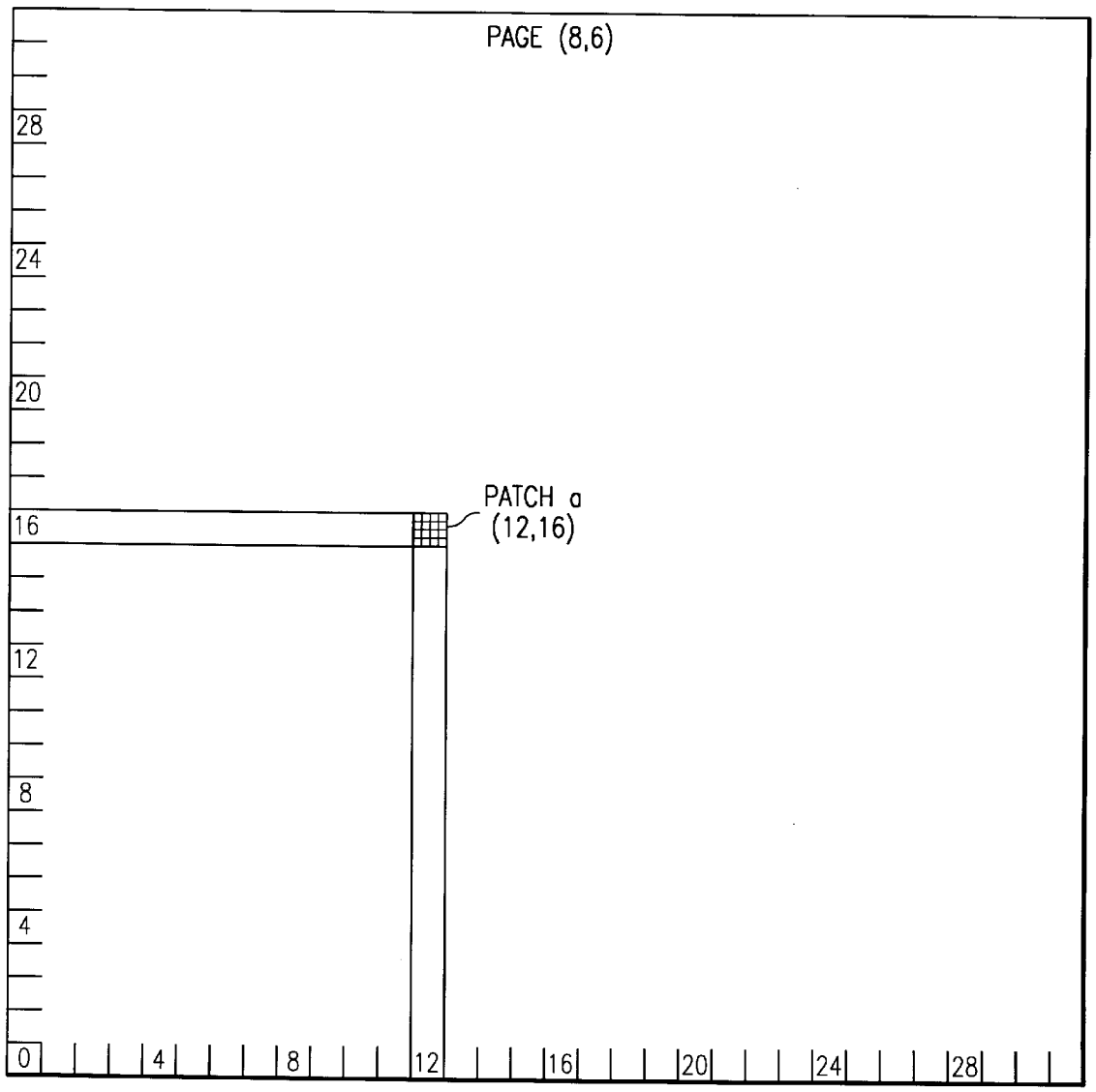
FIG. 9B is a 2-D representation of a page, showing the patch of FIG. 9A.

It will be appreciated that access to an aligned patch in memory is more straightforward than access to a non-aligned patch, because for an aligned patch the (x,y) address of each pixel in the different XY planes of memory as shown in FIG. 8 is the same. Furthermore, the (x,y) address of each pixel in the patch is equal to the bank address (bx,by) of the memory cell from which that pixel is derived. Referring to FIGS. 9A and 9B, an aligned patch "a" having a patch address (12, 16) in a page "A" having a page address (8, 6) is shown, as an example. The pixels in the aligned patch all have the same address in the sixteen XY banks of the memory, as represented in FIG. 9A, and when displayed would produce a 4×4 patch of pixels offset from the page boundaries by an integral number of patches, as represented in FIG. 9B. In the particular example the absolute address of the aligned patch in the memory would be (8×32+12, 6×32+16)=(268, 208).

Figure 10A:
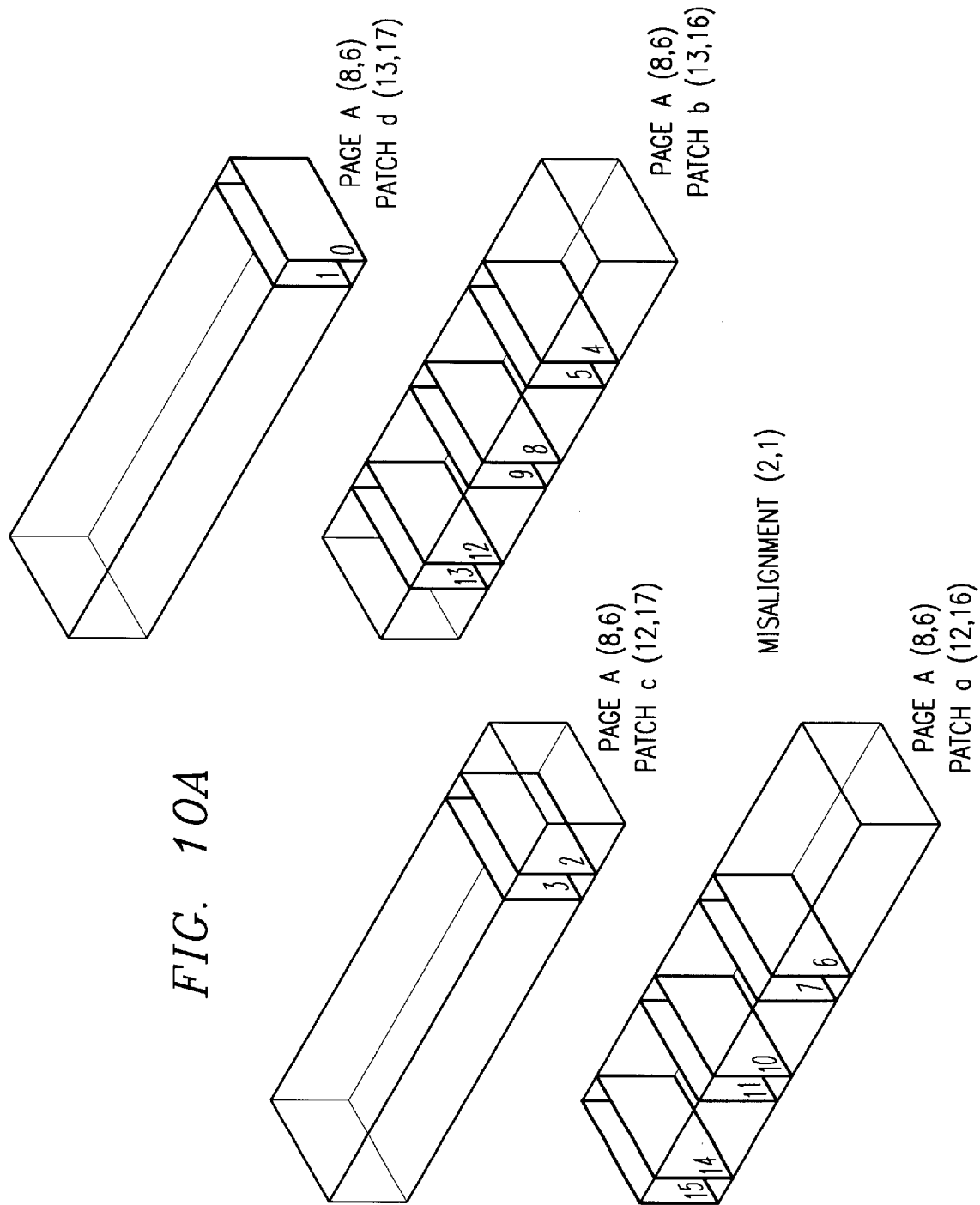
FIG. 10A is a 3-D representation of a non-aligned patch of data within a single page in the image memory.
Figure 10B:
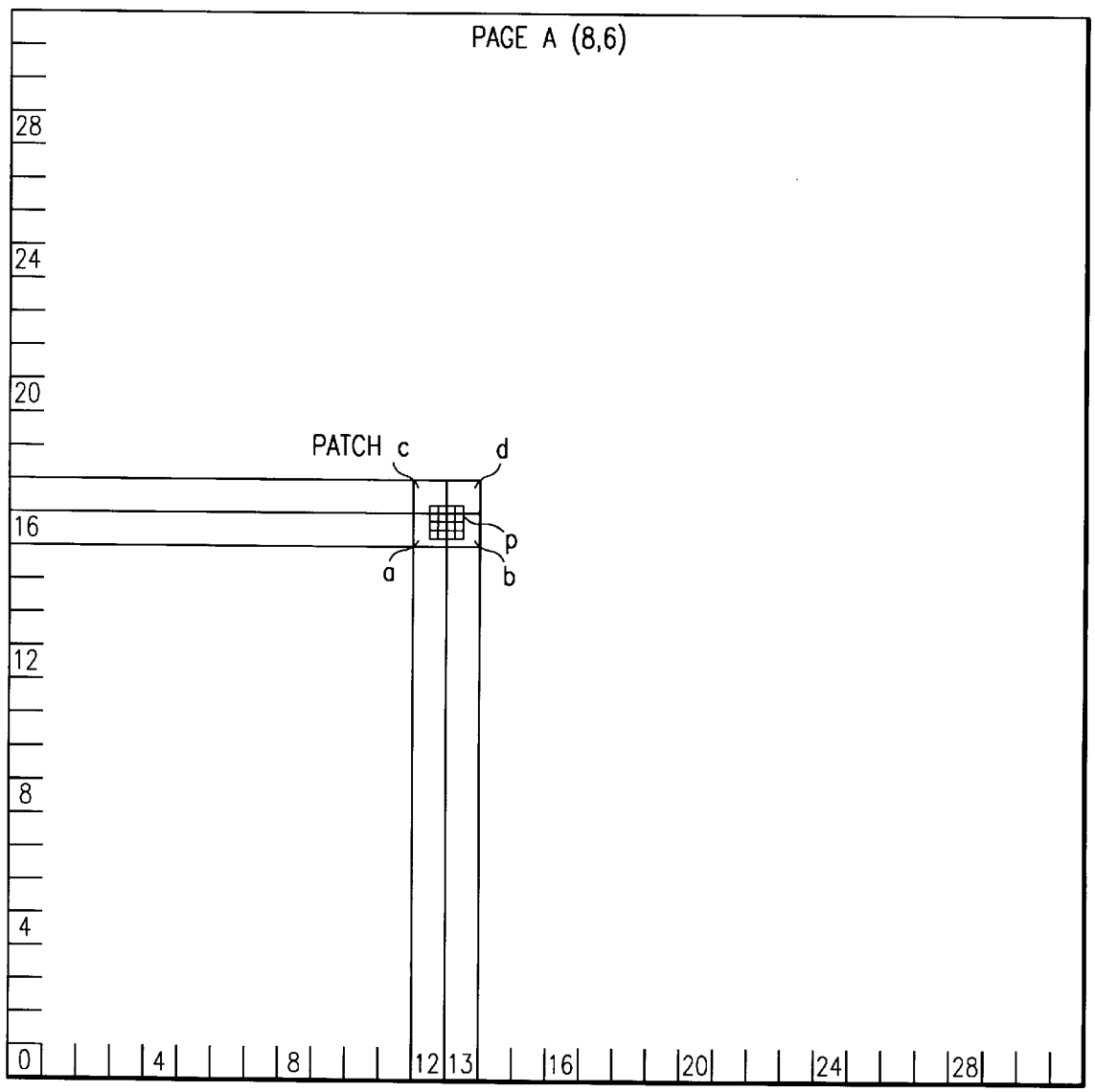
FIG. 10B is a 2-D representation of a page, showing the patch of FIG. 10A.

If, however, a patch "p" is non-aligned, and has a misalignment (mx,my)=(2,1), for example, from the previously considered aligned patch "a" at patch address (12, 16) in page A at page address (8, 6), then some of the pixels of patch "p" will need to be derived from three other aligned patches "b", "c" and "d" having patch addresses (12+1, 16), (12, 16+1) and (12+1, 16+1), or (13, 16), (12, 17) and (13, 17) in page A at page address (8, 6). This situation is represented in FIGS. 10A and 10B. The absolute address of these patches "b", "c" and "d" in the VRAM 700 are (269, 208), (268, 209) and (269, 209); respectively.

A further problem which arises in accessing a non-aligned patch "p" is that the (x,y) address of each pixel in the patch "p" does not correspond to the bank address (bx,by) in the memory from which that pixel is derived. In the particular example, the following pixel derivations and translations are required.

| Address (x,y) of pixel in non-aligned patch "p" | Aligned patch (px,py) from which pixel is derived | Bank address (bx,by) from which pixel is derived | Translation required from bank address (bx,by) to pixel address (x,y) in patch "p" |
|---|---|---|---|
| (0,0) | a (12,16) | (2,1) | (−2,−1) |
| (1,0) | a (12,16) | (3,1) | (−2,−1) |
| (2,0) | b (13,16) | (0,1) | (−2,−1) mod 4 |

-continued

| Address (x,y) of pixel in non-aligned patch "p" | Aligned patch (px,py) from which pixel is derived | Bank address (bx,by) from which pixel is derived | Translation required from bank address (bx,by) to pixel address (x,y) in patch "p" |
|---|---|---|---|
| (3,0) | b (13,16) | (1,1) | (−2,−1) mod 4 |
| (0,1) | a (12,16) | (2,2) | (−2,−1) |
| (1,1) | a (12,16) | (3,2) | (−2,−1) |
| (2,1) | b (13,16) | (0,2) | (−2,−1) mod 4 |
| (3,1) | b (13,16) | (1,2) | (−2,−1) mod 4 |
| (0,2) | a (12,16) | (2,3) | (−2,−1) |
| (1,2) | a (12,16) | (3,3) | (−2,−1) |
| (2,2) | b (13,16) | (0,3) | (−2,−1) mod 4 |
| (3,2) | b (13,16) | (1,3) | (−2,−1) mod 4 |
| (0,3) | c (12,17) | (2,0) | (−2,−1) mod 4 |
| (1,3) | c (12,17) | (3,0) | (−2,−1) mod 4 |
| (2,3) | d (13,17) | (0,0) | (−2,−1) mod 4 |
| (3,3) | d (13,17) | (1,0) | (−2,−1) mod 4 |

From the right hand column above, it will be noted that the translation from the bank address (bx,by) to the corresponding address in the non-aligned patch is constant for a particular non-aligned patch and in particular is equal to the negative of the misalignment (mx,my) of the non-aligned patch "p" from the base aligned patch "a", all translations being in modulus arithmetic with the modulus equal to the patch dimension.

Yet another further complication arises with non-aligned patches, and that is that the patch may extend across the boundary between two or four pages. To provide flexibility, not all pages which make up an image and which are contiguous in the virtual address space need to be stored in the VRAM at one time, and pages are swapped between the paging memory and the VRAM as required. This results in those pages making up an image which are in the VRAM not necessarily being stored adjacent each other in the VRAM, but possibly being scattered in noncontiguous areas of the VRAM.

For example, FIG. 11A represents four contiguous pages A, B, C, D in the virtual address space. When these pages are swapped into the physical memory 700, they may be scattered at, for example, page addresses (8,6), (4,8), (12, 12) and (6,10) in the VRAM, as represented in FIG. 11B. Now, if it is desired to access a non-aligned patch "p" who base aligned patch "a" in page A has an x or y patch address of 31, then the non-aligned patch "p" may extend into page B, page C or pages B, C and D, depending on the direction of the misalignment. In the example shown specifically in FIG. 11, the patch "p" to be accessed has a misalignment (mx, my)=(2,1) relative to base aligned patch "a" having patch address (px,py)=(31,31) in page A having page address (8,6) in the VRAM. It will be appreciated that, in addition to translating accessed pixels between their bank addresses (bx,by) and the addresses (x,y) in the non-aligned patch as described above with reference to FIG. 10, it is also necessary to determine the various pages B, C, D which are to be accessed in addition to the basic page A and furthermore to determine the addresses in these other pages B, C, D of the aligned patches to be accessed, it being noted in the example that although the aligned patch "a" in page A has a patch address of (31,31), different patch addresses need to be used in other the pages B, C, D, that is (0,31), (31,0) and (0,0), respectively. The following table sets out, for each of the pixels in the patch "p" to be accessed: the page and patch address of the aligned patch from which that pixel is derived; the translation necessary from the patch address of the basic patch "a" in page A to the patch address of the patch from which the pixel is derived; the bank address from which the pixel is derived; and the translation necessary from this latter address to the address of the pixel in the patch "p".

| Address (x,y) of pixel in non-aligned patch "p" | Page and aligned patch from which pixel is derived P/(px,py) | Translation necessary from address of patch "a" to address (px,py) of patch from which pixel is derived | Bank address (bx,by) of pixel | Translation necessary from bank address (bx,by) to pixel address (x,y) in patch "p" |
|---|---|---|---|---|
| (0,0) | A/(31,31)a | (0,0) | (2,1) | (−2,−1) |
| (1,0) | A/(31,31)a | (0,0) | (3,1) | (−2,−1) |
| (2,0) | B/(0,31)b | (1,0) mod 32 | (0,1) | (−2,−1) mod 4 |
| (3,0) | B/(0,31)b | (1,0) mod 32 | (1,1) | (−2,−1) mod 4 |
| (0,1) | A/(31,31)a | (0,0) | (2,2) | (−2,−1) |
| (1,1) | A/(31,31)a | (0,0) | (3,2) | (−2,−1) |
| (2,1) | B/(0,31)b | (1,0) mod 32 | (0,2) | (−2,−1) mod 4 |
| (3,1) | B/(0,31)b | (1,0) mod 32 | (1,2) | (−2,−1) mod 4 |
| (0,2) | A/(31,31)a | (0,0) | (2,3) | (−2,−1) |
| (1,2) | A/(31,3l)a | (0,0) | (3,3) | (−2,−1) |
| (2,2) | B/(0,31)b | (1,0) mod 32 | (0,3) | (−2,−1) mod 4 |
| (3,2) | B/(0,31)b | (1,0) mod 32 | (1,3) | (−2,−1) mod 4 |
| (0,3) | C/(31,0)c | (0,1) mod 32 | (2,0) | (−2,−1) mod 4 |
| (1,3) | C/(31,0)c | (0,1) mod 32 | (3,0) | (−2,−1) mod 4 |
| (2,3) | D/(0,0)d | (1,1) mod 32 | (0,0) | (−2,−1) mod 4 |
| (3,3) | D/(0,0)d | (1,1) mod 32 | (1,0) | (−2,−1) mod 4 |

Figure 11C:
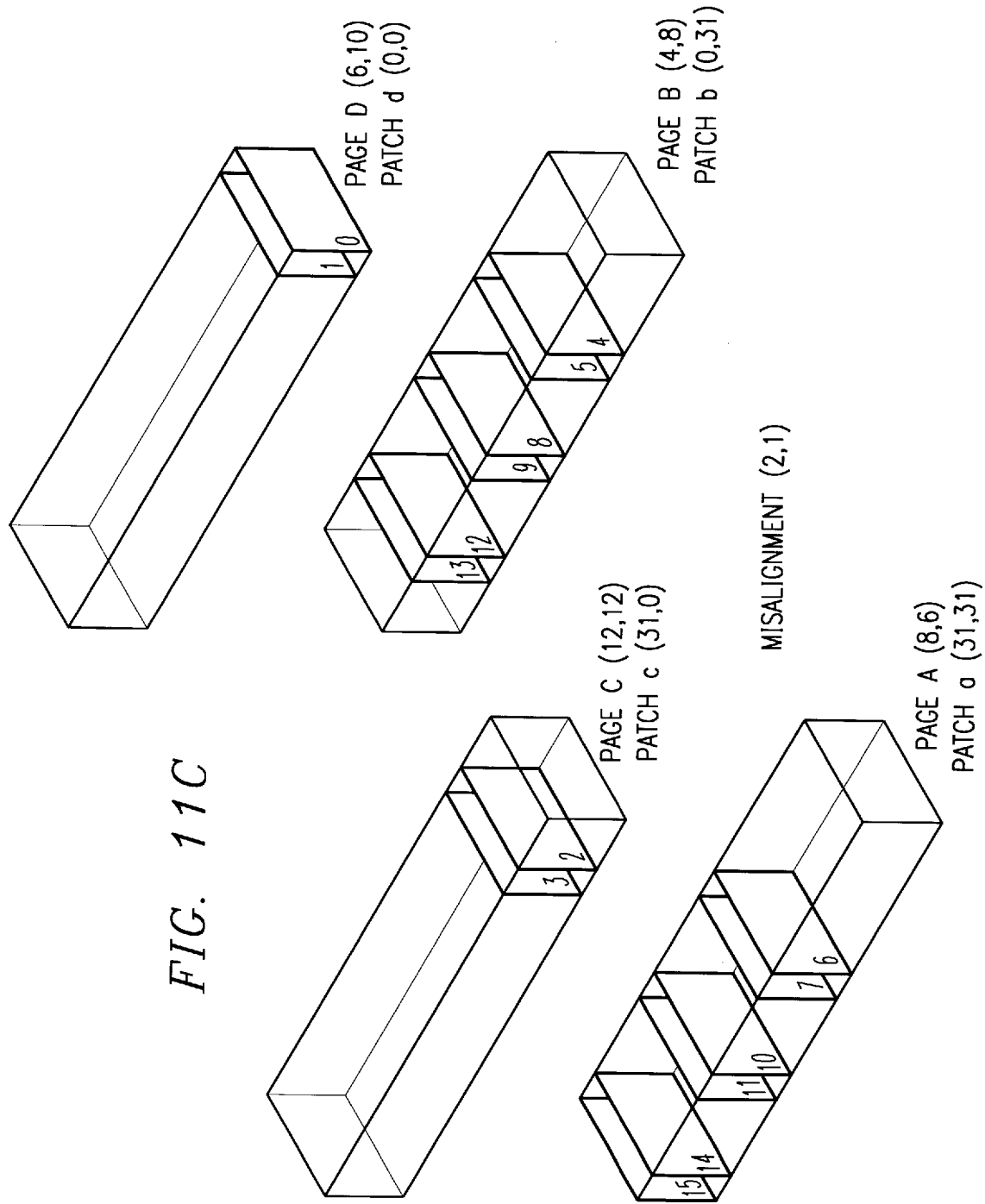
FIG. 11C is a 3-D representation of the non-aligned patch of FIG. 11A.

A representation of the locations of the pixels in the four aligned patches is shown in FIG. 11C.

In the example, the basic patch "a" has a patch address (px,py) of (31,31) and the non-aligned patch "p" to be accessed has a misalignment (mx, my) of (2,1) relative to the basic patch "a". In the general case of a base patch address (px, py), where 0<=px, py<=31, and a misalignment (mx, my), where 0<=mx, my<=3, the table of FIG. 12 sets out which page A, B, C or D should be used when accessing a pixel at bank address (bx,by), where 0<=bx,by<=3, in dependence up bx, by, mx, my, px and py, and the table of FIG. 13 sets out the X patch address px, or px+1 mod 4, and the Y patch address py, or py+1 mod 4, which should be used in order to obtain the address of the aligned patch a, b, c or d to be accessed, in dependence upon bx, by, mx and my. The increment is calculated using modular arithmetic of base 32. It is also to be noted that for all pixels where (mx, my)<>(0,0), a translation of (−mx, −my) is required between the bank address (bx,by) from which the pixel is derived and the address (x,y) of the pixel in the non-aligned patch "p".

Having described various addressing functions which it is required to be performed, there now follows a description in greater detail of the apparatus for performing these functions.

Figure 14:
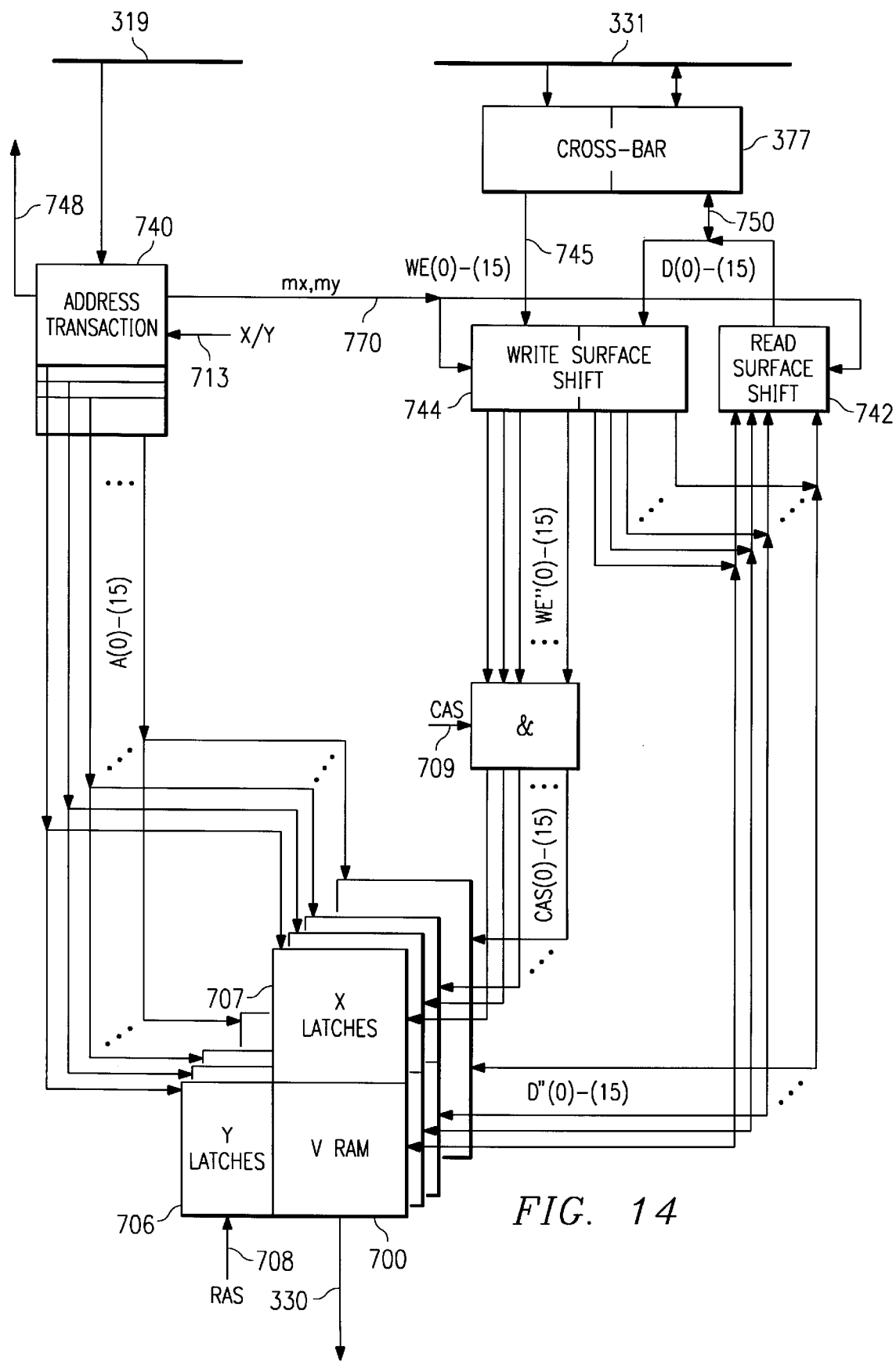
FIG. 14 is a schematic illustration in greater detail of part of the renderer of FIG. 4.

As described above with reference to FIG. 4, the VRAM 700 is addressed by the address processor 310 via the address translator 740, communicates data with the grid processor 312 via the exchange 326 and provides data to the video processor 34. A greater degree of detail of the address translator, VRAM and exchange is shown in FIG. 14.

The address translator 740 receives a 48-bit virtual address on bus 319 of a patch origin address. The translator determines whether the required page(s) to access the addressed patch are resident in the VRAM physical memory 700. If not, a page or superpage fault is flagged on line 748, as will be described in detail below. However, if so, the address translator determines the addresses in the sixteen XY banks of the physical memory of the sixteen pixels making up the patch, and addresses the memory 700 firstly with the Y addresses on the sixteen sets of 9-bit lines A(0) to A(15) and then with the X addresses on these lines. The X and Y addresses are generated under control of the X/Y select signal on line 713.

The exchange 326 includes a read surface shifter 742 and a write surface shifter 744. Pixel data is transferred, during a read operation, from the memory 700 to the read surface shifter 742 by a set of sixteen 32-bit data lines D"(0) to D"(15), and, during a write operation, from the write surface shifter 744 to the memory 700 by the same data lines D"(0) to D"(15). The read and write surface shifters 742, 744 receive 4-bit address data from the address translator on line 770, consisting of the least significant two bits of the X and Y address data. This data represents the misalignment (mx, my) of the accessed patch "p" from the basic aligned patch "a". The purpose of the surface shifters is re-order the pixel data in non-aligned patches, that is to apply the translation (−mx, −my) when reading and an opposite translation (mx, my) when writing. Pixel data to be written is supplied by a crossbar 327 forming part of the exchange 326 to the write surface shifter 744, and pixel data which has been read is supplied by the read surface shifter 742 to the crossbar 327, on the 512-bit line 750 made up of a set of 16 32-bit lines. The write surface shifter also receives on line 745 16-bit write enable signals WE(0)–WE(15) from the crossbar 327 one for each pixel, and the write surface shifter 744 re-organises these signals in accordance with the misalignment (mx, my) of the patch "p" to be accessed to provide the sixteen column write enable signals WE"(0) to WE"(15). Each of these signals is then ANDed with a common CAS signal on line 709 to form sixteen CAS signals CAS(0) to CAS(15), one for each of the sixteen banks of memory. This enables masking of pixels within a patch during writing, taking into account any misalignment of the patch.

The address translator 740 will now be described in more detail primarily with reference to FIG. 15. The translator 740 includes as shown, a contents addressable memory (CAM) 754, a page address table 756, a near-page-edge table 758, and X and Y incrementers 760X, 760Y. The translator 740 also includes sixteen sections 764(0) to 764(15), one for each output address line A(0) to A(15), and thus for each memory bank B(0) to B(15).

The translator 740 receives a 48-bit virtual address of the origin (0,0) pixel of a patch on the bus 319. It will therefore be appreciated that up to $2^{48}$ (i.e. 281, 474, 976, 710, 656) different pixels can be addressed. Many formats of the 48-bit address can be employed, but the following example will be considered in detail.

| BITS | IDENTITY |
|---|---|
| LSB | |
| 0,1 | X misalignment (mx) of patch (p) to be accessed relative to basic aligned patch (a) |
| 2–6 | X address (px) of aligned patch (a) in page A |
| 7,8 | X address of page A |
| 9–15 | X portion of superpage address |
| 16,17 | Y misalignment (my) of patch (p) to be accessed relative to basic aligned patch (a) |
| 18–22 | Y address (py) of aligned patch (a) in page A |
| 23,24 | Y address of page A |
| 25–31 | Y portion of superpage address |
| MSB | |
| 32–47 | Image ID portion of superpage address |

Figure 16:
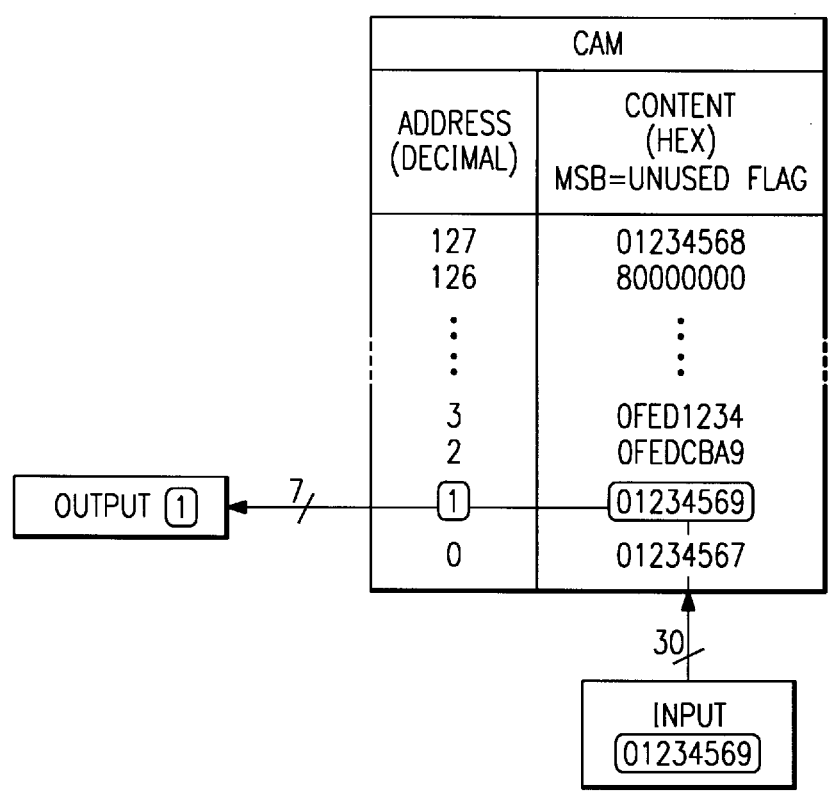
FIG. 16 is an illustration of the operation of a content-addressable memory used in the address translator of FIG. 15.

The bits identifying the superpage (i.e. bits 9 to 15, 25 to 31 and 32 to 47) are supplied to the CAM 754. The CAM 754 is an associative memory device which compares the incoming 30-bit word with all of the words held in its memory array, and if a match occurs it outputs the location or address in the memory of the matching value on line 767. The CAM 754 has a capacity of 128 32-bit words. Thirty of these bits are used to store the virtual address of a superpage which is registered in the CAM 754. Thus up to 128 superpages can be registered in the CAM. One of the other bits is used to flag any location in the CAM which is unused. The remaining bit is spare. FIG. 16 illustrates how the CAM 754 operates. Upon input of a 30-bit superpage address, e.g. 01234569 (hex), this input value is compared with each of the contents of the CAM. If a match is found and provided the unused flag is not set, the address in the CAM of the match is output, e.g. 1 in the illustration. If no match is found with the contents at any of the 128 addresses of the CAM, then a superpage fault is flagged on line 748S, and the required superpage is then set up in the CAM in the manner described in detail later.

Referring back to FIG. 13, the 7-bit superpage identification output from the CAM 754 on line 767 is used as part of an address for the page address table 756, implemented by a 4 k word×16-bit SRAM. The remaining 5 bits of the address for the page table 756 are made up by: bits 7, 8, 23 and 24 of the virtual address which identify the page within a superpage; and an X/Y select signal on line 713. The page table 756 has registered therein the X and Y page addresses in the VRAM 700 of: a) the basic page A in which the pixel to be accessed is located; b) the page B which is to the right of the page A in the virtual address space; c) the page C which is above the page A in the virtual address space; and d) the page D which is to the right of page C and above page B in the virtual address space, and these addresses are output on lines 771A to 771D, respectively. If these pages A to D are required, but are not stored in the VRAM 700 and thus are not registered in the page table 756, then a page fault is nagged on a line 748p (as described below with reference to FIG. 21) and the required page of data is then swapped into the VRAM 700 in the manner described in detail below. However, if all of the pages A to D which may possibly need to be accessed are stored, their addresses are made available on the lines 771A to 771D to all of the sections 764(0) to 764(15), the Y or X addresses being output depending on the state of the X/Y select signal on line 713.

Bits 2 to 6 and 18 to 22 of the virtual address are also supplied to each of the sections 764(0) to 764(15) on lines 772X and 772Y. These denote the patch address (px, py). The X and Y patch addresses together with bits 0,1, 16 and 17 of the virtual address (which indicate the misalignment mx, my of the patch p to be accessed) are also supplied to the near-page-edge table 758, implemented using combinatorial logic, which provides a 2-bit output to the sections 764(0) to 764(15) on line 774, with one bit being high only if the patch X address px is 31 and the X misalignment mx is greater than zero and the other bit being high only if the patch Y address py is 31 and the Y misalignment my is greater than zero.

Furthermore, the X and Y patch addresses (px, py) are also supplied to the X and Y incrementers 760X, 760Y, and these incrementers supply the incremented values px+1, mod 32 and py+1, mod 32, to each of the sections 764(0) to 764(15) on lines 776X, 776Y.

The four bits 0,1, 16 and 17 giving the misalignment mx and my are also supplied to the sections 764(0) to 764(15) on lines 770X, 770Y and are also supplied to the surface shifters 742, 744 on line 770.

Each section 764(0) to 764(15) comprises: a page selection logic circuit 778; X and Y increment select logic circuits

780X, 780Y; X and Y 4:1 4-bit page address multiplexers 782X, 782Y; X and Y 2:1 5-bit patch address multiplexers 784X, 784Y; and a 2:1 9-bit address selection multiplexer 786.

The page selection logic circuit 778 implemented using combinatorial logic, provides a 2-bit signal to the page address multiplexers 782X,Y to control which page address A, B, C or D to use. The page selection logic circuit 778 performs this selection by being configured to act as a truth table which corresponds to the table of FIG. 12. The circuit 778 receives the 2-bit signal on line 774 from the near-page-edge table 758 and this determines which of the four columns of the table of FIG. 12 to use. The circuit 778 also receives the misalignment (mx, my) on lines 770X, 770Y, and this data in combination with which section 764(0) to 764(15) (and thus which bx and by applies) determines which of the four rows in FIG. 12 to use. The X and Y page address multiplexers 782X, 782Y therefore supply appropriate page address as four bits to complementary inputs of the X/Y address selection multiplexer 786.

The increment selection logic circuits 780X, 780Y, which are implemented using combinatorial logic, receive the respective X and Y misalignments mx, my and provide respective 1-bit signals to control the patch address multiplexers 784X, 784Y. The increment selection circuits perform this selection by being configured to act as truth tables which correspond to the upper and lower parts, respectively, of the table of FIG. 13. It will be noted that selection depends upon the misalignment mx or my in combination with the bx or by position of the memory bank (and thus which of the sections 764(0) to 764(15) is being considered). The X and Y patch address multiplexers 784X, 784Y therefore output the appropriate 5-bit patch addresses px or px+1 (mod. 32) and py or py+1 (mod. 32) which are combined with the X and Y page addresses at the inputs to the X/Y selection multiplexers 786. This latter multiplexer receives as its control signal the X/Y selection signal on line 713 and therefore outputs the 9-bit X or Y address appropriate to the particular section 764(0) to 764(15).

The address translator 740 therefore deals with the problems described above of addressing pixels from different aligned patches a, b, c, d in the memory 700 when a patch "p" to be accessed is misaligned, and of addressing pixels from different pages A, B, C, D in the memory 700 when a patch "p" to be accessed extends across the boundary of the basic page A.

Figure 17:
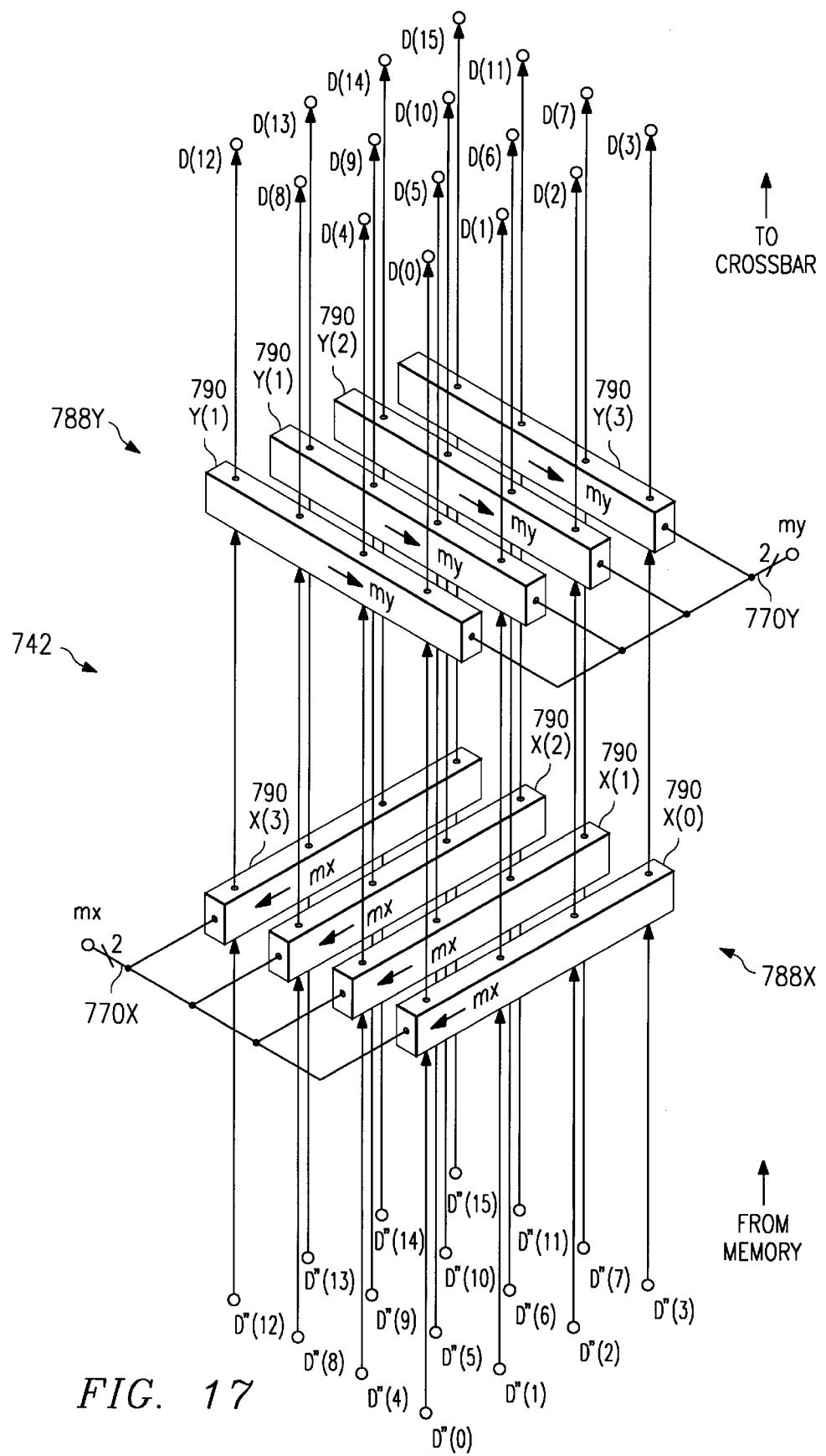
FIG. 17 is a schematic illustration in greater detail of a read surface shifter used in the apparatus of FIG. 14.

It is still necessary also to perform a translation of the pixel positions in the accessed patch of (-mx,-my) if reading, or (mx,my) if writing. This is performed by the surface shifter 742 for reading and the surface shifter 744 for writing. The read surface shifter 742 will now be described with reference to FIGS. 17 and 18.

The read surface shifter 742 comprises a pair of 4×4 32-bit barrel shifters, 788X, 788Y. The X barrel shifter 788X has four banks 790X(0) to 790X(3) of multiplexers arranged in one direction, and the outputs of the X barrel shifter 788X are connected to the inputs of the Y barrel shifter 788Y, which has four banks 790Y(0) to 790Y(3) of multiplexers arranged in the orthogonal direction. As control signals, the X and Y barrel shifters 788X, Y receive the X and Y misalignments mx, my, respectively.

Figure 18:
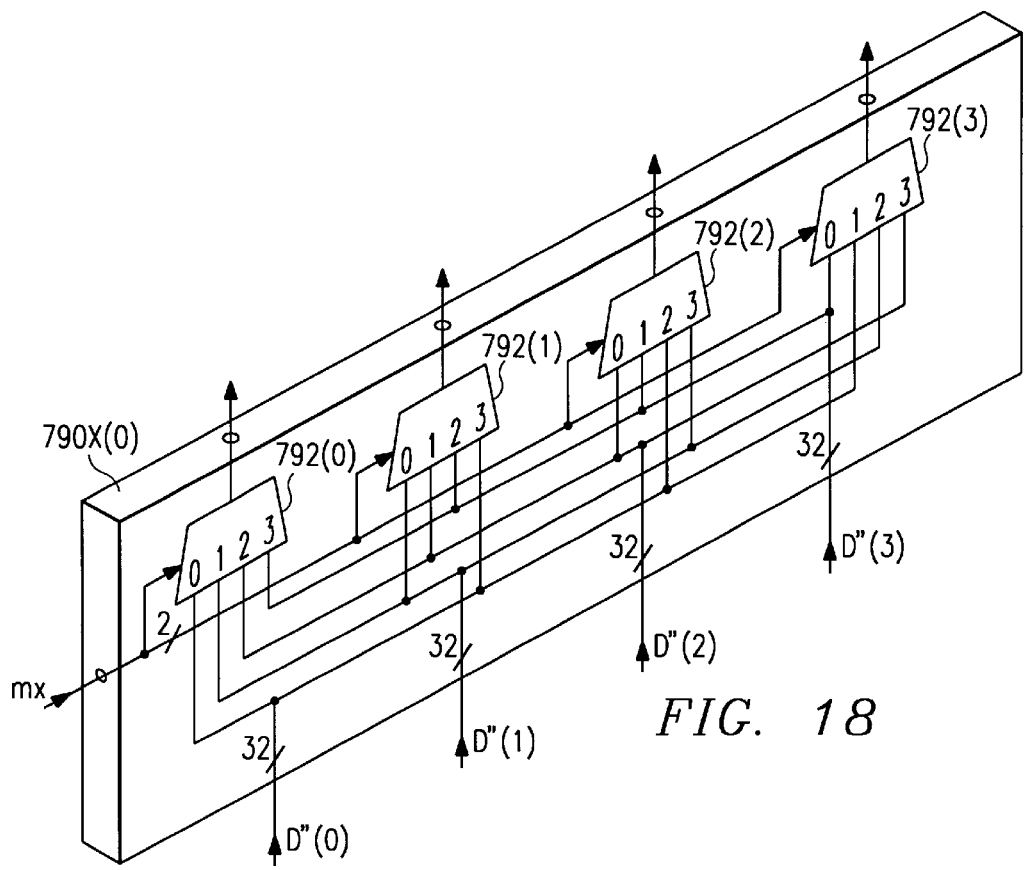
FIG. 18 shows in greater detail an array of multiplexers forming part of the surface shifter of FIG. 17.
Figure 19:
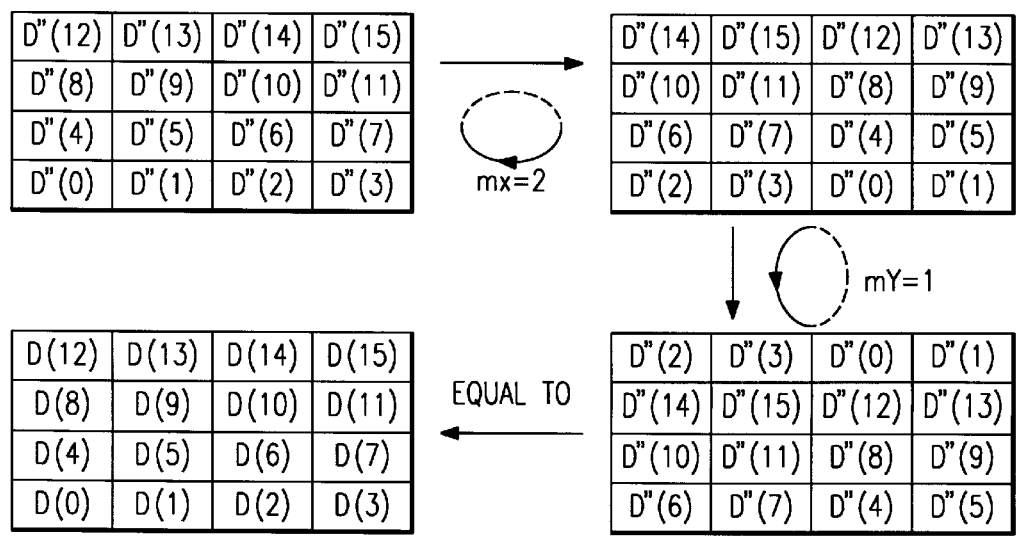
FIG. 19 illustrates the translation made by the surface shifter of FIG. 17.

One of the banks of multiplexers 790X(0) is shown in greater detail in FIG. 18, and comprises four 32-bit 4:1 multiplexers 792(0) to 792(3). The data from bank (0,0) is supplied to inputs 0, 3, 2 and 1, respectively, of the multiplexers 792(0) to 792(3). The data from bank (1,0) is supplied to inputs 1, 0, 3 and 2, respectively, of the multiplexers 792(0) to 792(3). The data from bank (2,0) is supplied to the inputs 2, 1, 0 and 3, respectively, of the multiplexers 792(0) and 792(3). The remaining data from bank (3,0) is supplied to the remaining inputs 3, 2, 1, 0, respectively, of the multiplexers 792(0) to 792(3). The other banks of multiplexers 790X(1) to 790X(3) in the X barrel shifter 788X are similarly connected, and the banks 790Y(0) to 790Y(3) in the Y barrel shifter 788Y are also similarly connected. It will therefore be appreciated that the read surface shifter performs a translation with wrap-around in the –X direction of mx positions and a translation with wrap-around in the –Y direction of my positions as shown in FIG. 19.

As shown in the drawings, the write surface shifter 744 may be provided by a separate circuit to the read surface shifter. In this case the write surface shifter is configured similarly to the read surface shifter, except that the inputs 1 and 3 to the multiplexers 792 in the barrel shifter banks are transposed. This results in translations of +mx and +my in the X and Y directions, rather than –mx and –my for the read surface shifter. The part of the write surface shifter which operates on the write enable signals WE(0) to WE(15) is identical to the part which operates on the data signals, except that the signals are 1-bit, rather than 32-bit.

As an alternative to employing separate circuits for the read and write surface shifters 742, 744, a single circuit may be employed, with appropriate data routing switches, and in this case translation provided by the surface shifter may be switched between (–mx, –my) and (+mx, +my), in dependence upon whether the memory is being read or written, as described with reference to FIGS. 46 and 47.

As mentioned above, if a required superpage is not registered in the CAM 754, then a superpage fault is flagged, on line 748S. This superpage fault is used to interrupt the address processor 310, which is programmed to perform a superpage interrupt routine as follows. Firstly, the address processor checks whether the CAM 754 has any space available for a new superpage to be registered. If not, the address processor selects a registered superpage which is to be abandoned in the manner described below and causes the, or each, page of that superpage which is stored in the VRAM 700 to be copied to its appropriate location in the paging memory. The registration of that superpage is then cancelled from the CAM 754. Secondly, the new superpage is registered in the CAM 754 at the, or one of the, available locations.

In order to select which superpage to abandon, a determination is made as to which is the least recently used (LRU) superpage which is registered in the CAM 754. To do this, a 128×16-bit LRU table 802 is provided, as illustrated in FIG. 20. Each of the 128 addresses represents a respective one of the superpages registered in the CAM 754. The 7-bit superpage identification output from the CAM 754 on line 767 is used to address the LRU table 802 each time the superpage identification changes, as detected by the change detector 804. The change detector 804 also serves to increment a 16-bit counter 806, and the content of the counter 806 is written to the addressed location in the LRU table 802.

Accordingly, for all of the registered superpages, the LRU table contains an indication of the order in which those superpages were last used. When registering a new superpage in the CAM 754, the address processor 310 checks the contents of the LRU table 802 to determine which superpage has the lowest count and in that way decides which superpage to abandon.

As also mentioned above, if the required pages of the registered superpage are not stored in the VRAM 700, a page fault is flagged, on line 748P. The page fault generator is shown in FIG. 21, and comprises a page fault table 794 constituted by a 2 k×4-bit SRAM, a set of three AND gates 796B, C, D and an OR gate 798. The page fault table 794 is addressed by the 7-bit superpage identity code on line 767, and by the X and Y page addresses on line 768X, Y. At each address, the page fault table 794 contains a 4-bit flag in which the bits denote whether the basic addressed page A and the pages B, C and D, respectively, to the right, above, and to the right and above, page A are stored in the VRAM 700. The page B flag is ANDed by gate 796B with the bit of the near-page-edge signal on line 774 denoting whether the patch "p" to be accessed extends across the boundary between pages A and B. Similarly, the page C flag is ANDed by gate 796C with the bit of the near-page-edge signal on line 774 denoting whether the patch "p" to be accessed extends across the boundary between pages A and C. Furthermore, the page D flag is ANDed by gate 796D with both bits of the near-page-edge signal, which in combination denote whether the patch "p" to be accessed extends in page D above page B and to the right of page C. The outputs of the three AND gate 796B, C, D and the page A flag are then ORed by the OR gate 798, the output of which provides the page fault flag on line 748P.

From the above, it will be appreciated that a page fault is always generated if the basic page A is not stored in the VRAM, but if page B, C or D is not stored in the memory, a page fault will be generated in response thereto only if the respective page B, C or D will be used, as indicated by the two bits of the near-page-edge signal on line 774.

The page fault signal on line 748P is used to interrupt the address processor 310. The address processor then searches a table in its PRAM 318 for a spare page address in the VRAM 700, causes the required page to be swapped into the VRAM at the spare page address, and update the table in its PRAM 318.

GRID PROCESSOR AND EXCHANGE

As described above with reference to FIG. 4, in the operation of the preferred embodiment, the exchange 326 and the VRAM 700 communicate in patches of sixteen pixels of data, each pixel having 32 bits. Furthermore, the grid processor 312 has sixteen processors, each of which processes pixel data and communicates with the exchange 326. Also, the grid processor 312 and the address processor 310 can communicate address data via the FIFO 332.

Figure 22:
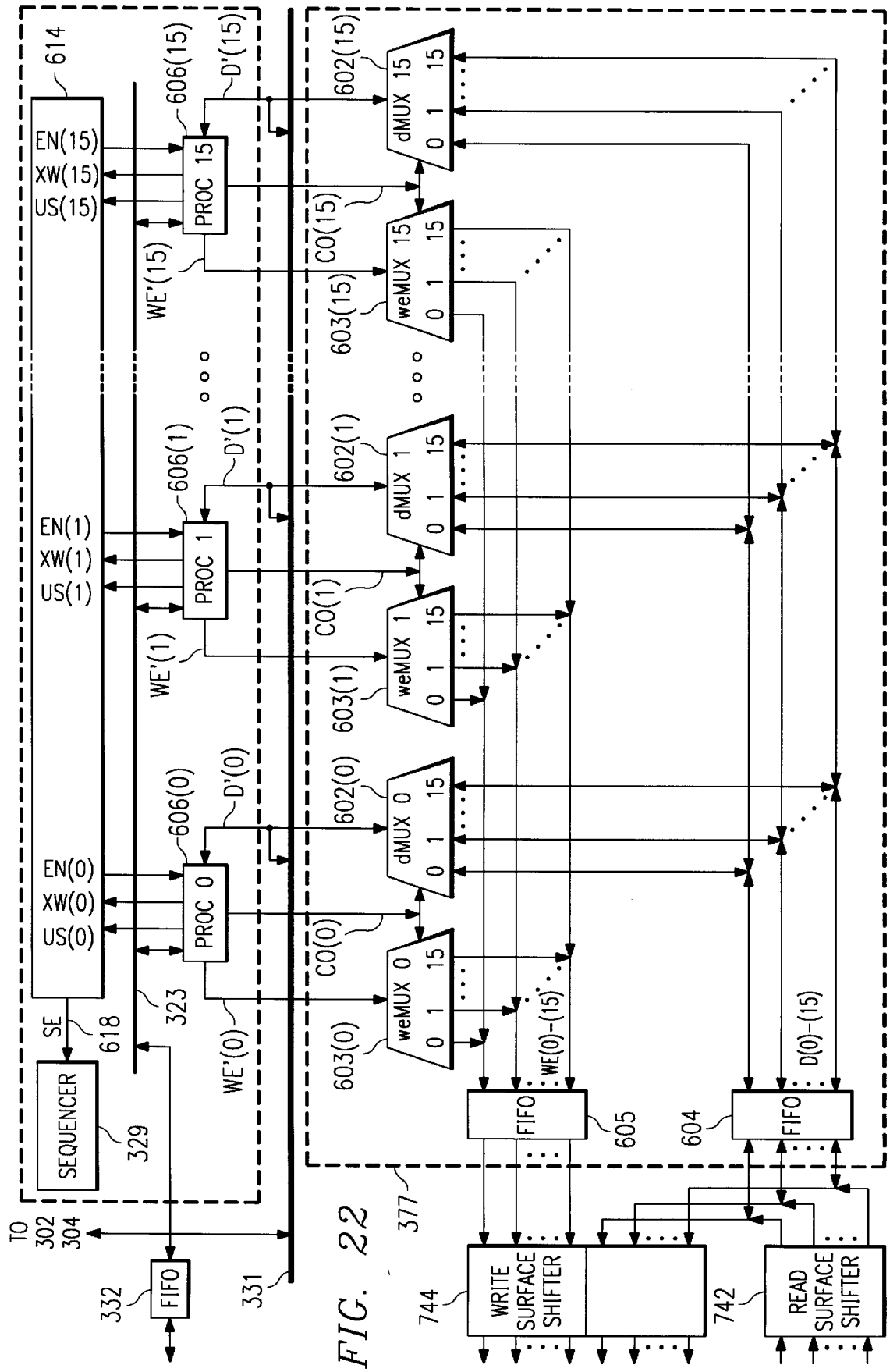
FIG. 22 is a schematic diagram of an exchange and grid processor which, in the presently preferred embodiment, is part of the renderer of FIG. 4.

The exchange 326 includes a crossbar 377, and a logical implementation of the crossbar 377 and of the grid processor 312 is shown in more detail in FIG. 22. As shown, the crossbar 377 comprises sixteen 16:1 32-bit data multiplexers 602(0) to 602(15); sixteen 16:1 1-bit write enable multiplexers 603(0) to 603(15); a 512-bit bidirectional FIFO 604 for pixel data; and a 16-bit bidirectional FIFO 605 for the write enable signals. During a read operation, the 16 pixels of a 4×4 patch are supplied from the VRAM 700 (FIG. 8) via the read surface shifter 742 and via the FIFO 604 as data D(0) to D(15) to the sixteen inputs of each data multiplexer 602(0) to 602(15). During a write operation, the data multiplexers 602(0) to 602(15) supply data D(0) to D(15) via the FIFO 604 and the write surface shifter 744 to the VRAM and the write enable multiplexers 603(0) to 603(15) supply write enable signals WE(0) to WE(15) via the FIFO 605 to the write surface shifter 744. The FIFOs 604, 605 and also the FIFO 332 are employed so that the grid processor 312 does not need to be stalled to take account of different access speeds of the VRAM 700 in dependence upon whether page-mode of non-page-mode access is taking place.

Each of the data multiplexers 602(0) to 602 (15) is associated with a respective one of sixteen processors 606(0) to 606(15) and communicates therewith respective data signals D'(0) to D'(15), which are logically 32 bits, but which in practice may be implemented physically as 16 bits, with appropriate multiplexing techniques. The data signals D'(O) to D'(15) are also supplied to respective parts of the bus 331. Also, each of the write enable multiplexers 603(0) to 603(15) is associated with a respective one of the sixteen processors 606(0) to 606(15) to 606(15) which supply respective 1-bit write enable signals WE'(0) to WE'(15) to the write enable multiplexers. Each processor 606(0) to 606(15) provides a logical control signal CO(0) to CO(15) to control both its associated data multiplexer 602 and write enable multiplexer 603. Thus, during writing to the memory, any processor may provide any respective one of the data signals by providing the number 0 to 15 of the required data signal as its control signal to its data and write enable multiplexers. Furthermore, during reading from the memory, any processor may read any of the data signals by providing the number 0 to 15 of the required data signal to its data multiplexer. Thus, there is no restriction on data being processable only relative to a particular processor, and each processor can select and control the routing of its own data.

The crossbar 377 shown in FIG. 22 is simplified for reasons of clarity, and shows, for example, bidirectional multiplexers, which in practice are difficult to implement. A modified form of the exchange, incorporating the crossbar and the surface shifters, is shown in FIG. 46.

Figure 46:
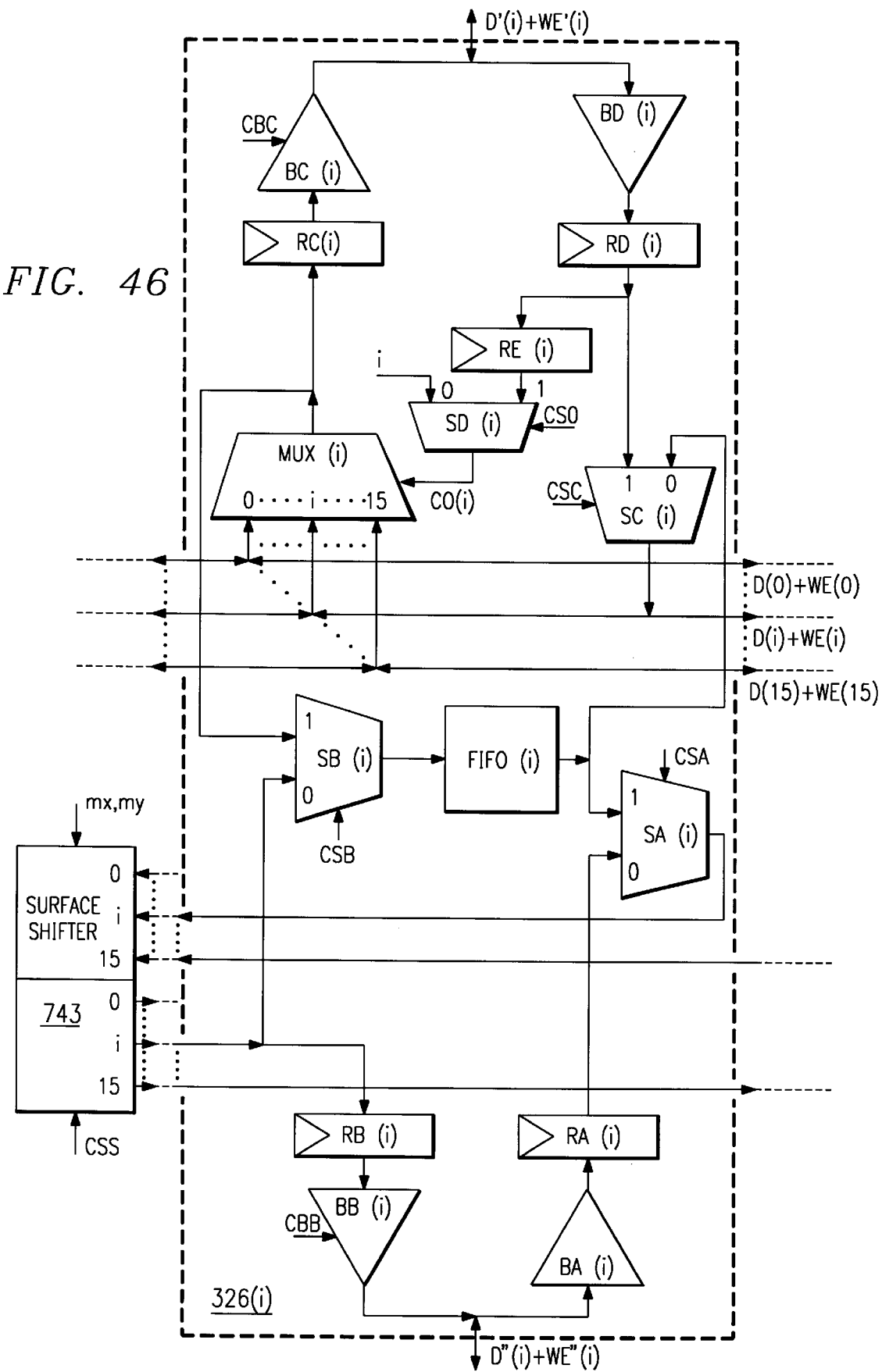
FIG. 46 is a circuit diagram of a modification to the exchange of FIG. 22.

The exchange of FIG. 46 comprises sixteen sections, of which one typical section 326(i) is shown for simplicity. The data D"(i) from the memory is supplied via a buffer BA(i) and register RA(i) to one input of a 2:1 multiplexer SA(i) acting as a two-way switch. The output of the switch SA(i) is fed to an input i of the surface shifter 743 which performs surface shifting for read and for write. The corresponding output i of the surface shifter 743 is fed to one input of a multiplexer switch SB(i) and is also fed back to the data D"(i) input via a register RB(i) and a tri-state buffer BB(i). The output of the switch SB(i) is input to a FIFO(i), the output of which forms the other input of switch SA(i) and is also fed to one input of a further switch SC(i). The set of sixteen data lines D(0) to D(15) connect the exchange sections 326(0) to 326(15) and the output of switch SC(i) is connected to data line D(i). In the general case, the output of each switch SC(0) to SC(15) is connected to the data line of the same number.

The sixteen inputs of a 16:1 multiplexer MUX(i) are connected to the data lines D(0) to D(15), and the output of the multiplexer MUX(i) is connected via a register RC(i) and a tri-state buffer BC(i) to the respective processor PROC(i) via the data line D'(i). The output of the multiplexer MUX(i) is also connected to the other input of switch SB(i). Furthermore, the data line D'(i) from the processor PROC(i) is also connected via a buffer BD(i) and a register RD(i) to the other input of the switch SC(i).

The control signal CO(i) for the multiplexer MUX(i) is provided by a switch SD(i) which can select between a hardwired value i or the output of a register RE(i) which receives its input from the output of the register RD(i).

Also, control signals CSB, CSC, CSD and CBC are supplied to the multiplexer switches SB(0) to (15), the multiplexer switches SC(0) to (15), the multiplexer switches SD(0) to SD(15), the tri-state buffers BC(0) to (15) from the microcode memory 308 (FIG. 4) of the processing section 321. Furthermore, control signals CSA, CBB and CSS derived from the microcode memory 307 of the address processing section 309 are supplied to the multiplexer switches SA(0) to (15), the tristate buffers BB(0) to (15) and the surface shifter 743.

The exchange 326 of FIG. 46 is operable in three modes. In a read mode, the processors PROC(0) to PROC(15) can read the memory; in a write mode, they can write to the memory; and in a transfer mode, they can transfer pixel data between each other. The values of the control signals for these three modes are as follows:

|  | CSA | CSB | CSC | CSD | CBB | CBC | CSS |
|---|---|---|---|---|---|---|---|
| READ | 0 | 0 | 0 | 0/1 | 0 | 1 | 0 |
| WRITE | 1 | 1 | 1 | 0/1 | 1 | 0 | 1 |
| TRANSFER | X | X | 1 | 1 | X | 0/1 | X |

It should be noted that the control signal CSD can select between a "straight-through" mode in which each multiplexer MUX(i) selects its input i and thus data D(i), or a "processor-selection" mode in which it selects an input j and thus data D(j) in accordance with the value j which the processor has loaded into the register RE(i).

Figure 47A:
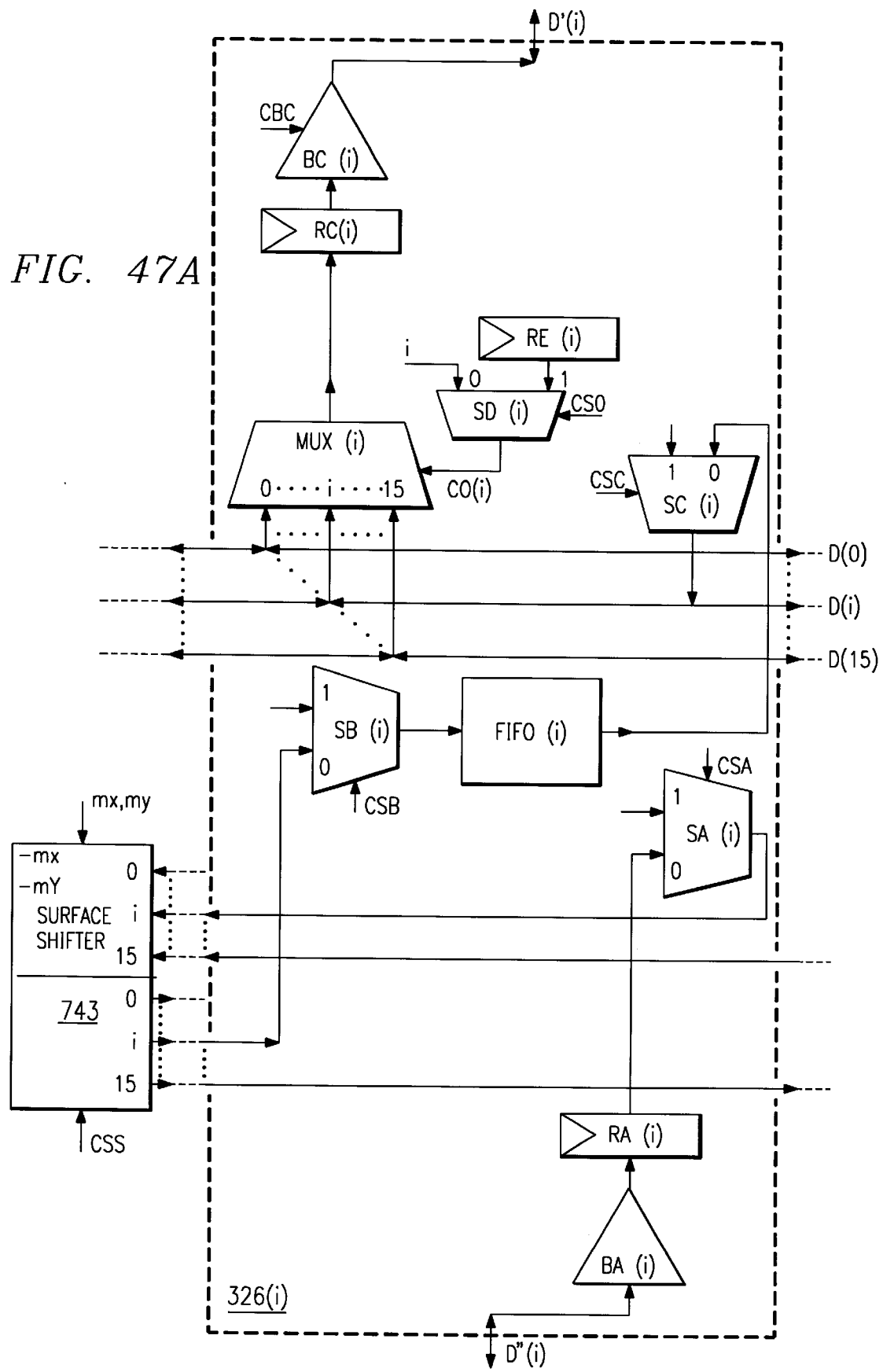
FIGS. 47A to 47C are simplified forms of the circuit of FIG. 46 when operating in three different modes.

The effective configuration of a generalised one of the exchange sections 326(i) of FIG. 46 in the read mode is shown in FIG. 47A. In this configuration, the data path from the data line D"(i) is via the register RA(i) to the surface shifter 743. In the read mode, the surface shifter applies a shift of (−mx,−my) (mod. 4) to the data paths. From the surface shifter, the data path continues via the FIFO(i) to the data line D(i). The multiplexer MUX(i) can select if CSD=0 the straight-through path in which its output is D(i), or if CSD=1 the processor selection path in which its output is D(j) were j is the value loaded into the register RE(i). The output data passes via the register RC(i) as data D'(i) to the processor PROC(i).

Figure 47B:
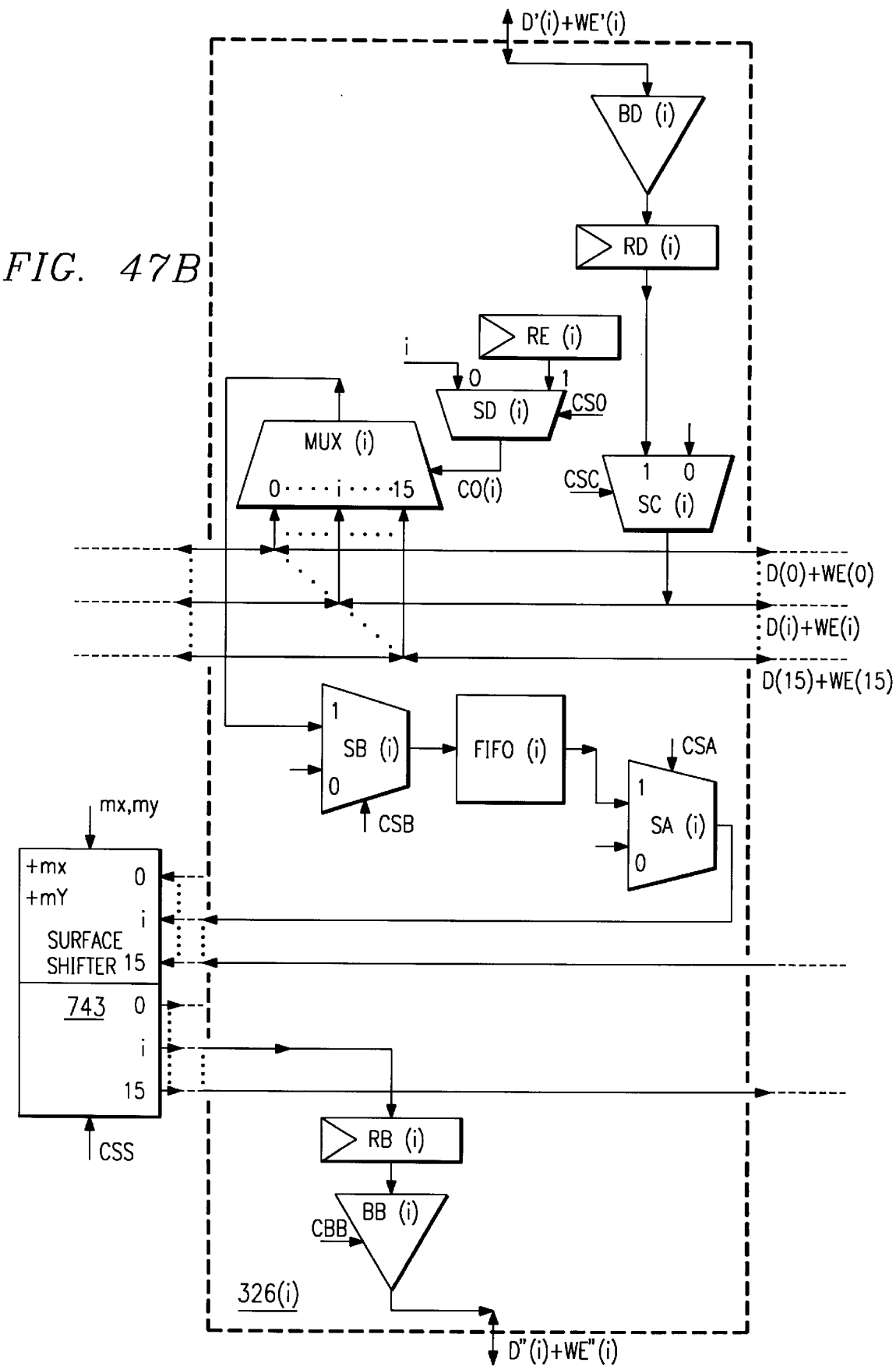

The effective configuration of the exchange section 326(i) in the write mode is shown in FIG. 47B. The data D'(i) from the respective processor PROC(i) passes via the register RD(i) to the data line D(i). The multiplexer MUX(i) can select, if CSD=0, the straight-through path in which its output is D(i), or if CSD=1 the processor selection path in which its output is D(j) where j is the value loaded into the register RE(i). The output data passes via the FIFO(i) to the surface shifter 743. In the write mode, the surface shifter applies a shift (+mx,+my) (mod. 4) to the data paths. From the surface shifter, the data path continues via the register RB(i) as data D"(i) to the VRAM 700.

It should be noted from FIGS. 46 and 47B that, in the write mode, the write-enable signal follows the same path WE'(i) to WE(i) to WE"(i) as the data signal path D'(i) to D(i) to D"(i). Thus these paths are logically 33 bits made up from 32 bits for the data signal and 1 bit for the write-enable signal.

Figure 47C:
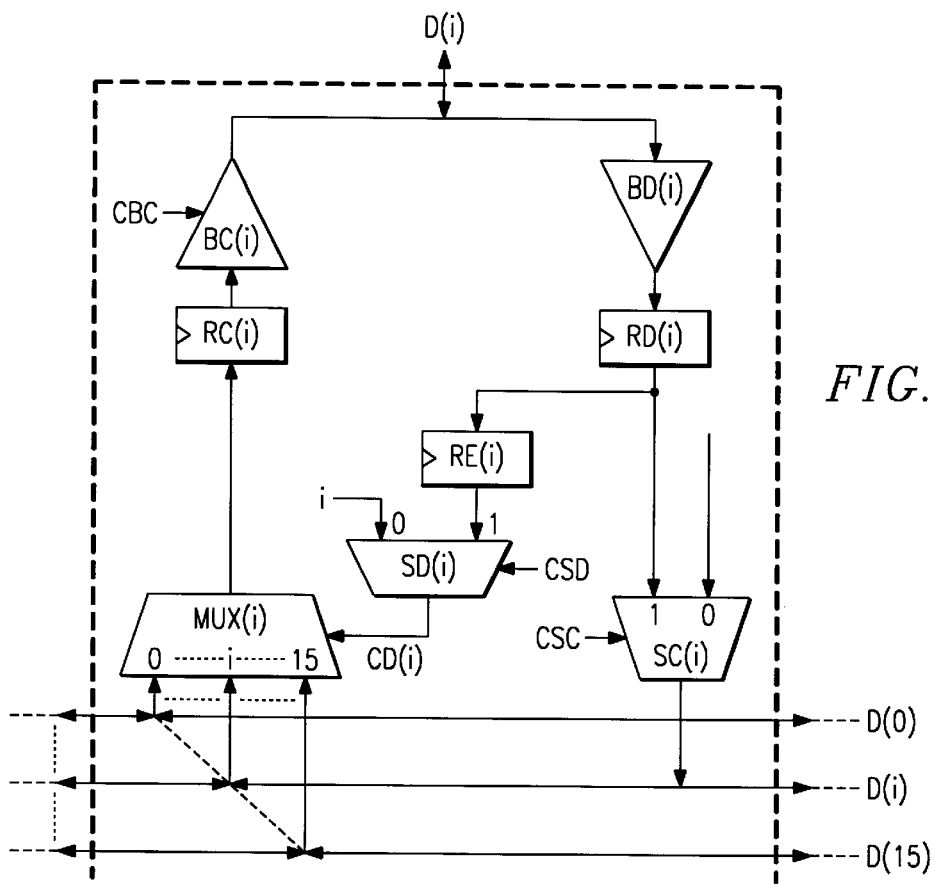

In the transfer mode, the effective configuration of the exchange section 326(i) is as shown in FIG. 47C. In this configuration the control signal CSD to the switch SD(i) is set to 1 so that the multiplexer MUX(i) receives as its control signal the value j loaded into the register RE(i). There are four phases to a transfer. In the first phase the processors output the values j of the data D(j) which they wish to receive as the lowest four bits of their data lines, and these values j are clocked into the registers RD(i). In the second phase, the processors output the data to be transferred out, and this data is clocked into the registers RD(i), while the values j are clocked out of the registers RD(i) and into the registers RE(i), thus setting the multiplexers MUX(i) to receive the data on the respectively selected lines D(j). In the third phase, the data in the registers RD(i) is clocked out onto the lines D and each multiplexer MUX(i) receives and outputs the data on respectively selected line D(j). In the fourth phase, the outputs of the multiplexers are clocked into the registers RC(i) and the tristate buffers BC(i) are enabled so that the processors can transfer in the data from the buffers BC(i). Thus, each processor PROC(i) receives the data (j) from the processor PROC(j) which was selected by the processor PROC(i) by its output value j in the first phase.

Referring back to FIG. 22, the processors 606(0) are connected to the data broadcast bus 323 and to a priority encoder 614 having 16 sections and which is associated with the sequencer 329. The processors 606(0) to 606(15) communicate address data with the data broadcast bus 323 and the FIFO 332 connects the data broadcast bus 323 with the address processor 310. The processors 606(0) to 606(15) can also supply respective "unsatisfied" signals US(0) to US(15) and respective "X waiting" signals XW(0) to XW(15) to the respective sections of the priority encoder and can receive respective "process enable" signals EN(0) to EN(15) from the respective sections of the priority encoder 614. Lastly, the priority encoder 614 has a sequencer enable (SE) output on line 618 to the sequencer 329 which controls the sequence of processing of a series of microcode instructions by the processors 606.

Figure 23A:
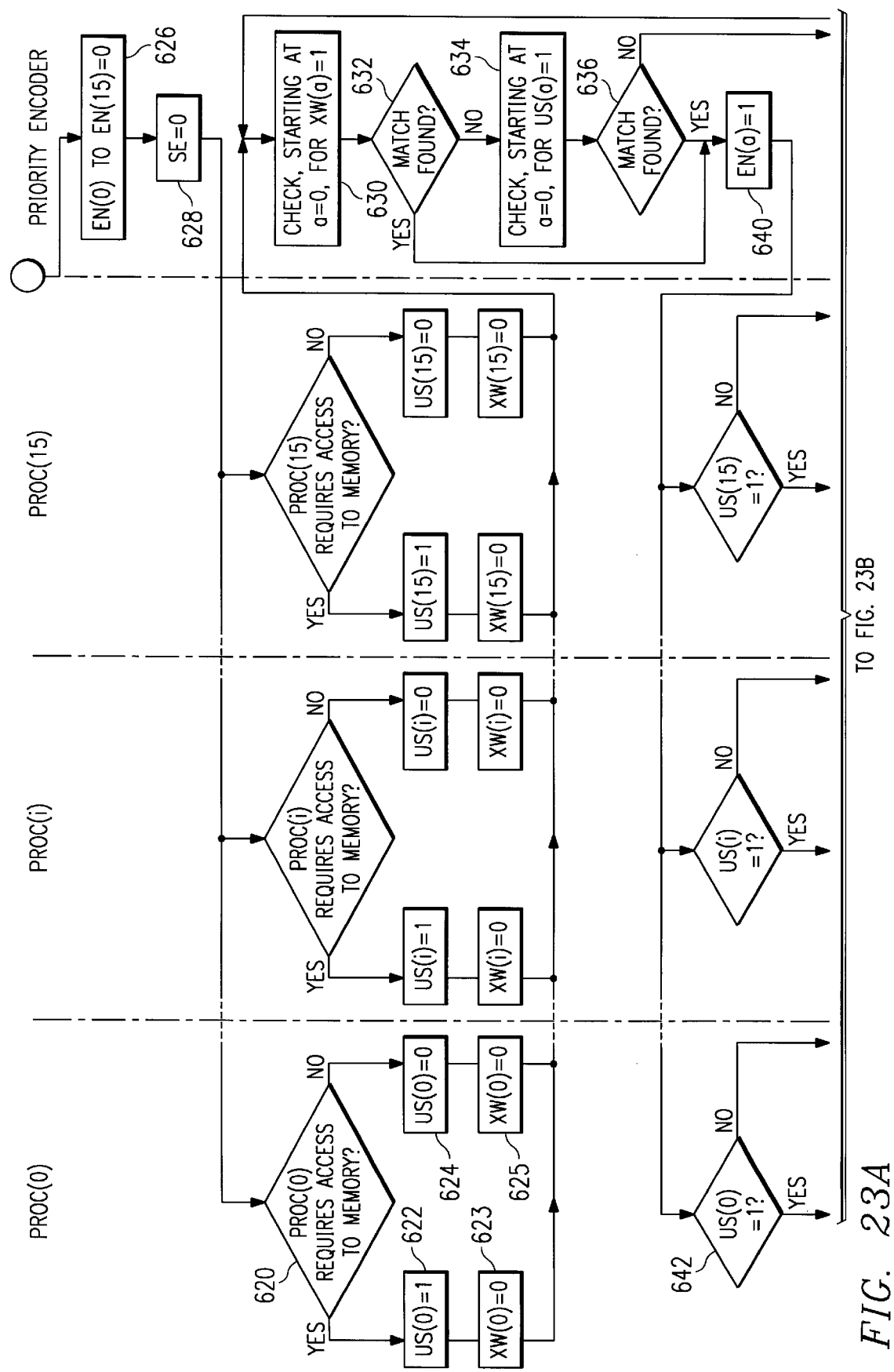
FIG. 23 is a flow diagram illustrating the operation of the proctors and a priority encoder of the grid processor of FIG. 22.
Figure 23B:
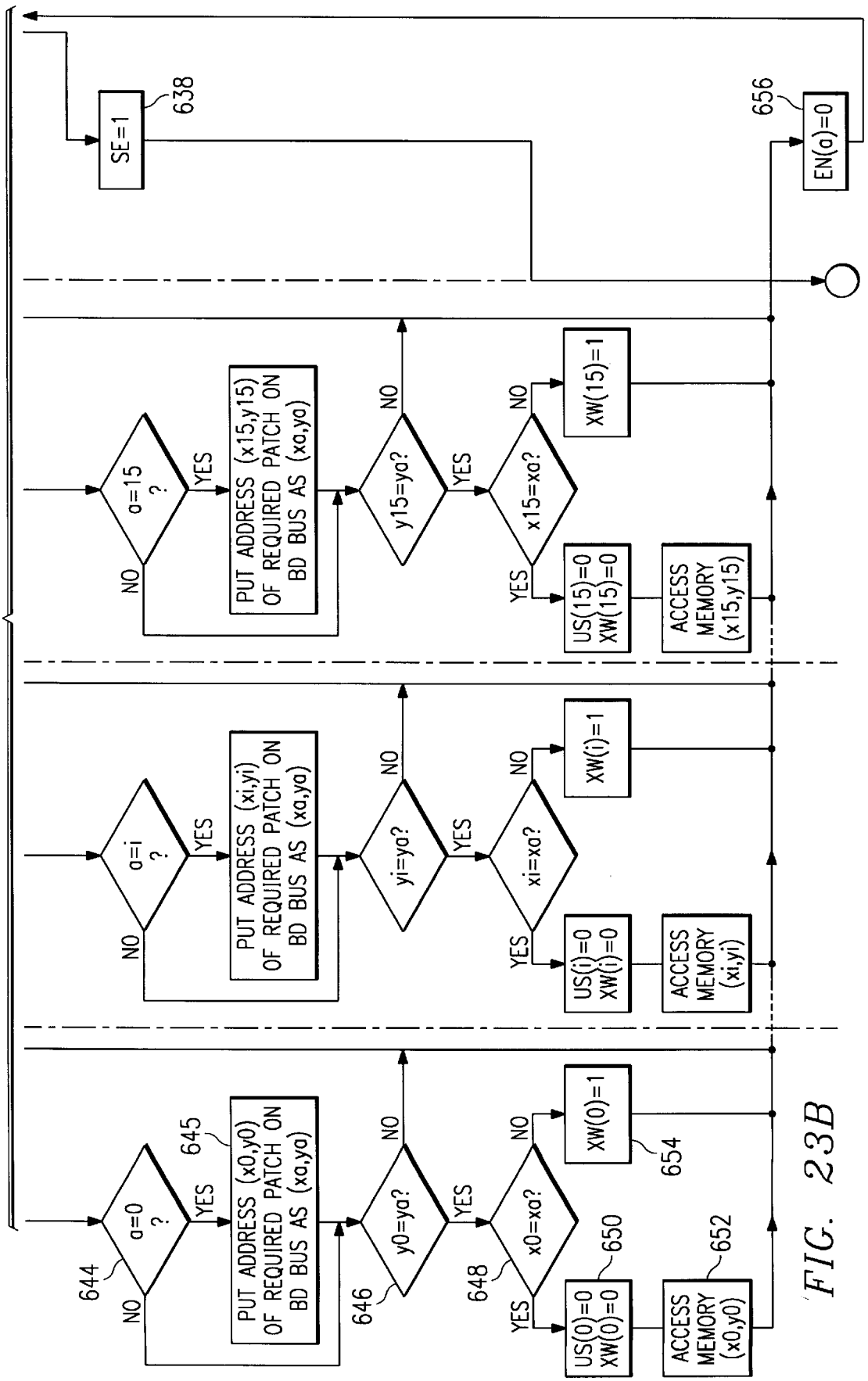

The purpose of the priority encoder 614 is to provide high efficiency in the accessing by the processors 606 of the memory 700. In order to do this, the encoder 614 and processors perform the following process, which is shown in the flow diagram of FIG. 23. In FIG. 23, the left-hand three columns contain steps which are taken by the processors 606(0) . . . 606(i) . . . 606(15), or PROC(0) . . . PROC(i) . . . PROC(15), in parallel with each other, the right-hand column contains steps performed by the priority encoder.

At the beginning of each microcode instruction, there are a series of initialisation steps 620 to 628. In steps 620 to 625, those processors which require access to the memory set (1) their respective unsatisfied signals US and reset (0) their X waiting signals XW, and those processors which do not require access reset (0) their unsatisfied signals US and their X waiting signals XW. In steps 626, 628, the priority encoder resets (0) the process enable signals EN for all of the processors and also resets (0) the sequencer enable signal SE.

After initialisation, the priority encoder 614 checks through the XW signals, starting with XW(0) in step 630 to find any processor which is X waiting, and if a match is found (step 632) at a processor, designated PROC(q), then the routine proceeds to step 640. If a match is not found, however, in step 632, then the priority encoder checks through the US signals, starting with US(0) in step 634 to find a processor which is unsatisfied, and if a match is found (step 636) for a processor, designated PROC(q), then the routine proceeds to step 640. If a match is not found, however, in step 636, then this indicates that all processors are satisfied, and accordingly the microcode program can proceed. Therefore, the sequence enable signal SE is set in step 638, and the routine terminates.

In step 640, the process enable signal EN(q) for the selected processor PROC(q) is set. In steps 642, each processor determines whether it is unsatisfied, and if not exits the subroutine of steps 642 to 654. For any processor which is unsatisfied, then in steps 644, that processor determines whether it is the selected processor, and if so supplies, in step 645, to the data broadcast bus 323 as (xq, yq) the virtual address of the base pixel (0,0) of the patch of pixel data which it wishes to process. This address is supplied via the FIFO 332 to the address processor 310, which in response accesses the appropriate locations in the memory 700, swapping in and out pages of pixel data, if required, as described above.

Then, in steps 646, each unsatisfied processor determines whether the y address yi of its required patch of pixel data is equal to the y address yq of the patch which is being accessed. If not, then the processor exits the subroutine of steps 642 to 654. If, however, yi=yq, then in step 648 the processor determines whether the X address xi of its required patch of pixel data is equal to the X address xq of the patch which is being accessed. If so, then the processor resets (0) its unsatisfied signal US(i) and X waiting signal XW(i) in step 650, and accesses the memory for read or write, as appropriate, in step 652. The processor then exits the subroutine of steps 642 to 654. If, in step 648, xi<>xq then in step 654 the X waiting signal XW(i) is set (1), and then the subroutine is exited.

Upon exit from the subroutine of steps 642 to 654 of all processors PROC(0) to PROC(15), the routine proceeds to step 656, where the priority encoder resets (0) the process enable signal EN(q) for the selected processor. The routine then loops back to step 630.

It will be appreciated from the above that (A) the lowest numbered processor (an arbitrary choice) which is unsatisfied is selected and given access to the memory initially, together with any other processors which require access to the same address as that selected processor. Then, (B) of any remaining unsatisfied processors which require access to the same y address as the selected processor, the lowest numbered processor is given access, together with any other processors requiring the same address. Then, (C) of any remaining unsatisfied processors which require access to the same y address as the last satisfied processor, the lowest numbered processor is given access, together with any other processors which require access to the same address. Step C is repeated, if necessary, and then steps A and B are repeated until all of the processors have been satisfied. The next microcode instruction sequence is then processed.

Figure 24:
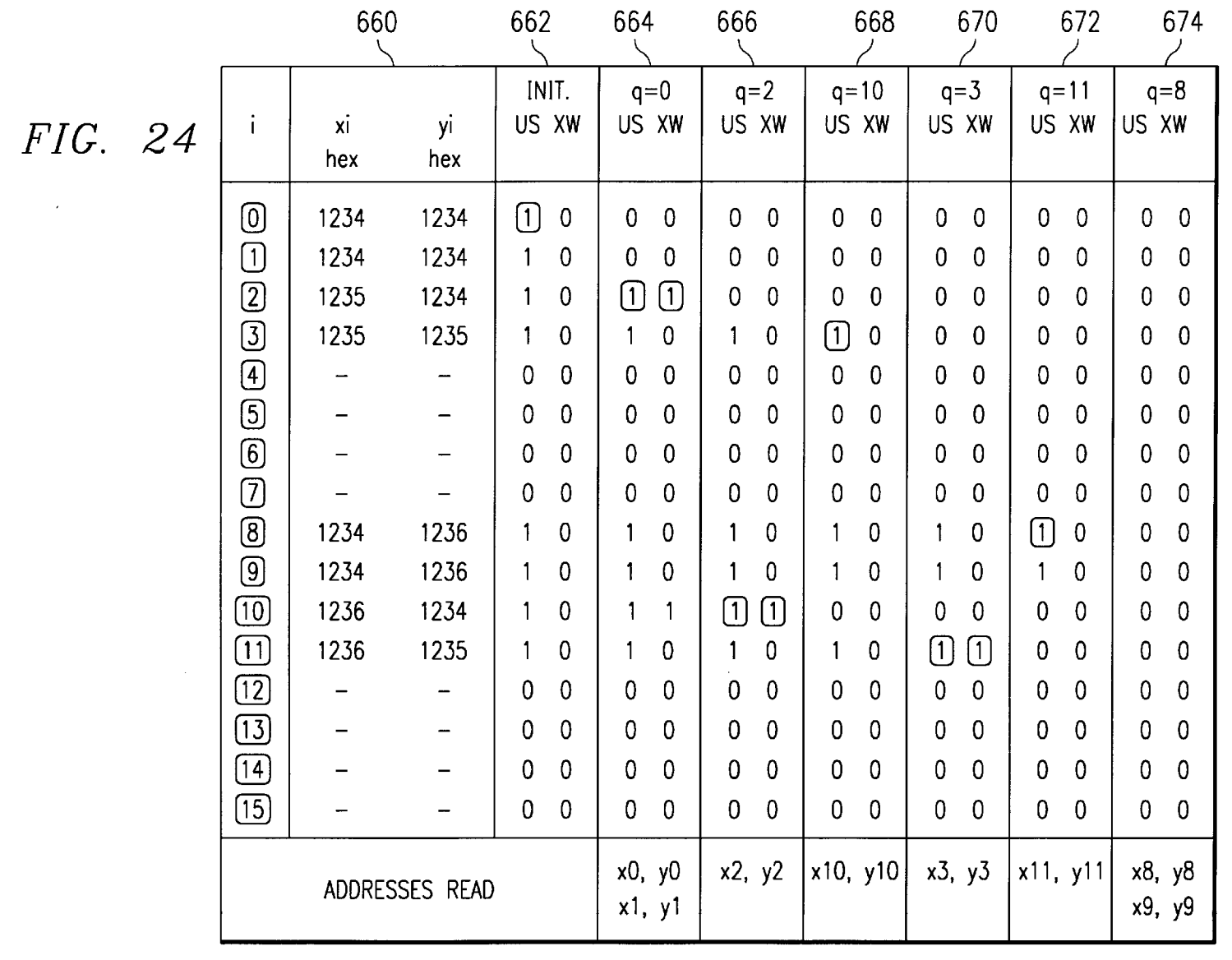

As example of the operation of the priority encoder and processors in accessing the memory will now be described with reference to the table of FIG. 24. In the example, PROC(0) to (3) and (8) to (11) require access to the patches having the base pixel X and Y addresses listed in column 660 of the table, the addresses being in hexadecimal notation. Thus, after the initialisation routine, US(0) to (3) and (8) to (11) are set to 1 and the other US signals and the XW signals are reset to 0, as shown in column 662.

In the first loop of the main routine, PROC(0) is selected, i.e. q=0, and thus accesses the memory at (1234, 1234). Because PROC(1) requires the same address, it also becomes satisfied, i.e. US(1)=0, and accesses the memory at (1234, 1234). Furthermore, because PROC(2) and PROC(10) require the same Y address-as PROC(0), they become X waiting, i.e. XW(2)=XW(10)=1. This is shown in column 664.

In the next loop of the main routine, PROC(2) is found to be X waiting XW(2)=1), and thus PROC(2) is selected, i.e. q=2. Therefore PROC(2) becomes satisfied, (US(2)=XW(2) =0), as shown in column 666, and accesses the memory at (1235, 1234).

In the next loop of the routine, PROC(10) is found to be X waiting XW(10)=1), and thus PROC(10) is selected, i.e. q=10. Therefore PROC(10) becomes satisfied, (US(10)= XW(10)=0), as shown in column 668, and accesses the memory at (1236, 1234).

In the next loop of the routine, no processor is found to be X waiting, and PROC(3) is found to be the first completely unsatisfied processor, i.e. US(3)=1, YS(3)=0. Therefore PROC(3) is selected (q=3), becomes satisfied (US(3)=XW (3)=0) and accesses the memory at (1235, 1235). Also because PROC(11) has the same Y address as PROC(3), PROC(11) becomes X waiting, i.e. XW(11)=1, as shown in column 670.

In the next loop of the routine, PROC(11) is found to be the only X waiting processor, (US(11)=XW(11)=1). Therefore, PROC(11) is selected (q=11), becomes satisfied (US(11)=XW(11)=0) and accesses the memory at (1236, 1235), as shown in column 672.

In the next loop of the routine, PROC(8) is found to be the first unsatisfied processor (US(8)=1). Therefore, PROC(8) is selected (q=8), becomes satisfied, and accesses the memory at (1234, 1236). Furthermore, because PROC(9) requires the same address, it also becomes satisfied (US(9)=0) and accesses the memory.

During the next loop of the routine, no processors are found to be unsatisfied, and therefore the sequence enable signal SE is set and the next microcode instruction is processed.

By using the priority encoder as described above, processors which require access to the same patch can access that patch simultaneously. Furthermore, when a plurality of processors require access to different patches having the same Y address, their accesses are made immediately one after the other, in "page model". Therefore the address translator does not need to re-latch the Y address(es) in the Y address latches 706(0) to (15) (FIGS. 8 and 14) between such accesses. Thus, a considerable improvement in performance is achieved as compared with a case where the processors PROC(0) to (15) access their required patches one at a time, sequentially and without reference to any similarity between the addresses to be accessed.

In the system described above, up to sixteen pixels in a patch are processed in parallel by sixteen processors. Preferably, the system is also arranged so that a group of patches, for example, up to 32 patches, are processed in series in order to reduce pipeline start and finish overheads. In this case, the method of operation may be modified, as compared with that shown in FIG. 23, in order to increase efficiency, by permitting any processor requiring access to, say, a jth pixel in the group to request that pixel without firstly waiting for all the otter processors to complete access to their (j–1)th pixels in the group. To do this, between steps 623 and 630 in FIG. 23, for each processor the step "set address of first required pixel in group as (xi, yi)" is included for each processor PROC(i). Furthermore, steps 650 and 652 for each processor as shown in FIG. 23 are replaced by the steps shown in FIG. 48. In step 682, the memory is accessed at address xi, yi for the particular processor PROC(i). Then, in step 684, it is determined whether or not the processor PROC(i) requires access to a further pixel in the group, and if not in step 686, the unsatisfied flag US(i) and the X waiting flag XW(i) are both reset to 0, similarly to step 650 in FIG. 23. However, if so in step 684, then in step 688 the processor PROC(i) sets the address of the next required pixel as (xi, yi). Then, in step 690, it is determined whether or not the new y address yi is equal to the Y address yq of the last accessed pixel. If so, then in step 692, the X waiting flag XW(i) is set to 1, whereas if not, then in step 694, the X waiting flag XW(i) is reset to 0. After steps 692 or 694, the routine proceeds to step 656 as in FIG. 23. It will therefore be appreciated that, once any processor has accessed a pixel in its series of required thirty-two pixels, it can immediately make itself ready to access the next pixel in its series, irrespective of how many of their required thirty-two pixels each of the other processors has accessed. This therefore makes good use of the page mode accessing of the VRAM in which a series of pixels with the same Y address are accessed without the need to re-latch the Y address between each access.

Figure 48:
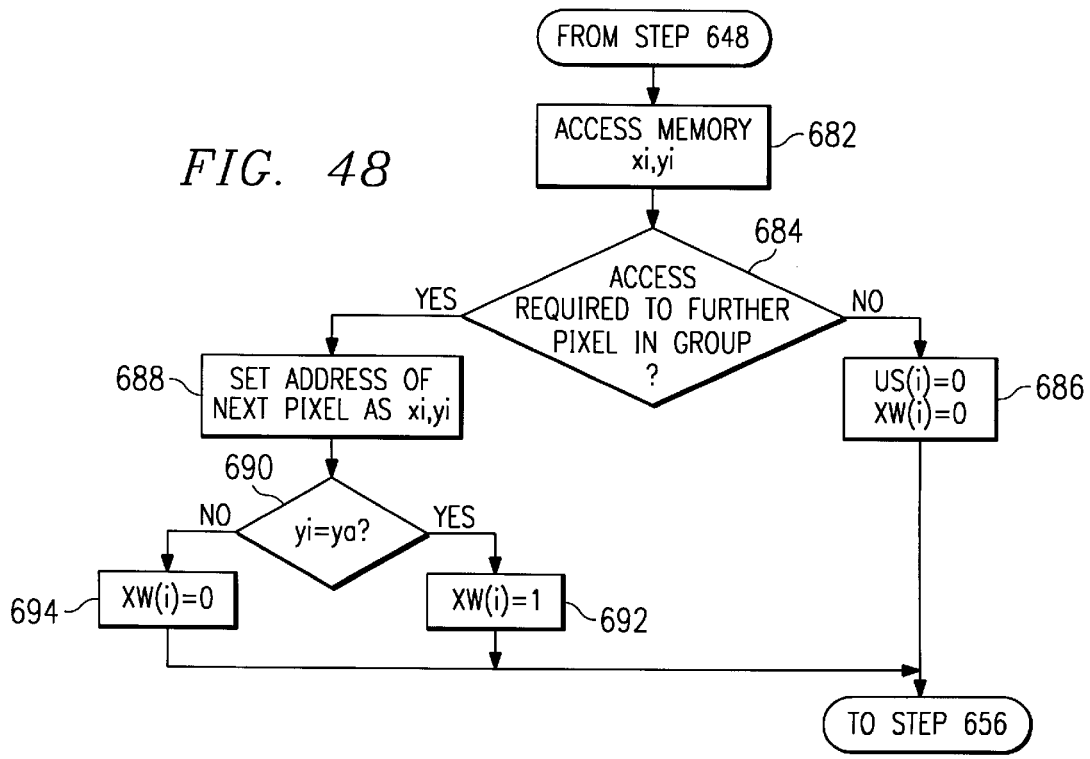
FIG. 48 shows a modification of the flow diagram at FIG. 23.

A problem which can arise with the modification of FIG. 48 is that some of the processors can inordinately race ahead of others of the processors in accessing their thirty-two pixels. For example, in the case where the processors require access to many different Y addresses, it may arise that PROC(0) accesses all of its thirty-two required pixels first, then PROC(1) accesses its thirty-two pixels, and so on. In order to obviate this problem, the following further modification may be made. Basically, access is permitted with the following order of priority: (a) of highest priority, processors which require access in page-mode (i.e. with the same Y address as the last access) are arbitrated for access; (b) of second priority, processors which have progressed least through their series of thirty-two accesses are arbitrated for access; and (c) of lowest priority there is arbitrary selection of any processors still requiring access. This is achieved by maintaining in a register file of each processor a respective local pointer LP(i) indicating which of its 32 accesses it is waiting for, a common low watermark pointer WM for all the processors, and a common high watermark pointer HP for all the processors. Furthermore, the significance of each unsatisfied flag US(i) is FIGS. 23 and 48 is modified so that US(i)=1 only if LP(i)=WM and the processor PROC(i) is unsatisfied. The process of FIGS. 23 and 48 is then modified as follows. In the initialisation steps 622 to 625, the additional steps are included of resetting to zero LP(i) and WM in the register files of all processors, and setting HP to the number of accesses in the series, usually 31. The step 642 in FIG. 23 is replaced by "LP(i)<>HP?". Furthermore, accompanying step 682 in FIG. 48, where a processor accesses the memory, it also increments it local pointer to LP(i)+1. This then has the affect of dealing with priorities "a" and "b" described above. In order to deal with the priority "e" above, an additional decision is included between steps 636 and 638 in FIG. 23. If the low watermark pointer WM is less than the high pointer HP, then the low watermark pointer in each of the processor register files is incremented to WM+1, and the process loops back to step 630. However, if WM=31 the process proceeds to step 638. From the above, it will be appreciated that the low watermark pointer is always less than or equal to the lowest local pointer LP(i). When there is no page mode, only those processors whose local pointer LP(i) is equal to the low watermark pointer WM are initially involved in the access arbitration. If there are none, the watermark pointer is incremented, unless it is equal to HP.

SPLIT-LEVEL PATCHES

It will be noted from the above that the memory is capable of storing pixel data of 32 bits and that the grid processor is capable of processing pixel data logically of at least 32 bits. In some applications, pixel data having a resolution as great as 32 bits is not needed, and all that may be required is 16-bit or 8-bit pixel data. In such cases it is possible to use only 16 or 8 bits of the 32 bits available for each pixel, but this would then result in the VRAM not being used to its full capacity, and pages of pixel data would need to be swapped between the VRAM and the paging memory more often than is necessary.

It may therefore be considered expedient to split the whole image memory into two for 16-bit data, or four for 8-bit data, and thus overlay whole pages of data one on top of another. This would make available the whole capacity of the VRAM, but would suffer from the disadvantage that severe complications would arise when swapping, for example, just one page of 16-bit or 8-bit data between the VRAM and page memory, because it would be necessary to select only half or a quarter of the stored data for transfer from the VRAM to the paging memory, and it would be necessary to mask off half or three-quarters of the VRAM when transferring a page of data from the paging memory to the VRAM.

There now follows a description of an arrangement which avoids these problems associated with transfer of 16-bit or 8-bit data between the VRAM and paging memories.

In essence, the data is overlaid so that at no single address for each of the 128 VRAMs 710 does there exist data for more than one page. This is achieved by overlaying the 8- or 16-bit pixel data in units of a pixel, or more preferably units of a patch, as described below.

Figure 25:
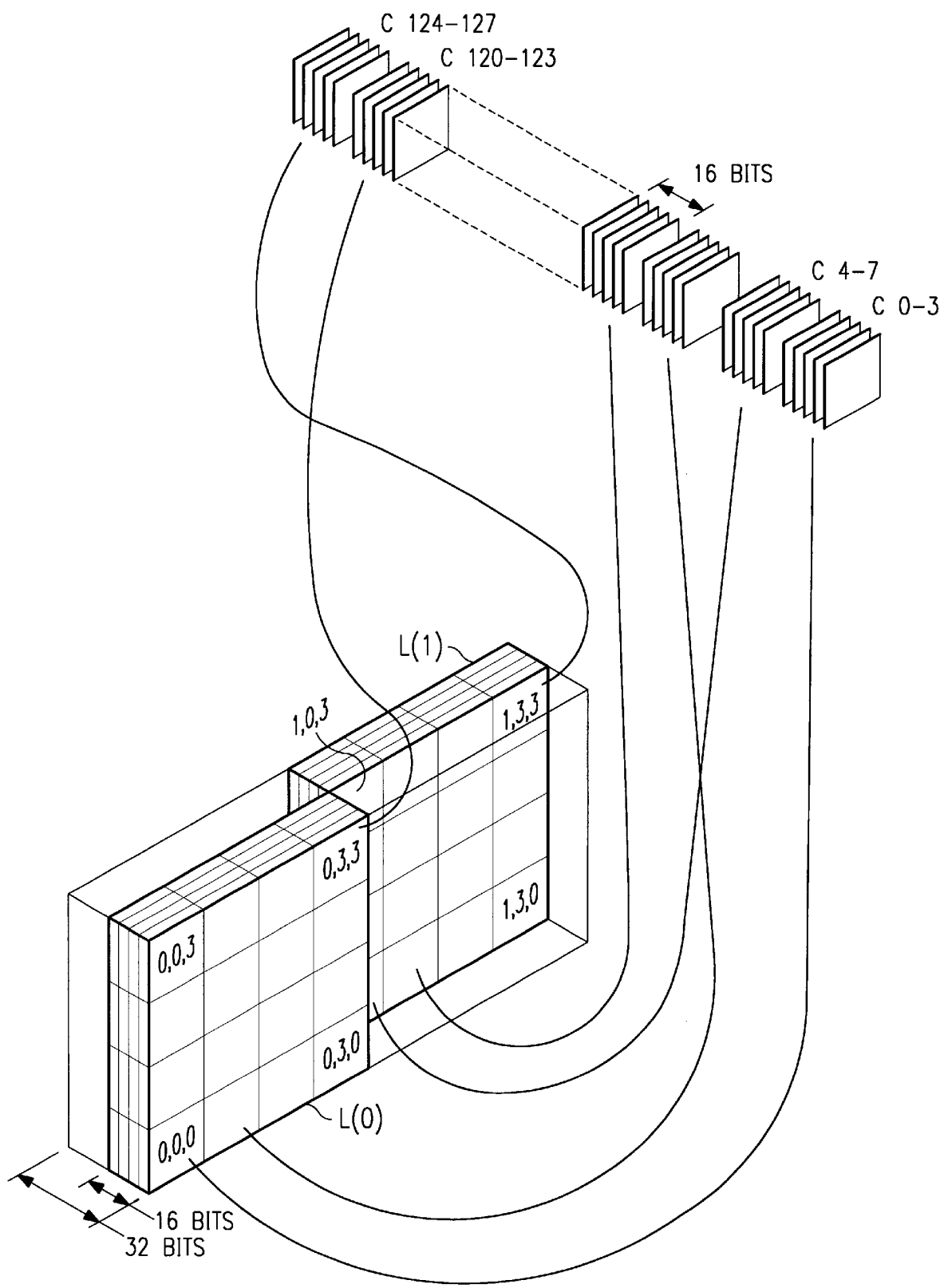
FIG. 25 illustrates the correlation between aligned memory cells and two levels of a patch in a 16-bit split patch system.

Referring to FIG. 25, an aligned set of memory cells C(0) to C(127), one from each VRAM chip, and each 4 bits wide, is shown. In the 32-bit arrangement described above, these cells form an aligned patch of 4×4 pixels.

In the 16-bit patch-overlay modification, these cells form two layers L(0), L(1) of a 8×4 patch. L(0) is provided by C(0) to (3), C(8) to (11), C(16) to (19) . . . C(120) to (123). L(1) is provided by the remaining cells C(4) to (7), C(12) to (15), C(20) to (27) . . . C(124) to (127). When the image represented by the two layers of the patch is to be displayed, layer L(0) is displayed immediately to the left of the layer L(1), as shown in FIG. 25.

In the 8-bit patch-overlay modification the cells form four layers L(0) to (3) of 16 pixel×4 pixel patch. The layers are provided by the cells as follows:

Layer L(0): C(0), C(1), C(8), C(9) . . . C(120), C(121)

Layer L(1): C(2), C(3), C(10), C(11) . . . C(122), C(123)

Layer L(2): C(4), C(5), C(12), C(13) . . . C(124), C(125)

Layer L(3): C(6), C(7), C(14), C(15) . . . C(126), C(127)

When the image represented by the four layers of a patch is to be displayed, the layers are displayed left to right in the order L(0), L(1), L(2), L(3).

A different address format needs to be employed when using 16-bit and 8-bit overlayed patches as compared with that used for the more straightforward 32-bit case, and is given in the table below:

|  | BITS OF VIRTUAL ADDRESS | | |
|---|---|---|---|
|  | 32-bit mode | 16-bit mode | 8-bit mode |
| X misalignment | 0,1 | 0,1 | 0,1 |
| Level | — | 2 | 2,3 |
| X patch address | 2–6 | 3–7 | 4–8 |
| X page address | 7,8 | 8 | — |
| X portion of superpage address | 9–15 | 9–15 | 9–15 |
| Y misalignment | 16,17 | 16,17 | 16,17 |
| Y patch address | 18–22 | 18–22 | 18–22 |
| Y page address | 23,24 | 23,24 | 23,24 |
| Y portion of superpage address | 25–31 | 25–31 | 25–31 |

-continued

| | BITS OF VIRTUAL ADDRESS | | |
| --- | --- | --- | --- |
| | 32-bit mode | 16-bit mode | 8-bit mode |
| Image ID portion of superpage address | 32–47 | 32–47 | 32–47 |

It will be noted that, between the different modes, there is no change of identity of the sixteen bits representing the image ID (32–47), the sixteen bits representing the Y address (16–31), the seven bits representing the X portion of the superpage address (9–15), and the two X misalignment bits (0,1). The X patch address is, however, represented by bits 2–6 for 32-bit mode, by bits 3–7 for 16-bit mode, and by bits 4–8 for 8-bit mode. This makes available bit 2 in the 16-bit mode, and the two bits 2 and 3 in the 8-bit mode, to provide the level data, and leaves only one bit 8 in the 16-bit mode, and no bits in the 8-bit mode, for the X page address.

Figure 26:
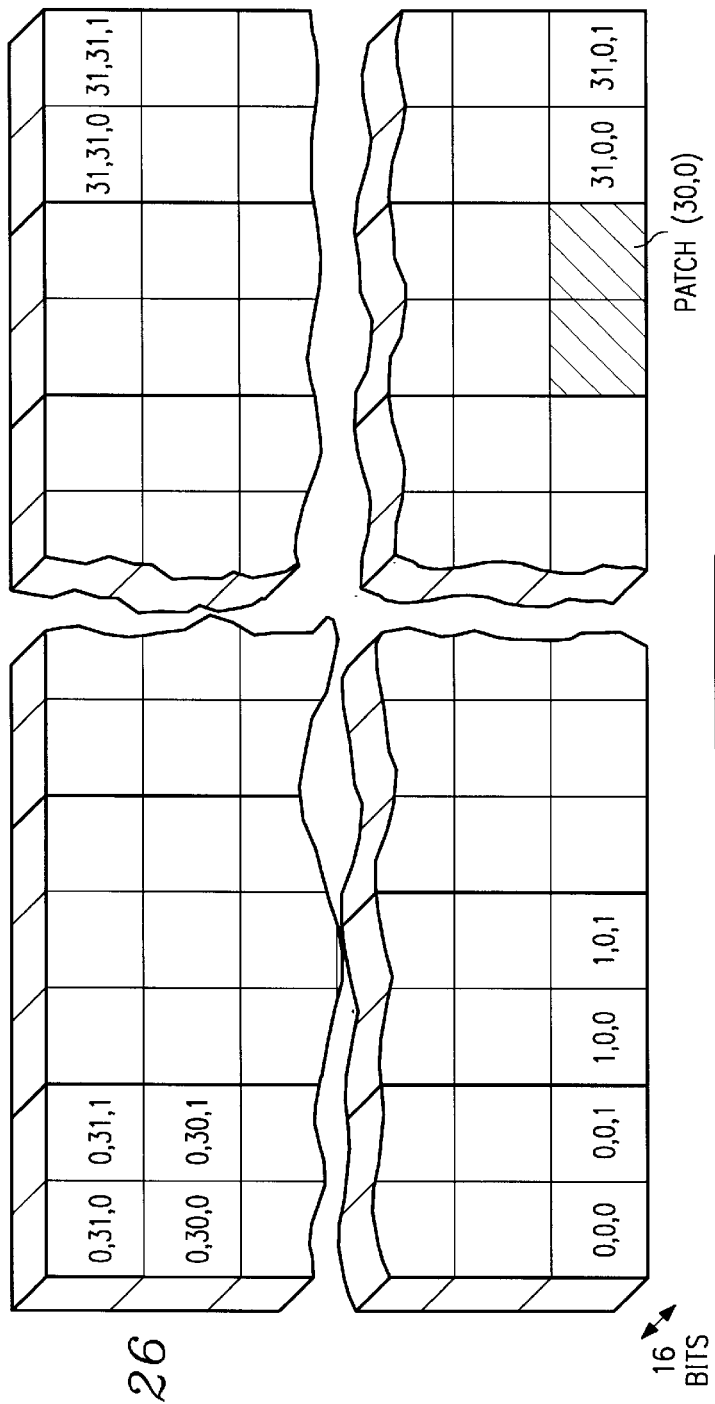
FIGS. 26 and 27 show how pages of patch data, and superpages of page data are made up in a 16-bit split patch system.
Figure 27:
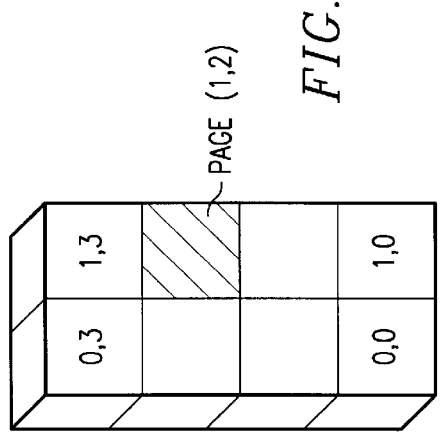
Figure 28:
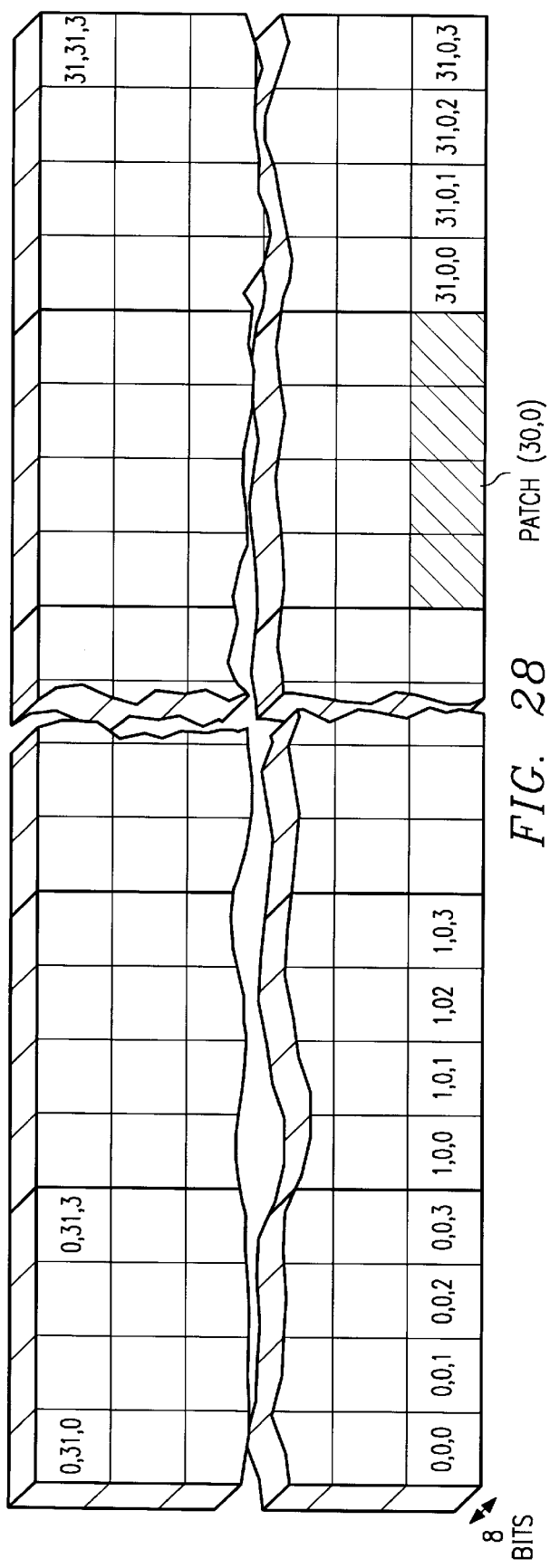
FIGS. 28 and 29 correspond to FIGS. 26 and 27 respectively in an 8-bit split patch system.
Figure 29:
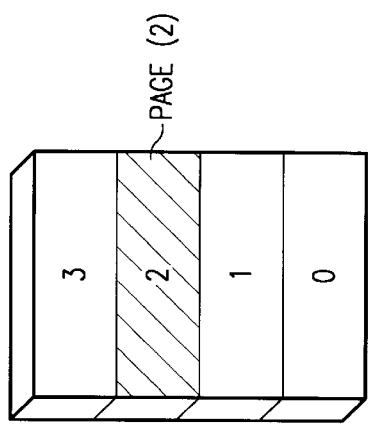

The patch and page arrangements and the address notations used for them are represented in FIGS. 26–29. FIG. 26 shows the arrangement of patches in a single 16-bit page, and FIG. 27 shows the arrangement of 8 pages in one complete 16-bit superpage. FIG. 28 shows the arrangement of patches in a single 8-bit page, and FIG. 29 shows the arrangement of 4 pages in one complete 8-bit superpage.

Figure 15A:
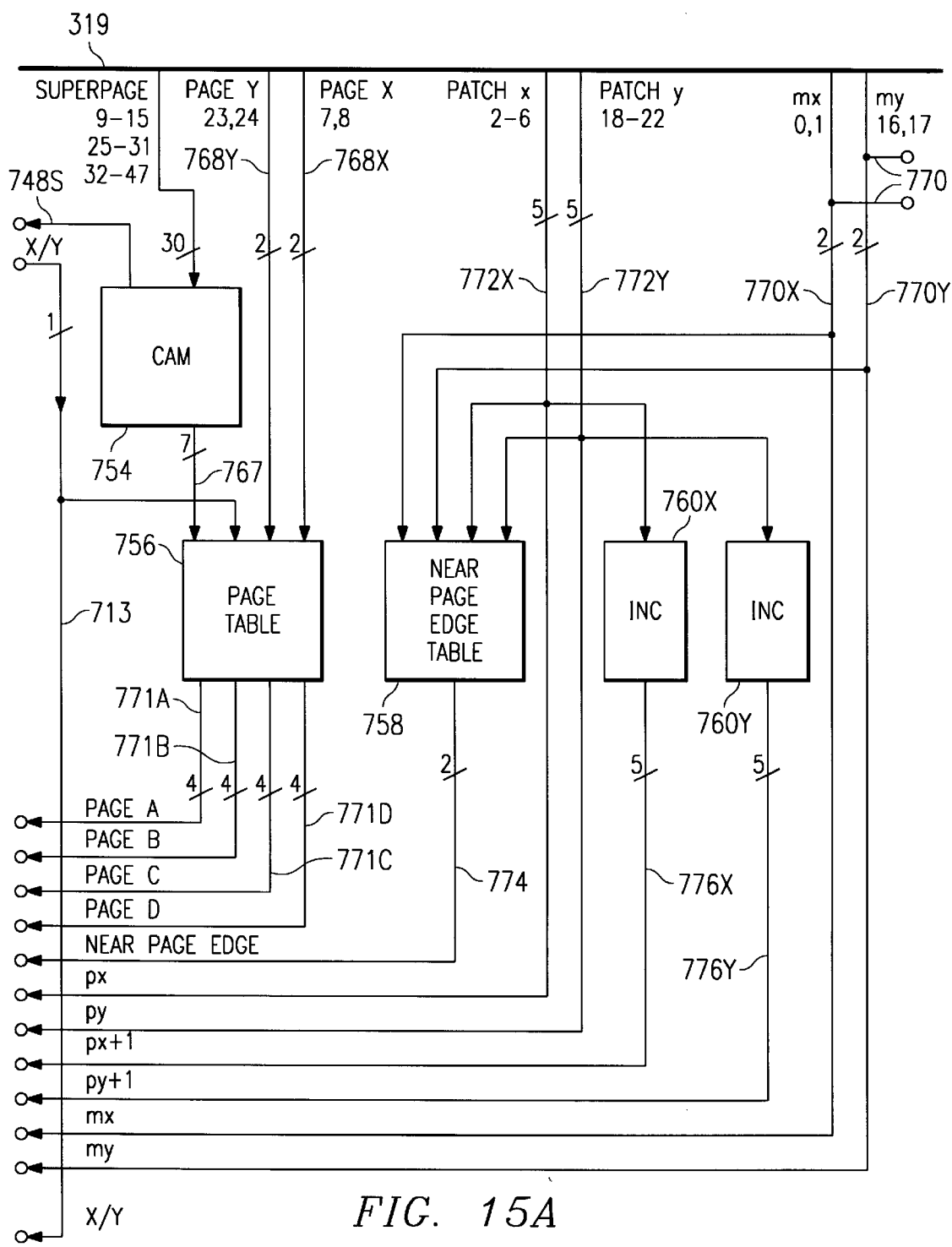
FIG. 15 is a schematic illustration in greater detail of an address translator of FIG. 14.
Figures 31, 32:
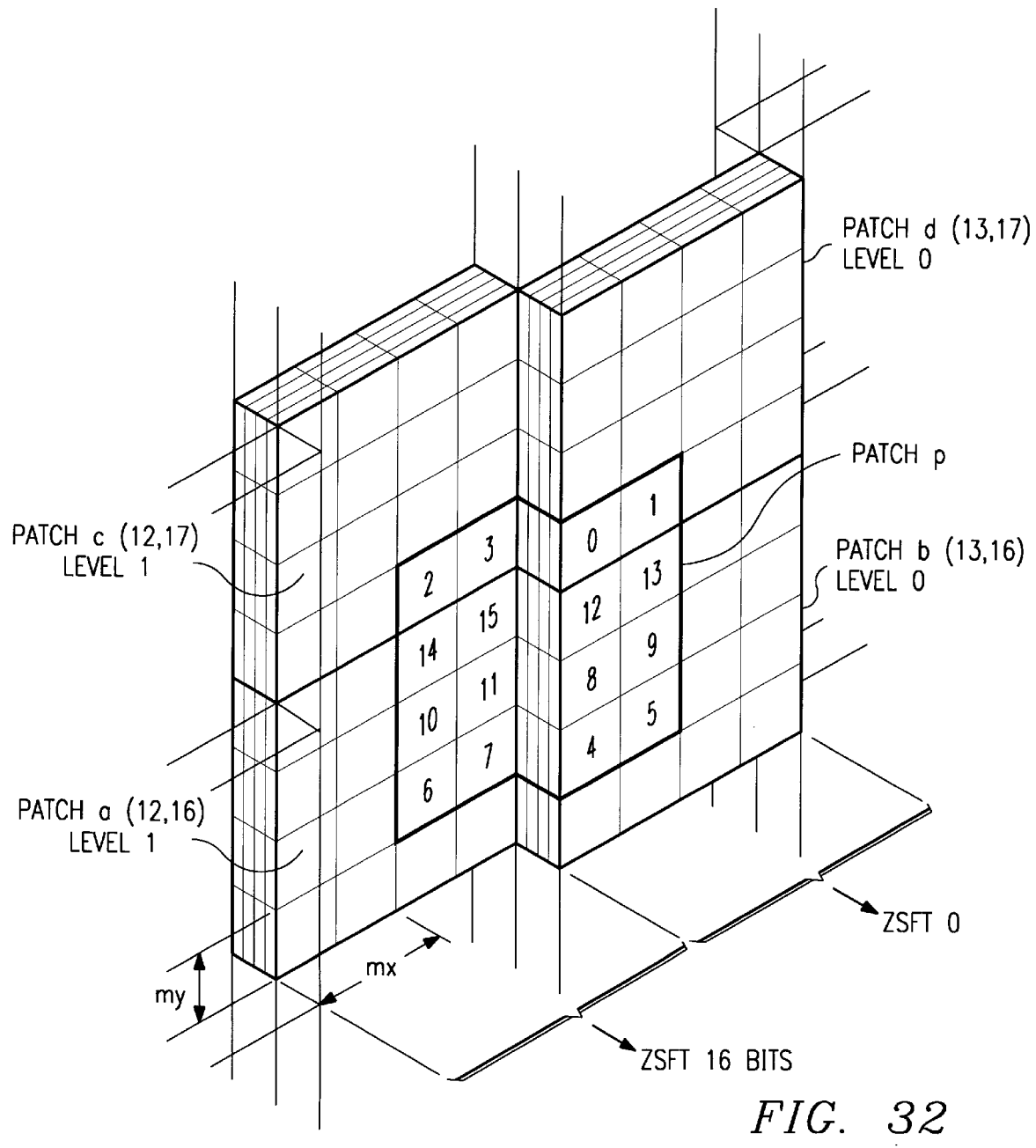
FIG. 31 is a table to explain the operation of a funnel shifter used in the circuit of FIG. 30A.
FIGS. 32 and 33 illustrate non-aligned split patches in a 16-bit and an 8-bit patch system, respectively.

A number of complications arise when dealing with 16- or 8-bit data. Firstly, it is necessary to ensure that the X bits of the address are used in the proper manner. In order to do this, the supply of data from the virtual address bus 319 to the page table 756, near page edge table 758 and X patch address incrementor 760X as shown in FIG. 15A is modified as shown in FIG. 30A. As before, the page Y bits, 23,24 are fed directly to the page table 756 and the patch Y bits, 18–22 are fed directly to the patch Y address multiplexers 784Y, etc. However, the X bits 2–8 (which form the page and patch X addresses in the 32-bit version) are input to a funnel shifter 812. The shift provided by the funnel shifter is controlled by a mode select signal MS on line 814 which is generated by a separate circuit in response to image header information provided prior to an image or graphics processing operation and which indicates whether the pixel data is 32-, 16- or 8-bit. The funnel shifter provides a page X address of up to two bits, a 5-bit patch X address, and the level data L of up to two bits. The relationship between the inputs to and outputs from the funnel shifter 812 is shown in the table of FIG. 31, and it will be noted that it corresponds to the required shifting derivable from the table set out above.

The next complication arises due to the need to present the 16- or 8-bit pixels to the grid processor during reading such that the appropriate 16 or 8 bits of each pixel will be processed and not the remaining irrelevant 16 or 24 bits. This complication is overcome by supplying, during a read operation, all 32 bits from a location in the memory to the grid processor, together with shift data ZSFT in response to which the grid processor shifts the read pixel data by an amount corresponding to the ZSFT data, and then processes predetermined bits of the shift data, e.g. bits 0–15 for 16-bit processing, or bits 0–7 for 8-bit processing.

A further complication arises due to the possibility of a read patch of data not being aligned with the patch level boundaries. This complication is overcome in a somewhat similar manner to that described above with respect to 32-bit patches not being aligned with the patch boundaries in the memory. To illustrate the above, reference is made to FIG. 32, which shows a 16-bit patch p in which the base pixel is in level L=1 of base patch a at (12,16) and is misaligned (mx,my)=(2,1). The address of the patch p in its respective page would therefore be (px,py)=(12,16); L=1; (mx,my)=(2,1). It will be seen that, because patch p has a non-zero x misalignment, mx>0, part of the patch is at the other level L=0, and furthermore because both mx>0 and the level of the base pixel is 1, part of the patch p is in another aligned patch b having patch address (13,16). Furthermore, because also the y misalignment my>0, the patch p also extends into aligned patches c and d at patch addresses (12,17) and (13,17) respectively and at levels 1 and 0, respectively. The determination of the further aligned patch addresses b, c, d is performed by the patch x and y address multiplexers 784 X,Y and the patch y address increment select tables 780 Y described above with reference to FIG. 15 and by a modified form of the patch X address increment select table 780X which is responsive to the level data L and the mode select signal MS in addition to the X misalignment mx, as shown in FIG. 30B. The modified table 780X provides a 1-bit output to the X patch address multiplexer 784X in accordance with the truth table set out in FIG. 30C.

The amount of shifting ZSFT required for each pixel in the grid processor so that each pixel occupies bits 0–15 in 16-bit mode and bits 0–7 in 8-bit mode at the grid processor is determined as follows. It will be appreciated from viewing the 16-bit example of FIG. 32, that the pixels labelled 6, 7, 10, 11, 14, 15, 2 and 3 will require ZSFT of 16 bits and that the pixels labelled 4, 5, 8, 9, 12, 13, 0 and 1 require zero ZSFT. This is specific to the case where the x misalignment mx=2 and the base level is 1. It will be appreciated that for the general case of a misalignment mx, where 0<=mx<=3 and a level L=0 or 1, the required ZSFT for a pixel at an X location x relative to the base pixel of the patch p will be 0 bits if mx+x<4 and L=0, or if mx+x>3 and L=1, and will be 16 bits if mx+x>3 and L=0, or if mx+x<4 and L=1.

Figure 33:
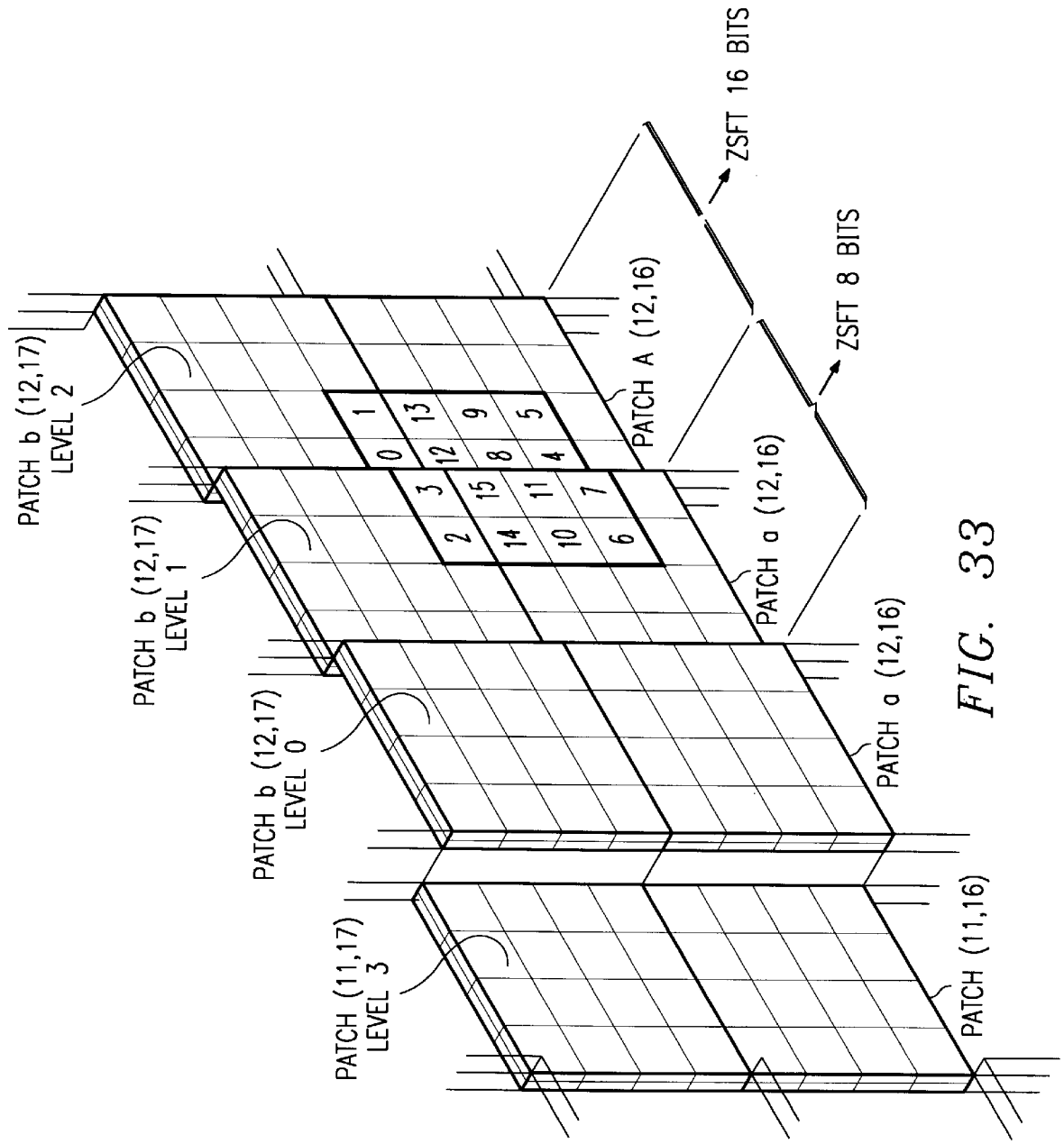

As a further illustration, reference is made to FIG. 33, which shows an 8-bit patch p which has an address in its respective page of (px,py)=(12,16); L=1; (mx,my)=(2,1). In this case, the pixels labelled 6, 7, 10, 11, 14, 15, 2 and 3 require a ZSFT of 8 bits, and the pixels labelled 4, 5, 8, 9, 12, 13, 0 and 1 require a ZSFT of 16 bits. In the general case of a misalignment mx, where 0<=mx<=3, and a level L where 0<=L<=3, the required ZSFT for a pixel at an X location x relative to the base pixel of the patch will be zero bits if mx+x<4 and L=0, or if mx+x>3 and L=3; will be 8 bits if mx+x<4 and L=1 or if mx+x>3 and L=0; will be 16 bits if mx+x<4 and L=2; or if mx+x>3 and L=1; and will be 24 bits if x mx+x<4 and L=3, if if mx+x>3 and L=2.

Figure 15:
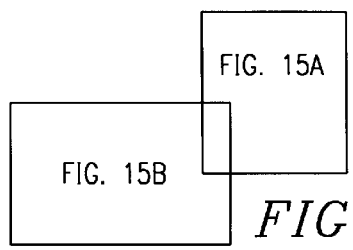
Figure 15B:
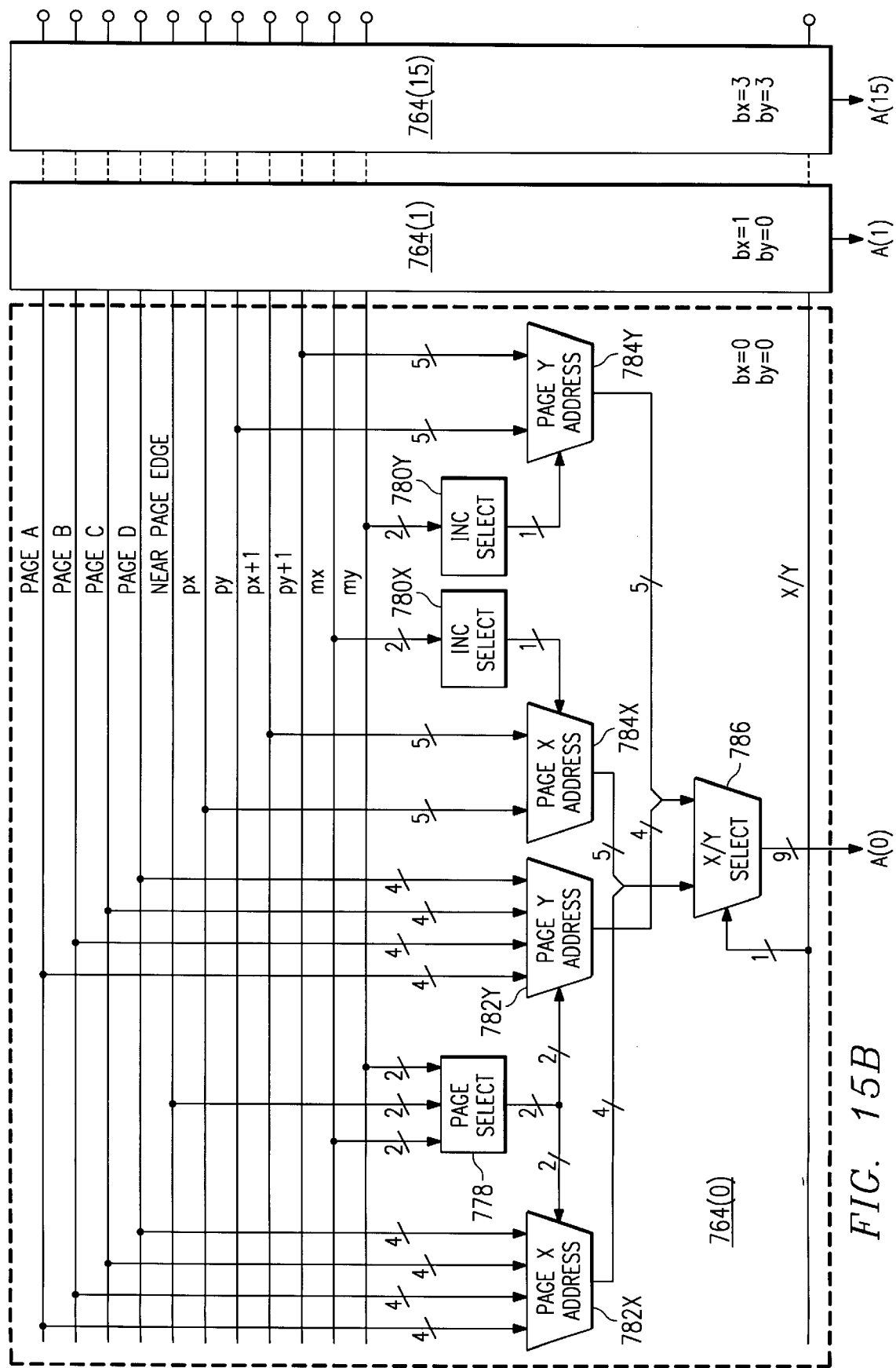
Figures 34, 35A, 35B:
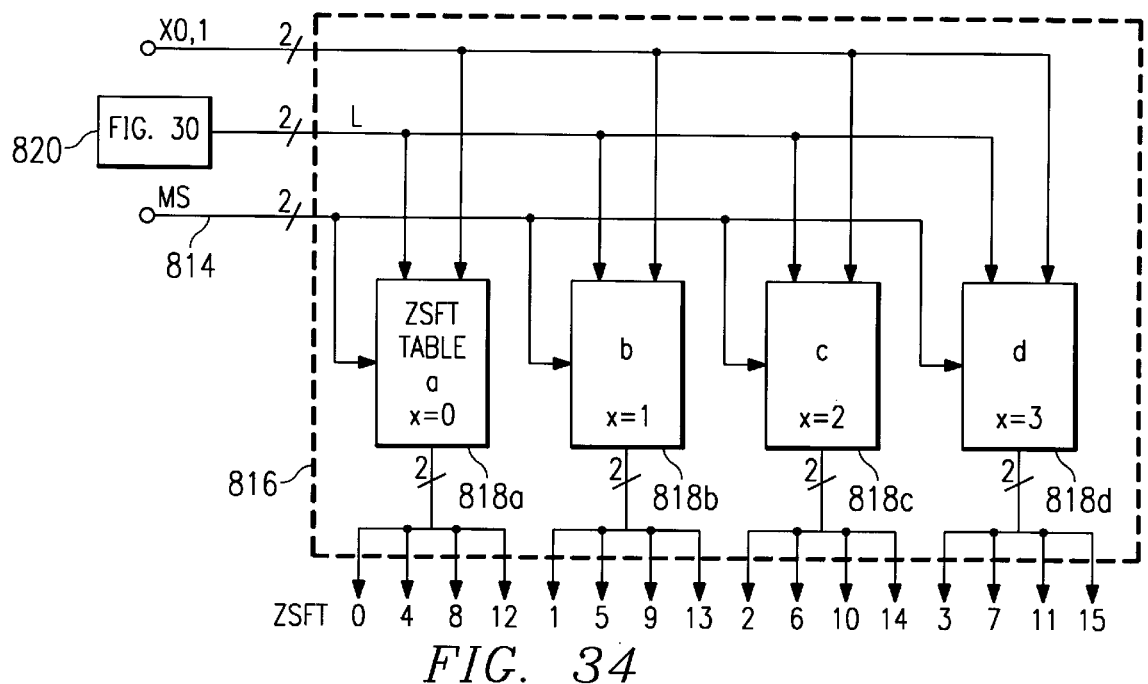
FIG. 34 shows a further modification of part of the address translator of FIG. 15 used in the split patch system.
FIGS. 35A and 35B illustrate the operation of lookup tables in the circuit of FIG. 34.

In order to provide the required ZSFT value for each pixel, the circuit of FIG. 15 includes the addition shown in FIG. 34, in addition to being modified as described above with reference to FIGS. 30 and 31. The level value L and also the bits 0,1 of the vitual address for the misalignment mx are supplied as addresses to four ZSFT tables 818 a to d implemented using combinational logic. The ZSFT tables 818 also receive the mode select signal MS on line 814 and have three sections for 32-, 16- and 8-bit operation which are selected in dependence upon the MS signal. The ZSFT table 818*a* supplies the ZSFT values ZSFT(0), (4), (8), (12) corresponding to data D(0), (4), (8), (12) supplied from the read surface shifter 742 to the exchange 326; ZSFT table 818*b* supplies ZSFT (1), (5), (9), (13) for data D(1), (5), (9), (13); ZSFT table 818*c* supplies ZSFT (2), (6), (10), (14) for data D(2), (6), (10), (14); and ZSFT table 818*d* supplies ZSFT (3), (7), (11), (15) for data D(3), (7), (11) and (15). It will therefore be appreciated that the four ZSFT tables 818*a* to d correspond to pixels having X addresses of x=0, x=1, x=2 and x=3, respectively, in the patch p relative to the base pixel of the patch p.

The table set out in FIG. 35A defines the values of ZSFT stored in the ZSFT tables 818a to d for different input misalignments mx, levels L and modes (8-, 16- or 32-bit) and in dependence upon the x value for the particular ZSFT table. As a further example, FIG. 35B sets out the values of ZSFT for the particular ZSFT table 818b (x=1) for all possible values of mx, L and mode. In these tables, the ZSFT values of 0, 1, 2, 3 represent a required shift of 0, 8, 16 and 24 bits respectively.

Figures 36A, 36B:
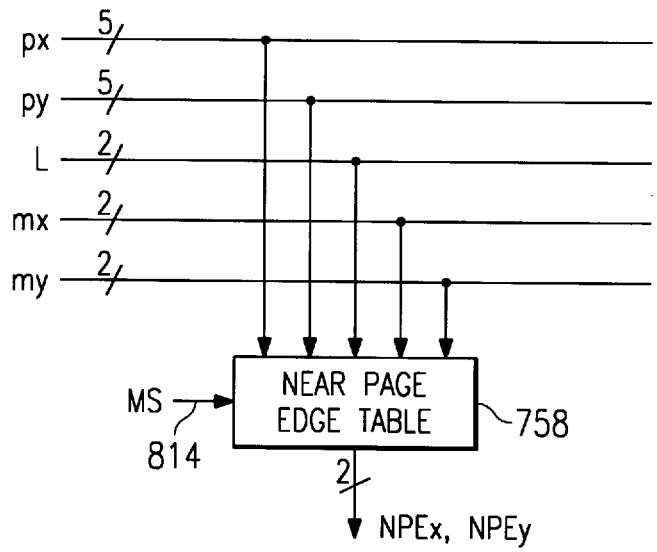
FIGS. 36A and 36B shows modifications of a near-page-edge table of FIG. 15A used in the split patch system.

A further complication which arises when dealing with 8 or 16 bit data is that the X near-page-edge signal no longer needs to be dependent solely upon whether or not 4px+mx>124, but is also dependent upon the mode selected and the level data L. The X near-page-edge signal is set only if the highest X patch address is designated (i.e. px=31), and if the highest level data is designated (i.e. L=1 in 16-bit mode, or L=3 in 8-bit mode), and if the misalignment mx is non-zero. Accordingly, the near-page-edge table 758 shown in FIG. 15A is modified as shown in FIG. 36A so as to receive the mode select signal MS on line 814 and the level signal L, in addition to the patch address (px,py) and the misalignment (mx,my). The modified table 758 of FIG. 36A produces X and Y values NPEx and NPEy of the 2-bit NPE signal as shown by the table set out in FIG. 36B.

Figure 37:
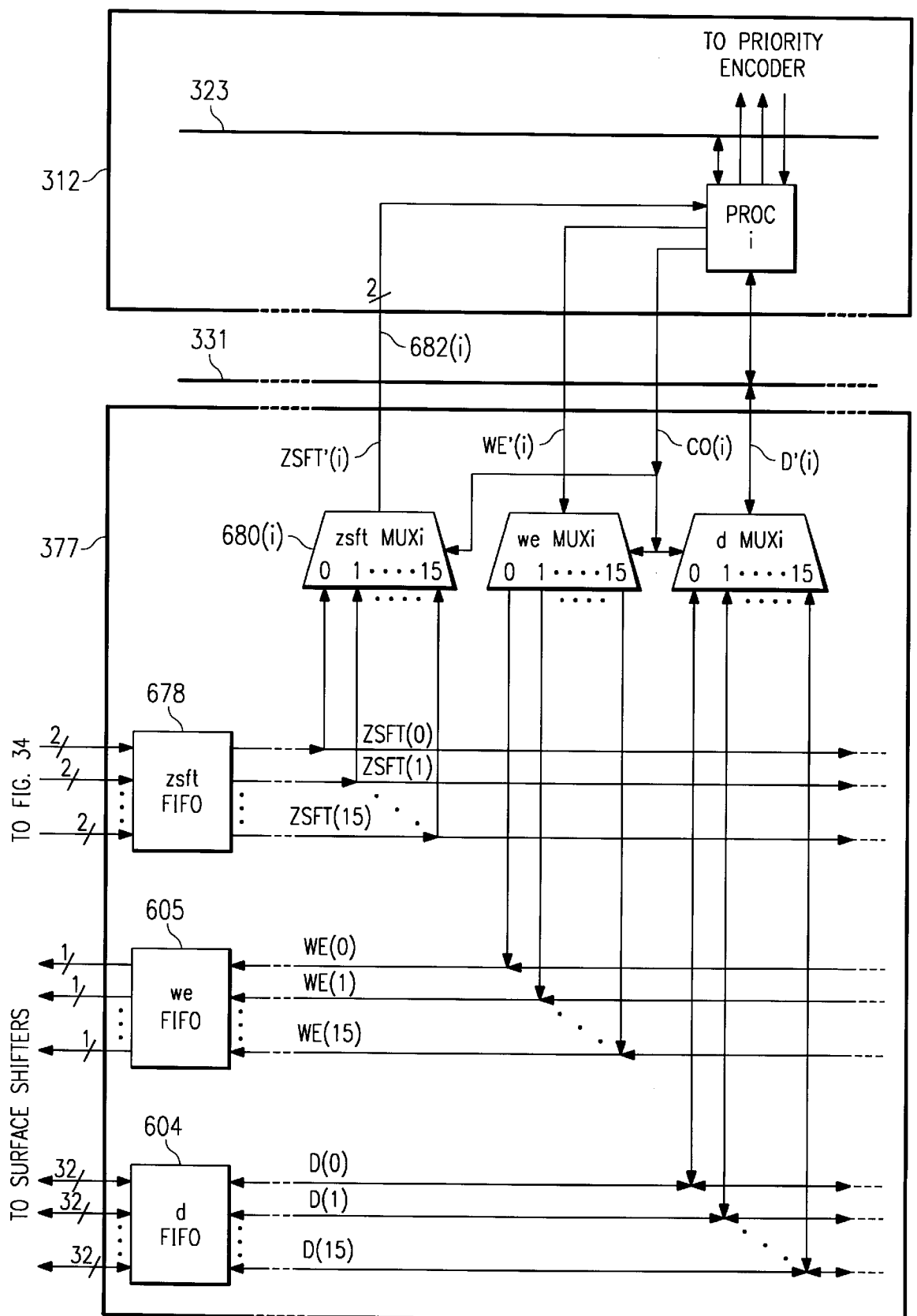
FIG. 37 illustrates, in part, a modification to the exchange and grid processor of FIG. 22 used in the split patch system.

As described above, during reading, ZSFT data ZSFT(0) to (15) is supplied to the crossbar 327 with the pixel data D(0) to (15). Also, as described earlier with respect to FIG. 22, each processor PROC(0) to (15) is capable of reading any of the data D(0) to (15). It is therefore necessary to ensure that the ZSFT data appropriate to the selected pixel data is supplied each processor. FIG. 37 shows a modification to the crossbar 377 and part of the grid processor arrangement of FIG. 22 for a generalised processor PROC(i) where 0<=i<=15. The modified arrangement is similar to the arrangement of FIG. 15 except in the following respects. Firstly, a 16x2-bit ZSFT FIFO 678 is provided to receive ZSFT(0) to (15). The output of the ZSFT FIFO 678 is supplied to each of sixteen 16:1 2-bit multiplexers 680(0) to 680(15). The 2-bit outputs of the ZSFT multiplexers 680(0) to 680(15) are supplied to the respective processors PROC (0) to PROC(15) as signals ZSFT'(0) to (15). The ZSFT multiplexers are controlled by the same logical control signals CO(0) to CO(15) as the associated data and write enable multiplexers. It will therefore be appreciated that each processor receives the appropriate ZSFT data for the pixel data which is selects and can then shift the received pixel data by 0, 8, 16 or 24 bits in dependence upon the value 0, 1, 2 or 3 of the received ZSFT data so that the received pixel data then always occupies the first 8 bits of the processor's input register in 8-bit mode, or the first 16 bits of the input register in 16-bit mode.

It will be appreciated that the arrangement of the multiplexers and FIFOs shown in FIG. 37 may be modified in a similar manner to the modification of FIG. 22 which is described above with reference to FIGS. 46 and 47.

A further complication which arises when dealing with 16-bit or 8-bit pixel data is that, during writing to the memory 700, only the appropriate 16 or 8 bits should be written, and the remaining 16 or 24 should not be overwritten. For example, referring to FIG. 32, during writing of the patch p as shown, the memory cells which are to store the 16-bit pixels labelled 6, 7, 10, 11, 14, 15, 2 and 3 need to have bits 16 to 31 written, with writing of bits 0 to 15 disabled, and the memory cells which are to store the pixels labelled 4, 5, 8, 9, 12, 13, 0 and 1 need to have bits 0 to 15 written, with bits 16 to 31 being disabled. As a further example, referring to FIG. 33, the memory cells which are to store the 8-bit pixels labelled 6, 7, 10, 11, 14, 15, 2 and 3 need to have bits 8 to 15 written, with bits 0 to 7 and 16 to 31 being disabled, and the memory cells which are to store the pixels labelled 4, 5, 8, 9, 12, 13, 0 and 1 need to have bits 16 to 23 written with bits 0 to 15 and 24 to 31 disabled.

Figures 38, 39, 40:
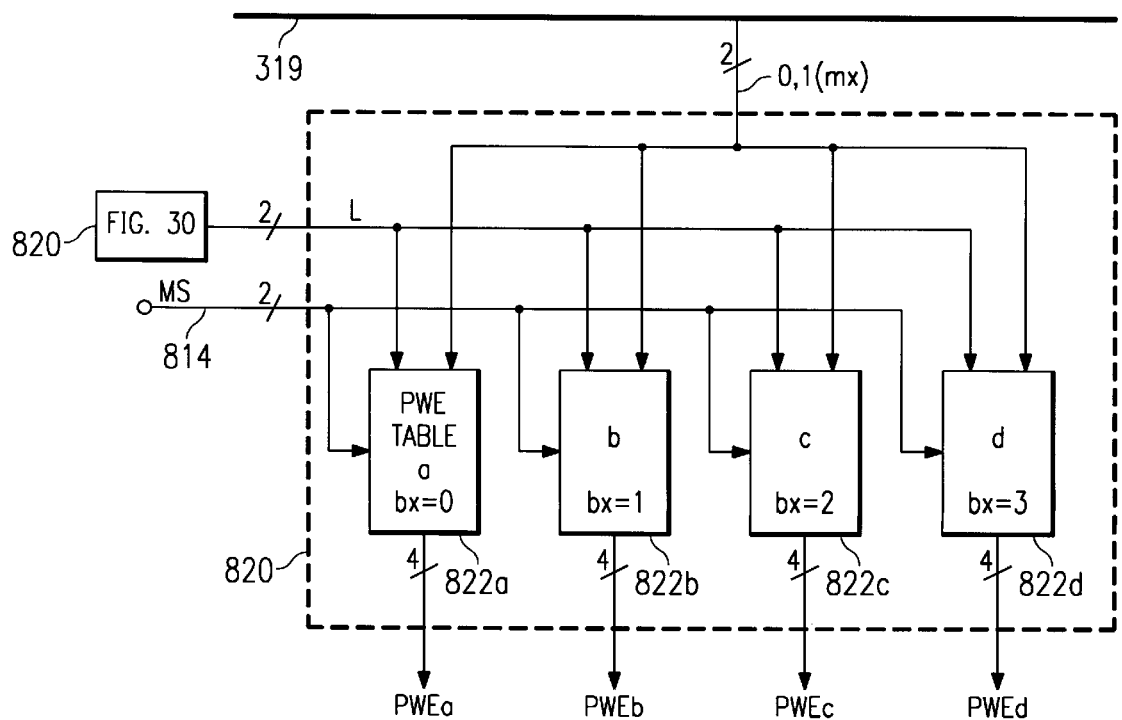
FIGS. 38 and 39 are tables which illustrate the operation of further tables in a further modification of part of the address translator of FIG. 5.
FIG. 40 shows the further modification to FIG. 5.

In order to deal with this complication, the circuit of FIG. 40 is employed, which provides partial write enable signals PWEa to PWEd for the memory banks having x addresses of bx=0, 1, 2 and 3, respectively. The circuit of FIG. 40 comprises four PWE tables 822a to d for the values bx=0 to 3, respectively. Each PWE table 822 is provided with the bits 0,1 of the virtual address on bus 319 indicating the X misalignment mx, the value L from the circuit 820 of FIG. 30, and the mode select MS signal on line 814. The PWE tables contain the data as set out in FIG. 38 and therefore a table having a particular value of bx can provide the 4-bit value PWE in dependence upon the input values of mx, L and MS.

Figure 41:
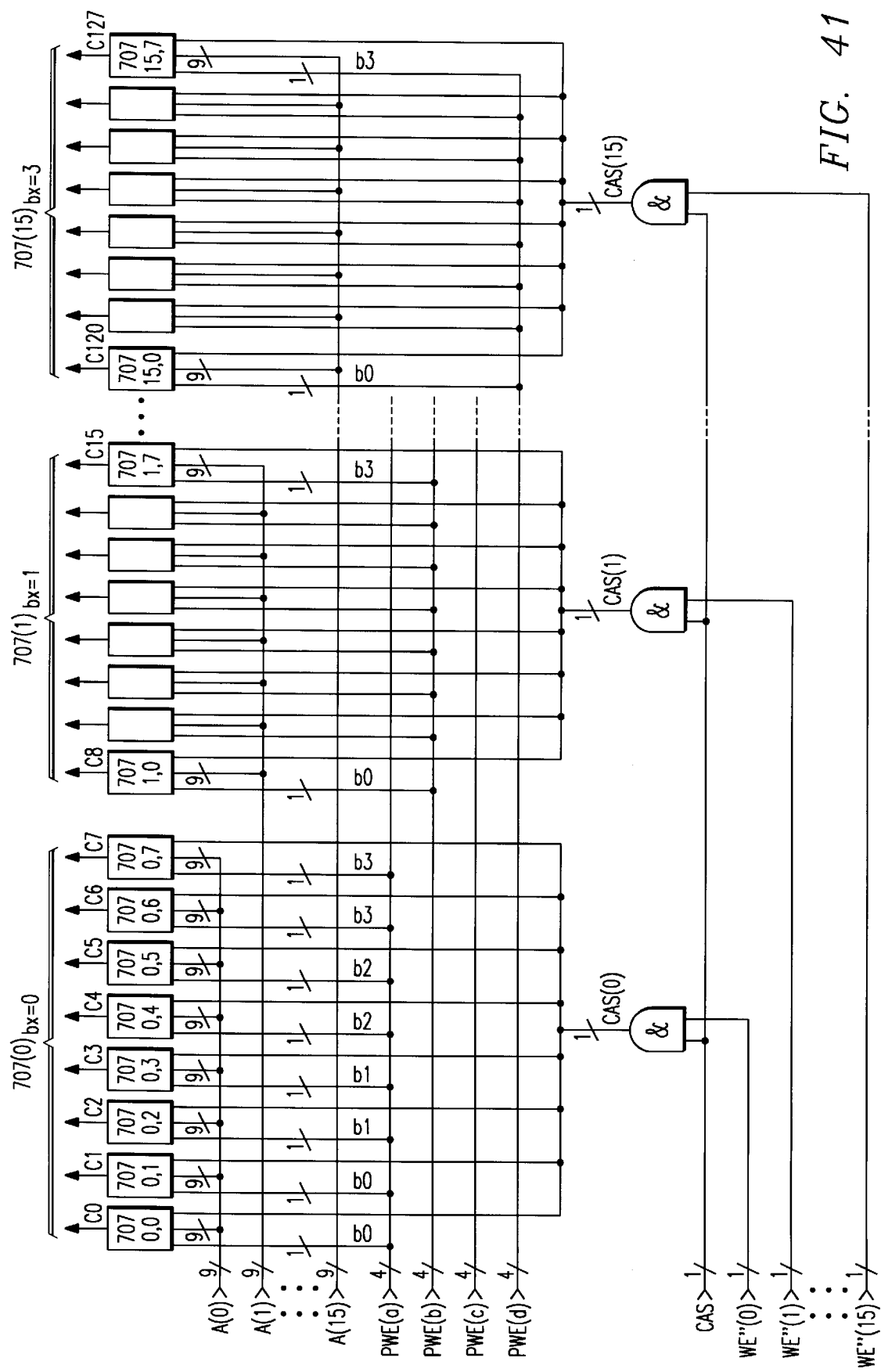
FIG. 41 shows a modification to FIG. 8 which is made in addition to the modification shown in FIG. 40.

In addition to adding the circuit of FIG. 40, the connections to the X latch groups 707(0) to (15) (see FIGS. 8 and 14) are modified as shown in FIG. 41. The column address strobe CAS signal is still ANDed with the write enable signals WE"(0) to (15) to produce the signals CAS(0) to (15) and the addresses A(0) to (15) are also applied to respective groups 707(0) to 707(15) of X latches. The various bits of the partial write enable signals PWE(a) to (d) are connected to write enable inputs of the X latches for the cells 0 to 127 as follows:

| PWE bits | Cells |
|---|---|
| PWE(a) | |
| bit 0 | 0, 1, 32, 33, 64, 65, 96, 97 |
| bit 1 | 2, 3, 34, 35, 66, 67, 98, 99 |
| bit 2 | 4, 5, 36, 37, 68, 69, 100, 101 |
| bit 3 | 6, 7, 38, 39, 70, 71, 102, 103 |
| PWE(b) | |
| bit 0 | 8, 9, 40, 41, 72, 73, 104, 105 |
| bit 1 | 10, 11, 42, 43, 74, 75, 106, 107 |
| bit 2 | 12, 13, 44, 45, 76, 77, 108, 109 |
| bit 3 | 14, 15, 46, 47, 78, 79, 110, 111 |
| PWE(c) | |
| bit 0 | 16, 17, 48, 49, 80, 81, 112, 113 |
| bit 1 | 18, 19, 50, 51, 82, 83, 114, 115 |
| bit 2 | 20, 21, 52, 53, 84, 85, 116, 117 |
| bit 3 | 22, 23, 54, 55, 86, 87, 118, 119 |
| PWE(d) | |
| bit 0 | 24, 25, 56, 57, 88, 89, 120, 121 |
| bit 1 | 26, 27, 58, 59, 90, 91, 122, 123 |
| bit 2 | 28, 29, 60, 61, 92, 93, 124, 125 |
| bit 3 | 30, 31, 62, 63, 94, 95, 126, 127 |

It will therefore be appreciated that, during writing in the 8-bit or 16-bit mode, only the relevant memory cells are write enabled, and the remaining cells are disabled.

It will be recalled that, in 8-bit mode, the data is processed as the first 8 bits of their 32-bit capacity by the processors, and in 16-bit mode as the first 16 bits. Therefore, in order to ensure that, upon writing, the processors can write to bits 8 to 31 of the memory in 8-bit mode, or bits 16 to 31 of the memory in 16-bit mode, prior to writing, each processor which is to write duplicates, in 8-bit mode, the pixel data of locations 0 to 7 in its output register at bit locations 8 to 15, 16 to 23 and 24 to 31 of the output register, and duplicates, in 16-bit mode, the pixel data of bit locations 16 to 31.

Accordingly, when the enabled bits of the pixel data are written to the memory, the complete data for the pixel is written.

FLAGGING OF MODIFIED PAGES

Figure 42:
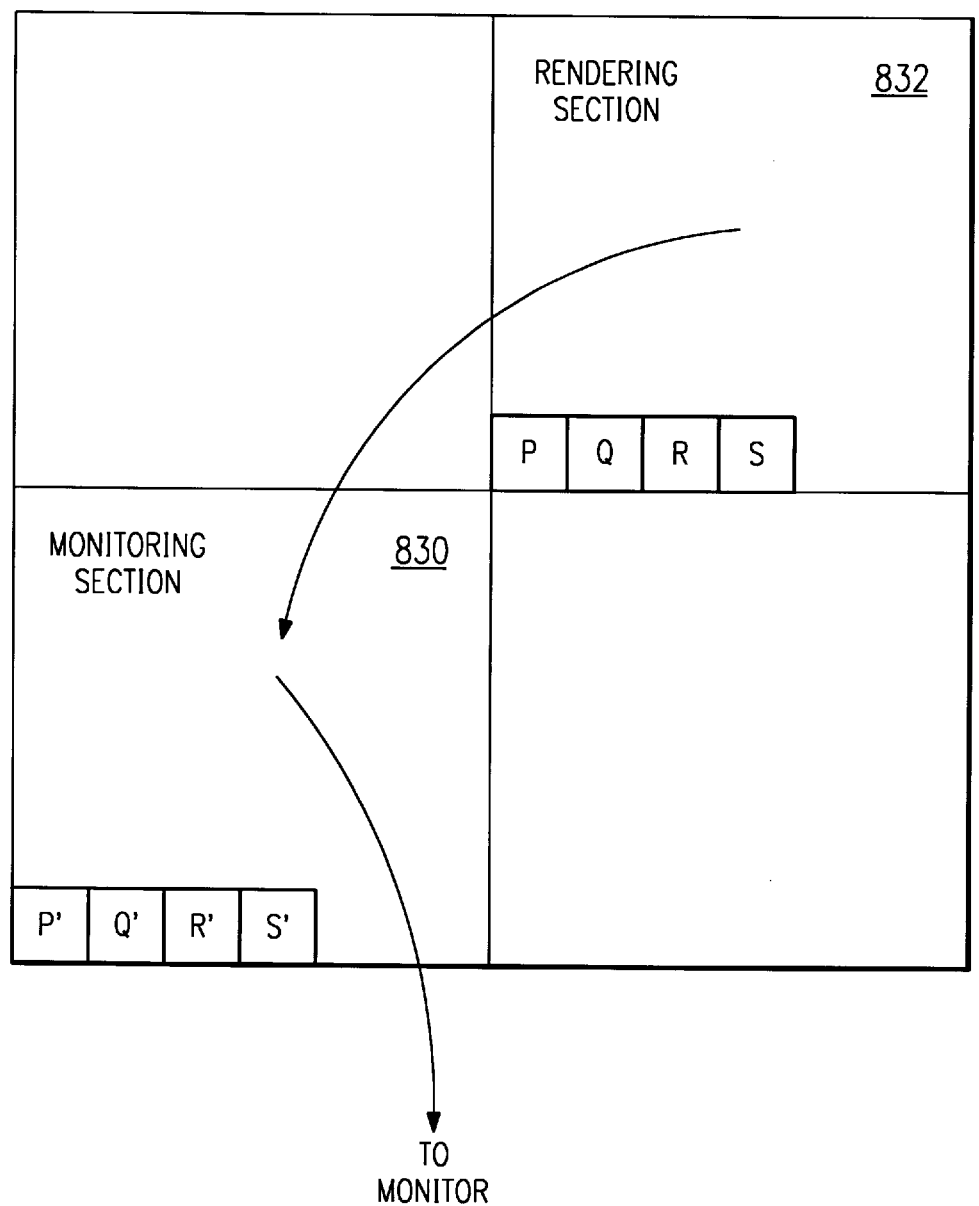
FIG. 42 is a representation of the VRAM memory space, showing how pages of data are rendered in one section of the memory and then copied to another monitoring section of the memory.

Referring to FIG. 42, it is convenient that a predetermined section 830 of the VRAM 700 is always mapped to the monitor 40, and for simplicity the section will be considered between page addresses (0,0) and (7,7) giving a total mapped area of 8×8×31×31×4×4=1 Mpixel. It is also convenient that images are rendered in another section of the VRAM 700, and for simplicity the section 832 between pages addresses (8,8) and (15,15) will be considered. Then, periodically, the data of the rendering section 832 is copied to the monitoring section, for display on the monitor. It will be appreciated that the data for some pixels may not change between one copying operation and the next, and indeed it can arise that no pixel data changes between two successive copying operations. If these unchanged pixels are unnecessarily copied from the rendering section to the monitoring section, then the performance of system is impaired.

In order to overcome this problem, it may be considered expedient to flag each pixel which is modified during a rendering operation and to copy only those pixels which have been flagged. However, this would require an inordinate amount of memory to store the flags and would require an excessive amount of flag setting, testing and resetting, which would degrade the system performance. In the arrangement described below, therefore, pages which have been changed, or dirtied, in a rendering operation are flagged, and only the flagged dirty pages are copied to the monitoring section of the memory.

It will furthermore be appreciated that, if a page of pixel data is copied from the paging memory to the VRAM, and that if that page is not modified, or dirtied, in the VRAM, then there is no need to copy that page of data back to the paging memory when the time comes to replace that page in the VRAM with a different page from the paging memory. Accordingly, in the arrangement described in detail below, a flag is set when a page is dirtied in any rendering operation while it is in the VRAM, and when the page is to be replaced, it is copied back to the paging memory only if the flag is set.

It should be noted that pixel data in the VRAM is processed in patches and that a non-aligned patch may extend across a page boundary. Therefore the arrangement described below also includes for each page, dirty flags for the pages B, C and D, as shown in FIG. 11, to the right, above and the right and above, of the page A in question. It should be noted that if page A has a virtual page address (PX,PY) then pages B, C and D have virtual page addresses (PX+1, PY), (PX, PY+1) and (PX+1, PY+1), respectively.

Figure 43:
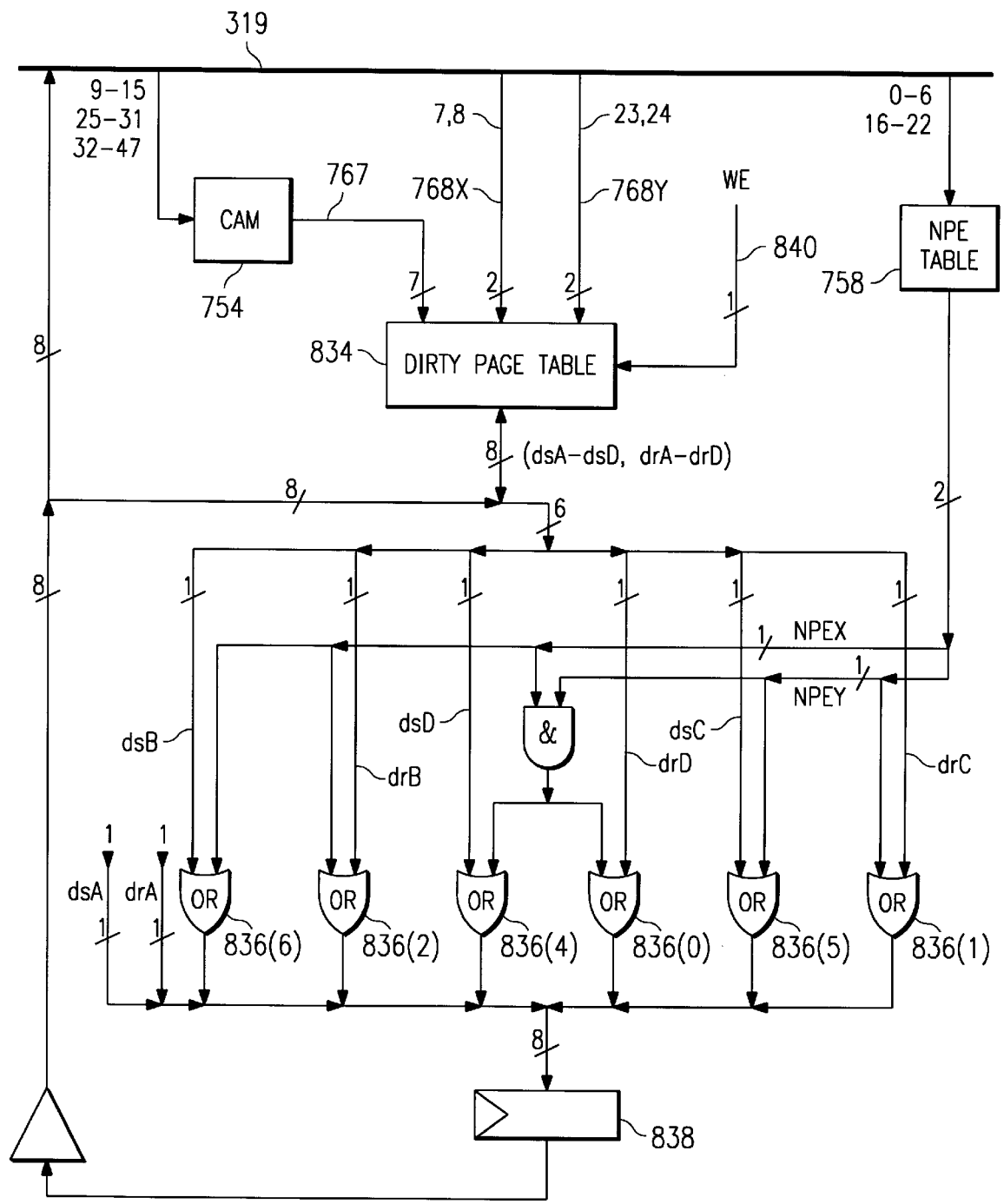
FIG. 43 shows a circuit for determining which pages need not be copied from the rendering section to the monitoring section and to the virtual memory.

Referring to FIG. 43, a dirty-page table 834 is provided by a 2K SRAM which is addressed by the 7-bit superpage identification on line 767 from the CAM 754, and the 2-bit page X address and 2-bit page Y address from the virtual address bus 314 on lines 768X,Y. The eight data bits at each location in the table 834 are assigned as follows:

| bit 7 | Page A dirty swap   | dsA |
| bit 6 | Page B dirty swap   | dsB |
| bit 5 | Page C dirty swap   | dsC |
| bit 4 | Page D dirty swap   | dsD |
| bit 3 | Page A dirty render | drA |
| bit 2 | Page B dirty render | drB |

-continued

| bit 1 | Page C dirty render | drC |
| bit 0 | Page D dirty render | drD |

Bits 0 to 2 and 4 to 6 of the dirty page data are supplied to respective OR gates 836 (0) to (2) and 836 (4) to (6). At gates 836 (6) and (2), the signals dsB and drB are ORed with the near-page-edge X signal NPEX. At gates 836 (5) and (1), dsC and drC are ORed with the near-page-edge Y signal NPEY, and at gates 836 (4) and (0), the signals dsD and drD are ORed with an ANDed form of the near page edge X and Y signals on line 774. The six bits output from the OR gates, together with a pair of high bits, representing the new signals dsA and drA, are then passed via a register 838 for writing back into the dirty page table 834 under control of a dirty pages write-enable signal DWE on line 840. The 8-bit data line of the dirty page table 834 is also multiplexed onto the 48-bit virtual address bus 319, and the address processor is operable (a) to reset the appropriate dirty swap bits and set the appropriate dirty render bits when a new page is swapped from the paging memory to the VRAM, (b) to set the appropriate dirty swap bits and dirty render bits for a page when rendering operation is carried out on that page, (c) to test the appropriate dirty swap bits for a page when that page is to be replaced by a different page in the VRAM, and (d) to test the appropriate dirty render bits for a page when that page is to be copied from the rendering section to the monitoring section of the VRAM and to reset the dirty render bits.

An example of the operation of the dirty page arrangement will now be described with reference to FIGS. 42 and 43, the table of FIG. 44 and the flow diagrams of FIG. 45. Suppose that 4 pages P, Q, R, S of pixel data at (X,Y) page addresses (0,0), (1,0), (2,0), (3,0) in the same superpage are copied into the VRAM at contiguous page addresses (8,8), (8,9), (8,10), (8,11), and that the superpage has an identification code of 25 in the CAM 754. Suppose also that the rendering section 832 between page addresses (8,8) and (15,15) in the VRAM is copied over to the monitoring section 830 between pages addresses (0,0) and (7,7) in the memory. Suppose also that three rendering operations are carried out in the rendering section, the first rendering operation affecting page Q, the second operation affecting page P and including a misaligned patch which extends into page Q, and the third operation affecting pages Q and S; the pages P to S then being replaced by four other pages.

The dirty page data for pages P to S will be located at addresses 400 (=25×16+0+0), 401, 402 and 403 in the dirty page table 840. Referring to FIGS. 44 and 45A, when page P is copied from the paging memory into the VRAM, it is treated as page A for the purposes of FIG. 45A. In step 842 bit 7 (dsA) of the dirty flag for page A is reset and bit 3 (drA) of the dirty flag for page A is set. In step 844, the address processor 310 determines whether there is a page B' stored in the physical memory, that is the page to the left of page A. If so, in step 846, bit 6 (dsB) and bit 2 (drB) of the dirty flag for page B' are reset and set respectively. Similar steps 848, 850 and 852, 854 are carried out for pages C' and D', that is pages below and to the left and below of page A in the paging memory. Then, in step 856, page A is copied from the paging memory of the VRAM. The process of FIG. 45A is then repeated for pages Q,R & S. It will therefore be appreciated that the dirty flags for pages P to S attain the state as shown in column 902 of FIG. 44.

Figure 45B:
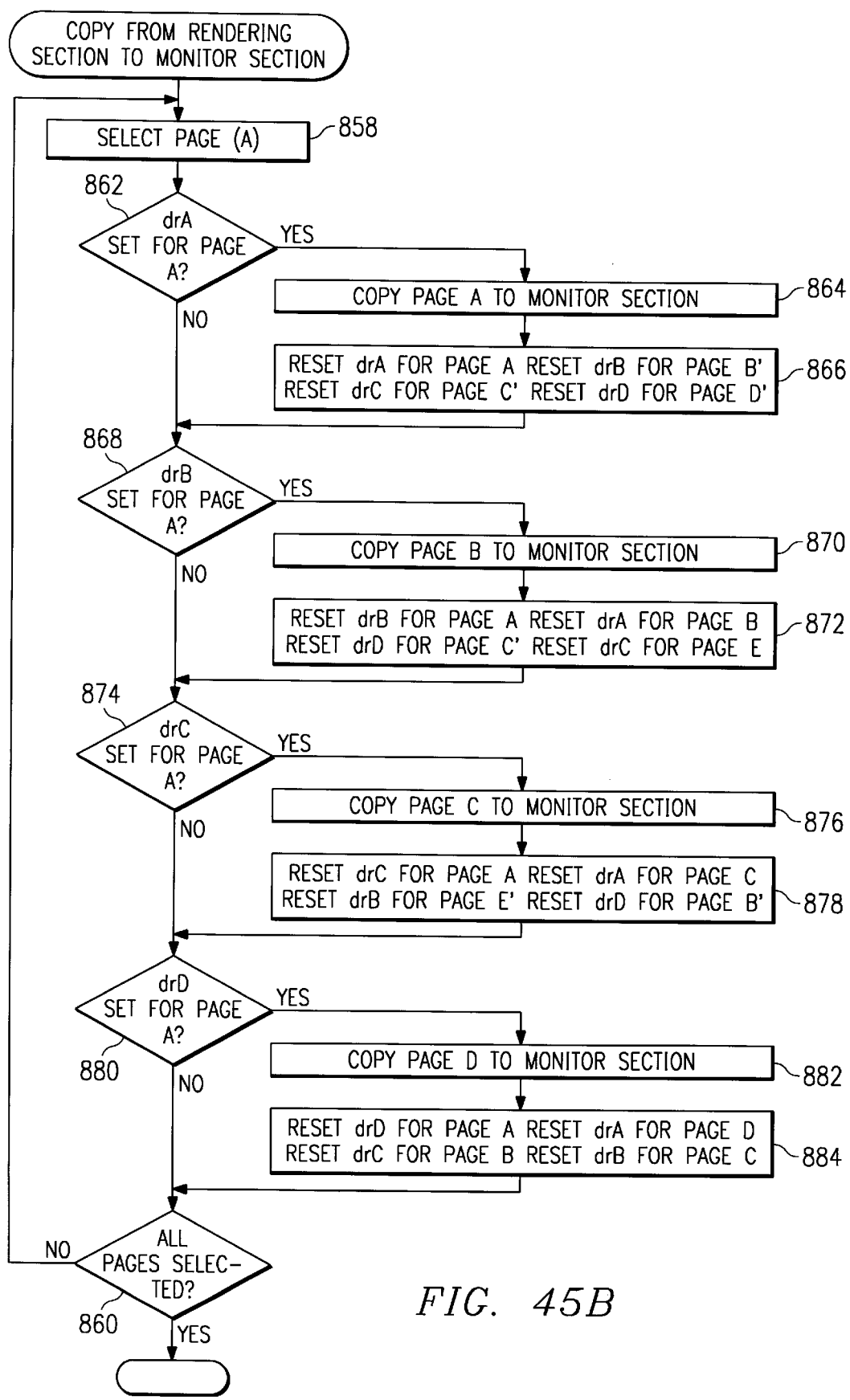

The monitoring section 830 of the VRAM is then to be updated, the address processor 310 carries out the process shown in FIG. 45B. In the loop of steps 858 and 860, all of the pages of the rendering section which may possibly need to be copied are selected one-by-one. In step 862, bit 3 (drA) of the selected page (A) is tested, and if set page A is copied to the monitoring section in step 864, and in step 866 bit 3 (drA) for page A, bit 2 (drB) for page B' to the left of page A, bit 1 (drC) for page C' below page A and bit 0 (drD) for page D' to the left and below page A are reset. In step 868, bit 2 (drB) of page A is tested, and if set page B relative to page A is copied to the monitoring section in step 870, and in step 872 bit 2 (drB) of page A and bit 3 (drA) for page B to the right of page A, bit 0 (drD) for page C' below page A, and bit I (drC) for page E below and to the right of page A are reset. Somewhat similar steps 874 to 884 are performed for bits 1 and 0 (drC, drD), as shown in FIG. 45B, and if set the respective page C or D is copied to the monitoring section and various bits are reset as shown. It will therefore be appreciated that when this process is carried out with the dirty flags in the state as shown in column 902 of FIG. 44, all four pages P to S are copied to the monitoring section of the VRAM, and the dirty flags attain the states as shown in column 904.

In the first rendering operation, page Q only is modified, and it will therefore be appreciated that the circuit of FIG. 43 serves to set bit 7 (dsA) and bit 3 (drA) for page Q, as shown in column 906 of FIG. 44.

The monitoring section of the VRAM is again updated in accordance with the process of FIG. 45B. The only dirty render flag bit set is drA for page Q, and therefore only page Q is copied, and the bit drA for page Q is reset, as shown in column 908.

In the second rendering operation, page P is modified, and also a misaligned patch in page P modifies page Q. As a result, bits 7, 6, 3 and 2 (dsA, dsB, drA, drB) of the page P dirty flag are set, as shown in column 910. Because bits drA and drB for page P are set, pages P and Q are copied to the monitoring section by the process of FIG. 45B, and bits 3 and 2 (drA, drB) for page P are then reset, as shown in column 912.

In the third rendering operation, pages Q and S are modified. As a result, bits 7 and 3 (dsA, drA) of the page S flag are set; bit 3 (drA) of the page Q flag is set, and bit 7 (dsA) of the page Q flag remains set, as shown in column 914. Because bits 3 (drA) of pages Q and S are set, pages Q and S are copied to the monitoring section of the VRAM, and these bits are then reset, as shown in column 916.

Figure 45C:
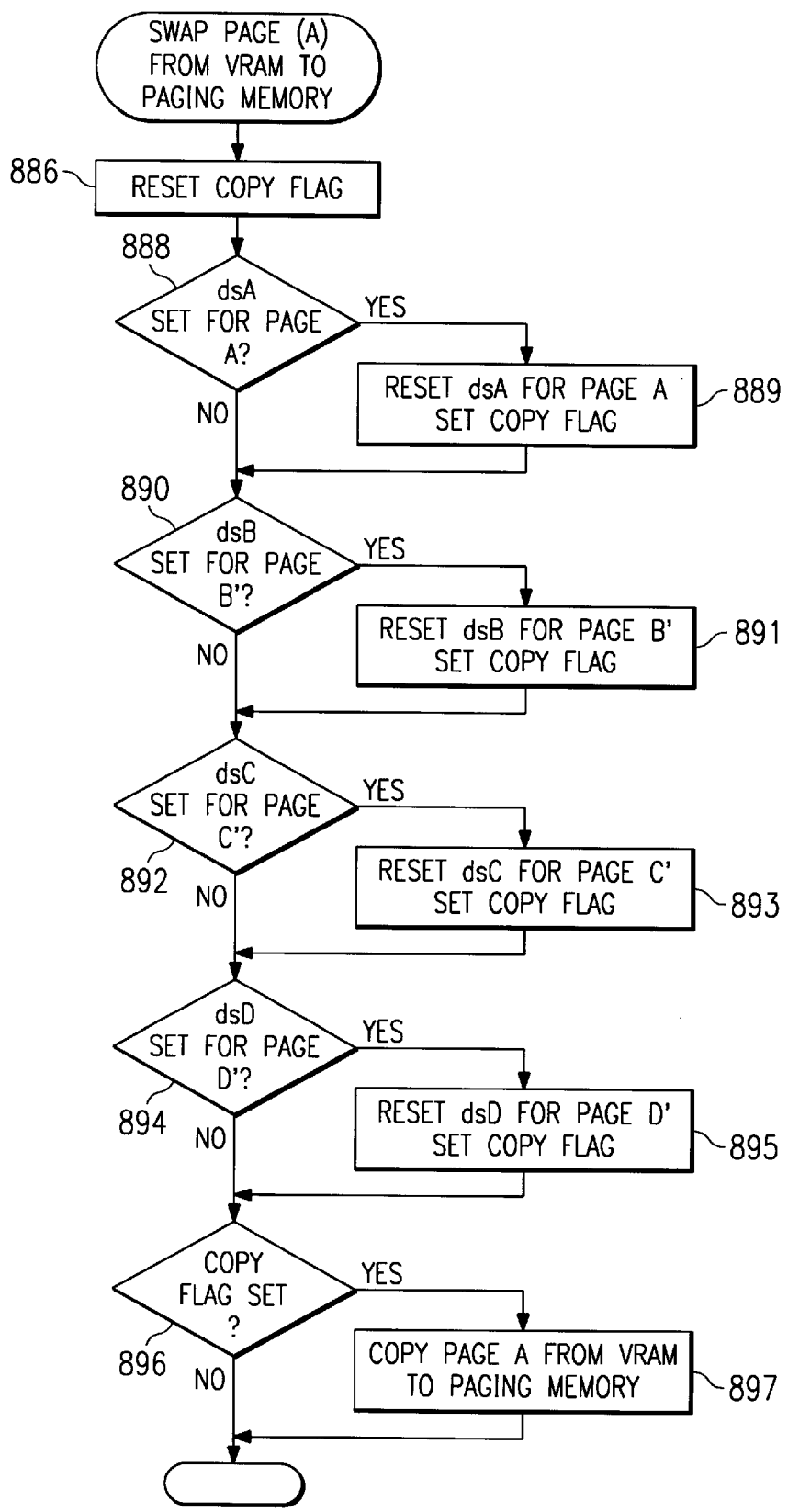

When the pages P to S are to be replaced, the address processor performs the process of FIG. 45C for each selected page to be replaced. In step 886, a copy flag is reset. Then in step 888, it is determined whether bit 7 (dsA) for page A is set, and if so in step 889 that bit is reset and the copy flag is set. Steps 888 and 889 are then repeated as steps 890 to 895 for bits 6, 5 and 4 (dsB, dsC, dsD) respectively of the dirty page flags for pages B', C' and D' relative to page A. Then in steps 896 and 897, if the copy flag has been set, page A is copied to the paging memory.

Referring back to column 916 of FIG. 44, it will be appreciated that as a result of performing the process of FIG. 45C for page P, this page is copied to the paging memory because dsA is set for page P (step 888). This is then reset (step 889). Page Q is copied to the paging memory because dsA is set for page Q (step 888). Even if it were not, page Q would be copied because dsB is set for page P (step 890). The flag bits dsA for page Q and dsB for page P are also reset (steps 889 and 891). Page R is not copied because none of dsA for page R (step 888), dsB for page Q (step 890), and dsC and dsD for the pages below, and below and to the left, of page R (step 892 and 894) are set. Page S is copied because dsA is set for page S (step 888). This bit is then reset (step 889). Accordingly, pages P, R and S are copied back to paging memory, and the flags attain the status shown in column 918 of FIG. 44.

CONDITIONAL PROCESSING

The processors 606(0) to (15) of the grid processor 312 described above are arranged basically as a SIMD array, SIMD standing for 'Single Instruction—Multiple Data' and meaning that all of the processors receive the same instruction and apply it to their own particular data elements. This can be an efficient and simple way of obtaining good performance from a parallel-processing machine, but it does assume that all of the data elements need exactly the same instruction sequence. However, the processors are preferably arranged, as described below, to be able to deal with conditional instructions. Further detail of such an arrangement is shown in FIG. 49.

Figure 49:
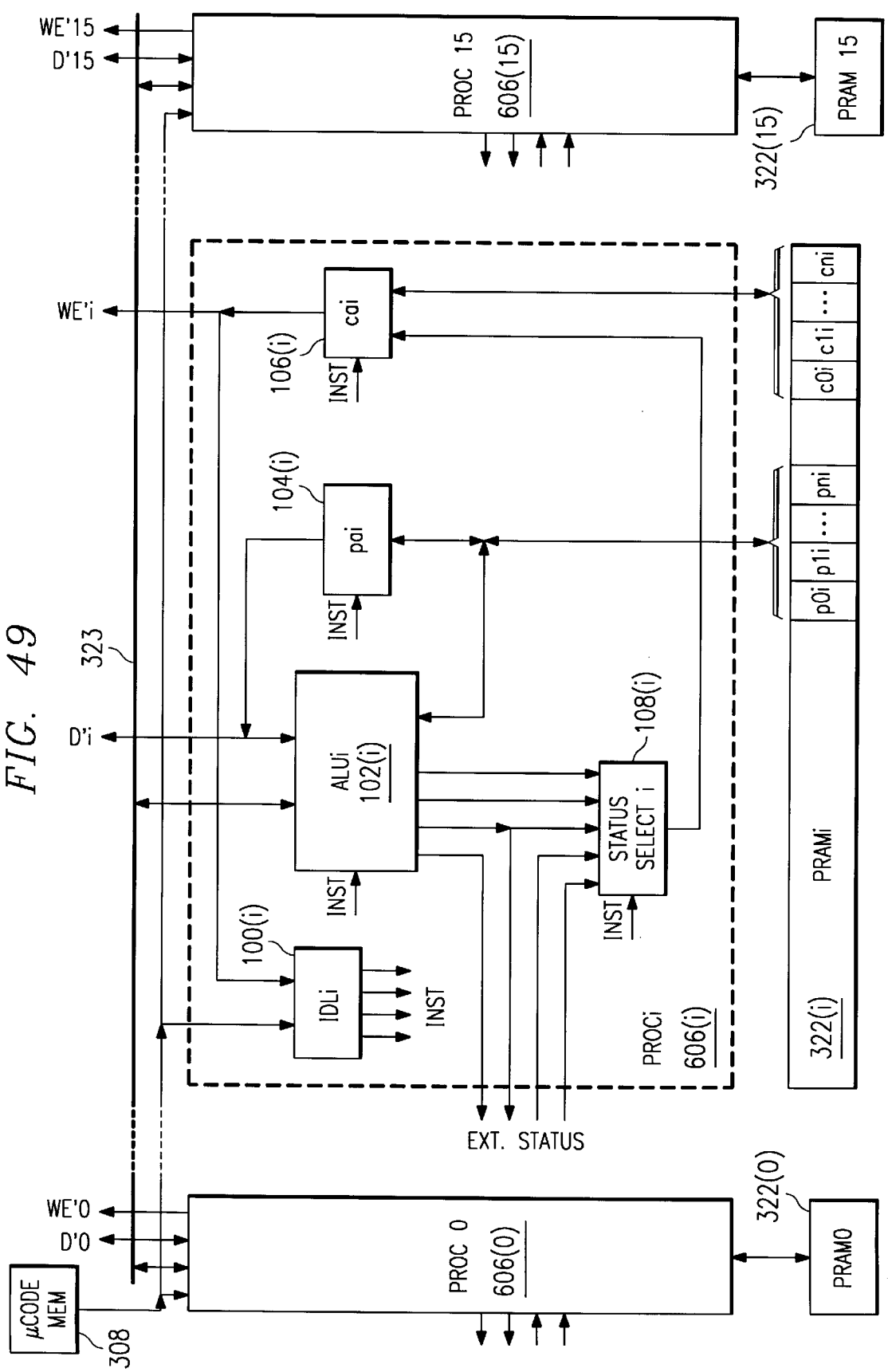
FIG. 49 is a schematic diagram of the processors and a microcode memory, with one of the processors shown in detail.

FIG. 49 shows three of the processors PROC 0, PROC i and PROC 15, with PROC i being shown in greater detail, their PRAMs 322(0), (i), (15), the microcode memory 308 and the processing section broadcast bus 323. The microcode memory 308 supplies microcode instructions of about 90 bits to each respective instruction decode logic (IDL) circuit 100 in each of the processors. The same microcode instruction is supplied to each processor. The instruction decode logic is provided by a gate array which decodes the 90 bit instruction to provide about 140 control bits to various elements in the respective processor including an arithmetic logic unit ALU 102, a 32-bit pixel accumulator (pa) 104, a 1-bit condition accumulator (ca) 106 and a status select circuit 108 which is provided by a gate array. The ALU 102 connects with the data bus D' via the exchange 326 to the VRAM 700, the pa 104 and a stack of pixel registers p0 to pn in the PRAM 322. The main data paths for pixel data are from the data bus D' to the ALU 102 and the pa 104; from the pa 104 to the ALU 102, the data bus D' and selected pixel registers p0 to pn; from the ALU 102 to the data bus D' and the pa 104; and from selected pixel registers p0 to pn to the ALU 102. Various status bits are output from the ALU 102 to the status select circuit 108, such as a "negative" bit, a "zero" bit and an "overflow" bit. Some of these status bits are also fed out externally. Also, external status bits such as the EN flag (see FIGS. 22, 23) are fed in to the status select circuit 108. Under control of the IDL 100, the status select circuit 108 can select a respective status bit and output it to the ca 106. The ca 106 is associated with a stack of condition registers c0 to cn in the PRAM 322. The ca 106 also connects to the IDL 100 and provides the write enable output WE' of the processor. The main paths for condition and status bits are: from the ALU 102 to the status select circuit 108 and to the external outputs; from the external inputs to the status select circuit 108; from the status select circuit 108 to the ca 106; from the ca 106 to the condition stack registers c0 to cn, the write enable output WE' and the ALU 102; and from the condition stack registers c0 to cn to the ca 106.

The 1-bit input from the ca 106 to the IDL 100 is important. This input condition bit enables the IDL 100 to modify the control outputs from the IDL 100 in dependence upon the value of the condition bit, and accordingly the arrangement provides direct support for microcode instructions from the microcode memory 308 to the IDL 100 which in high-level language would be represented by, for example, if (condition) then (operation X) else (operation Y). As an example, reference is made to FIGS. 50A to 50D.

Figure 50A:
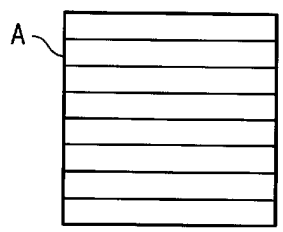
FIGS. 50A to 50D illustrate three images (FIGS. 50A to 50C) which are processed to form a fourth image (FIG. 50D).
Figure 50B:
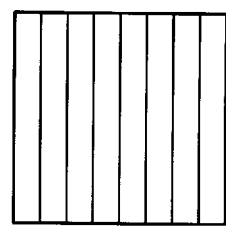
Figure 50C:
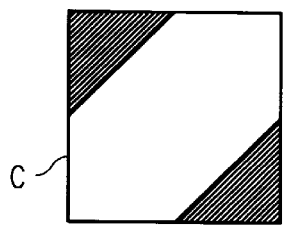

Suppose that the VRAM 700 contains three images: image A of FIG. 50A which in this simple example is a rectangle of horizontal lines; image B of FIG. 50B which is a rectangle of vertical lines; and image C of FIG. 50C which is a mask in which the upper-left and lower-right corners are black (say pixel values of 0) and the remainder is white (say pixel values of ($2^{32}$−1). In the example, it is desired to combine images A and B using image C as a mask to form an output image D such that image A appears where the mask image C is black and image B appears where the mask image C is white. The process performed by the processors under control of the microcode instructions from the microcode memory 308 to perform this operation can be considered, using high-level pseudo-language, to be as follows:

```
1. For each patch (x,y) in the rectangle:
2.    If pixel in rectangle, ca = 1, else ca = 02.
3.    c0 = ca
4.    pa = A(x,y)
5.    p0 = pa
6.    pa = B(x,y)
7.    p1 = pa
8.    pa = C(x,y)
9.    ca = zero-status (pa)
10.   If ca = 1 then pa = p0 else pa = p1
11.   ca = c0
12.   D(x,y) = pa
13. Next patch
```

In the above, steps 1 and 13 set up a loop for each patch (x,y) having its origin in the rectangle. For each patch, each processor PROC 0 to PROC 15 will process a different pixel in the patch. In step 2 a test is made to determine whether the particular processor's pixel in the patch is in the rectangle, and if so the ca 106 is set, otherwise it is reset. This value of ca will form the write-enable signal WE'. In step 3, this value which is stored in the ca 106 is put onto the condition stack in c0 and an associated condition stack pointer is modified accordingly. In step 4, the value of the processor's pixel in the current selected patch in image A is loaded into the pa 104, and in step 5 is transferred to the p0 register. Similarly in step 6, the value of the processor's pixel in the current selected patch in image B is loaded into the pa 104, and in step 7 is transferred to the p1 register. In step 8, the value of the processor's pixel in the current selected patch in the mask image C is loaded into the pa 104, and then in step 9 the zero status bit of the ALU 102 is selected by the status select circuit 108 and is loaded into the ca 106. Thus, if the pixel in the mask image is black, the ca 106 value becomes 1, and if it is white, the ca 106 value becomes 0. The next step 10 is a conditional instruction "If ca=1 then pa=p0 else pa=p1". The IDL 100 modifies this instruction in dependence upon the value in the ca 106 so that it becomes simply "pa=p0" or "pa=p1" and the modified instruction is used by the processor. In step 11, the signal which was put onto the condition stack at c0 in step 3 is pulled off the stack and placed in the ca 106 in order to constitute the write enable signal WE' and the condition stack pointer is modified accordingly. Lastly, in step 12, the pixel value in the pa 104 is transferred out to the image D at the appropriate pixel position for the processor in the current selected patch.

Figure 50D:
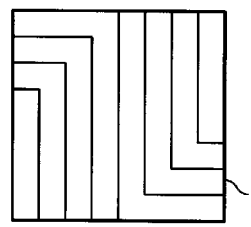

As a result of the above operations carried out by the processors on the pixels of all of the patches in the rectangle, an image D is formed as shown in FIG. 50D.

In the above simple example, the condition stack c0 to cn was used simply to store the initially generated value which will form the write enable signal, and only one register in the stack was employed. By virtue of the provision of more than one register in the condition stack, nesting of the conditional instructions is permitted.

PAGE FILING SYSTEM

Figure 51:
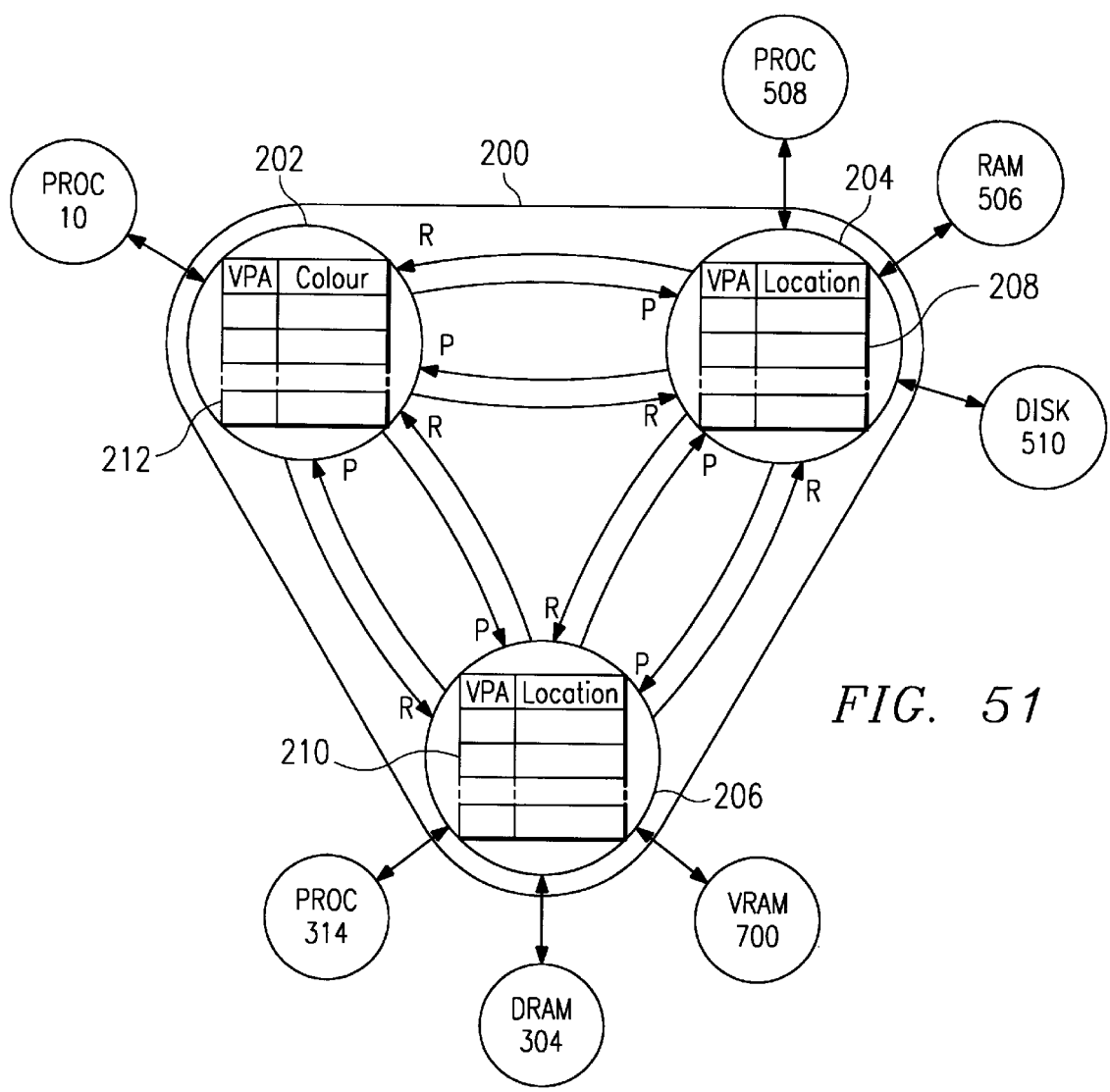
FIG. 51 is a system diagram showing a page filing system.

As described above, pages of data can be swapped between the VRAM 700, on the one hand, and the paging memory comprising the DRAM 304 (FIG. 4), and the paging RAM 504 and fast disk 510 (FIG. 5), on the other hand. There now follows a description of how pages are handled as between the VRAM and the paging memory, with reference to the system diagram of FIG. 51.

The total system is based on a distributing operating system denoted by the triangle 200. Part of this system constitutes a host page manager module 202 running on the processor 10 of the host computer. Another part constitutes a front-end page manager module 204 running on the i960 control processor 508 of the front-end board 22 and handling the paging RAM 504 and fast disk 510. A further part constitutes a renderer page manager module 206 running on the i960 control processor 314 of the renderer board 16 and handling the VRAM 700 and the DRAM 304. Each of these page manager modules 202, 204, 206 can make a request R to any other module for a page P of image data specified by the virtual page address (VPA) consisting of the following bits of the virtual address:

| | |
|---|---|
| 32–47 | Image ID component |
| 25–31 | Y superpage component |
| 23, 24 | Y page component |
| 9–15 | X superpage component |
| 7, 8 | X page component |

In response, the module to which a request R is made determines whether it is responsible for the requested page, and if so it transfers the page of data P and responsibility therefor to the requesting module, but if not it indicates to the requesting module that it is not responsible for the requested page.

To give two examples of how the filing system would be used, suppose that the page fault table 794 (FIG. 21) of the renderer has generated a page fault in respect of a particular page, this page fault is handled by the renderer page manager module 206. Firstly, the module 206 checks with itself whether the required page is stored in the renderer DRAM 304, and if so swaps the page of data into the VRAM 700. If not, the module 206 checks with the front-end page manager module 204 whether it is responsible for the page, and, if so, the page of data is swapped from the RAM 506 or disk 510, as appropriate, into the VRAM 700. If the front-end module 204 is not responsible, the renderer module 206 asks the host module 202 for the page of data, which is then swapped into the VRAM 700. As another example, suppose that the system is to be closed down and a complete image is to be saved to disk 510. Such saving of an image is handled by the front-end module 204. For each page in the image the module 204 firstly checks with itself whether it is responsible for that page. If it is and the page is already stored on the disk 510, it stays there, and if the page in question is stored in the front-end RAM 506 the data of that page is copied to the disk 510. If the module 204 is not responsible, it checks with the renderer module 206 whether the renderer module has responsibility for the page, and, if so, the page of data is copied from the VRAM 700 or DRAM 304 of the renderer to the disk 510. If not, the front-end module 204 requests the page in question from the host module 202, and the page of data is transferred to the disk 510.

In order to keep track of the pages for which they are responsible, the front-end module 204 and the renderer module 206 each maintain a table 208, 210 containing a list of the virtual page addresses of the pages, and against each address an indication of the location of that page. For example, the location data in the front-end table 208 would comprise an indication of whether the page is in the RAM 506 or on the disk 510. If in the RAM 506, the physical address of that page in the RAM would be included, and if on the disk 510, an indication of the location on the disk would be included. The location data for each virtual page address in the renderer table 210 may contain an indication of whether the page is in the DRAM 304 or the VRAM 700 and the physical address of the page in the respective memory. In the case of a page in the VRAM 700, the physical address of the page need not necessarily be kept in the table 210, because this address can be determined by the module 206 from the CAM 754 and the page table 756 (FIG. 15A) of the address translator 740, and indeed it i not necessary for the table 210 to include the virtual page address of the pages in the VRAM 700, because the module can check whether a page is present by referring to the CAM 754 and page table 756 and testing whether or not a page fault is generated.

An important feature of the filing system, in the preferred embodiment, is that the host page manager module 202 is not responsible for the storage of whole pages of data. The host module 202 is used when an image is initially created. The image is specified by the host processor 10 as being of a particular dimension, size, bit width (see FIGS. 25 to 41) and background colour. In response, the system software 200 allocates to that image the next available image ID (bits 32 to 47 of the virtual address). Until any rendering operations or copying operations are carried out on the image, the colour of every pixel in the new image is the background colour, and the host module 202 therefore merely sets up a table 212 containing the virtual page address of the or each page required in the new image, and against the or each page address the table 212 contains the 32-bit background colour of the image. There is no need for this 32-bit word of data for the page to be expanded into a full page of data, for example 16 k words, until the page is transferred to the control of one of the other modules 204, 206. Accordingly, when one of the other modules requests a page from the host module 202, the host module 202 determines from its table 212 the 32-bit background colour of that page, and then repeatedly sends that 32-bit word to the requesting module, once for each pixel in the page.

In the above description, it is assumed that only one of the modules 202, 204, 206 has responsibility for any given page at any given time and that when a page of data is transferred from one module to another, the sending module cancels the entry for that page from its table 212, 208, 210 and that the receiving module makes an entry in its table for the page. It will be appreciated that the dirty page-swap scheme described with reference to FIGS. 42 to 45 above will not be effective if the filing system operates in this way, because when, for example, a page is swapped from the disk 510 to the VRAM 700, the entry for that page is cancelled from the table 208 of the front-end module 204, and so even if the page is not dirtied in the VRAM 700, it would be necessary to swap all of the data-elements of the page back to the disk 510.

The filing system described above may be modified so that it works in conjunction with the dirty page-swap scheme, by including against each virtual page address in each table 208, 210, 212 a bit indicating whether that page is current. The operation of each module 202, 204, 206 is then modified so that when a module has responsibility for a page, the current bit is set to 1 and when responsibility is transferred to a different module the current bit is reset to zero. Furthermore, when a page which has not be dirtied is to be swapped out of the VRAM 700, the renderer module 206 polls the other modules 202, 204 to check which has an entry in its table for the page with the current bit reset, and instructs that module to set the current bit, obviating the need to copy all of the data-elements for that page from the renderer module to the other module.

In the above arrangement, a single word representing the image background colour is stored for each new image. Rather than storing a single word, a few words may be stored, for example as a patch, and representing, for example, a pattern which is to be repeated in the new image.

MODIFICATIONS AND DEVELOPMENTS

Although preferred embodiments have been described above, it will be appreciated that many modifications and developments may be made to the arrangements described above. To take a few examples, the non-split-level patches, pages and superpages described above are two-dimensional and have a pixel resolution of 32-bits, a patch size of 4 pixels×4 pixels, a page size of 32 patches×32 patches, and a superpage size of 4 pages×4 pages. It will be appreciated that the system may be configured so as to operate for example with one-r three-dimensional patches, and/or pages and/or superpages, with patches, pages and superpages of different sizes, and with different pixel resolutions. Furthermore, the system may be arranged to operate selectably in different configurations through appropriate use of funnel shifters, switches and the like. In the above description, examples of specific sizes of the memories have been given, but it will be appreciated that other sizes may be used. In the split level patch system, division into two and four in the X direction has been illustrated, but it will be appreciated that other divisors may alternatively or selectably be employed, that division in other directions may alternatively or selectably be employed, and that division on a pixel basis rather than a patch basis may alternatively or selectably be employed. The dirty page facility described above deals with copying between the rendering section and monitoring section of the VRAM and also with swapping between the VRAM and the paging memory, but it will be appreciated that either of these two features may be employed without the other. In the page filing system, the page manager modules are run on specific processors, but it will be appreciated that each page manager module may be run on different processors, and that the modules may be combined.

Line Tracking and Line Drawing

FIG. 52 shows how a line is mapped onto a sequence of patches 5200A, 5200B, etc. As shown in the code below, this step is performed by a calculation which carries a cumulated running error value from patch to patch.

This calculation has some superficial resemblance to Bresenham's algorithm. However, it should be noted that the successive patches, in the presently preferred embodiment, are separated by a relative displacement which is purely vertical or purely horizontal. Thus, if the line runs out of the top of one patch, the next patch accessed will be directly above the preceding patch. This ensures that sufficient patch accesses will be performed that no pixels are missed.

As shown below, the error measure is preferably scaled up, to avoid any necessity for performing repeated divide operations. However, for clarity, this scaling factor will be ignored in the following explanation.

The example shown illustrates an example with a line slope slightly less than 45 degrees. The starting remainder, at the left side of patch 5200A, is equivalent about to 1.5 pixels. By performing a simple addition (as in Bresenham's algorithm), it is found that the next remainder term would be about 4.5 pixels. Thus, the next patch selected (patch 5200B) is vertically aligned with patch 5200A. The initial remainder for patch 5200B is about −2.5 pixel, and the remainder at the end of patch 5200B is about 0.5 pixels. The initial remainder for patch 5200C is about 0.5 pixel and the remainder at the end of patch 5200C would be about 4.4 pixels. Thus, again, a vertical move is made, to patch 5200D (which is only partly shown).

It should be noted that the individual pixel positions are ignored in this computation. That is, the 16 individual pixels of patch 5200A are shown in FIG. 52 merely to help identify the relative positioning of the patches.

Figure 53:
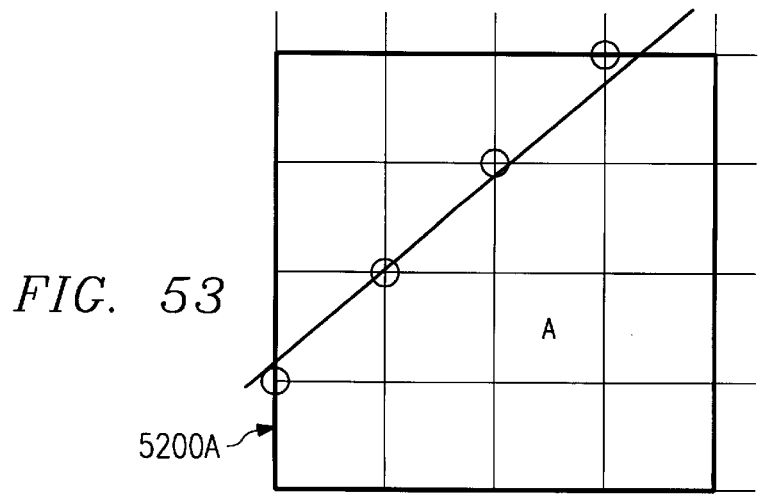
FIG. 53 shows how, within each accessed patch, the correct pixels are rendered.

FIG. 53 shows how, within each accessed patch, the correct pixels are rendered. Two linear equations are solved to define the "top" and "bottom" of the range permissible for drawing the line. The error term carried in from the patch-by-patch tracking algorithm defines the entry point for these two line-drawing borders. Each of the 16 pixel positions (x,y) in the accessed patch is rendered if and only if it falls within these two linear equations. This procedure is somewhat computationally intensive, but is preferably performed in parallel (by the multiple grid processors).

The following source code, in the C language, provides a specific example of use of some of the innovative teachings herein as presently contemplated, in combination with the hardware architecture described above. (Note that this source code, in its present version, simulates the operation of the complete hardware system. Thus, this version of the source code can be used with other systems as well.) However, of course, a large variety of other implementations could be used instead. Note also that, in the following example, much of the code is simply taken up by a test to determine which quadrant and octant current patch is in.

```
/* •••••••••••••••••••••••••••••••• */
/* NAME : pipline2.c */
/* This component simulates drawing to the pipre screen. */
/* •••••••••••••••••••••••••••••••• */

/* "Include" commands ••••••••••••••••••••*/
#include <sys/types.h>
include <pixrect/pixrect_hs.h>
include <stdio.h>
#include <math.h>
#include    "lib.h"

/* "Define" commands ••••••••••••••••••••*/
#define    OCT0_45       0
#define    OCT45_90   1
#define    OCT90_135  2
#define    OCT135_180    3
#define    OCT180_225    4
#define    OCT225_270    5
#define    OCT270_315    6
#define    OCT315_360    7
#define    QUAD0_90 0
#define    QUAD90_180    1
#define    QUAD180_270  2
#define    QUAD270_360  3
#define X_MAJOR       0
#define Y_MAJOR       1

/* Declarations ••••••••••••••••••••••••••*/
static   INT    Quadrant,Octant,Major;
static   INT color[16] =
... {255,255,255,255,
......... 255,255,255,255,
```

```
              . . . . . . . . . 255,255,255,255,
              . . . . . . . . . 255,255,255,255 };
          static  IMAGE   screen;

main()
    5     {
          ...  POINT  start,end;
          ...  double  angle;
          ...  {
          ......  POINT size;
   10     ......  size.x = 800; size.y = 800;
          ......  screen = create_image(&size,0);
          ...  }
          ...  start.x = 250;
          ...  start.y = 250;

15     ...  for(angle = 0.0; angle < 20; angle + = 0.05)
          ...  {
          ......  start.x = (250 + 5*angle) + 4800 * sin(angle) / (angle + 20);
          ......  start.y = (250 + 5*angle) + 4000 * cos(angle) / (angle + 20);
          ......  end.x = (200 + 5*angle) + 2000 * sin(angle + 2) / (angle + 20);
   20     ......  end.y = (200 + 5*angle) + 3400 * cos(angle + 2) / (angle + 20);
          ......  DrawLine(screen,&start,&end);
          ...  }
          }

DrawLine(image,start,end)
   25     IMAGE   image;
          POINT  *start;
          POINT  *end;
          {
          ...  POINT  delta;
   30                                           /* First find the quadrant delta x delta y etc. */
          ...  delta.x = end->x - start->x;
          ...  delta.y = end->y - start->y;
          ...  if(delta.x < 0)
          ...  {
   35     ......  if(delta.y < 0)
```

```
            {
                Quadrant = QUAD180_270;
                if(-delta.x > -delta.y)
                    {Octant = OCT180_225; Major = X_MAJOR;}
5               else
                    {Octant = OCT225_270; Major = Y_MAJOR;}
            }
            else
            {
10              Quadrant = QUAD90_180;
                if(-delta.x > delta.y)
                    {Octant = OCT135_180; Major = X_MAJOR;}
                else
                    {Octant = OCT90_135; Major = Y_MAJOR;}
15          }
        }
        else
        {
            if(delta.y < 0)
20          {
                Quadrant = QUAD270_360;
                if(delta.x > -delta.y)
                    {Octant = OCT315_360; Major = X_MAJOR;}
                else
25                  {Octant = OCT270_315; Major = Y_MAJOR;}
            }
            else
            {
                Quadrant = QUAD0_90;
30              if(delta.x < delta.y)
                    {Octant = OCT45_90; Major = Y_MAJOR;}
                else
                    {Octant = OCT0_45; Major = X_MAJOR;}
            }
35      } switch(Octant)
        {
```

```
           case OCT0_45 :
           {
               BOOL  mask[4][4];
               POINT addr;
 5             INT   error;
               INT   proc_error[4][4];          /* for Bresenham's algorithm */
               INT   lin_end[4][4];             /* for line end */
               INT   x,y;

/* Initialize the address used by the address processor */
10                                   /* to access the framestore. */
               addr.x = start->x;
               addr.y = start->y;

/* Initialize the Bresenham's error for each processor in */
                                    /* the array. */
15             for(y=0; y<4; y++)
                   for(x=0; x<4; x++)
                       proc_error[y][x] =
               delta.x * y * 2 - delta.y * x * 2;

/* Initialize the linear equation used to find the end */
20                                   /* of the line in the grid array. */
               for(y=0; y<4; y++)
                   for(x=0; x<4; x++)
                       lin_end[y][x] = delta.x - x;

/* Process patches until the end is reached. */
25             for(;;) {

/* Calculate the mask required and the end flag too. */
                   for(y=0; y<4; y++)
                       for(x=0; x<4; x++)
                       {
30                                   /* Test for the end && top && bottom of the line */
                           if((lin_end[y][x] > 0) &&
                              (proc_error[y][x] - delta.x <= 0) &&
                              (proc_error[y][x] + delta.x > 0))
```

```
                          mask[y][x] = TRUE;
                     else mask[y][x] = FALSE;
                 }
            patch_write(screen,color,mask,&addr);
    5       if(lin_end[3][3] < 0) break;

/* Now use a modified tracking algorithm */
            error = proc_error[0][0] + 7 * delta.x - 8 * delta.y;

if(error > 0)
            {
   10           addr.x += 4;
                for(y=0; y<4; y++)
                    for(x=0; x<4; x++)
                    {
                        proc_error[y][x] -= 8 * delta.y;
   15                   lin_end[y][x] -= 4;
                    }
            }
            else
            {
   20           addr.y += 4;
                for(y=0; y<4; y++)
                    for(x=0; x<4; x++)
                        proc_error[y][x] += 8 * delta.x;
            }
   25   }
      }
      break;

case OCT45_90 :
      {
   30     BOOL mask[4][4];
          POINT addr;
          INT error;
          INT   proc_error[4][4];

/* for Bresenham's algorithm */
```

```
         INT    lin_end[4][4];
                                           /* for line end */
         INT    x,y;
                            /* Initialize the address used by the address processor */
 5                          /* to access the framestore. */
         addr.x = start->x;
         addr.y = start->y;
                            /* Initialize the Bresenham error for each processor in */
                            /* the array. */
10       for(y=0; y<4; y++)
           for(x=0; x<4; x++)
             proc_error[y][x] =
               delta.x * y * 2 - delta.y * x * 2;
                            /* Initialize the linear equation used to find the end */
15                          /* of the line in the grid array. */
         for(y=0; y<4; y++)
           for(x=0; x<4; x++)
             lin_end[y][x] = delta.y - y;
                            /* Process patches until the end is reached. */
20       for(;;) {

/* Calculate the mask required and the end flag too. */
         for(y=0; y<4; y++)
           for(x=0; x<4; x++)
           {
25                          /* Test for the end && top && bottom of the line */
             if((lin_end[y][x] > 0) &&
                (proc_error[y][x] - delta.y <= 0) &&
                (proc_error[y][x] + delta.y > 0))
               mask[y][x] = TRUE;
30             else mask[y][x] = FALSE;
           }
         patch_write(screen,color,mask,&addr);
         if(lin_end[3][3] < 0) break;

/* Now use a modified tracking algorithm */
35       error = proc_error[0][0] + 8 * delta.x - 7 * delta.y;
         if(error > 0)
```

```
                     {
                       addr.x += 4;
                       for(y=0; y<4; y++)
                         for(x=0; x<4; x++)
5                        ......
                         proc_error[y][x] -= 8 * delta.y;
                     }
                   else
                   {
10                   addr.y += 4;
                     for(y=0; y<4; y++)
                       for(x=0; x<4; x++)
                       {
                         ......
15                       proc_error[y][x] += 8 * delta.x;
                         ......
                         lin_end[y][x] -= 4;
                       }
                   }
20               }
               }
               break;
               ......
               case OCT90_135 :
25             {
                 BOOL   mask[4][4];
                 POINT  addr;
                 INT    error;
                 INT    proc_error[4][4];          /* for Bresenham */
30               INT    lin_end[4][4];             /* for line end */
                 INT    x,y;
                                                    /* Initialize the address used by the address processor */
35                                                  /* to access the framestore. */
                 addr.x = start->x-3;
                 addr.y = start->y;
                 ......
```

```
                                              /* Initialize the Bresenham error for each processor in */
                                              /* the array. */
              for(y=0; y<4; y++)
              for(x=0; x<4; x++)
 5            proc_error[y][x] =
              deltax * y * 2 - delta.y * (x-3) * 2;

/* Initialize the linear equation used to find the end */
                                              /* of the line in the grid array. */
10            for(y=0; y<4; y++)
              for(x=0; x<4; x++)
              lin_end[y][x] = delta.y - y;

/* Process patches until the end is reached. */
15            for(;;) {

/* Calculate the mask required and the end flag too. */
          for(y=0; y<4; y++)
20        for(x=0; x<4; x++)
          {

/* Test for the end && top && bottom of the line */
25            if((lin_end[y][x] > 0) &&
                  (proc_error[y][x] - delta.y <= 0) &&
                  (proc_error[y][x] + delta.y > 0))
                  mask[y][x] = TRUE;
              else mask[y][x] = FALSE;
30        }
          patch_write(screen,color,mask,&addr);
          if(lin_end[3][3] < 0) break;

35                                            /* Now use a modified tracking algorithm */
          error = proc_error[0][3] + 8 * deltax + 7 * delta.y;
          if(error < 0)
          {
```

```
                    addr.x -= 4;
                    for(y=0; y<4; y++)
                    for(x=0; x<4; x++)
                        proc_error[y][x] += 8 * delta.y;
5           }
            else
            {
                    addr.y += 4;
                    for(y=0; y<4; y++)
10                  for(x=0; x<4; x++)
                    {
                        proc_error[y][x] += 8 * delta.x;
                        lin_end[y][x] -= 4;
                    }
15          }
        }
     }
     break;

case OCT135_180 :
20      {
                BOOL mask[4][4];
                POINT addr;
                INT error;
                INT     proc_error[4][4];
25                                              /* for bresenhams al */
                INT     lin_end[4][4];
                                                /* for line end */
                INT     x,y;

30                                      /* Initialize the address used by the address processor */
                                        /* to access the framestore. */
                addr.x = start->x-3;
                addr.y = start->y;

35                                      /* Initialize the bresenhams error for each processor in */
                                        /* the array. */
                for(y=0; y<4; y++)
```

```
                    for(x=0; x<4; x++)
                proc_error[y][x] =
                    delta.x * y * 2 - delta.y * (x-3) * 2;

/* Initialize the linear equation used to find the end */
                            /* of the line in the grid array. */
                for(y=0; y<4; y++)
                    for(x=0; x<4; x++)
                        lin_end[y][x] = - delta.x + x - 3;

/* Process patches until the end is reached. */
                for(;;) {

/* Calculate the mask required and the end flag too. */
            for(y=0; y<4; y++)
                for(x=0; x<4; x++)
                {

/* Test for the end && top && bottom of the line */
                    if((lin_end[y][x] > 0) &&
                        (proc_error[y][x] + delta.x <= 0) &&
                        (proc_error[y][x] - delta.x > 0))
                            mask[y][x] = TRUE;
                    else mask[y][x] = FALSE;
                }
            patch_write(screen,color,mask,&addr);
            if(lin_end[0][0] < 0) break;

/* Now use a modified tracking algorithm */
            error = proc_error[0][3] + 7 * delta.x + 8 * delta.y;
            if(error < 0)
            {
                addr.x -= 4;
                for(y=0; y<4; y++)
                    for(x=0; x<4; x++)
```

```
                    {
              proc_error[y][x] + = 8 * delta.y;

5            lin_end[y][x] - = 4;
                    }
              }
              else
              {
10            addr.y + = 4;
              for(y=0; y<4; y++)
              for(x=0; x<4; x++)

proc_error[y][x] + = 8 * delta.x;
15                  }
                    }
              }
         break;

case OCT180_225 :
20            {
              BOOL mask[4][4];
              POINT addr;
              INT error;
              INT     proc_error[4][4];
25                                           /* for bresenhams al */
              INT     lin_end[4][4];
                                             /* for line end */
              INT     x,y;

30                                /* Initialize the address used by the address processor */
                                  /* to access the framestore. */
              addr.x = start->x-3;
              addr.y = start->y-3;

35                                /* Initialize the bresenhams error for each processor in */
                                  /* the array. */
              for(y=0; y<4; y++)
```

```
                     for(x=0; x<4; x++)
                         proc_error[y][x] =
                             deltax * (y-3) * 2 - delta.y * (x-3) * 2;
      ......
 5                                /* Initialize the linear equation used to find the end */
                                  /* of the line in the grid array. */
                  for(y=0; y<4; y++)
                     for(x=0; x<4; x++)
                         lin_end[y][x] = - deltax + x - 3;
10    ......
                                  /* Process patches until the end is reached. */
                  for(;;) {
      ......
      ......
15                                /* Calculate the mask required and the end flag too. */
             for(y=0; y<4; y++)
                 for(x=0; x<4; x++)
                 {
                                  /* Test for the end && top && bottom of the line */
20                if((lin_end[y][x] > 0) &&
                     (proc_error[y][x] + deltax <= 0) &&
                     (proc_error[y][x] - deltax > 0))
                         mask[y][x] = TRUE;
                     else mask[y][x] = FALSE;
25               }
             patch_write(screen,color,mask,&addr);
             if(lin_end[0][0] < 0) break;
      ......
      ......
30                                /* Now use a modified tracking algorithm */
             error = proc_error[3][3] - 7 * deltax + 8 * delta.y;
             if(error > 0)
             {
                 addr.x -= 4;
35               for(y=0; y<4; y++)
                     for(x=0; x<4; x++)
                     {
      ......
```

```
                    proc_error[y][x] += 8 * delta.y;

lin_end[y][x] -= 4;
                }
5           }
            else
            {
                addr.y -= 4;
                for(y=0; y<4; y++)
10                  for(x=0; x<4; x++)

proc_error[y][x] -= 8 * delta.x;
                }
            }
15      }
        break;

case OCT225_270 :
        {
            BOOL mask[4][4];
20          POINT addr;
            INT error;
            INT  proc_error[4][4];
                                                /* for bresenhams al */
            INT  lin_end[4][4];
25                                              /* for line end */
            INT  x,y;

/* Initialize the address used by the address processor */
                                /* to access the framestore. */
30          addr.x = start->x-3;
            addr.y = start->y-3;

/* Initialize the bresenhams error for each processor in */
                                /* the array. */
35          for(y=0; y<4; y++)
                for(x=0; x<4; x++)
                    proc_error[y][x] =
```

84

```
                    deltax * (y-3) * 2 - delta.y * (x-3) * 2;

/* Initialize the linear equation used to find the end */
                                    /* of the line in the grid array. */
 5                  for(y=0; y<4; y++)
                       for(x=0; x<4; x++)
                          lin_end[y][x] = - delta.y + y - 3;

/* Process patches until the end is reached. */
10                  for(;;) {

/* Calculate the mask required and the end flag too. */
                        for(y=0; y<4; y++)
15                         for(x=0; x<4; x++)
                           {

/* Test for the end && top && bottom of the line */
20                              if((lin_end[y][x] > 0) &&
                                    (proc_error[y][x] + delta.y <= 0) &&
                                    (proc_error[y][x] - delta.y > 0))
                                    mask[y][x] = TRUE;
                                else mask[y][x] = FALSE;
25                         }
                        patch_write(screen,color,mask,&addr);
                        if(lin_end[0][0] < 0) break;

30                                  /* Now use a modified tracking algorithm */
                        error = proc_error[3][3] - 8 * deltax + 7 * delta.y;
                        if(error > 0)
                        {
                           addr.x -= 4;
35                         for(y=0; y<4; y++)
                              for(x=0; x<4; x++)

proc_error[y][x] += 8 * delta.y;
```

```
            }
        else
        {
            addr.y -= 4;
 5          for(y=0; y<4; y++)
            for(x=0; x<4; x++)
            { proc_error[y][x] -= 8 * delta_x;
10
            lin_end[y][x] -= 4;
            }
          }
        }
15    }
      break;

case OCT270_315 :
      {
            BOOL mask[4][4];
20          POINT addr;
            INT error;
            INT   proc_error[4][4];
                                                /* for bresenhams al */
            INT   lin_end[4][4];
25                                              /* for line end */
            INT   x,y;

/* Initialize the address used by the address processor */
                                    /* to access the framestore. */
30          addr.x = start->x;
            addr.y = start->y-3;

/* Initialize the bresenhams error for each processor in */
                                    /* the array. */
35          for(y=0; y<4; y++)
            for(x=0; x<4; x++)
            proc_error[y][x] =
```

```
                              delta.x * (y-3) * 2 - delta.y * x * 2;

/* Initialize the linear equation used to find the end */
                                        /*    of the line in the grid array. */
 5                     for(y=0; y<4; y++)
                         for(x=0; x<4; x++)
                           lin_end[y][x] = - delta.y + y - 3;

/* Process patches until the end is reached. */
10                     for(;;) {

/* Calculate the mask required and the end flag too. */
                         for(y=0; y<4; y++)
15                         for(x=0; x<4; x++)
                             {

/* Test for the end && top && bottom of the line */
20                           if((lin_end[y][x] > 0) &&
                                (proc_error[y][x] + delta.y <= 0) &&
                                (proc_error[y][x] - delta.y > 0))
                                 mask[y][x] = TRUE;
                               else mask[y][x] = FALSE;
25                           }
                         patch_write(screen,color,mask,&addr);
                         if(lin_end[0][0] < 0) break;

30                                      /* Now use a modified tracking algorithm */
                         error = proc_error[3][0] - 8 * delta.x - 7 * delta.y;
                         if(error < 0)
                           {
                             addr.x += 4;
35                           for(y=0; y<4; y++)
                               for(x=0; x<4; x++)

proc_error[y][x] -= 8 * delta.y;
```

```
            }
         else
         {
            addr.y -= 4;
5           for(y=0; y<4; y++)
               for(x=0; x<4; x++)
               { proc_error[y][x] -= 8 * delta_x;
10
            lin_end[y][x] -= 4;
               }
            }
         }
15    }
      break;

case OCT315_360 :
      {
         BOOL mask[4][4];
20       POINT addr;
         INT error;
         INT     proc_error[4][4];
                                                    /* for Bresenham */
         INT     lin_end[4][4];
25                                                  /* for line end */
         INT     x,y;

/* Initialize the address used by the address processor */
                                    /* to access the framestore. */
```

Parallelized Line Tracking and Line Drawing

Among other innovative teachings, the parallel graphics architecture described herein provides an innovative line drawing operation.

Figure 52C:
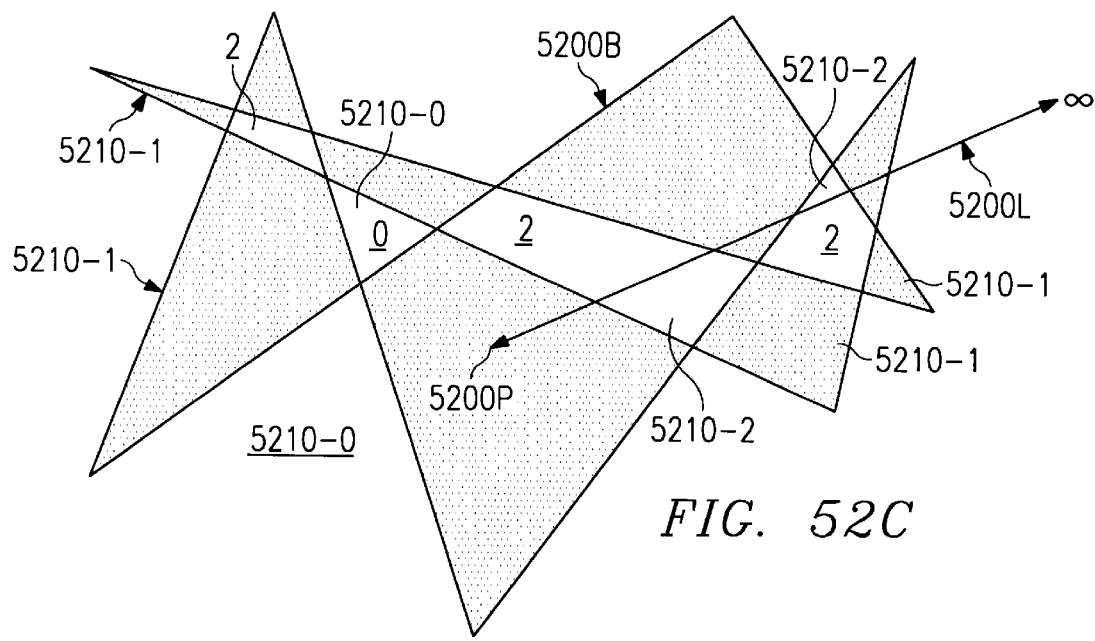
FIG. 52C conceptually shows how fill area set calculations are conventionally done, if it is acceptable to not render areas which are doubly covered by a self-intersecting polygon.
Figure 52D:
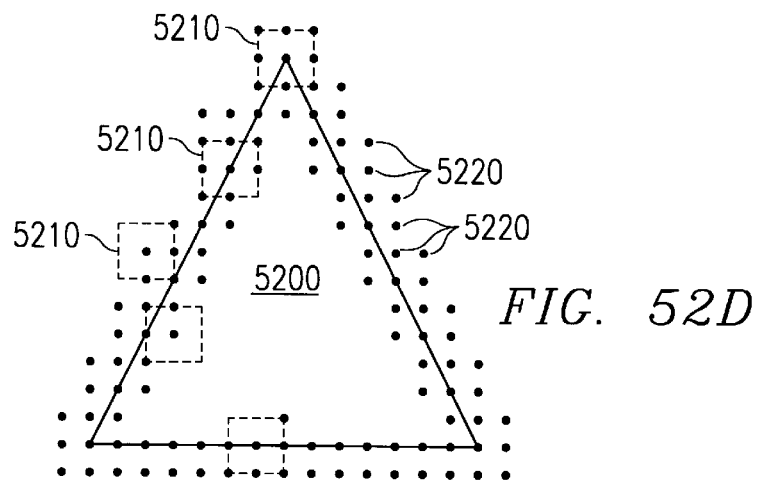
FIG. 52D schematically shows an example of the desired result, wherein a given set of points is "outlined" by a given set of translations.
Figure 52E:
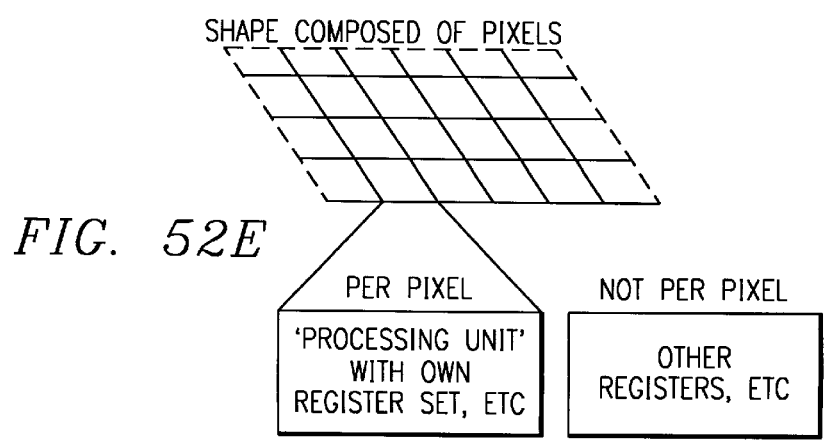
FIG. 52E shows the allocation of some functions to per-pixel registers (registers which provide at least some data locations for each pixel), and of other functions to registers which are not per-pixel.
Figure 52F:
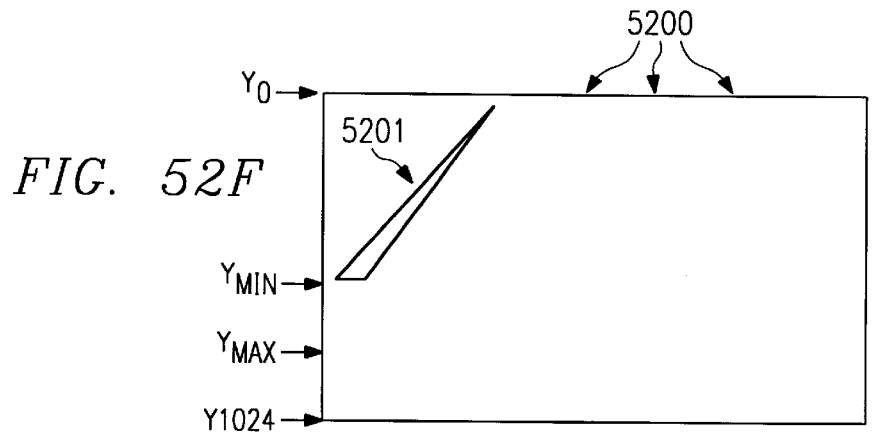
FIG. 52F shows an example of a range of lines, on a display 5200, where the bounding lines ymin and ymax are selected to prevent interference with the drawing of a large graphical primitive 5201 into the image memory.
Figure 52G:
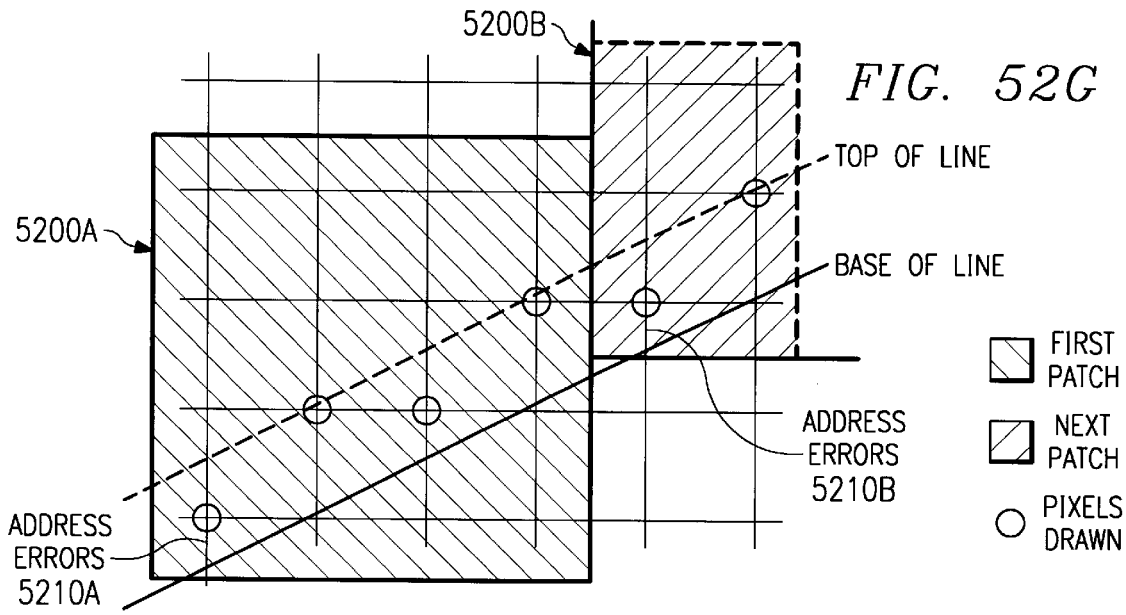
FIG. 52G shows an example of how successive parallel accesses define the patches of pixels which are used to draw (render pixels in) a line.

FIG. 52G schematically shows this operation. The line is tracked through each patch of pixels 5200A by solving two linear equations which define the "top" and "bottom" of the range permissible for drawing the line. The error term carried in from the patch-by-patch tracking algorithm defines the entry point for these two line-drawing borders. Each of the 16 pixel positions $(x_i, y_i)$ in the accessed patch is rendered if and only if it falls within these two linear equations. This procedure is somewhat computationally intensive, but is preferably performed in parallel (by the multiple grid processors).

The calculated address error 5210B is used to determine what the position of the succeeding patch 5200B will be. In the example shown, the vertical offset of patch 5200B from patch 5200A is 2 pixels; but offsets of 0, 1, 3, or 4 pixels could occur in other instances, depending on the slope of the line and the magnitude of the incoming error term 5210A.

Note that this method requires use of an architecture wherein the patch boundaries are not fixed. An example of such architecture is shown in FIG. 10.

Note that two types of data are created to draw the line: the first is a series of patch addresses, and the second is a mask for each patch drawn. It is assumed that a patch can be written with any arbitrary address. For simplicity a square patch is assumed.

First let us take a line in the following octant: $\Delta x > 0$, $\Delta y > 0$ and $\Delta x > \Delta y$. All types of line can be drawn by detecting the octant of the line and modifying signs in the algorithm. The calculation of the addresses uses a modified Bresenhams algorithm. (See the patent for high gradient Bresenhams algorithm.) First the number of pixels to be moved up is calculated via the following equation:

$$y\_inc = (N * \Delta y)/\Delta x;$$

where:

N is the width of the patch in pixels.

Of course the line may move up within the patch by a non-integer amount. This fact is taken into account by using the remainder of the above division to modify the addresses produced. The remainder can be calculated thus:

$$remainder = N * \Delta y - y\_inc * \Delta x;$$

By the use of an accumulative error modified by the remainder and $\Delta x$, the line can be tracked. The following iterative equations will track a line.

$$x += N;$$

if (error>0) {y+=y\_inc; error-=remainder;} else {y+=y\_inc+1; error+=($\Delta x$-remainder);} where:

N is the width of the patch in pixels.

x is the x address initialise to the start of the line.

y is the y address initialise to the start of the line.

error is a Bresenham like value which is initialised to $\Delta x/2$.

The physical meaning of the error can be seen in FIG. 52G. The error is used in the formation of the mask within each mask.

The mask within each patch is formed by the solution of two ear equations. If the base of the line passed right through the bottom left corner of the patch, then the following linear equations will describe the line.

If both of the following are true:

$$\Delta x * j - \Delta y * i < 0$$

$$\Delta x * (j+1) - \Delta y * i >= 0$$

then the pixel is on the line.

where:

i,j are the coordinates within the patch.

The base of the line does not always go exactly through the bottom left corner of the patch due to the integer nature of the image store. If the above equations are compared against the error in the address calculation instead of zero, then the position of the line within the patch is corrected.

The following sample source code, in the C language, provides a specific example of use of some of the innovative teachings herein as presently contemplated, in combination with the hardware architecture described above. (Note that this source code, in its present version, simulates the operation of the complete hardware system. Thus, this version of the source code can be used with other systems as well.) However, of course, a large variety of other implementations could be used instead. A very large range of changes could be made to the disclosed example, which does not necessarily delimit any of the claimed inventions. Note also that, in the following example, much of the code is simply taken up by a test to determine which quadrant and octant the current patch is in.

30               /* "Include" commands ******************** */
include <sys/types.h>
include <pixrect/pixrect_hs.h>
include <stdio.h>

90

```c
#include <math.h>
#include "lib.h"
                                            /* "Define" commands ********************* */
    #define OCT0_45      0
 5  #define OCT45_90     1
    #define OCT90_135    2
    #define OCT135_180   3
    #define OCT180_225   4
    #define OCT225_270   5
10  #define OCT270_315   6
    #define OCT315_360   7
    #define QUAD0_90     0
    #define QUAD90_180   1
    #define QUAD180_270  2
15  #define QUAD270_360  3
    #define X_MAJOR      0
    #define Y_MAJOR      1
                                            /* Declarations ************************** */
    static  INT    Quadrant,Octant,Major;
20  static  INT    color[16] =
    . . (255,255,255,255,
    . . 255,255,255,255,
    . . 255,255,255,255,
    . . 255,255,255,255 );
25  static  BOOL   mask[16];
    static  POINT  address,inc;
    static  IMAGE  screen;

main()
    {
30  . . POINT   start,end;
    . . double  angle;
    . . {
    . . . . POINT size;
    . . . . size.x = 800; size.y = 800;
35  . . . . screen = create_image(&size,0);
    . . }
    . . start.x = 250;
    . . start.y = 250;
    . . for(angle = 0.0; angle < 6.3; angle += 0.1)
40  . . {
    . . . . end.x = start.x + 200 * sin(angle);
    . . . . end.y = start.y + 200 * cos(angle);
    . . . . DrawLine(screen,&start,&end);
    . . }
45  }

DrawLine(image,start,end)
    IMAGE   image;
    POINT   *start;
    POINT   *end;
```

```
    {
..  INT     remain,count;
..  POINT   delta;
                                            /* first find the quadrant & octant */
5   .. if(start->x > end->x)
    .. {
    .... delta.x = start->x - end->x;
    .... if(start->y > end->y)
    .... {
10  ...... delta.y = start->y - end->y;
    ...... Quadrant = QUAD180_270;
    ...... if(delta.x > delta.y) {Octant = OCT180_225; Major = X_MAJOR;}
    ...... else {Octant = OCT225_270; Major = Y_MAJOR;}
    .... }
15  .... else
    .... {
    ...... delta.y = end->y - start->y;
    ...... Quadrant = QUAD90_180;
    ...... if(delta.x > delta.y) {Octant = OCT135_180; Major = X_MAJOR;}
20  ...... else {Octant = OCT90_135; Major = Y_MAJOR;}
    .... }
    .. }
    .. else
    .. {
25  .... delta.x = end->x - start->x;
    .... if(start->y > end->y)
    .... {
    ...... delta.y = start->y - end->y;
    ...... Quadrant = QUAD270_360;
30  ...... if(delta.x > delta.y) {Octant = OCT315_360; Major = X_MAJOR;}
    ...... else {Octant = OCT270_315; Major = Y_MAJOR;}
    .... }
    .... else
    .... {
35  ...... delta.y = end->y - start->y;
    ...... Quadrant = QUAD0_90;
    ...... if(delta.x < delta.y) {Octant = OCT45_90; Major = Y_MAJOR;}
    ...... else {Octant = OCT0_45; Major = X_MAJOR;}
    .... }
40  .. }

.. switch(Quadrant)
    .. {
    .... case QUAD0_90 :
    ...... address.x = start->x;
45  ...... address.y = start->y;
    ...... break;
    .... case QUAD90_180 :
    ...... address.x = start->x - 3;
    ...... address.y = start->y;
50  ...... break;
    .... case QUAD180_270 :
    ...... address.x = start->x - 3;
```

```
                address.y = start->y - 3;
                break;
           case QUAD270_360 :
                address.x = start->x;
5               address.y = start->y - 3;
                break;
        }
                                          /* The following switch statement carries out a */
                                          /* simple divide for the increment and the remain */
10      switch(Octant)
        {
           case OCT0_45 :
                count = delta.x>>2;
                inc.y = 0; inc.x = 4;
15              remain = delta.y * 4;
                if(remain >= delta.x * 2) { inc.y += 2; remain -= delta.x * 2; }
                if(remain >= delta.x) { inc.y += 1; remain -= delta.x; }
                grid(delta.x,delta.y,remain,count);
                break;
20         case OCT45_90 :
                count = delta.y>>2;
                inc.x = 0; inc.y = 4;
                remain = delta.x * 4;
                if(remain >= delta.y * 2) { inc.x += 2; remain -= delta.y * 2; }
25              if(remain >= delta.y) { inc.x += 1; remain -= delta.y; }
                grid(delta.y,delta.x,remain,count);
                break;
           case OCT90_135 :
                count = delta.y>>2;
30              inc.x = 0; inc.y = 4;
                remain = delta.x * 4;
                if(remain >= delta.y * 2) { inc.x += 2; remain -= delta.y * 2; }
                if(remain >= delta.y) { inc.x += 1; remain -= delta.y; }
                inc.x = -inc.x - 1;
35              remain = delta.y - remain;
                grid(delta.y,-delta.x,remain,count);
                break;
           case OCT135_180 :
                count = delta.x>>2;
40              inc.y = 0; inc.x = -4;
                remain = delta.y * 4;
                if(remain >= delta.x * 2) { inc.y += 2; remain -= delta.x * 2; }
                if(remain >= delta.x) { inc.y += 1; remain -= delta.x; }
                grid(delta.x,delta.y,remain,count);
45              break;
           case OCT180_225 :
                count = delta.x>>2;
                inc.y = 0; inc.x = -4;
                remain = delta.y * 4;
50              if(remain >= delta.x * 2) { inc.y += 2; remain -= delta.x * 2; }
                if(remain >= delta.x) { inc.y += 1; remain -= delta.x; }
                inc.y = -inc.y - 1;
```

```
              remain = delta.x - remain;
              grid(delta.x,delta.y,remain,count);
              break;
          case OCT225_270 :
 5            count = delta.y>>2;
              inc.x = 0; inc.y = -4;
              remain = delta.x * 4;
              if(remain >= delta.y * 2) { inc.x += 2; remain -= delta.y * 2; }
              if(remain >= delta.y){ inc.x += 1; remain -= delta.y; }
10            inc.x = -inc.x - 1;
              remain = delta.y - remain;
              grid(delta.y,delta.x,remain,count);
              break;
          case OCT270_315 :
15            count = delta.y>>2;
              inc.x = 0; inc.y = -4;
              remain = delta.x * 4;
              if(remain >= delta.y * 2) { inc.x += 2; remain -= delta.y * 2; }
              if(remain >= delta.y) { inc.x += 1; remain -= delta.y; }
20            grid(delta.y,-delta.x,remain,count);
              break;
          case OCT315_360 :
              count = delta.x>>2;
              inc.y = 0; inc.x = 4;
25            remain = delta.y * 4;
              if(remain >= delta.x * 2) { inc.y += 2; remain -= delta.x * 2; }
              if(remain >= delta.x) { inc.y += 1; remain -= delta.x; }
              inc.y = -inc.y - 1;
              remain = delta.x - remain;
30            grid(delta.x,-delta.y,remain,count);
              break;
      . . }
      } grid(delta_x,delta_y,remainder,count)
35    int delta_x,delta_y,remainder,count;
      {
      . . int k,j,i,error_pos[16],error_neg[16],error[16];
      . . int flag,root;

/* Note that delta_x and delta_y are swapped by the */
40                                          /* the setup processor when the line majors in y */
                                            /* The root processor is setup to carry out a true */
                                            /* dda. Other processors just check for bounds. */
                                            /* Set the other processors up according to their */
                                            /* value. */

45    . . switch(Octant)
      . . (
          case OCT0_45 :
              for(j=0,k=0; j<4; j++)
              for(i=0; i<4; i++)
50                error[k++] = delta_x * j - delta_y * i
```

```
               . . . . . . . . . . . + remainder - (delta_x/2);
               . . . . . . error[0] = (delta_x/2);
               . . . . . . root = 0;
               . . . . break;
 5             . . . . case OCT45_90 :
               . . . . . . for(j=0,k=0; j<4; j++)
               . . . . . . . . for(i=0; i<4; i++)
               . . . . . . . . . . error[k++] = delta_x * i - delta_y * j
               . . . . . . . . . . . + remainder - (delta_x/2);
10             . . . . . . error[0] = (delta_x/2);
               . . . . . . root = 0;
               . . . . break;
               . . . . case OCT90_135 :
               . . . . . . for(j=0,k=0; j<4; j++)
15             . . . . . . . . for(i=0; i<4; i++)
               . . . . . . . . . . error[k++] = delta_x * (i-3) - delta_y * j
               . . . . . . . . . . . + remainder - (delta_x/2);
               . . . . . . error[3] = (delta_x/2);
               . . . . . . root = 3;
20             . . . . break;
               . . . . case OCT135_180 :
               . . . . . . for(j=0,k=0; j<4; j++)
               . . . . . . . . for(i=0; i<4; i++)
               . . . . . . . . . . error[k++] = delta_x * j - delta_y * (3-i)
25             . . . . . . . . . . . + remainder - (delta_x/2);
               . . . . . . error[3] = (delta_x/2);
               . . . . . . root = 3;
               . . . . break;
               . . . . case OCT180_225 :
30             . . . . . . for(j=0,k=0; j<4; j++)
               . . . . . . . . for(i=0; i<4; i++)
               . . . . . . . . . . error[k++] = delta_x * (j-3) - delta_y * (i-3)
               . . . . . . . . . . . + remainder - (delta_x/2);
               . . . . . . error[0xf] = (delta_x/2);
35             . . . . . . root = 0xf;
               . . . . break;
               . . . . case OCT225_270 :
               . . . . . . for(j=0,k=0; j<4; j++)
               . . . . . . . . for(i=0; i<4; i++)
40             . . . . . . . . . . error[k++] = delta_x * (i-3) - delta_y * (j-3)
               . . . . . . . . . . . + remainder - (delta_x/2);
               . . . . . . error[0xf] = (delta_x/2);
               . . . . . . root = 0xf;
               . . . . break;
45             . . . . case OCT270_315 :
               . . . . . . for(j=0,k=0; j<4; j++)
               . . . . . . . . for(i=0; i<4; i++)
               . . . . . . . . . . error[k++] = delta_x * i - delta_y * (j-3)
               . . . . . . . . . . . + remainder - (delta_x/2);
50             . . . . . . error[0xc] = (delta_x/2);
               . . . . . . root = 0xc;
               . . . . break;
               . . . . case OCT315_360 :
```

```
            for(j=0,k=0; j<4; j++)
              for(i=0; i<4; i++)
                error[k++] = delta_x * (j-3) - delta_y * i
                  + remainder - (delta_x/2);
5         error[0xc] = (delta_x/2);
          root = 0xc;
          break;
      } for(k=0; k<count; k++)                /* The outer patch loop */
10    {
        for(i=0; i<16; i++)
        {
                                            /* The next two results form the */
                                            /* alternatives for the dda. */
15        error_neg[i] = error[i] - remainder;
          error_pos[i] = error[i] + delta_x - remainder;

/* form up the line write mask. */
          if((error_pos[i] > 0) && (error_neg[i] <= 0)) mask[i] = TRUE;
          else mask[i] = FALSE;
20      }

/* As the root processor is always on the line */
                                            /* set its line o/p mask to true. */
        mask[root] = TRUE;

25                                          /* get the address generator to draw the line. */
        address_generator(flag = error_neg[root]<0);

/* Now allow the command dda to affect the rest */
                                            /* of the array. */
30      if(flag) for(i=0; i<16; i++) error[i] = error_pos[i];
        else for(i=0; i<16; i++) error[i] = error_neg[i];
      }
    } address_generator(flag)
35  int flag;
    {
                                            /* This subroutine simulates the action of the */
                                            /* address processor during line drawing. The */
                                            /* addresses and the increment are all downloaded */
40                                          /* by the setup processor. */

/* Write the current patch */
      patch_write(screen,color,mask,&address);

/* update the patch position for the next cycle. */
      switch(Major)
45    {
        case X_MAJOR :
          if(flag) address.y += inc.y + 1;
```

```
         . . . . . . else address.y += inc.y;
         . . . . . . address.x += inc.x;
         . . . . . . break;
         . . . . case Y_MAJOR :
   5     . . . . . . if(flag) address.x += inc.x + 1;
         . . . . . . else
         . . address.x += inc.x;
         . . . . . . address.y += inc.y;
         . . . . . . break;
  10     . . )
         )
```

Polygon Traversal

FIG. 52A is an overview of an innovative operation for efficient traversal of a convex polygon. The grid is scanned row-by-row, by rows of patches of pixels. In each row, the scanning starts from a root position, and continues in one direction until elements are found which are not on the polygon. Scanning is then performed in the opposite direction (if needed), until elements are found which are not on the polygon.

When the scanning operation has found both extremities of the polygon, on a given row, the operation is repeated on the next row up. This continues until a row is reached where no elements of the polygon are present.

FIG. 52 schematically the sequence of patch locations used in traversing a large triangle. Starting from an initial root position (marked as position (1)), scanning moves (for example) to the left, until a test of the leading pixels indicates, at position (2), that the edge of the polygon has been reached. Scanning is then performed in the opposite direction, until a test of the leading pixels indicates, at position (3), that the edge of the polygon has been reached. A new root position (4) is then chosen directly above position (3). In this example, a test of the rightmost pixels at position (4) indicated that no movement to the right is necessary, so only leftward scanning is performed, until an edge is reached at position (5). A new root position (6) is then chosen directly above position (4). Similarly, in this example a test of the rightmost pixels at position (6) indicated that no movement to the right is necessary, so only leftward scanning is performed, until an edge is reached at position (7). A new root position (8) is then chosen directly above position (6). However, in this case, the rightmost pixels of position (8) are not all outside the polygon, so scanning also goes right, from position (8), to position (10).

Masking Pixels for Test Computation

FIG. 52B shows how only pixels at the leading edge of a patch are tested for the presence of the polygon, in the presently preferred embodiment.

Selecting the Direction of Scanning

Figure 53A:
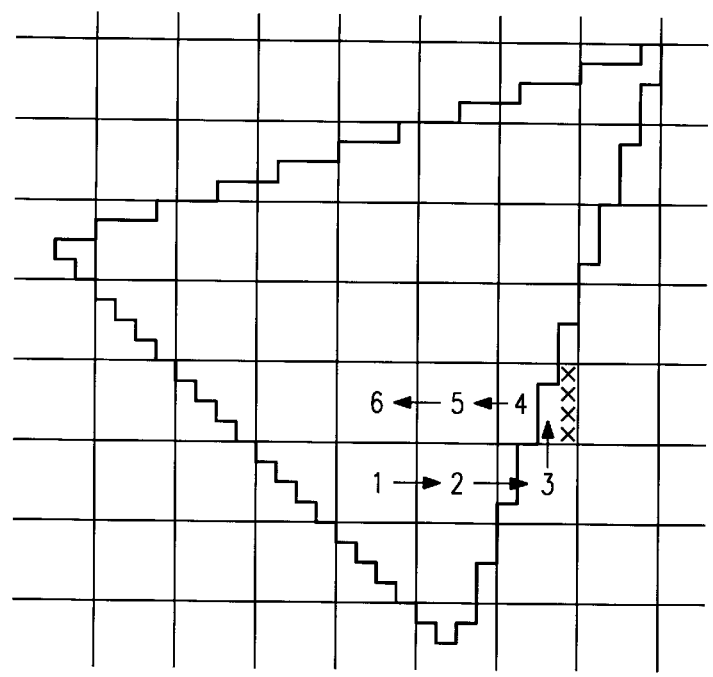
FIGS. 53A and 53B show how, after one row of patches has been scanned, the direction of scanning in the next row of patches is selected to be either the same (FIG. 53A) or opposite (FIG. 53B).
Figure 53B:
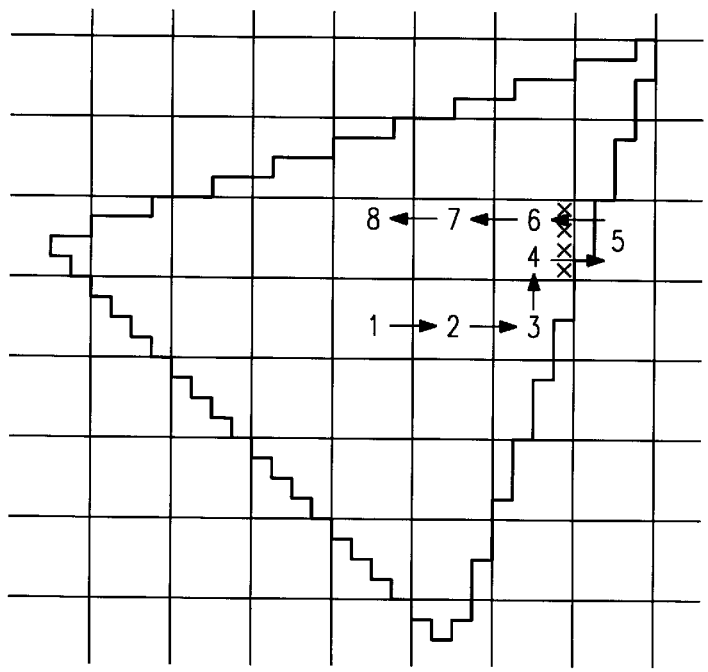

FIGS. 53A and 53B show how, after one row of patches has been scanned, the direction of scanning in the next row of patches is selected to be either the same (FIG. 53A) or opposite (FIG. 53B).

Testing the Direction of Movement

FIG. 54 shows an example of how a polygon is defined by three linear functions. In this example, the polygon shown is a triangle, with vertices at (4,0), (1,3), and (6,8). These coordinate values can be translated, as described above, to define equations for the boundary lines. In this example, the first line corresponds to the equation y=x+2; the second line corresponds to the equation y=4x−16; and the third line corresponds to the equation y=4−x. The equations for the boundary functions $f_i(x,y)$ can therefore be written as:

$$f_1(x,y)=-y+x+2;$$

$$f_2(x,y)=y-4x+16;$$

$$f_3(x,y)=y+x-4.$$

Note that the signs of these functions have been set so that all three are positive in the interior of the triangle.

Thus, at point A (coordinates (7,4)), functions $f_1$ and $f_3$ will be positive, and function $f_2$ will be negative. At point B (coordinates (7,3)), the value of function $f_2$ sill be less than it was at point A. This indicates that the path from A to B is not pointing toward the interior of the polygon. However, at point C (coordinates (6,3)), the value of function $f_2$ will be greater than it was at point A. This indicates that the path from B to C is pointing toward the interior of the polygon.

Note that, in evaluating the path from A to B to C, the change in the value of functions $f_1$ and $f_3$ is ignored (in this embodiment), because those functions are positive at these points. Similarly, if the starting point had been point D, function $f_3$ (which is positive at D) would be ignored in evaluating the path. If the starting point had been point E, function $f_2$ (which is positive at E) would be ignored in evaluating the path.

Figure 55:
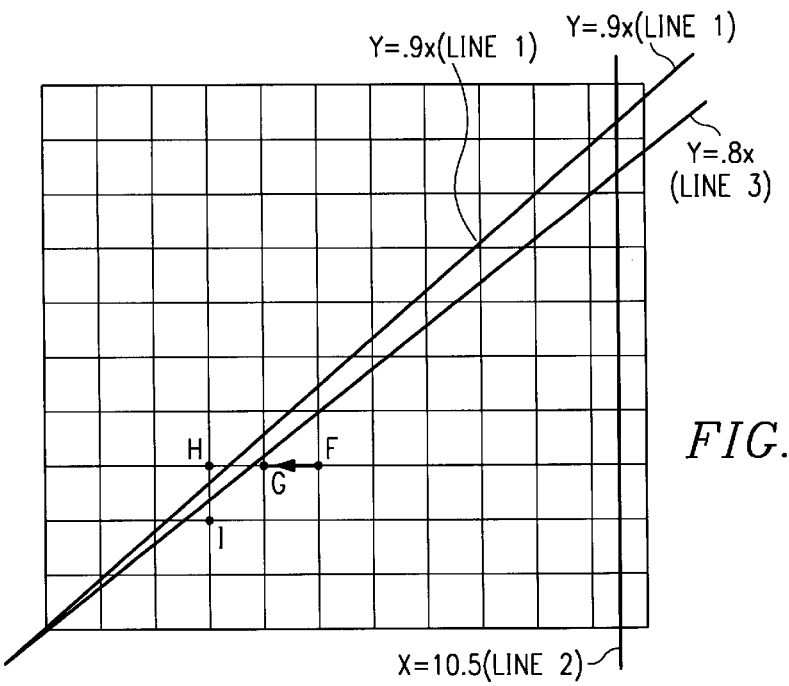
FIG. 55 shows another example of how a polygon is defined by three linear functions, and shows how the described method of finding the polygon operates when a portion of the polygon falls between grid points.

FIG. 55 shows another example of a polygon defined by three linear functions, and shows how the described method of finding the polygon operates in this case. In this example, the polygon shown is another triangle, with vertices at (0,0), (10.5,9.45), and (10.5,8.4). These coordinate values can be translated, as described above, to define equations for the boundary lines. In this example, the first line corresponds to the equation y=0.9x; the second line corresponds to the equation x=10.5; and the third line corresponds to the equation y=0.8x. The boundary functions $f_i(x,y)$, for this polygon, can therefore be written as:

$$f_1(x,y)=-10y+9x;$$

$$f_2(x,y)=-10x+105;$$

$$f_3(x,y)=10y-8x.$$

Again, note that the signs of these functions have been set so that all three are positive in the interior of the polygon. Note also that the functions have been scaled up to permit computation with integers only.

The example of FIG. 55 shows a possible difficulty. The polygon shown is long and narrow, so that it does not include any pixel center locations for x=1, x=2, x=3, or x=4. Such polygons may cause erroneous tracking, as discussed above.

However, the disclosed sample embodiment includes innovations which solve this problem. Point F is outside the polygon, and functions $f_1$ and $f_2$ are positive there. Point G is still outside the polygon, but the step from point F to point G is a step toward the center of the polygon, as indicated by change in the value of function $f_3$. However, the next point in the same direction (point H) is on the other side of the polygon: function $f_3$ has gone positive at point H, but function $f_1$ has now gone negative.

This information can be used in several ways. In the presently preferred embodiment, the points G, H, and I are not themselves necessarily rendered, but the tracking process is continued. (Thus, in the example shown the tracking process will eventually find and render point (0,0).) Tracking is stopped when a row count shows that the full height of the polygon has been traversed.

Alternatively, this information can be used to obtain a one-pixel-wide boundary set for a polygon, or to provide a polygon rendering which is guaranteed to be continuous, without gaps.

The following source code, in the C language, provides a specific example of use of some of the innovative teachings herein as presently contemplated, in combination with the hardware architecture described above. (Note that this source code, in its present version, simulates the operation of the complete hardware system. Thus, this version of the source code can be used with other systems as well.) However, of course a large variety of other implementations could be used instead. Note also that, in the following example, much of the code is simply taken up by a test to determine which quadrant and octant current patch is in.

```
                                            /* "Include" commands ******************** */
35  #include <sys/types.h>
    #include <pixrect/pixrect_hs.h>
    #include <stdio.h>
    #include <math.h>
    #include      "lib.h"
```

```
                                                      /* "Define" commands ********************* */
      #define MOVE_UP        0
      #define MOVE_LEFT      1
      #define MOVE_RIGHT     2
  5   #define MOVE_END       3
      #define TEST_UP        0
      #define TEST_LEFT      1
      #define TEST_RIGHT     2
      #define TEST_END       3
 10   #define LEFT           0
      #define RIGHT          1
                                                      /* Declarations ************************** */
      static  INT color[16] = {255,255,255,255,
                               255,255,255,255,
 15                            255,255,255,255,
                               255,255,255,255 };
      static  BOOL    mask[16];
      static  INT     right_addr,left_addr;
      static  POINT   addr;
 20   static  IMAGE   screen;

main()
      {
          POINT   trig[3];
          double  angle;
 25       double  inc = 0.15;
          double  center = 250;
          double  inner = 150;
          double  outer = 180;
          double  shift = -2.50;
 30       {
              POINT size;
              size.x = 800; size.y = 800;
              screen = create_image(&size,0);
          }
 35       for(angle = 0.0; angle < 6.28; angle += inc)
          {
              trig[0].x = (int)(center + inner * sin(angle + shift));
              trig[0].y = (int)(center + inner * cos(angle + shift));
              trig[1].x = (int)(center + outer * sin(angle));
 40           trig[1].y = (int)(center + outer * cos(angle));
              trig[2].x = (int)(center + outer * sin(angle - (inc/2)));
              trig[2].y = (int)(center + outer * cos(angle - (inc/2)));
              DrawTrig(trig);
              trig[0].x = (int)(center + inner * sin(angle + shift));
 45           trig[0].y = (int)(center + inner * cos(angle + shift));
              trig[2].x = (int)(center + outer * sin(angle - (inc/2)));
              trig[2].y = (int)(center + outer * cos(angle - (inc/2)));
              trig[1].x = (int)(center + inner * sin(angle - (inc/2) + shift));
              trig[1].y = (int)(center + inner * cos(angle - (inc/2) + shift));
 50           DrawTrig(trig);
```

```
       DrawTrig(coord)
       POINT    coord[3]; {
  5    INT      sol[16][3],sol_s[16][3];
       INT      i,j,k,l,count;
       INT      dir,flag;
       BOOL     local_mask[16];
       INT      cond = 0;
 10    POINT    d[3];
                                  /* This is a parallel implementation to setup for */
                                  /* triangles on pipre. */
                                  /* First calculate the delta x and delta y. It also */
                                  /* finds the signs of the delta y so that the min & */
 15                               /* max can be found. These are used as the origin */
                                  /* for the triangle. */
          for(i=0; i<3; i++)
          {
                  d[i].x = coord[(i+1)%3].x - coord[i].x;
 20               d[i].y = coord[i].y - coord[(i+1)%3].y;
                  if(d[i].y >= 0) cond |= (1 << i);
                  if((d[i].y | d[i].x) == 0) return;
          }
                                  /* The condition code cond has encoded the sign of */
 25                               /* the three y directions. A multiway branch is */
                                  /* used to access this information. */
                                  /* In the following equations c is equivalent to the */
                                  /* following cross product: */
                                  /* c[i] = d[i].y * (x[min] - x[i]) + */
 30                               /* d[i].x * (y[min] - y[i]); */
          switch(cond)
          {
                  case 1 :
                                                          /* Y max:0 min:1 */
 35                       right_addr = left_addr = addr.x = coord[1].x;
                          addr.y = coord[1].y;
                          count = ((d[0].y)>>2);
                          for(j=0,k=0; j<0x4; j++)
                                  for(i=0; i<0x4; i++,k++)
 40                               {
                                          sol[k][0] = d[0].y*i + d[0].x*j;
                                          sol[k][1] = d[1].y*i + d[1].x*j;
                                          sol[k][2] = d[2].y*(i-d[1].x) + d[2].x*(j+d[1].y);
                                          if((sol[k][0] |
 45                                            sol[k][1] |
                                               sol[k][2]) >= 0) local_mask[k] = TRUE;
                                          else local_mask[k] = FALSE;
                                  }
                          break;
 50               case 2 :
                                                          /* Y max:1 min:2 */
                          right_addr = left_addr = addr.x = coord[2].x;
```

101

```
                    addr.y = coord[2].y;
                    count = ((d[1].y)>>2);
                    for(j=0,k=0; j<0x4; j++)
                            for(i=0; i<0x4; i++,k++)
 5                              {
                                    sol[k][0] = d[0].y*(i-d[2].x) + d[0].x*(j+d[2].y);
                                    sol[k][1] = d[1].y*i + d[1].x*j;
                                    sol[k][2] = d[2].y*i + d[2].x*j;
                                    if((sol[k][0] |
10                                      sol[k][1] |
                                        sol[k][2]) >= 0) local_mask[k] = TRUE;
                                    else local_mask[k] = FALSE;
                                }
                    break;
15          case 3 :
                                                                    /* Y max:0 min:2 */
                    right_addr = left_addr = addr.x = coord[2].x;
                    addr.y = coord[2].y;
                    count = ((-d[2].y)>>2);
20                  for(j=0,k=0; j<0x4; j++)
                            for(i=0; i<0x4; i++,k++)
                                {
                                    sol[k][0] = d[0].y*(i-d[2].x) + d[0].x*(j+d[2].y);
                                    sol[k][1] = d[1].y*i + d[1].x*j;
25                                  sol[k][2] = d[2].y*i + d[2].x*j;
                                    if((sol[k][0] |
                                        sol[k][1] |
                                        sol[k][2]) >= 0) local_mask[k] = TRUE;
                                    else local_mask[k] = FALSE;
30                              }
                    break;
            case 4 :
                                                                    /* Y max:2 min:0 */
                    right_addr = left_addr = addr.x = coord[0].x;
35                  addr.y = coord[0].y;
                    count = ((d[2].y)>>2);
                    for(j=0,k=0; j<0x4; j++)
                            for(i=0; i<0x4; i++,k++)
                                {
40                                  sol[k][0] = d[0].y*i + d[0].x*j;
                                    sol[k][1] = d[1].y*(i-d[0].x) + d[1].x*(j+d[0].y);
                                    sol[k][2] = d[2].y*i + d[2].x*j;
                                    if((sol[k][0] |
                                        sol[k][1] |
45                                      sol[k][2]) >= 0) local_mask[k] = TRUE;
                                    else local_mask[k] = FALSE;
                                }
                    break;
            case 5 :
50                                                                  /* Y max:2 min:1 */
                    right_addr = left_addr = addr.x = coord[1].x;
                    addr.y = coord[1].y;
                    count = ((-d[1].y)>>2);
```

```
                    for(j=0,k=0; j<0x4; j++)
                            for(i=0; i<0x4; i++,k++)
                                    {
                                            sol[k][0] = d[0].y*i + d[0].x*j;
 5                                          sol[k][1] = d[1].y*i + d[1].x*j;
                                            sol[k][2] = d[2].y*(i-d[1].x) + d[2].x*(j+d[1].y);
                                            if((sol[k][0] |
                                                    sol[k][1] |
                                                    sol[k][2]) >= 0) local_mask[k] = TRUE;
10                                          else local_mask[k] = FALSE;
                                    }
                    break;
            case 6 :
                                                                    /* Y max:1 min:0 */
15                  right_addr = left_addr = addr.x = coord[0].x;
                    addr.y = coord[0].y;
                    count = ((-d[0].y)>>2);
                    for(j=0,k=0; j<0x4; j++)
                            for(i=0; i<0x4; i++,k++)
20                                  {
                                            sol[k][0] = d[0].y*i + d[0].x*j;
                                            sol[k][1] = d[1].y*(i-d[0].x) + d[1].x*(j+d[0].y);
                                            sol[k][2] = d[2].y*i + d[2].x*j;
                                            if((sol[k][0] |
25                                                  sol[k][1] |
                                                    sol[k][2]) >= 0) local_mask[k] = TRUE;
                                            else local_mask[k] = FALSE;
                                    }
                    break;
30          default :
                                                /* A point or a line must be drawn under */
                                                /* these conditions to make the operation */
                                                /* consistent. */
                    return;
35      }
        for(k=0; k<16; k++) mask[k] = local_mask[k];
                                                /* Make the increments for a whole patch. */
        for(i=0; i<3; i++)
        {
40              d[i].y *= 4;
                d[i].x *= 4;
        }
                                                /* for a point to be inside the triangle all the */
                                                /* solutions must be positive. */
45      push(sol,sol_s);
        while(test_inc(sol,TEST_LEFT,MOVE_LEFT,d));
                pop(sol,sol_s);
                                                /* this loop counts the number of patch lines scanned */
        for(j=0; j <= count; )
50      {
                while(j++ <= count)
                {
```

```
                    push(sol,sol_s);
                    while(test_inc(sol,TEST_RIGHT,MOVE_RIGHT,d));
                    if(!test_inc(sol,TEST_RIGHT,MOVE_UP,d)) break;
                    push(sol,sol_s);
                    while(test_inc(sol,TEST_LEFT,MOVE_LEFT,d));
                    pop(sol,sol_s);
            )
            while(j++ <= count)
            (
                    push(sol,sol_s);
                    while(test_inc(sol,TEST_LEFT,MOVE_LEFT,d));
                    if(!test_inc(sol,TEST_LEFT,MOVE_UP,d)) break;
                    push(sol,sol_s);
                    while(test_inc(sol,TEST_RIGHT,MOVE_RIGHT,d));
                    pop(sol,sol_s);
            )
        )

address_generator(MOVE_END);
)

sol_printf(sol) int sol[16][3]; (
        int i,j,k;

for(k=0; k<3; k++)
        (
                for(j=0; j<4; j++)                                         /* y */
                (
                        for(i=0; i<4; i++) printf("%d ",sol[4*j + i][k]);
                        printf("\n");
                )
                printf("\n");
        )
)

pop(a,b)
int a[],b[];
(
        int i;
        for (i=0; i<48; i++)
                a[i] = b[i];
)

push(a,b)
int a[],b[];
(
        int i;
        for (i=0; i<48; i++) b[i] = a[i];
)

int     test_inc(sol,test,move,d)
int     sol[16][3],test,move;
POINT   d[3];
```

```
        {
            INT         i,l,inc[3];
            BOOL        local_mask[16][3];
            BOOL        move_mask[16];
 5                                              /* ****************************************** */
                                                /* This routine returns true if the patch is   */
                                                /* moving towards or inside the triangle. It   */
                                                /* returns false if the patch is moving away. It */
                                                /* also calculates a mask as well.             */
10          address_generator(move);            /* ****************************************** */
            switch(move)
            {
                case MOVE_UP    : for(l=0; l<3; l++) inc[l] = d[l].x; break;
15              case MOVE_LEFT  : for(l=0; l<3; l++) inc[l] = - d[l].y; break;
                case MOVE_RIGHT : for(l=0; l<3; l++) inc[l] = d[l].y; break;
            } for(i=0; i<16; i++)
            {
20              for(l=0; l<3; l++)
                {
                    sol[i][l] += inc[l];
                    if(sol[i][l] < 0) local_mask[i][l] = TRUE;
25                  else local_mask[i][l] = FALSE;
                }
                                                /* The write mask to the frame store */
                mask[i] =   !(local_mask[i][0] ||
                                               local_mask[i][1] ||
30          }                                  local_mask[i][2]);
            switch(test)
            {
                case TEST_UP    :
                    for(i=12; i<16; i++)
35                  {
                        move_mask[i] = FALSE;
                        for(l=0; l<3; l++)
                            move_mask[i] = move_mask[i] ||
40                  }                   (local_mask[i][l] && (d[l].x <= 0));
                    if(move_mask[15] && move_mask[14] &&
                        move_mask[13] && move_mask[12]) return FALSE;
                    else return TRUE;
                                                /* more to do in this direction */
45              case TEST_LEFT  :
                    for(i=3; i<16; i+=4)
                    {
                        move_mask[i] = FALSE;
                        for(l=0; l<3; l++)
50                          move_mask[i] = move_mask[i] ||
                                (local_mask[i][l] && (d[l].y >= 0));
                    }
```

```
                    if(move_mask[3] && move_mask[7] &&
                            move_mask[11] && move_mask[15]) return FALSE;
                    else return TRUE;
                                            /* more to do in this direction */
 5          case TEST_RIGHT :
                    for(i=0; i<16; i+=4)
                    {
                            move_mask[i] = FALSE;
                                    for(l=0; l<3; l++)
10                                          move_mask[i] = move_mask[i] ||
                                                    (local_mask[i][l] && (d[l].y <= 0));
                    }
                    if(move_mask[0] && move_mask[4] &&
15                          move_mask[8] && move_mask[12]) return FALSE;
                    else return TRUE;
                                            /* more to do in this direction */
            }
    }

20  address_generator(flag)
    int     flag;
    {
            int i;
                                    /* This subroutine simulates the action of the */
25                                  /* address processor during line drawing. The  */
                                    /* addresses and the increment are all downloaded */
                                    /* by the setup processor. */

/* Write the current patch */
                                    /* Wpatch(xaddr,yaddr,0xffff,bg); */
30          patch_write(screen,color,mask,&addr);

switch(flag)
            {
                    case MOVE_RIGHT :
                            right_addr += 4;
35                          addr.x = right_addr;
                            break;
                    case MOVE_LEFT :
                            left_addr -= 4;
                            addr.x = left_addr;
40                          break;
                    case MOVE_UP :
                            right_addr = left_addr = addr.x;
                            addr.y += 4;
                            break;
45                  case MOVE_END :
                            break;
            } if ((addr.x > 1280) ||
                    (addr.x < 0))
```

```
            {
                    printf("X out of range %x flag = %1.x\n",addr.x,flag);
                    exit(0);
            }
5       if ((addr.y > 1024) ||
                    (addr.y < 0))
            {
                    printf("Y out of range %x flag = %1.x\n",addr.y,flag);
                    exit(0);
10          }
    }
```

Fill Area Set Calculation

FIG. 52C conceptually shows how fill area set calculations are conventionally done, if it is acceptable to not reader art which are doubly covered by a self-intersecting polygon. Conceptually, to determine whether any particular point 5200P should be rendered, a line 5200L is drawn from infinity (in any direction) to the point in question: and the point 5200P is considered to be part of the area set if and only if the line 5200L crosses the border 5200B, between the point 5200P and infinity, an odd number of times. (In practice, this is conventionally implemented by following scan lines.)

FIG. 52C reveals a limitation of this approach:
- the areas 5210-0, which are not covered, are (properly) not rendered;
- the areas 5210-1, which are singly covered, are (properly) rendered; but
- the areas 5210-2, which are doubly covered, are not rendered.

For many graphics applications it is acceptable not to render the doubly covered pixels; but for some applications this is unacceptable.

Note that the boundary set used as a starting point for fill area set operations is normally not highly constrained. For example, FIG. 52C shows a boundary set which is a non-convex reentrant polygon, and FIG. 53A1 shows a boundary set which includes two distinct polygons one of which is non-simple (i.e. has a hole in it).

FIGS. 53A1 and 53B1 show how two different fill area set operations produce different results on a similar graphics object: if a simple method, as in FIG. 52C, is used, then areas 5310-2 which are doubly covered will not be rendered (FIG. 53A1); but if oriented line segments are used for the boundaries, then winding number computations can be used to assure that pixels 5310-2 which are doubly covered will be rendered (FIG. 53B1). Note that, if FIG. 53B1, the boundary set 5300B' is made of oriented line segments. These can be used to implement a modification of the method just described: a line is drawn from infinity to a point (preferably along a scan line, for convenience). Every time, this line-from-infinity hits the left side of an oriented boundary segment, a count value (which was originally set to zero) is incremented. Every time the line-from-infinity hits the right side of an oriented boundary segment, a count value is decremented. Pixels where the count value is zero (such as pixels 5310-0) are not rendered, and all other pixels 5310-1, 5310-2, etc., are rendered (whether the count value is positive or negative).

The above computations are normally performed serially, and could be parallelized row-by-row if desired. However, the disclosed innovations provide a much more highly parallelized implementation of these computations. In different versions, the disclosed innovations provide computation with winding numbers (as shown in FIG. 53B1, and in FIGS. 54A–54E) and without winding numbers (as shown in FIGS. 52C, 53A1, and 55A–55D).

Parallel Computation with Winding Numbers

Figure 54A:
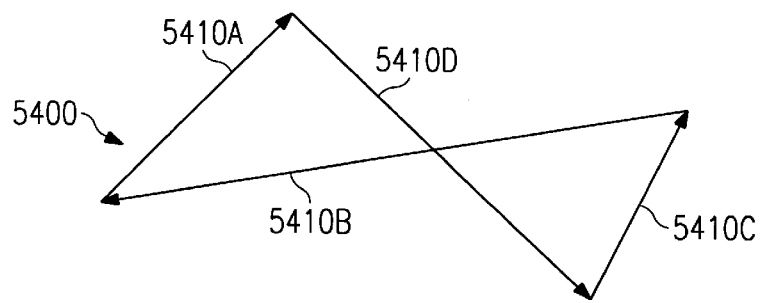
FIG. 54A shows a sample graphical object, included oriented boundaries, for a fill area set operation.

FIG. 54A shows a sample graphical object, including oriented boundaries 5410A–5410D, for a fill area set operation.

Initially a bounding box 5402 is drawn around the graphical object.[1]

[1] Bounding boxes, with horizontal boundaries at the maximum and minimum y value and vertical boundaries at the maximum and minimum x value, are often used to circumscribe a graphical object being manipulated; but in the following example it is only the left side of the bounding box which is relevant (i.e. a line, at the minimum x value, extending from the minimum y to the maximum y). Therefore, only this portion of the bounding box is shown in the Figures. Some of the boundary lines may include curves.

Figure 54B:
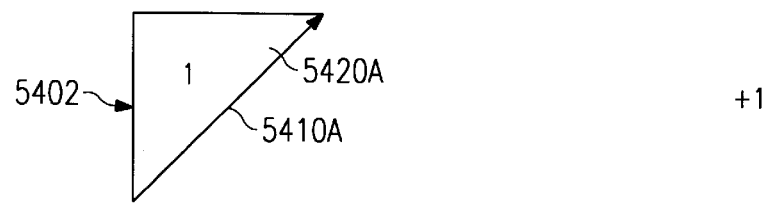
FIGS. 54B through 54E show the parallelized operations which are used to perform the fill area set operation with correct winding number computations.

In a first step, as shown in FIG. 54B, a convex polygon 5420A is defined by taking a first boundary segment 5410A, and extending both endpoints straight left to the bounding box 5402. A data value (which was originally set to zero) is incremented for all pixels in this polygon. (In this example, the sign of the area of polygon 5420A is taken to be positive rather than negative, because the head of segment 5410A leads into a left turn at a vertex of convex polygon 5420A. The signs of the areas could be reversed, as long as this was done consistently for all areas.)

Figure 54C:
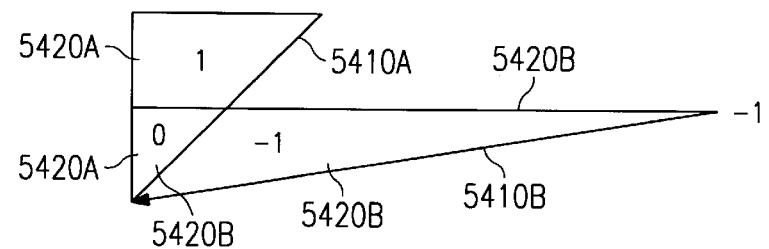

In a second step, as shown in FIG. 54C, a convex polygon 5420B is defined by taking a second boundary segment 5410B, and extending both endpoints straight left to the bounding box 5402. The data value is decremented for all pixels in this polygon. (The area of polygon 5420B is taken to be negative, because the head of segment 5410B leads into a right turn at a vertex of convex polygon 5420B.) Note that the pixel data value, for pixels which are common to polygons 5420A and 5420B, is now zero.

Figure 54D:
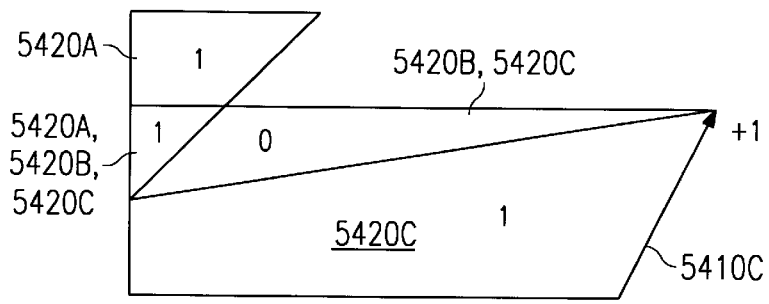

In a third step, as shown in FIG. 54D, a convex polygon 5420C is defined by taking a third boundary segment 5410C, and extending both endpoints straight left to the bounding box 5402. The data value is incremented for all pixels in this polygon. (The area of polygon 5420C is taken to be positive, because the head of segment 5410C leads into a left turn at a vertex of convex polygon 5420C.) Note that the pixel data value, for pixels which are common to polygons 5420C and 5420B (but not to 5420A as well), is DOW zero.

Figure 54E:
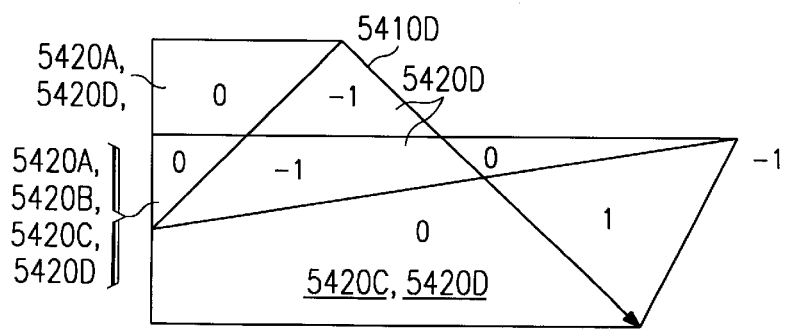

In a fourth step, as shown in FIG. 54E, a convex polygon 5420D is defined by taking a fourth boundary segment 5410D, and extending both endpoints straight left to the bounding box 5402. The data value is decremented for all pixels in this polygon. (The area of polygon 5420D is taken to be negative, because the head of segment 5410D leads into a right turn at a vertex of convex polygon 5420D.)

In a final step (not shown), all pixels where the data value is nonzero will be rendered. Comparison of FIGS. 54A and 54E will show that those pixels exactly correspond to the shape shown in FIG. 54A, as desired.

The steps from 54B through 54E can each be performed as parallel operations, using a parallel image and graphics processor as described above.

Moreover, it should be noted that the order of steps 54B through 54E is completely unimportant. As long as memory access collisions do not become a problem, these steps can be performed asynchronously, on separate processors, if desired.

Parallel Computation without Winding Numbers

Figure 55A:
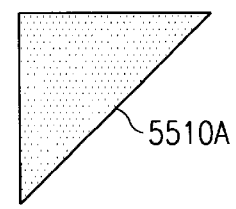

FIGS. 55A through 5SD show the parallelized XOR operations which are used to perform a fill area set operation without winding number computations. The graphical object which defines the fill area set is assumed to be the same as that of FIG. 54A (except that the orientation of the boundary segments 5410 will be ignored). Again, a bounding box 5402 is initially drawn around the graphical object.

In this procedure, the pixel data values are preferably Boolean. The data values are preferably all initialized to "0" (false).

In a first step, a convex polygon 5420A is defined by taking a first boundary segment 5410A, and extending both endpoints straight left to the bounding box 5402. The data value is complemented for all pixels in this polygon. This produces an area 5510A, as shown in FIG. 55A, where the pixels have a stored value of "true".

In a second step, a convex polygon 5420B is defined by taking a second boundary segment 5410B, and extending both endpoints straight left to the bounding box 5402. The data value is complemented for all pixels in this polygon.

Figure 55B:
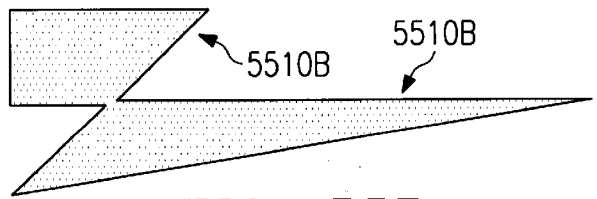

This produces an area 5510B, as shown in FIG. 55B, where the pixels have a stored value of "true".

Figure 55C:
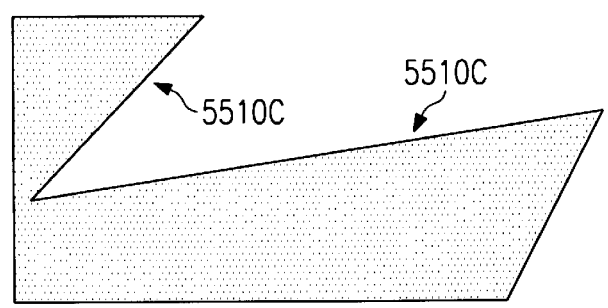

In a third step, a convex polygon 5420C is defined by taking a third boundary segment 5410C, and extending both endpoints straight left to the bounding box 5402. The data value is complemented for all pixels in this polygon. This produces an area 5510C, as shown in FIG. 55C, where the pixels have a stored value of "true".

Figure 55D:
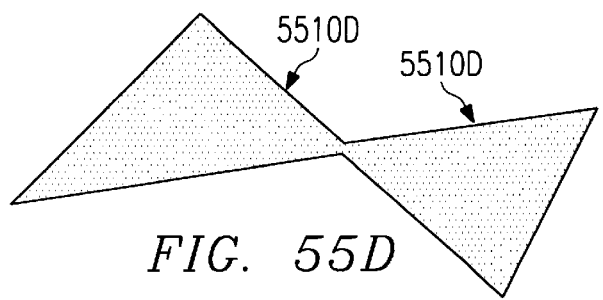

In a fourth step, a convex polygon 5420D is defined by taking a fourth boundary segment 5410D, and extending both endpoints straight left to the bounding box 5402. The data value is complemented for all pixels in this polygon. This produces an area 5510D, as shown in FIG. 55D, where the pixels have a stored value of "true". Note that area 5510D correctly corresponds to the desired area fill result.

In a final step (not shown), all pixels where the data value is "1" (true) are rendered.

Again, the steps from 55A through 55D can each be performed as parallel operations, using a parallel image and graphics processor as described above.

Moreover, it should be noted that the order of steps 55A through 55D is completely unimportant. As long as memory access collisions do not become a problem, these steps can be performed asynchronously, on separate processors, if desired.

Rendering Outlines

FIG. 52D schematically shown the operation of rendering the outline of a graphical primitive. In this example, the graphical primitive to be outlined is a triangle 5200.

The outline is defined with respect to a set of offsets. In the example shown, the set of offsets used is (1,−1), (1,0), (1,1), (0,−1), (0,1), (−1,−1), (−1,0), (−1,1). These offsets are represented schematically by the small squares 5210 shown in several places.

As discussed above, a point is considered to be part of the outline if some of the offsets map that point onto the exterior of the graphical primitive, and some of the set of offsets map that point onto the interior or border of the graphical primitive. In the example of FIG. 52D, this means that the border will be the set of points 5220 which are shown as heavy dots.

The disclosed innovations provide improved performance in rendering outlines of functions.

A sample pseudo-code realization of the disclosed invention, to run on a hardware system as described above, is as follows.

```
for (all pixels: x,y)
{
    a = 0;
    for (all offsets: i,j)
    {
        if (F(x+i,y+j)>0)
            a = a+1;
                // where F is a function which shows
                // whether a point is in the graphical primitive
    }
    if a ≠ 0 AND a ≠ the number of offsets, then set pixel(x,y)
}
```

Note that x and y are required to be integers, but i and j can be fractional.

A key feature to be noted here is the order of parallelism: the outer loop ranges over all pixels, and c a be operated in parallel on a parallel architecture like that described. This permits the parallelism to be efficiently exploited, and provides advantages in the context of a parallel architecture like that described.

Synchronization between Pixel Processor and Display Driver or Video Processor

Among the innovative teachings set forth herein is a new architectural feature for synchronizing drawing operations in accordance with the scan-line position of the video processor. A video processor will normally scan a rectangular area of memory displaying the results. The main objective of any processor which is writing to the scanned area is not to leave half-finished primitives displayed on the screen even for one frame. The present application provides methods for achieving this aim.

Assume that a primitive is to be written to an active screen (i.e., one currently being scanned). The primitive may be a copy to carry out double-buffering by copy or it may be a single triangle. There are three types of synchronization requirements. These are:

(a) Update immediately, upsetting the video processor if required.

(b) Update without disturbing the video output stream.

(c) Update a specific frame without disturbing the video. (For animation.)

Most applications currently available to run under a window manager update using method (a). Applications requiring type (c) update have tended to be done via full double-buffering. The market trend appears to demand improvement in the quality of window-managed applications (Multiple Luts on the Tek video is an example of this), so that being able to provide type (b) update for applications running under X-windows might be highly desirable. Applications which need update type (c) are typically not written to work through a window manager.

The following equations show bow to calculate when drawing of a primitive to the screen can be commenced. $Y_{min}$ and $y_{max}$ will be used to designate the boundaries of the scan line range tested for, i.e. if the current scan line is between $y_{max}$ and $y_{min}$ then drawing will not be permitted. $Y_{min}$ and $y_{max}$ are functions of the following variables:

The rate that the video processor transfers lines.

The rate that the primitive is drawn to the screen.

The total time taken to draw the primitive.

The position of the start line of the primitive.

It is relatively easy to show that:

$$y_{min} = S_w$$
$$y_{max} = S_w + (K_c - K_t)\Delta t$$

where $K_c$ is the rate of drawing lines of the primitive.

$K_t$ is the rate of transferring lines from the screen.

$S_w$ is the start line of the primitive.

$\Delta t$ is the time taken to draw the primitive.

Note: It is possible that $y_{max} < y_{min}$. However, the time when the primitive cannot commence drawing is still the time between the two specified lines: that is, after the scan line number reaches $y_{min}$, drawing is forbidden until a vertical blanking interval occurs and the scan line thereafter reaches $y_{max}$.

If the primitive is to be drawn straightaway, then there is bound to be a possibility that the video stream will be disrupted. To minimize this effect, $K_c$ (in the above equations) should be made the same value as $K_t$. This means that the transfer of lines from the screen occurs at the same rate that the lines are written to the screen. This is the ideal case and is not very often possible, but the sign of $K_c$ and $K_t$ should be the same. This means that the direction of transfer from the screen should be the same direction as the write to the screen.

FIG. 52F shows an example of a range of lines, on a display 5200, where the bounding lines $y_{min}$ and $y_{max}$ are selected to prevent interference with the drawing of a large graphical primitive 5201 into the image memory.

In this example, the screen shown is a 1280×1024 display. However, of course, the disclosed technology can be used in a wide variety of display sizes.

In the presently preferred embodiment, the scan-line-synchronization capability of a TMS340 graphics processor in the video processor 18 is used to provide the needed capability. Low-level logic in the video processor 18 is used to detect the periods in which a first signal indicating that the video driver is at line $y_{min}$ has been received more recently than a second signal indicating that the video driver is at line $y_{max}$. To communicate this synchronization information a hardware interrupt is provided from the video processor 18 to the renderer module 16.

Assembly Language for Parallel Graphics Computing System

The following text describes "Crackle", the assembly language which is preferably used for programming the hardware system as described above.

The Pipre Renderer, described in detail above, is controlled, in the presently preferred embodiment, via an assembly language interface known as Crackle. This language allows the Renderer to be programmed to carry out various graphics and image processing functions. There is a close one to one relation between Crackle instructions and the User Microcode functions available on the Renderer. This document first gives a register model of the Renderer. It then gives all instructions which can be carried out on those registers. It also gives examples of how various graphics and imaging functions can be formed in Crackle. It is not the aim of this document to give a formal definition of the Crackle syntax, but rather to give a precise definition of each Crackle instruction, and an overview of how the instructions can be used together.

Addressing Images in Crackle

The Crackle programmer is presented with an elegant model to specify and execute imaging operations. In Crackle, the addressing and selection of image data is separated from the processing of that data. An addressing loop is used to set up the addresses of all pixels to be processed: the defined pixels can then be processed many times within this loop, using the full power of the Crackle data operation instructions. All the addressing and selection of data in Crackle is achieved via Shapes. A Shape is one of a number of geometrically defined image regions. A Shape can be used in a number of different ways: as a Stencil; as a Translator; or as a Clipper. A Stencil uses a Shape to define a Region of Interest within an image: a Stencil Region. Typically, imaging operations can only occur within the context of a Stencil, and only pixels within the Stencil Region are affected. A Stencil can be regarded as a loop specifier that defines all pixels within the Stencil Region, although in execution all pixels are regarded as being processed in parallel. Nested Stencils are not allowed. It is important to realize that the only method of writing to the image store is to use the Stencil Region. The Stencil Region therefore normally corresponds to the area of the destination image to be written. If an operation uses more than one output with different shapes, then such an operation has to be carried out in multiple passes. A Translator is another method of establishing a looping operation, again using a Shape. A Translator interacts with a Stencil: causing the Stencil to be offset by, and executed for, each pixel in the Translator's shape. Thus a translator is only legitimate within a stencil. A Clipper again uses a Shape, but acts as a further qualifier for pixels within a Stencil Region. When used within a Stencil the Clipper's Shape is combined with the Stencil's Shape: the logical combination of shapes defines the affected pixels within the Stencil Region. Data operations occur within a specified Region using a Load/Store type register model which is explained in the next section. It is worth reiterating that although Stencils and Translators can be imagined to set up loops within which each pixel is processed, no sequential ordering of processing is implied—in fact all pixels will behave as if processed in parallel. It should thus be thought that there is a separate set of registers for each pixel; thus any operations involving the registers only makes sense within a Stencil, as otherwise the operation has no context (the registers involved are not "tied" to any specific pixel). All this will be explained further in subsequent sections.

The Register Model

This section introduces the register model of Pipre, used to support the Imaging Model and data operations. There are two classes of register within Crackle: "per-pixel" registers (which each exist in multiple copies, one for each pixel being processed); and the others. This document first covers the per-pixel registers.

Per Pixel Registers

There are three types of register in the Per-Pixel Register Model of Pipre. These are Pixel, Condition, and Offset registers. (FIG. 52E graphically shows the model.)

The Pixel registers hold data or address values currently being operated on within the Renderer. The Condition registers hold Boolean values used to affect renderer operations. The Offset accumulator holds a value that is added as offsets to addresses into the Image Store. The nature of each type of register is explained further in the following sections.

Pixel Registers

The Pixel registers are used to store any data or address data that is being processed by the Renderer. Even a copy on Pipre uses the Pixel registers. There is one pixel accumulator (pa) and N auxiliary registers (p[0] through p[N−1]). The number of auxiliary registers is controllable from the Crackle assembler. The pa is the target for all Loads and Stores from the Image Store and is the primary register for all data operations. The auxiliary Pixel registers can be moved to and from the accumulator and can be used in operations involving more than one register. A full set of instructions for carrying out arithmetic and logical operations on the Pixel registers is provided. The Crackle programmer can regard each Pixel register as capable of holding a 32 bit data value for each pixel of the Stencil Region currently being processed—however large that may be. If images of less than 32 bits depth are transferred to or from the Pixel registers, the data are conformed between the different widths of the registers and the image in a defined way. It is also possible for the Pixel registers to hold address information as well as data, a number of address formation and dereference instructions are provided.

Condition Registers

The Condition registers are used to store boolean data used to influence the execution of imaging operations. There is one condition accumulator (Ca) and N auxiliary registers (c[0] through c[N−1]). The number of auxiliary registers is controllable from the Crackle assembler. The ca is the primary register for all data operations. The auxiliary Condition registers can be moved to and from the accumulator and can be used in operations involving more than one register. A full set of instructions for carrying out logical operations on the Condition registers are provided. The Condition registers are used in the implementation of Stencils. A Stencil is processed as a series of Patches, equivalent in size to the Grid dimensions: e.g. 4×4. Although the series of patches will approximate to the Stencil Region being processed, there will be pixels in some patches, particularly around the edges of the Stencil Region, that are not members of the Region. To identify these Pixels, a bit mask is loaded to the Condition Accumulator as each patch of pixels is loaded into the Pixel Accumulator. A true bit indicates that the corresponding Pixel is a member of the Stencil Region. So, the Crackle programmer can regard each Condition register as capable of holding a 1 bit boolean for each pixel of an area closely enclosing the Stencil Region currently being processed—however large that may be. This boolean area is called a Region Mask. When data is stored to the Image Store, the current ca is used to mask each pixel write. Normally the ca will hold the current Stencil Region's Mask: and so each pixel of the Stencil Region will be written. It is possible that the ca will have been formed from explicit operations on the condition registers, however, it would be unusual for these logical operations not to involve the original Stencil Region's Mask. Clippers are implemented simply by combining the Region Mask of the Chipper's Shape together with the current ca—which would normally bold the Stencil Region's Mask. Note that a Clipper's mask is only evaluated within the extent of the Stencil Region.

Offset Registers

The Offset registers are used to store address offsets which are added to Image Store access addresses. There is one Offset accumulator (oa) and N auxiliary registers (o[0] through o[N-1]). The number of auxiliary registers is controllable from the Crackle assembler. The oa is the register that is implicitly used as an offset during every Image Store access (this means for both reading and writing). The oa can be assigned and translated by use of a Pixel Translator. It stores addresses that are added the image store access address. The auxiliary Pixel registers can be moved to and from the accumulator and can be used in operations involving more than one register. Each Offset register holds three integer dimension addresses. 1D, 2D and 3D image accesses use 1, 2 or 3 of the dimension addresses respectively. The oa register is set to zero on entry to each Crackle segment. It cannot be explicitly set (except by a translator). At the end of each translator it reverts to the value it had just outside. The Offset registers are used in the implementation of Translators. Using a Translator will cause the oa to be set to each pixel position in the Translator's Shape in turn for each pass through the Translator loop. Note that a translator can only be used inside a stencil loop. At the end of a translator the oa reverts to the value it had before the start of it. Note that translators can be nested, and do not affect the value of the Condition Accumulator.

Register Context

As explained briefly earlier in this document, the above set of registers conceptually exists for each pixel, and thus any reference to the registers only really makes any sense given some context (the pixel being referred to). This is done by the Stencil, and thus many of the operations referred to below only make sense when used within a stencil of some kind, and thus a semantic error occurs every time one of the instructions is used outside. Note that this is not the case with every instruction that follows, and also that whether the Crackle assembler chooses to flag the error or not is quite another matter.

Other Registers

In addition there are what are known as global registers. These are very useful for storing context between Stencils, as will be seen later. There is a set of these (g[0] to g[n-1]), and no global accumulator. Note that they do not exist on a per-pixel basis but exist just once across the whole Stencil etc.

Crackle Syntax

Some rules of Crackle syntax will now be described.

Syntax Used in this Document

This section describes the syntax used to describe the assembler source. First note is that all lower case information is complete and will be accepted by the assembler. Upper case information needs substituting for numbers or expressions as defined. The document uses the following notation for instruction syntax:

( ) Parenthesis is used to force an evaluation order different from normal precedence.

[ ] The contents of square brackets may appear once or not at all.

{ } Braces are used to indicate one or multiple occurrences of the braces contents.

data Italic words indicate that a substitution must take place.

a|b Means that "a" OR "b" is valid.

The following are logical operations:

~ not

| or

& and

^ XOR

The abbreviation "LogicOp" (Logical Operator) is used frequently in the syntax of each instruction in this document. It is defined as the following:

$$\text{Logic}Op \rightarrow ||\&|\hat{}\,.$$

Similarly, the abbreviation "EqLogicOp" refers to operators which can perform the above while also making an assignment, much as are present in "C":

$$Eq\text{Logic}Op \rightarrow =|\&=||=|\hat{}\,=.$$

Similarly, for arithmetic operators:

$$\text{Arith}Op \rightarrow +|.|*|/|\%.$$

where the symbols have meanings as in "C".

Also there are $$Eq\text{Arith}Op \rightarrow =|+=|.=|*=|/=|\%=$$

$$Eq\text{ArithLogic}Op \rightarrow Eq\text{Logic}Op|Eq\text{Arith}Op$$

The following are the relational operators used in Crackle. They have the sane meaning as they do in C: <, >, ==, !=, <=, >=.

Another abbreviation used in this document is "RelOp" (Relational Operator) and is defined as the following:

$$\text{Rel}Op \rightarrow <|<=|>|>=|==|!=.$$

Other abbreviations which arc used herein may include, e.g.: "Statement(s)" means one or more instructions within C braces. The instructions are what is described in the latter stages of this document-"pa=p[N]", etc. Note that all instructions should be terminated by a semi-colon.

$C$Expr→$C$Expression–constant, variable, or expression.

Const$C$Expr→Constant $C$ Expression

Description of Instructions

Many different primitives are described within this document; these are all described under the five headings of syntax, format of data (sometimes), constraints, semantics, and in most of the cases an example. All instructions (apart from stencils and translators—which are followed by a block of instructions) are terminated by semi-colons. Syntax is pretty straightforward; it merely described the text used and the meaning of any parameters. Format of Data (which is only given where relevant) is slightly more complicated; the relevant data may well be simple enough to be best described in the syntax section. This section comes into play particularly with PolyShapes (see later for a description) where the amount of data involved is not constant. This section is really intended to describe the ordering of the data. The first few cases where this occurs are given in slightly more detail than the rest in order to familiarize the reader. Constraints describes any "illegal" situations, and generally points out any restrictions concerning the instruction. Semantics described "what the instruction does" in a fair amount of detail. The example section is intended to give example(s) of the use of the primitive, with the intention of clarifing the meaning/use.

Use of Crackle Segments

The general intention is that segments of Crackle will be used within C and C++ programs; it is thus necessary to have some way of indicating to the various compilers involved just where the C ends and where the Crackle begins. For the sake of consistency the same mechanism is employed even when there is no C within the file, and it consists entirely of Crackle. This is done by the use of the reserved word "crackle" followed by the Crackle code which is placed within C style braces (i.e. "{" and "}"). Note that in order to specify that a Crackle segment exist the statement Crackle must contain the letters in precisely the sane mix of upper and lower case as here, and the word should appear as a separate token, and not as part of another string. The use of white space (new lines, tabs, spaces etc.) is not significant. Thus crackle { . . . } and crackle { . . . } are correct, whereas Crackle { . . . } is not (because "Crackle" has a large "C"), and fredcrackle { . . . } is not because the word "crackle" is part of a larger token.

Comments in Crackle

These are done in precisely the same way as in C++— namely by either enclosing them in "/*" and "*/" (non-nestabie), a la C, or by putting them after a "//"—in this case only the rest of the line is taken as a comment. Consider the following example:

```
crackle
{
                           // This is a Crackle Comment
    /* So is this */
}
```

Data Types

This section describes the data types that it is envisaged will eventually be supported and used by Pipre, although in the early stages only the first two will be implemented. It explains their abbreviations and format. The types are: Integer; Coordinate Fixed-Point; IEEE Floating-Point; Fractional Address; Packed Address; RGB Color; PIPRE Floating-Point; Short Floating-Point Integer Abbreviation: INT. Format: 32 bits to left of decimal point. 0 bits to right of decimal point. Function: All integer data in the Grid is held as signed 32 bit values.

Coord (Coordinate)

Abbreviation: COORD. Format; 16 bits to left of decimal point. 16 bits to right of decimal point. Function: This data type segments the 32 bit words used by the AP/GRID into a fixed-point form. This data type is used for specification of coordinates in stencils, translators and clippers.

IEEE Floating-Point

Abbreviation: IEEE. Function: IEEE floating-point data are stored in the Grid simply as 32 bit values (24.8). They are moved loaded and stored simply as INT values. IEEE arithmetic operations arc NOT supported by the first version of Pipre. The next generation may have IEEE modules in the Gripors. At present IEEE format data is only converted to and from PFLOAT format. Presently they are converted and processed as a sequence of fixed point operations.

Fractional Addresses

Abbreviation: FADDR. Function: Full resolution pixel addresses use 16. 16 fixed point data called a Fractional Addresses. For 2D and 3D addressing, the Y and Z components follow in subsequent words. Note that only the most significant 16 bits (integer part) of each word is used when the address is converted to an internal format (PACKed). (This allows subpixel addressing and allows for corrections such as adding 0.5 to all addresses to account for corner/ center addressing schemes. They can be manipulated as normal INT values.

Packed Addresses

Abbreviation: PACK1D, PACK2D & PACK3D. Packed addresses are signed integer values which are packed in a single word in 1D, 2D and 3D modes. Obviously as dimension increases, the number on bits for each component is reduced and hence restricting dynamic range. The bit ordering for these three modes is specified in the Gripor Data Sheet.

RGB Color

Abbreviation: RGB. Function: Full 24 bit color is supported and is packed as 3×8 bit components in a 32 bit word. Blue is the least significant byte. The type utilizes a hardware gadget to optimize color rendering.

PIPRE Floating-Point

Abbreviation: PFLOAT. Where; 24 bits in mantissa. 8 bits in exponent. Function: This type allows packing of floating point data. Both mantissa and exponent are signed fields of the form PIPRE24.8. This format can be converted to fixed point values more efficiently than IEEE format.

Short Floating-Point

Abbreviation: SFLOATx.y. Where; x=int, Number of bits in mantissa, y=int, Number of bits in exponent. x+y need not be 32. Function: This type allows a shorter representation of floating point data. Both mantissa and exponent are signed variable width fields, in 2's complement. The type is only used for I/O in that it is used by operations on the frame store (Load/Store) where they are converted to integers for use by the hardware.

Shapes

This chapter describes the shape primitives built into the Crackle assembly language. As has already been mentioned, any of the following shapes may be used as a Stencil, a Translator, or a Clipper.

Shapes Supported

Note that in all cases it is possible to draw multiple versions of the shapes below—thus while it is not mentioned explicitly they are "PolyShapes" rather than "Shapes".

Pixel

This shape describes a single picture element within an image of any supported dimension. Poly pixels can be used to describe any 1D, 2D or 3D shape although there is a practical limitation to this method. An example is the description of a small "airbrush" using a 2D poly pixel.

Rect/Cuboid

This shape will probably be the most commonly used as images are generally rectangular. It describes a filled rectangle in 2D and a solid cuboid in 3D where the specified coordinates are inclusive on the raster device. e.g. 0 . . . 10×0 . . . 10 accesses 121 pixels. This shape is only defined in 2D & 3D.

Line

A line drawing shape is provided in 2 and 3 dimensions. Pixels are addressed that are closest to an imaginary line between the specified points. End points are included.

Triangle

This shape describes a filled triangular area where the edges are approximated on the raster device in a similar manner to the line shape. It is only applicable in 2D.

Cubic Spline

This primitive gives a flexible curve drawing function. It uses a generalized spline algorithm which allows Bezier, B-spline & Hermite class curves to be fully described.

Conic

This shape addresses a conic surface in 2D and 3D. It can be used to describe any ellipse in 2D (including circles) and any ellipsoid in 3D (including spheres).

Stride

Stride is a primitive which addresses a contiguous area in a 1D image in specified steps. For example, a step of 2 gives an "every other" addressing mechanism.

Convex Polygon

This shape is provided as an optimization of the Fill Area Set primitives. It can be used to describe a closed polygonal shape with the proviso that the shape is convex.

Fill Area Set

Odd-Even Rule

The Odd-Even rule is a method of describing an 2D area using a series of polygons. The rule determines the "insideness" of a point by drawing a ray from that point in any direction and counting the number of edges crossed. If the number is odd, the point is inside; if it is even, the point is outside.

Non-Zero Winding Rule

The Non-Zero winding number rule determines whether a given point is inside a path by (conceptually) drawing a ray from that point to infinity an any direction and then examining the places where the segment of the path crosses the ray. Starting from zero, add one each time the path crosses the segment from left to right and subtract one when the crossing is from right to left. After the count is complete, if the result is zero the point is outside; otherwise the point is inside.

Anti-Aliased Shapes

AA Triangle

This stencil does the same as the ordinary triangle stencil except that a value between 0 and 1 is left in the pa to indicate just how close to the edge the particular point is.

AA Line

This works exactly the same as above, with the value between zero and one left in the pixel accumulator again. Table 1 summarizes the shape primitives and shows the forms and dimensions in which they are available. Note that strides are no longer available and anti-aliased triangles and lines still have to be added to the table.

Variable Shapes

In addition to the above it will also be possible to have generic shapes whose form is not determinate until runtime. The syntax for this is slightly different than that for the shapes above, as will be seen.

Shape Subclasses

Primitives such as Cubic Spline and Conic give a powerful shape description mechanism but could sometimes be over-complicated. It is possible to use the host or some on-line processor to perform geometric processing and data type transforms for Crackle parameter data. For example, a function to draw circles of specified radius could be transformed into a function to generate/translate data and then pass it to the AP/GRID. Geometric types like circles and ellipses (simplifications of conic—filled & outlined) will be supported by the Crackle language.

Shape Combinations

Figure 53C:
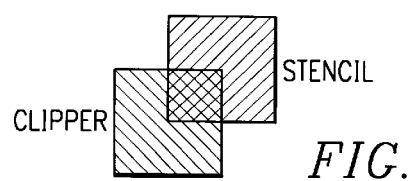
FIG. 53C shows bow a stencil shape can be logically ANDed with an inverted clipper shape to form arcs and segments.

By using a certain type of shape descriptor, a Clipper, it is possible to obtain a limited logical combination of shapes to form new useful shapes. Take for example the Conic shape primitive to form a circle, combined with a triangle. FIG. 53C shows how a stencil shape can be logically ANDed with an inverted clipper shape to form arcs and segments.

Conceptual View

Recall that all pixels within a shape should be thought of as being processed in parallel. However, it is not necessary to use the shapes singly—for most (if not all) of them it is possible to generate a stencil/translator/clipper for multiple cases—e. g. two hundred rectangles, ten thousand lines, etc, etc. These are often referred to as "PolyShapes". The general syntax is often to use the word for the single shape and to indicate the number of shapes required. When this facility is used it should be remembered that (taking the first example above) while all the pixels within each rectangle can be viewed as being processed in parallel (although not necessarily precisely in step), the individual rectangles should be viewed as being processed sequentially. As will be seen later, the Crackle syntax allows the user to run certain instructions over the region generated by the Stencil and thus for the case above the code will be executed two hundred times—once over each rectangle.

Shape Parameters

Whenever a Shape is called for (whether it be for the purpose of a Stencil, a Translator, or a Clipper), it has parameters to go with it. This section gives a brief description of the various ways in which the parameters can be expressed. Thus, the full syntax for a general shape is as follows:

shape (data_list, num_shapes)

where shape=rect2D|pixel1D| . . .

data_list=single_param|several_params, where:

single_param=C expression of type * COORD;

several_params=one$_{13}$ param {, one_param} one_param=C expression—variable, constant, pointer to buffer etc.

Expression is of type INT.

num_shapes=C expression giving the number of shapes. The terms "data_list" and "num_shapes" are used throughout this document. Note that data_list is used in such a way as not to include the number of shapes that comprise the PolyShape.

EXAMPLES

Consider the case of a rectangle; this has four corners, but it can be described (and commonly is) by the coordinates of the top-left and bottom-right corners. Assume for the minute that this is the case, and consider how a request to set up a stencil could be made. It could be done using a single C expression that would presumably grab all the necessary data from a single buffer, such as *data++ with all parameters in one array, or alternatively it is possible to have all the parameters as separate C expressions. This means that all parameters can be in different arrays on the host *x1++, *y1++, *x2++, *y2++, . . . or alternatively rect2D (0x00640000, 0x00640000, 0x01f40000, 0x01f4000, 1) which draws a rectangle between (100,100) and (500,500). It also illustrates one important point; all addresses are specified in 16 bit integer, 16 bit fractional fixed point numbers. This looks distinctly untidy in this formal, but it is easy enough to make macros available to convert between types. In addition, many numbers will be stored as variables, and a lot of processing will be done within functions. All this gives a programmer plenty of chances to hide the above, and in any case it is common in this type of application to have this sort of addressing. Alternatively, there is the following notation, rect2D(x1, y1, x2, y2, 1)where x1, y1 etc. are C variables. It is possible to use a combined form where some of the data is taken from buffers and the other data comes from variables or literals for example rect2D(*x1++, 0x00640000, *x2++, 0x01f40000, 5)where the y coordinates arc constant and the x coordinates come from buffers. Note however that when a single buffer is not used then the number of parameters (not counting the number of shapes) must be correct for the particular shape (in the case of rect2D, the figure is four). Thus rect2D(0x00640000, 0x00640000, 0x00c80000, 0x00c80000, 0x01f40000, 0x01f40000, 0x02580000, 0x02580000, 2) which is intended to draw two rectangles, one from (100,100) to (200,200) and one from (500,500) to (600,600) is actually illegal, as is rect2D(*xy1__data++, *x2__data++, *y2__data++, 10)where the intention is to put all the data for the first corner into the one array. Note in passing that the way that the "++" is used in these examples fits in with the concept of the individual shapes within the PolyShape being executed sequentially, as described earlier in this document. The only problem with this, of course, is when the single buffer is used to store all the information, where there is only one "++" at the "head" of the stencil. A good way to view this is as the C expression being expanded out to fill in the right number of parameters, and thus to pick up each parameter in turn, thus: rect2D(*data++, *data++, *data++, *data++, 10)and indeed, there would be nothing wrong with using this in the first place, and exactly the same result would be achieved. Another possibility is to use indexed variables, for example rect2D(data[i++], 10)would get expanded out to something suitable, or alternatively rect2D (data[i], data[i+1], data[i+2], data[i+3], 10)would do if a C variable "i" were increased by four each as part of the code in the Stencil. This of course needs i set somewhere beforehand (may not be that easy in Crackle). Essentially anything that is a C expression can be used. It is also quite possible to arrange data in other ways, and to use all double minus operators or combinations of double pluses and double minuses and various other options, as long as the points just made are remembered. The actual number of parameters in data__list will vary from shape to shape, and a fuller description is given for the expanded version for each shape. Summing up though, for any of the shapes there are two cases; data__list consists of one item that is the buffer pointer, or N items, where each of these may be a buffer pointer, a literal, or a variable, and N is the number of items needed to describe a single shape. This will be seen throughout the description of the shapes in the section on stencils below (and it maps over into translators and clippers) where the format of data involved is given for each stencil. Here the value of N can be deduced by considering just this attribute.

Condition Register Operations

This section describes all operation on the condition registers.

Stencils

Stencils describe shapes by creating a mask based around the specified origin and a set of addresses to access the image store. As will be seen shortly, the syntax of Stencils involves assigning the shape the "ca", the Condition Accumulator. This should be viewed as the mask created being assigned to an array of Condition Accumulators (recall each pixel has its own set of registers). Thus the region mask and the Condition Accumulators for the pixels in the shape are synonymous. The mask and the addresses define a Stencil Region. The mask (condition accumulator) is TRUE within the stencil region and FALSE outside it. When reading data from the image store the Stencil Region mask (condition accumulators for each pixel) does not inhibit read operations. When writing data to the image store, the Condition Accumulators (i.e., the mask) determines whether the write is inhibited. Note that the Condition Accumulator can be set by instructions other than stencils, and this can lead to confusion if not used with care as it can add bits onto the shape or lop them off if the "ca" is set to the opposite value to what it is for the stencil at any particular point. This is of course exactly what is required for Clippers, but more on this later. It is a hardware restriction of the Address Processor that stencils cannot be nested. It is possible to have shape based logical operations of stencil regions by use of Clippers. Sometimes it will no be possible to perform an operation in one pass due to nesting restrictions. It should be remembered that any operations involving registers assume a whole array of them; one set for each pixel within the stencil. As previously mentioned therefore, any instruction of this kind makes no sense outside of a stencil and may well be made illegal, but even if it is not, no register state should be assumed. All Stencils (except for the generic case which will be examined later) are of the form;

region (ca=shape(data__list, num__shapes)) statement(s)

Where: "shape" is a Shape primitive name, and "statement (s)" is one or more Instruction(s) to be performed where the region is valid.

Note that even a single statement must be enclosed in braces. This is not the same as C. This seems a good point to describe how the "format of data" section that appears in the next section should be viewed. For a general shape, suppose that the format of data is: {S1C1, S1C2, . . . S1CN, S2C1, S2C2, . . . S2CN, . . . SMC1, SMC2, . . . , SMCN} where SACB is Coordinate B for shape A. In the above case M of the particular shapes are to be drawn, and each of these requires N coordinates (perhaps attributes is a more general word). If a buffer is constructed in the format described above then it can be accessed by the "short form" of the data list using the single "*data++", or otherwise the data list will need to contain N items, one for each attribute of each of the shapes. Let region (ca=shape(data__list, num__shapes))

be known as the Stencil Head, and the statements that appear with it be known as the Stencil block. The two are known collectively as the Stencil. Some potential problems may be encountered with the poly forms of shape primitives. Using line as an example, code can be specified to perform an XOR with data and the frame store. As the line stencil's start and end points are inclusive, the vertices of the poly-line may be assigned an undesirable result, eg. A poly line is drawn, but pixels at the vertices are not plotted. There is also the generic case, as mentioned earlier, which allows for the shape involved to only be known at run time. This has the syntax:

region (ca=shape(actual_shape, data_list, num_shapes))

where "actual_shape" describes the actual shape.

Pixel 1D

Syntax region (ca=a pixel1D(data_list, num_shapes)) statement(s)

Format of Data: {P1x1, P1x2, P1x3, . . . }. Each pixel only has one coordinate (since 1D pixels are specified). The format of the data above describes how the relevant data might be stored within a buffer. Constraints: As with all stencils this must not be placed within another stencil. After this instruction (and that includes the statements that go with it, no register state should be assumed. Semantics: This instruction creates a series of 1D single pixel stencil regions based at specified origins. It is used to address an area in a 1D image. The number of stencils must be specified by the num_shapes parameter. Although each pixel's position is specified they can still be translated using the Offset Accumulator. Note here (as with the other pixel stencils) that Pixel 1D refers to a pixel that can be located by one coordinate, rather than a one dimensional pixel. This is dissimilar to the terminology used for rectangles etc. Example:

```
                                                        // C/C++ Code
                            // Coordinate data held as 32 bit integers on host.
static INT32 data[] = {0x0000000a};                     // pixel 10
crackle                                                 // Crackle Code
{
    region (ca = pixel1D(*data++,1))
    {
        pa = is(ip_id,ip_conf);                         // Load (unconditionally)
        is(op_id,op_conf) = pa;                         // Store (conditionally)
    }
}
```

This program read a single pixel from location 0x0000000a (10 decimal) from an input image and writes back the pixel value to an output image, i.e., a single 1D pixel copy.

Pixel 2D

Syntax:    region (ca = pixel2D(data_list, num_shapes)) statement(s)

Format of Data: {P1poX, P1posY, P2posX, P2posY, etc. . . . } There are several ways to use this instruction, as is indicated by the description of data_list above. Either the data is all placed in one buffer, in the format described above, and uses the "*data++" approach, or, recalling how data_list works again, since each pixel requires two coordinates, two buffers, variables, literals, or any combination may be used. Constraints: As always, this stencil cannot be nested within other stencils. After this instruction, no register state should be assumed. Semantics: This instruction creates a series of 2D single pixel stencil regions based at specified origins. It is used to address an area in a 2D image. The number of stencils must be specified by the num_shapes parameter. Although each pixels position is specified, they can still be translated using the Offset Accumulator. Example:

```
                                                        // C/C++ Code
                            // Coordinate data held as 32 bit integers on host.
static INT32 data[] = {0x000a0000, 0x000c0000};         // pixel 10,12
crackle                                                 // Crackle Code
{
    region (ca = pixel2D(*data++,1))
    {
        pa = is(ip_id,ip_conf);                         // Load (unconditionally).
        is(op_id,op_conf) = pa;                         // Store (conditionally)
    }
}
```

This program read a single pixel from location 0x000a0000, 0x000c0000 (10,12 decimal) of an input image and writes the pixel value to an output image. i.e., a 2D single pixel copy.

Pixel 3D

Syntax:    region (ca = pixel3D(data_list, num_shapes)) statement(s)

Format of Data: {P1posX, P1posY, P1posZ, P2posX, P2posY, P2posZ, . . . } Hence "data_list" may contain one or three items. After this instruction, no register state should be assumed. Semantics: This instruction creates a series of 3D single pixel stencil regions based at specified origins. It is used to address an area in a 3D image. The number of stencils must be specified by the num shapes parameter. Although each pixels position is specified, they can still be translated using the Offset Accumulator. Example:

```
                                                        // C/C++ Code
                            // Coordinate data held as 32 bit integers on host.
static INT32 data[] = {0x000a0000, 0x000c0000, 0x000e0000};  // pixel 10,12,14
crackle                                                 // Crackle Code
{
    region (ca = pixel3D(*data++,1))
    {
        pa = is(ip_id,ip_conf);                         // Load (unconditionally).
        is(op_id,op_conf) = pa;                         // Store (conditionally)
    }
}
```

This program read a single pixel from location 0x000a0000, 0x000c0000, 0x000e0000 (10,12,14 decimal) from an input image and writes the pixel value to an output image, i.e. , a 3D single pixel copy.

Syntax: Rect 2D
region (ca = rect2D(data_list, num_shapes)) statement(s)

Format of Data: {R1minX, R1minY, R1maxX, R1maxY, R2minX, etc. . . . } After this instruction, no register state should be assumed. Semantics: This instruction creates a series of 2D filed rectangular stencil regions based around specified origins. It is used to address an area in a 2D image. The number of stencils must be specified by the num_shapes parameter. Although each stencils origin is specified, it can still be translated using the Offset Accumulator. Example:

```
#define COLOR 26                                          // C/C++ Code
                    // Coordinate data held as 32 bit integers on host.
static INT32 data[] = {0x00050000, 0x00050000,                 // Top left
    0x000a0000, 0x000a0000};                            // Bottom right
crackle                                                // Crackle Code
{
    region (ca = rect2D(*data++,1))
    {
    pa = COLOR;
    is(op_id,op_conf) = pa;                        // Store (conditionally)
    }
}
```

This program creates a (5,5)..(10,10) 2D stencil region. The 2D region is then assigned to the Pixel Accumulator value, Handling of color attributes in the presently preferred embodiment, presents some difficulties. Unfortunately, whenever a copy is done without going through temporary store, unless extreme care is taken then it is possible (while in the process of copying to the destination) to overwrite a part of the source that has yet to be written across. This is particularly nasty with 2D rectangles which get moved around/scrolled all over the place in X-windows or similar systems and the restriction of having to use a temporary image would be a major hit on speed of execution. One way around this is to have a variety of stencils that process the various shapes in different directions, thus ensuring that read always keep ahead of writes thus avoiding the above problem. This is, perhaps, excessive, as certainly scrolling within triangles is unlikely, and moving triangles around the screen is also unlikely, but not impossible. Note that when rendering polygonal models the case does not crop up as the image is redrawn from basics anyway. It is possible when moving (say) a triangle around that if the whole background in the relevant region is the same color the desired result can be achieved by copying a bounding box. Thus if stencils are provided that calculate relative movement tables in any direction for rectangles and rectangles alone, there is some possibility of handling other shapes. As a last resort remember that a temporary image can always be used. Thus rather than the simple "rect2D" syntax, "rect2Dur", "rect2Dul", "rect2Ddl", and "rect2Ddr" are provided, where the letters after the "rect2D" stand for up, down, left, and right on the screen, where these are the direction that the "scanning" of the rectangle is done (Note that up and down here are not related to the values of x and y on the screen, as y goes down the further up the screen you go). The simple "rect2D" will still be provided which could permit the user to either work out the correct version to use, or use the "conventional" version (now "rect2Ddr"). All other syntax etc. is exactly as per the description given at the head of this section. Note that the above does NOT apply to 3D rectangles etc.

Syntax: Rect 3D
region (ca = rect3D(data_list, num_shapes)) statement(s)

Format of Data: {R1minX, R1minY, R1minZ, R1maxX, R1maxY, R1maxZ, R2minX, etc. . . . }. After this instruction, no register state should be assumed. Semantics: This instruction creates a series of 3D filled block stencil regions based around specified origins. It is used to address a block in a 3D image. The number of stencils must be specified by the num_shapes parameter. Although stencils are always based on their own origins, they can be displaced by use of the Offset Accumulator. Example:

```
#define COLOR 26                                          // C/C++ Code
                    // Coordinate data held as 32 bit integers on host.
static INT32 data[] = {
    0x00050000, 0x00050000, 0x0005000,                     // Top left near
    0x000a0000, 0x000a0000, 0x000a0000 };               // Bottom right far
crackle                                                // Crackle Code
{
    region (ca = rect3D(*data++,1))
    {
        pa = COLOR                                              // Load.
        is(op_id,op_conf) = pa;                        // Store (conditionally)
    }
}
```

This program creates a (5,5,5) . . . (10,10,10) 2D stencil region. The 3D region is then assigned to the Pixel Accumulator value, COLOR.

Syntax: Line 1D
region (ca = line1D(data_list, num_shapes)) statement(s)

Format of data: {L1x1, L1x2, L2x1, L2x2, etc. . . . } After this instruction, no register state should be assumed. Semantics: This instruction creates a series of 1D line stencil regions based around specified origins. It is used to address a contiguous block in a 1D image (eg. a LUT). The number of stencils must be specified by the num_shapes parameter. Although stencils are always based on their own origins, they can be displaced by use of the Offset Accumulator. Note that the start and end points are inclusive. Example:

```
#define COLOR 26                                          // C/C++ Code
                    // Coordinate data held as 32 bit integers on host.
static INT32 data[] = {0x00030000, 0x0008000};
                                                           // From 3 to 8
crackle                                                // Crackle Code
{
    region (ca = line1D(*data++,1))
    {
        pa = COLOR;
        is(op_id,op_conf) = pa;                        // Store (conditionally)
    }
}
```

This program creates a 1D Stencil Region in the range 3.. . 8. Each pixel in the region is then set to the Pixel Accumulator's value (COLOR). The program performs a 6 element pixel assignment in 1D {3,4,5,6,7,8}.

| | Line 2D |
|---|---|
| Syntax: | region (ca = line2D(data_list, num_shapes)) statement(s) |

Format of data: L1x1, L1y1, L1x2, L1y2, L2x1, L2y1, etc. . . . } After this instruction, no register state should be assumed. Semantics: This instruction creates a series of 2D line stencil regions based around specified origins. It is used to address a 2D image. The number of stencils must be specified by the num_shapes parameter. Although stencils are always based on their own origins, they can be displaced by use of the Offset Accumulator. Note that the start and end points are inclusive. Example:

```
#define COLOR 26                                      // C/C++ Code
                       // Coordinate data held as 32 bit integers on host.
static INT32 data[] = {0x00030000, 0x0003000,         // From 3,3...
    0x00080000, 0x0008000};                           // to 8,8
crackle                                               // Crackle Code
{
    region (ca = line2D(*data++,1))
    {
        pa = COLOR;
        is(op_id,op_conf) = pa;                       // Store (conditionally)
    }
}
```

This program creates a 2D Stencil Region in the range (3,3) to (8,8).

Each pixel in the region is then set to the Pixel Accumulator's value (COLOR). The program performs a 36 element pixel assignment in 2D.

| | Line 3D |
|---|---|
| Syntax: | region (ca = line3D(data_list, num_shapes)) statement(s) |

Format of data: {L1x1, L1y1, L1z1, L1x2, L1y2, L1z2, L2x1, L2y1, etc.) After this instruction, no register state should be assumed. Semantics: This instruction creates a series of 3D line stencil regions based on specified origins. It is used to address a 3D image. The number of stencil must be specified by the num_shapes parameter. Although stencils are always based on their own origins they can be displaced by use of the Offset Accumulator. Note that the start and end points are inclusive. Example:

```
#define COLOR 26                                      // C/C++ Code
                       // Coordinate data held as 32 bit integers on host.
static INT32
data[] = {
    0x00030000, 0x0003000, 0x0003000,                 // From 3,3,3...
    0x0008000, 0x00080000, 0x0008000 ):               // to 8,8,8
crackle                                               // Crackle Code
{
    region (ca = line30(*data++,1))
    {
        pa = COLOR;
        is(op_id,op_conf) = pa:                       // Store (conditionally)
    }
}
```

This program creates a 3,3,3 . . . 8,8,8 3D Stencil Region. Each pixel in the region is then set to the Pixel Accumulator's value (COLOR). The program performs a 216 element pixel assignment in 3D.

| | Triangle 2D |
|---|---|
| Syntax: | region (ca = triangle2D(data_list, num_shapes)) statement(s) |

Format of data: {T1x1, T1y1, T1x2, T1y2, T1x3, T1y3, T2x1, T2y1, T2x2, . . . } After this instruction, no register state should be assumed. Semantics: This instruction creates a series of 2D filled triangular stencil regions based on specified origins. The first triangular stencil is with the coordinates d0, d1, d2 and the second is with the coordinates d1, d2, d3, etc. It is used to address an area in a 2D image. The number of stencils must be specified by the num_shapes parameter. Although stencils are always based on their origins, they can be displaced by use of the Offset Accumulator. Example:

```
#define COLOR 26                                      // C/C++ Code
                       // Coordinate data held as 32 bit integers on host.
static INT32 data[] = ( 0x000a0000, 0x001c0000,       // d0
    0x002d0000, 0x004c0000,                           // d1
    0x001f0000, 0x000d0000,                           // d2
    0x00220000, 0x00ff0000,                           // d3
    0x00ea0000, 0x00cd0000 );                         // d4
crackle                                               // Crackle Code
{
    region (ca = triangle2D(*data++,3))
    {
        pa = COLOR;
        is(op_id,op_conf) = pa;                       // Store (conditionally)
    }
}
```

This program draws three tessellated triangles in COLOR. The coordinate of the triangles are (d0, d1, d2), (d1, d2, d3) & (d2,d3,d4).

| | Cubic Spline 2D |
|---|---|
| Syntax: | region (ca = spline2D(data_list, num_shapes)) statement(s) |

Format of data: {d0X, d0Y, d1X, d1Y, d2X, d2Y, d3X, d3Y, d4X, d4Y, d5X, d5Y, . . . } After this instruction no register state should be assumed. The number of control points provided must be a multiple of four as each spline requires four control points (each control point has two coordinates). Semantics: This instruction creates a series of 2D spline stencil regions based on specified origins. Each curve is described using four parameters so the first spline stencil is computed using the control points d0, d1, d2, d3 and the second by d4, d5, d6, d7 and so on. It is used to address an area in a 2D image. The number of stencils must be specified by the num_shapes parameter. Although stencils are always based on their origins, they can be displaced by use of the Offset Accumulator. Problem: How do we specify the type of curve to be addressed? (Hermite, b-spline, etc). The type of curve is described using some matrix. One approach would be to make the include a pointer to the matrix (as opposed to provided a fixed set) as part of the operands to the instruction. This is however inconsistent with other instructions and causes problems for Pixel C. Example

```
#define COLOR 26                                      // C/C++ Code
                       // Coordinate data held as 32 bit integers on host.
static INT32 data[] = {
    0x000a0000, 0x001c0000,                           // d0
```

```
    0x002d0000, 0x004c0000,                    // d1
    0x001f0000, 0x000d0000,                    // d2
    0x00220000, 0x00ff0000,                    // d3
};
crackle                                        // Crackle Code
{
    region (ca = spline2D(*data++,1))
    {
        pa = COLOR;
        is(op_id,op_conf) = pa;                // Store (conditionally)
    }
}
```

This program draws a single spline in COLOR. The control points for the spline are (d0, d1, d2, d3).

Cubic Spline 3D
Syntax:
    region (ca = spline30(data_list, num_shapes)) statement(s)

Format of data: {d0X, d0Y, d0Z, d1X, d1Y, d1Z, d2X, d2Y, d2Z, d3X, d3Y, d3Z, d4x, . . . } Each spline needs four control points and thus this much data must be supplied (each control point needs three coordinates).

Conic 2D
Syntax:
    region (ca = conic2D(data_list, num_shapes)) statement(s)

Format of data: {A1, B1, C1, D1, E1, F1, A2, B2, C2, D2, E2, F2, . . . } This instruction creates a series of Filed 2D conic stencil regions based around specified origins. The region is specified by the calculation:

$$Ax^2 + By^2 + Cyx + Dx + Ey + F > 0.$$

The conic stencil is computed using blocks of six parameters from the data array. The stencil addresses an area in a 2D image. The number of stencils must be specified by the num_shapes parameter. Although stencils are always based on the origin they can be displaced by use of the Offset Accumulator. Example:

```
#define COLOR 26                               // C/C++ Code
                // Coordinate data held as 32 bit integers on host.
static INT32 circle [] = {
    0x00400000,                                // A = 64 (8^2)
    0x00400000,                                // B = 64 (8^2)
    0x00000000,                                // C = 0
    0x00000000,                                // D = 0
    0x00000000,                                // E = 0
    0x00000000};                               // F = 0
crackle                                        // Crackle Code
{
    region (ca = conic2D(*circle++,1))
    {
        pa = COLOR;
        is(op_id,op_conf) = pa;                // Store (conditionally)
    }
}
```

This program draws a single filled circle in value COLOR. The circle has a radius of 8.

Conic 2D Outline
Syntax:
    region (ca = conic2Dout(data_list, num_shapes)) statement(s)

This shape primitive has identical parameters and attributes to Conic2D except the stencil region is a single pixel outline of the described shape.

Conic 3D
Syntax:
    region (ca = conic3D(data_list, num_shapes)) statement(s)

Format of data: {A1, B1, C1, D1, E1, F1, G1, H1, I1, J1, A2, . . . } Function: This instruction creates a series of filled 2D conic stencil regions based around specified origins. The region is specified by the calculation:

$$Ax^2 + By^2 + Cz^2 + Dxy + Exz + Fyz + Gx + Hy + Iz + J > 0.$$

The conic stencil is computed using blocks of ten parameters from the data array. The stencil addresses an area in a 3D image. The number of stencils must be specified by the num parameter. Although stencils are always based on the origin, they can be displaced by use of the Offset Accumulator. Example:

```
#define COLOR 26                               // C/C++ Code
                // Coordinate data held as 32 bit integers on host.
static INT32 sphere[] = {
    0x00400000,                                // A = 64 (8^2)
    0x00400000,                                // B = 64 (8^2)
    0x00400000,                                // C = 64 (8^2)
    0x00000000,                                // D = 0
    0x00000000,                                // E = 0
    0x00000000,                                // F = 0
    0x00000000                                 // G = 0
    0x00000000                                 // H = 0
    0x00000000                                 // I = 0
    0x00000000 };                              // J = 0
crackle                                        // Crackle Code
{
    region (ca = conic3D(*sphere++,1))
    {
        pa = COLOR;
        is(op_id,op_conf) = pa;                // Store (conditionally)
    }
}
```

This program draws a single Filled sphere in value COLOR. The circle has a radius of 8.

Conic 3D Outline
Syntax:
    region (ca = conic3Dout(data_list, num_shapes)) statement(s)

This shape primitive has identical parameters and attributes to Conic3D except the stencil region is a single outline of the 3D conic shape.

Stride 1D
Syntax:
    region (ca = stride1D(data, num)) statement

Where: data=COORD*, Pointer to shape describing parameters; num=INT, Number of vectors. Data Format: {L1x1, L1x2, L1stride, L2x1, L2x2, L2stride, etc. . . . } Function:

This instruction is basically identical to Line 1D except that a stepping size can be incorporated. This variable is known as the stride. This instruction creates a series of 1D line stencil regions based around specified origins. It is used to address a contiguous block in a 1D image (eg. a LUT). The number of stencils must be specified by the num parameter. Although stencils are always based on their own origins, they can be displaced by use of the Offset Accumulator. Note that the start and end points are inclusive. An "every other" element mechanism is provided by setting the stride value to 2. Example:

```
#define COLOR 26                          // C/C++ Code
                  // Coordinate data held as 32 bit integers on host.
static INT32 data[] = {
    0x00030000,                           // From 3...
    0x00080000,                           // to 8
    0x00020000};                          // in strides of 2.
crackle
                                          // Crackle Code
{
    pa = COLOR;
    region (ca = stride1D(data,1))
    is(op_id,op_conf) = pa;               // Store (conditionally)
}
```

This program creates a 3 . . . 8 1D Stencil Region with a stride of 2. Each pixel in the region is then set to the Pixel Accumulator's value (COLOR). The program performs a 3 element pixel assignment in 1D {3,5,7}.

Fill Area Set 2D

Fill-Area-Set gives a very powerful stencil generation mechanism. It allows a path to be described using a series of polygons which are then filled using one of two algorithms. If the two Fill Area Set primitives were extended to allow combinations of polygon and spline paths, an imaging model similar to that of Adobe PostScript could be provided. See THE POSTSCRIPT LANGUAGE REFERENCE MANUAL from Adobe Systems Inc., which is hereby incorporated by reference.

Odd-Even Fill Area Set 2D

Syntax:
    region (ca = oa_FAS2D(data_list, num_shapes)) statement(s)
Format of data:
    { N1, S1,1, S1y1, S1x2, S1y2, ...           // 1st FAS
      N2, S2x1, S2y1, S2x2, S2y2, ...           // 2nd FAS ... etc }
                  // Nx contains the number of line segments
    // in each FAS. SNm specifies coordinate data for segments of FAS.

This is a Fill Area-Set instruction using the Odd-Even rule (See shape descriptions). Parameters are clustered in blocks of coordinates which specify line segments constructing the shape.

Non-Zero Winding Fill Area Set 2D

Syntax:
    region (ca = zwind_FAS2D(data_list, num_shapes)) statement(s)
Format of Data:
    { N1, S1,1, S1y1, S1x2, S1y2, ...           // 1st FAS
      N2, S2x1, S2y1, S2x2, S2y2, ...           // 2nd FAS ... etc }
                  // Nx contains the number of line segments
    // in each FAS. SNm specifies coordinate data for segments of FAS.

A Fill-Area-Set instruction using the Non-zero winding rule (See shape descriptions). Parameters are clustered in blocks of coordinates which specify line segments constructing the shape. Example:

Raster 2D

Syntax:
    region (ca = raster2D(data, num)) statement

Where: data=COORD*, Pointer to shape describing parameters {R1minX, R1minY, R1maxX, R1maxY, R2minX, etc. . . . }; num=INT, Number of rectangles. Function: This instruction creates a series of 2D filled rectangular stencil regions based around specified origins. It is used to address an area in a 2D image. The number of stencils must be specified by the num parameter. Although each stencils origin is specified, it can still be translated using the Offset Accumulator. The difference between Raster2D and Rect2D is that the Raster stencil does not utilize the full parallelism of the SIMD array. Only the bottom row of processors are utilized and the image is scanned as a reverse raster display (bottom-left to top-right). This gives better immunity to processor topology and provides a relatively simple ordering mechanism of sending data to and from the host. Refer to Host Load and Host Save.

AA Triangle 2D

Syntax:
    region (ca = AAtriangle2D(data_list,num_shapes))statement(s)

Format of data: {T1x1, T1y1, T1x2, T1y2, T1x3, T1y3, T2x1, T2y1, T2x2, . . . }=d0. This instruction creates a series of 2D filled triangular stencil regions based on specified origins. The first triangular stencil is with the coordinates d0, d1, d2 and the second is with the coordinates d1, d2, d3, etc. It is used to address an area in a 2D image. The number of stencils must be specified by the num_shapes parameter. Although stencils are always based on their origins, they can be displaced by use of the Offset Accumulator. The difference between this and the ordinary 2D triangle is that as well as generating a Region Mask, a value between 0 and 1 is left in the Pixel Accumulator to indicate either how close to the line the pixel is or how much of the pixel is covered. The fine details of this have yet to be decided.

AA Line 1D

Syntax:
    region (ca = AAline1D(data_list, num_shapes)) statement(s)

Format of data: {L1x1, L1x2, L2x1, L2x2, etc. . . . } This instruction creates a series of 1D line stencil regions based around specified origins. It is used to address a contiguous block in a 1D image (eg. a LUT). The number of stencils must be specified by the num_shapes parameter. Although stencils are always based on their own origins, they can be displaced by use of the Offset Accumulator. Note that the start and end points are inclusive. The difference between this and the ordinary 1D line is that this leaves a value between zero and one in the Pixel Accumulator to indicate either how close to the line the pixel is or how much of the pixel is covered. The fine details of this have yet to be decided.

---
AA Line 2D
Syntax:
    region (ca = AAline2D(data_list, num_shapes)) statement(s)
---

Format of data: {L1x1, L1y1, L1x2, L1y2, L2x1, L2y1, etc. . . . } This instruction creates a series of 2D line stencil regions based around specified origins. It is used to address a 2D image. The number of stencils must be specified by the num_shapes parameter. Although stencils are always based on their own origins, they can be displaced by use of the Offset Accumulator. Note that the start and end points are inclusive. Tie difference between this and the ordinary 2D line is that this leaves a value between zero and one in the Pixel Accumulator to indicate how close to the edge of the line the pixel in question is.

---
AA Line 3D
Syntax:
    region (ca = AAline3D(data_list, num_shapes)) statement(s)
---

Format of data: {L1x1, L1y1, L1z1, L1x2, L1y2, L1z2, L2x1, L2y1, etc.} This instruction creates a series of 3D line stencil regions based on specified origins. It is used to address a 3D image. The number of stencils must be specified by the num_shapes parameter. Although stencils are always based on their own origins, they can be displaced by use of the Offset Accumulator. Note that the start and end points are inclusive. The difference between this and the ordinary 3D line is that this leaves a value between zero and one in the Pixel Accumulator to indicate how close to the edge of the line the pixel in question is.

Stencil & Translator "Continue"

A mechanism is provided of ignoring a instructions in a stencil loop based on the state of the Condition Accumulator. This gives a mechanism similar to the "continue" statement which can be used in loops such as WHILE in the "C" programming language. Crackle inherits the word continue and takes on the following syntax.

ca ? continue.

The continue statement automatically consumes any transient data which might have normally been utilized.

Clippers

A Clipper is class of instruction which allows the Condition Accumulator to be modified by a test on the present stencil region position and another described shape. They allow a logical combinations of stencils with additional shapes. The clipper can optionally be NOTTed to provide an even larger range of areas. All Clippers are of the form:

ca LogicOp=[~]shape(data_list, num_shapes)

ca=[~]shape(data_list, num_shapes)

Where: shape, data_list, and num_shapes have exactly the same meanings as described in the section describing Stencils. The shapes that can be used are exactly the same as those described in the section on Stencils. The data_list and num_shapes parameters are used in exactly the same way as they are there also. The generic shape facility exists too. It can thus be seen that there is a great similarity between stencils and clippers, and so rather than give a full description for each of them in turn, a few examples are given, and it is hoped that the reader can infer the necessary details for any particular shape. There are some differences between stencils and clippers, and while they are small they are significant. Firstly, whereas a stencil must not be placed within another stencil, a clipper can only exist within a clipper. Clippers can be nested, whereas stencils cannot. The state of all registers is maintained on exit from the Clipper (i.e., once the associated statements (clipper block) have been executed. The coordinates used when clipping are relative to the same base as that used for the enclosing stencil, rather than relative to the start of that stencil.

Clipper Examples

Conic 2D & Triangle 2D

Code Sample

---
```
crackle
{
    region (ca = conic2D(*rdata++,1))
    {
        pa = 123;
        ca &= triangle2D(*tdata++,1);
        is(op_id,op_conf) = pa;
    }
}
```
---

Note here that "ca=triangle2D(------)" would have the same effect as it is only the area inside the circle that is of interest anyway.

Rect 2D & ~Triangle 2D

Code Sample

---
```
crackle
{
    region (ca = rect2D(*rdata++,1))
    {
        pa = 123;
        ca &= ~triangle2D(*tdata++,2);
        is(op_id,op_conf) = pa;
    }
}
```
---

Bounding Stencils & Clippers

Code Sample

---
```
crackle
{
    region (ca = rect2D(*bound++,1))
    {
        pa = 123;
        ca=FALSE;
        ca |= triangle2D(*clip1++,2);
        ca |= conic2D(*clip2++,1);
        is(op_id,op_conf) = pa;
    }
}
```
---

Other Operations on the Condition Registers

The processing of the Condition Accumulator is implicit when using Pixel Register operations. The following instructions are provided to allow the programmer to directly manipulate the Condition Registers.

```
        Move
Syntax:
     ca = c[ConstCExpre]c[ConstCExpr] = ca
```

This instruction makes no sense outside a stencil and may well be made illegal there. Semantics: Moves an Aux Condition Register to the Condition Accumulator and vice-versa.

```
crackle
{
     region ( ca = rect2D( *data++, 100 ))
     {
          ca = c[5];
     }
}
          Monadic
Syntax:
     ca = ( ~ca | bool | [~]c[ConstCExpr])
```

Where: ConstCExpr=Aux Pixel Register numbers; bool= INT, zero or non-zero value (TRUE or FALSE). This instruction makes no sense outside a stencil and may well be made illegal there. Semantics: Monadic logical operation on the Condition Registers. The operations are SET and NOT. Example:

```
crackle
{
     region ( ca = rect2D( *data++, 100 ))
     {
          ca = ~c[5];
     }
}
          Diadic
Syntax:
     ca EqLogicOp c[ConstCExpr];
```

Where: ConstCExpr=an Aux Condition Register EqLogicOp=*=*,*|=*,*&=*,*^=*. Constraints: This instruction makes no sense outside a stencil and may will be made illegal there. Semantics: This function allows any bitwise logical operation between the Condition Accumulator and an Aux Condition register. Example:

```
crackle
{
     region ( ca = rect2D( *data++, 100 ))
     {
          ca &= c[5];
     }
}
          Compare
Syntax:
     ca EqLogicOp (pa RelOp CExpr) ca EqLogicOp (pa RelOp p[ConstCExpr])
```

Where: ConstCEXpr=INT, an Aux Pixel Register number. This instruction makes no sense outside a stencil and may well be made illegal there. Semantics: Compares the Pixel Accumulator and an Aux Pixel Register, optionally combined with a logical operation with the original value of the Condition Accumulator. Example:

```
crackle
{
     region ( ca = rect2D( *data++, 100 ))
     {
          ca &= ( pa < 5 );
     }
}
```

Offset Register Operations

This section describes all operations on the Offset Registers.

Offset Operations

All accesses to the frame store go via the Offset Accumulator. The Offset Registers can work in 1D, 2D and 3D mode. When inside a stencil loop the Offset Accumulator is implicitly in 1D, 2D or 3D mode. Where the addressing mode required for an operation is a different type to the stencil loop (e.g., sectioning a plane out of a 3D image, see the Read IS(Indirect) example program), the type of the Offset Register must be changed. Offset Registers are set implicitly by writing one, two or three parameters to the register.

```
          Set
Syntax:
     oa = (x {,y [,z]})
     o[N] = oa,
     oa = (x [,y {,z}])
```

Where:

N=INT, an Aux Offset Register.

x,y,z=INT (Fixed point offsets).

Function: This instruction sets the OA register to an explicit 1D, 2D or 3D address. The original contents of the register are optionally moved to an Aux Offset Register. This allows an access to memory to be offset by an arbitrary value.

```
          Translate
Syntax:
     oa = (x[,y[,z]]) + oa
     oa = oa + (x[,y[,z]])
```

-continued

```
     o[N] = oa,
     oa = (x[,y[,z]]) + oa
     o[N] = oa, oa = oa + (x[,y[,z]])
```

Where: x,y,z=INT, Fixed point offsets; N=INT, An Aux Offset Register. Function: This instruction translates the OA register. The original contents of the register are optionally moved to one of the other Offset Registers. This allows an access to memory to be offset by an arbitrary value. Example:

```
                                                    // C/C++ Code
              // Coordinate data held as 32 bit integers on host.
static INT32 data = {
    0x00000000,0x00000000,0x00140000,0x00140000);   // 0x14 = 20
crackle                                             // Crackle Code
{
    oa = (0,0);
    region(ca = rect2D(data,1))
    {
        pa = is(ip_id,ip_conf);                     // Read IS
        oa = oa + (50,50);                          // Translate destination
        is(op_id,op_conf) = pa;                     // Write Cond, on ca
        oa = oa + (-50,-50);                        // Reset origin
    }
}
```

This program copies the bottom left 20 by 20 corner of one image to the middle (50,50 origin) of another image.

```
    Move
Syntax:
    oa = o[n]
    o[n] = oa
```

Where: N=INT, An Aux Offset Register. Function: Copies an Aux Offset Register to the Offset Accumulator or visa-versa.

Translators

All Stencils have serial counterparts called Translators. This suite of instructions drives the Offset Accumulator through a shape relative to the original value of the Offset Accumulator. The origin of the shape is specified in the instructions parameters. The original value of the Offset Register is restored on completion of the operation. These loops are particularly useful as they can be nested where as Stencils cannot. Hence any operation which requires the concept of nested Stencils must be constructed using a Stencil on the outer loop and a Translator on the inner. All Translators are of the form:

region (*oa*=shape(data_list, num_shapes)) statement(s)

Where:
   shape=Shape primitive name (exactly as for stencils and clippers).
   data_list=As described above;
   num_shapes=as described above; and
   statement(s) is one or more Instruction(s) (enclosed in braces) to be performed where the region is valid.

The shapes that can be used are exactly the same as those described in the section on Stencils. The data_list and num_shapes parameters are used in exactly the same way as they are there also. The possibility for using generic shapes exists too. It can thus be seen that there is a great similarity between stencils and translators, and so rather than give a full description for each of them in turn, a few examples are given, and it is hoped that the reader can infer the necessary details for any particular shape. There are some differences between stencils and translators and while they are small they are significant. Firstly, whereas a stencil must not be placed within another stencil, a translator can only exist within a stencil. Translators can be nested, whereas stencils cannot. The state of all registers (except the Offset Accumulator) is maintained on exit from the Translator (i.e., once the associated statements (translator block) have been executed. It is quite legitimate to clip within translators; however they are still relative to the same base address as the stencil. What happens when a clip occurs is that the current address is compared against the bounds of the clipper. When the clipper is within a translator then for each pixel within a stencil several different addresses occur (as the various offsets of the translator are applied) and each of these is clipped in turn. Example:

```
                                                    // C/C++ Code
              // Coordinate data held as 32 bit integers on host.
static UINT32 area[ ] = {
    0x00000000,0x00000000,0x000a0000,0x000a0000},
                                        // 10 x 10; (0,0) to (10,10)
kernel[ ] = {
    0xffff0000,0xffff0000,0x00010000,0x00010000};
                                        // 3 x 3; (-1,-1) to (1,1)
crackle                                             // Crackle Code
{
    region(ca = rect2D(*area++,1))
    {
        pa = 9; p[2] = pa;                          // Used to divide by 9
        pa = 0; p[0] = pa;                          // Initialize p[0] to 0
        region(oa = rect2D(*kernel++,1))            // Drive through area
        {
            pa = is(ip_id,ip_conf);                 // Read image
            pa /= p[2];                             // Take 1/9 of each pixel under kernel
            pa += p[0];p[0] = pa;                   // Sum the data
        is(op_id,op_conf) = pa;                     // Cond* on ca
        }
    }
}
```

This program performs a convolution on an image using a 3×3 kernel containing values of ⅑.[2] This algorithm performs a simple smoothing of the input image.

[2]That is, new(x,y)+=old(x+i,y+j)*⅑, where (x,y) are values over the image and (i,j) are values over the convolution kernel.

Pixel Register Operations

This chapter describes all operations on the Pixel Accumulator ("pa") and the Pixel Registers (the "PREGs"). Currently, any instruction involving the Pixel Accumulator as the destination has two forms; one conditional and one unconditional. The intention is to achieve a simple set of primitives that still permit all the functionality of a more complicated instruction set. While it is realized that sometimes this will mean juggling data between registers and not always achieving optimum efficiency, it is believed that the set below will permit all functionality to be achieved, and give the equivalent of conditional flow through the Crackle code. Consider the following examples: Rather than have a complicated instruction that outputs the value in one pixel register if the condition in the Condition Accumulator is true and the value in another PREG if it is fake, this is expanded to several instructions; the first outputs the value in the first PREG if the ca holds the value true, the ca is then NOTTED, and then the value in the second PREG is conditionally output. The ca can be NOTTED again to restore the original state if this is so desired. Rather than have an instruction to conditionally load a PREG with what is in the Pixel Accumulator, the same effect can be achieved by writing the pa to a spare PREG, loading the pa with the value in the destination PREG, conditionally writing the spare PREG back to the pixel accumulator, and then writing the pa (unconditionally) to the target register. All rather long minded, but it does work. On the assumption that similar tricks can be done in all situations, this means that there is no need for "if . . . then . . . else . . . " statements within Crackle that enclosed several instructions within each clause-the same effect can be achieved by doing each individual instruction conditionally. This will probably become clearer once the instruction set has been studied and a few examples have been tried. Note that the use of such manipulation in no way prohibits the possibility of bringing in other instructions later to achieve the same effects in a far more straightforward way; a conditional load to the PREG's is not at all difficult to implement. Conditional instructions have exactly the same form as the non-conditional versions except that they commence with "?" or "ca ?". Thus "pa= p[5]" becomes "? pa=p[5]" or "ca ? pa=p[5]".

Image Store Addressing

This section contains all operation concerned with the loading and storing of the pixel registers from the main image store. The main image store is configured as a 216 virtual images. The value to specify which virtual image is call the image ID. Each virtual image has a 32 bit address range. They can be 1D, 2D or 3D. It is important that they are addressed by the correct address type. The address type is normally specified by the stencil loop used. The Read and Write instructions are available in various addressing modes being:

Direct-The Pixel Accumulator is loaded with the pixel at the current address. This is determined by any governing stencils and the value of the Offset Accumulator;

Indirect-The Pixel Accumulator is loaded with a pixel whose address is stored in either the Pixel Accumulator;

Broadcast (Read IS only)-All processors Pixel Accumulators are loaded with a single pixel which is referenced by the present current address, as described above.

```
             Read IS
             Direct Addresing
Syntax:
    pa = is(id,conf)                    // unconditional
    [ca] ? pa = is(id,conf)             // conditional
```

Where:

conf=INT, input conformance word (see Gripor spec, supra)

id=INT, id of the image.

Constraints: This instruction makes no sense outside a stencil and may well be made illegal there.

Semantics: This instruction reads data from the image store by simply loading a pixel value into the Pixel Accumulator. The addressing pattern for the access is implied by any governing stencil loop and the Offset Accumulator. The input conformance word specifies the width and the sign extension required for the pixel read. There will be macros available for standard conformance values. If the latter case is used then the write to pa is conditional. Example:

```
crackle
                                                // Crackle Code
{
    region(ca = rect2D(*rdata++,1))
    {
        c[0] = ca;                              // Stash stencil mask
        pa = is(ip_id,ip_conf);                 // Read image
        ca = (pa < 0);                          // Works on value of pa
        ca ? pa = -pa;                          // Take absolute value
        ca = c[0];                              // Get original mask
        is(op_id,op_conf) = pa;                 // Write image
    }
}
```

This program takes the absolute value of any negative value pixels in the rectangular region specified by rdata.

```
             Indirect Addressing
Syntax:
    pa = is(id,conf)[pa]                // unconditional
    [ca] ? pa = is(id,conf)[pa]         // conditional
```

Where:

id=INT, The id of the image.

conf=INT, The input conformance word.

Constraints: This instruction makes no sense outside a stencil and may well be made illegal there. Semantics: This form of the Read IS instruction gives indirect addressing to the image store. First the data in the indexing Pixel Accumulator must be converted to the correct addressing type to access the image. This form is a 1D, 2D or 3D packed address. The Offset Accumulator must also be set to the correct type. This instruction then places the contents of the specified Pixel Register at those addresses. Example:

```
crackle                                         // Crackle Code
{
    region(ca = rect2D(*RectData++,1))
    {
        pa = lin(0,13,45);                      // X address cal
        p[1] = pa
        pa = lin(0,61,45);                      // Y address cal
        p[0] = pa
        pa = lin(0,35,71);                      // Z address cal
        conv (INT)(p[0],p[1],pa) to (PACK)pa;
                                                // convert to packed 3D
        pa = is(ip_id,ip_conf)[pa];             // read section
        is(op_id,op_conf) = pa                  // output 2D result
        pa = p[0];
    }
}
```

The above program carries out a section on a 3D image. The addresses of the required pixels are calculated using three linear equations. These equations are then used to address a 3D image. The result is stored in a 2D image. As a Crackle programmer will not be using packed address types most of the time, macros can be set up to extend the syntax of the language so that a conversion function is automatically called.

```
             Broadcast Addressing
Syntax:
    pa = is(id,conf)[oa]                // unconditional
    [ca] ? pa = is(id,conf)[oa]         // conditional
```

Where:

conf=INT, The input conformance word id=INT, The id of the image.

This instruction makes no sense outside a stencil and may well be made illegal there. This instruction reads a single pixel data from the image store. (The single value is loaded into the PA's of all Gripors) The address of the single pixel is the current contents of the OA register (i.e., without the address specified by the Stencil added in as per normal). The input conformance word specifies the width and the sign extension required for the pixel read. Example:

```
crackle
{
    region(ca = rect2D(*AreaData++,1))
    {
```

```
        pa = 0;
        region(oa = rect2D(*KernelData++,1))
        {
            p[0] = pa
            pa = is(ip__id,ip__conf);
            p[1] = pa
            pa = is(ke__id,ke__conf)[oa];
            pa += p[1];
            pa += p[0];
        }
        is(op__id,op__conf) = pa
        pa = p[0];
        }
}
```

This program uses Read IS in both Direct and Indirect addressing modes to perform a convolution.

Write IS

```
        Direct Addressing
Syntax:
        is(id,conf) = pa
```

Where: conf=INT, The input conformance word (see Gripor spec)id=INT, The id of the image. Constraints: This instruction makes no sense outside a stencil and may well be made illegal there. Semantics: This instruction moves the data in the pa register out to image store. Note that although it is not specified by the syntax that this instruction performs the write conditionally. It is possible that the normal two versions (conditional and unconditional) will be available soon.

```
        Indirect Addressing
Syntax:
        is(id,conf)[p[ConstCExpr]] = pa
```

Where: ConstCExpr=INT, an Aux Pixel Register number. id=INT, The id of the image. conf=INT, The input conformance word (see Gripor spec)Constraints: This instruction makes no sense outside a stencil and may well be made illegal there. Semantics: This form of the Write IS instruction gives indirect addressing to the image store. First the data in the indexing Pixel Register must be converted to the correct addressing type to access the image. The Offset Accumulator must also be set to the correct type. This instruction then places the contents of the Pixel Accumulator at those addresses.

PRAM Addressing

This section contains all operations concerned with the loading and storing of the data from PRAM. The Read and Write instructions are available in two addressing modes being: Direct; and Indirect. When copying data from PRAM to Image Store and vice versa, the code for the copy instructions automatically handles all dimensions of the data.

Read PRAM

```
        Direct Addressing
Syntax:
        pa = pram[offset]              // conformance may be needed
        [ca] ? pa = pram[offset]       // conformance may be needed
```

Where: offset=INT, Address offset from task PRAM base. Constraints: This instruction makes no sense outside a stencil and may well be made illegal there. Semantics: This instruction reads data from PRAM. Each processor reads data from its own PRAM, displaced by offset, and writes it into its own Pixel Accumulator.

```
        Indirect Addressing
Syntax:
        pa = pram[pa]                  // unconditional
        [ca] ? pa = pram[pa]           // conditional
```

Constraints: This instruction makes no sense outside a stencil and may well be made illegal there. Semantics: This form of the Read PRAM instruction gives indirect addressing to the image store. The data in the Pixel Accumulator (assumed to be of type integer) is used to index to pram. This instruction then places the data found at the specified address into the Pixel Accumulator.

Write PRAM

```
        Direct Addressing
Syntax:
        pram[offset] = pa
```

Where: offset=INT, Address offset based on PRAM base. Constraints: This instruction makes no sense outside a stencil and may well be made illegal there. Semantics: This instruction moves the data in the pa register out to a specified area in PRAM.

Indirect Addressing

Syntax pram[p[ConstCExpr]]=pa

Where: ConstCExpr=INT, Aux Pixel Register number. offset=INT, Address offset based on PRAM base. Constraints: This instruction makes no sense outside a stencil and may well be made illegal there. Semantics: This form of the Write PRAM instruction gives indirect addressing to the PRAM. The data in the Pixel Register (which is assumed to be of type integer) is used to index the PRAM. The instruction then places the Pixel Accumulator value at this address.

PRAM and Image Store Interaction

```
        Set
Syntax:
        pram[addr,size] = CExpr
```

Where: addr=INT, Address offset based on PRAM base. size=INT, Number of elements to assign. CExpr=CExpr value to PRAM. Constraints: This instruction moves the data in the pa register out to a specified area in PRAM. Semantics: This instruction sets a block of PRAM to a single value. This is useful for setting a PRAM cache to an identity for an operation. For example, for cached additions, the value would be 0 but for a multiplications, it would be 1. Example:

```
crackle
{
    pram[100,200] = 15
            // Set a block of memory 200 long from 100 to the value 15.
}
        Replicate
Syntax:
        pram[addr,size] = is[id,isconf]
```

Where: addr=INT, Address offset based on PRAM base. size=INT, Number of elements to copy. isconf=INT, image conformance word (see Gripor spec)id=INT, The id of the image. Constraints: This only makes sense within a Stencil and may be made illegal outside. Note also that the stencil it is in must be either a 1D line or a 1D pixel to ensure that the dimensionality of source and destination match. Semantics: The instruction broadcasts a specified amount of data from image store to a specified region of the PRAM on all Gripors. The envisaged scenario is to have a linear array in the Image Store, and the value in each of these locations is sent to PRAM addresses in turn (broadcast so that all processors have the same value). However, caution should be exercised regarding mis-matches of dimensionality between PRAM and the Image Store. Example: See the example of a histogram with collate.
Collate

---

Add
Syntax:
    is[id,isconf] += pram[addr,size]

---

Where: isconf=INT, The input conformance word (see Gripor spec)id=INT, The id of the image. addr=INT, Address offset based on PRAM base. size=INT, Number of elements to copy. Constraints: This only makes sense within a Stencil and may be made illegal outside. Note also that the stencil it is in must be either a 1D line or a 1D pixel to ensure that the dimensionality of source and destination match. Semantics: Collates a specified area in each processor's PRAM into image store using an addition to bind the data together. i.e. PRAM location N for all processors is added together (along with data in Image Store) and written back to Image Store. As the addition progresses through PRAM so the destination moves through Image Store. This is a sort of inverse of duplicate and must tend to be used with a linear segment of Image Store. Example:

---

```
                                        // The Code below produces a histogram in I.S.
crackle
{
    region(ca = rect1D(0x00000000,0x00ff0000,1))
    {
        pa = 0;                         // Set histogram to zero
        is(id2,conf2) = pa;             // Set PRAM copy to zero
    }
    region(ca = rect1D(0x00000000,0x00ff0000,1))
    {
        pram[0.256] = is(id2,conf2);    // Count across rectangle
    }
    region(ca = rect2D(x1,y1,x2,y2,1))
    {
        pa = is(id1,conf1);
        p[0] = pa;                      // temp copy
        pa = pram[pa];                  // get count so far
        pa += 1;                        // inc. by 1
        pram[p(0)] = pa;                // store back
    }
    region(ca = line1D(0x00000000,0x00ff0000,1))  // Sum over Grid
    {
        is(id2,conf2) += pram[0.256];   // Histogram left
                                        // in image store
    }
}
```

AND
Syntax:
    is(id,isconf) &= pram[addr,size]

---

Where: isconf=INT, The input conformance word (see Gripor spec)id=INT, The id of the image. addr=INT, Address offset based on PRAM base. size=INT, Number of elements to copy. Constraints: This only makes sense within a Stencil and may be made illegal outside. Note also that the stencil it is in must be either a 1D line or a 1D pixel to ensure that the dimensionality of source and destination match. Semantics: Collates a specified area in each processor's PRAM into image store using an AND to bind the data together. i.e. , PRAM location N for all processors is ANDED together (along with data in Image Store) and written back to Image Store. As the AND progresses through PRAM so the destination moves through Image Store. This is a sort of inverse of duplicate and must tend to be used with a linear segment of Image Store.

---

OR
Syntax:
    is(id,isconf) |= pram[addr,size]

---

Where: isconf=INT, The input conformance word (see Gripor spec)id=INT, The id of the image. addr=INT, Address offset based on PRAM base. size=INT, Number of elements to copy. Constraints: This only makes sense within a Stencil and may be made illegal outside. Note also that the stencil it is in must be either a 1D line or a 1D pixel to ensure that the dimensionality of source and destination match. Semantics: Collates a specified area in each processor's PRAM into image store using an OR to bind the data together. i.e., PRAM location N for all processors is ORED together (along with data in Image Store) and written back to Image Store. As the OR progresses through PRAM so the destination moves through Image Store. This is a sort of inverse of duplicate and must tend to be used with a linear segment of Image Store. In a similar, the operation can be done with any of the "AssignOp" assignments (apart from an ordinary equals) replacing "|=" etc.

I/O Operations

The following section covers communications between the Renderer and the Host. The goal of this section is to provide a method of providing reasonable processor topology immunity while giving full transparency at a higher software layer, e.g. Pixel "C".

---

Down Load
    Conditional Down Load
Syntax:
    pa = PixData, ca = CondData

---

Where: PixData=INT*, a pointer to Pixel data in host memory. CondData=INT*, a pointer to Conditional data in host memory. Function: This instruction allows data to be transferred from Host memory to the Pixel Accumulator. It can only be run inside a stencil loop or an undefined result occurs. The only stencil that will probably be utilised with this instruction is Raster as it minimises processor topology problems. A routine running on the host will be required to order the data correctly for user consumption.

---

Pixel Down Load
Syntax:
    pa = [(cast)]PixData               // unconditional
    [ca] ? pa = [(cast)]PixData        // conditional

---

Where:

PixData=a pointer to Pixel data in host memory
cast=type, one of a restricted type set.
Constraints: This instruction makes no sense outside a stencil and may well be made illegal there. Semantics: This instruction allows data to be transferred from Host memory to the Pixel Accumulator. A routine running on the host will be required to order the data correctly for user consumption.

Condition Down Load
Syntax:
    ca = CondData               // unconditional
    [ca] ? ca = CondData      // conditional Where:
    CondData=a pointer to Conditional data in host memory or a condition (variable or literal). Constraints: This instruction makes no sense outside a stencil and may well be made illegal there. Semantics: This instruction allows data to be transferred from Host memory to the Conditional Accumulator. A routine running on the host will be required to order the data correctly for user consumption.

Host Save
Syntax:
    PixData = pa, CondData = ca

Where: PixData=INT*, a pointer to Pixel data in host memory. CondData=INT*, a pointer to Conditional data in host memory. Function: This instruction reads back the pa register into an array in the host along with condition information from the CA. It can only be run inside a stencil loop or an undefined result occurs. The only stencil that will probably be utilised with this instruction is Raster as it minuses processor topology problems. A routine running on the host will be required to order the data correctly for user consumption.

Pixel Save
Syntax:
    PixData = [(cast)]pa        // unconditional
    [ca] ? PixData = [(cast)]pa  // conditional Where: PixData=a pointer to Pixel data in host memory cast=type, one of a restricted type set. Constraints: This instruction makes no sense outside a stencil and may well be made illegal there. Semantics: This instruction allows data to be transferred from the Pixel Accumulator to Host Memory. Just how the data is ordered is undecided at the moment.

Condition Save
Syntax:
    CondData = ca          // unconditional
    [ca] ? CondData = ca    // conditional Where: CondData=a pointer to Conditional data in host memory. Constraints: This instruction makes no sense outside a stencil and may well be made illegal there. Semantics: This instruction allows data to be transferred from the Conditional Accumulator to a buffer on the Host. Just how the data will be ordered is undecided at present.

Linear Load

The Load Linear instruction solves a linear equation of the form:

$$result = df/dx * x + df/dy * y + f(0,0)$$

The instruction can only be used inside a stencil or translator loop. The origin for the equation is based on the shape primitive in use.

pa = lin(data_list)         // unconditional
    pa = lind(data_list)        // unconditional
    [ca] ? pa = lin(data_list)   // conditional
    [ca] ? pa = lind(data_list)  // conditional Where:
    data_list=as above. Format of data: {df/dx, df/dy, f0,0}. For the double precision version "lind," each attribute takes two INTSs. Constraints: This instruction makes no sense outside a stencil and may well be made illegal there. Semantics: Generates a linear equation using scope inherited from any governing stencil. and translator. The result is written to the Pixel Accumulator. The result is INT for single precision and 2*INT for double precision. Overflow of the result is ignored.

Moving Registers

This set of functions allows the movement of Pixel Registers.

Move
Syntax:
    pa = p[ConstCExpr]       // unconditional
    p[ConstCExpr] = pa       // unconditional
    [ca] ? pa = p[ConstCExpr]  // conditional Where: ConstCExpr=Aux Pixel Register number. Constraints: This instruction makes no sense outside a stencil and may well be made illegal there. Semantics: This instruction moves the value in the Pixel Accumulator to an Aux Pixel Register and vice-versa. The operation can be performed conditionally. Example:

```
crackle
{
    region(ca = rect2D(*data++, 100))
    {
        ' pa = p[7];            // set pa to p[7] if ca is set
    }
}
```

Set
Syntax:
    pa = CExpr             // unconditional
    [ca] ? pa = CExpr       // conditional This instruction makes no sense outside a stencil and may well be made illegal there. This instruction moves a value to the Pixel Accumulator, possibly conditionally.

Swap
Syntax:
    pa <=> p[ConstCExpr]      // unconditional
    [ca] ? pa <=> p[ConstCExpr] // conditional Where:
    ConstCExpr=INT, an Aux Pixel Register number.
This instruction swaps an Aux Pixel Register with the Pixel Accumulator. The action can be carried out conditionally. It will mainly be used to leave data in the correct registers to be manipulated by other instructions. Example:

```
crackle
{
    region(ca = rect2D(*data++, 50))
    {
```

```
        ca ? pa <=> p[8];                           // swap
    }
}
```

Monadic Arithmetic and Logical Operators

---

Negate
Syntax:
    pa = –pa                                             // unconditional
    [ca] ? pa = –pa                              // conditional

---

Where:
N=INT, an Aux Pixel Register number. Constraints: This instruction makes no sense outside a stencil and may will be made illegal there. Semantics: This instruction negates the Pixel Accumulator. This can be conditional on the Condition Accumulator. Example:

```
crackle
{
    region(ca = rect2D(*data++, 100))
    {
        ca ? pa = –pa;
    }
}
```

Sqrt (Square Root)
Syntax:
    pa = [(cast)]sqrt(pa)                    // unconditional
    [ca] ? pa = [(cast)]sqrt(pa)         // conditional

---

Where: cast=type, one of a restricted type set. Constraints: This instruction makes no sense outside a stencil and may well be made illegal there. Semantics: Replace the top Pixel Stack SuperWord with its square root. DYN_SEL selects the number of bits the 16 bit result is right shifted. The cast allows the dynamic range of the result to be specified. The result is sign extended.

---

Shift
Syntax:
    pa (>>=|<<=) (rot) p[ConstCExpr] [LogicOp mask]
    pa (>>=|<<=) ((arith|logic)) p[ConstCExpr]
    [ca] ? pa (>>=|<<=) (rot) p[ConstCExpr|LogicOp mask]
    [ca] ? pa (>>=|<<=) ((arith|logic)) p[ConstCExpr]

---

Where: ConstCExpr=INT, an Aux Pixel Register number; mask=INT, General purpose mask. This instruction carries out a data driven shift on the Pixel Accumulator. It is also possible to logically NOT the result as well. Only the bottom six bits of the input data (for the shift or rotate) are used. If the input data is not in the range –32 to +31 an unexpected result may be obtained. This is because –32 to +31 is the limit for rotates etc. on the hardware (in the Logical Unit).

Diadic Arithmetic and Logical Operators

---

Add
Syntax:
    pa += [(cast)]p[ConstCExpr)      // unconditional
    [ca] ? pa += [(cast)]p[ConstCExpr]  // conditional

---

Where:
cast=type, one of a restricted type set.
ConstCExpr=INT, an Aux Pixel Register used.
This instruction adds an Aux Pixel Register to the Pixel Accumulator. Although both casts must be unpacked fixed point, different dynamic ranges can be catered for. The carry for the operation can be put into the Condition Accumulator.

---

Subtract
Syntax:
    pa –= [(cast)]p[ConstCExpr]       // unconditional
    [ca] ? pa –= [(cast)]p[ConstCExpr]  // conditional

---

Where:
cast=type, one of a restricted type set. ConstCExpr=INT, an Aux Pixel Register number. This instruction subtracts an Aux Pixel Register from the Pixel Accumulator.

---

Multiply
Syntax:
    pa += [(cast)]p[ConstCExpr]       // unconditional
    [ca] ? pa += [(cast)]p[ConstCExpr]  // conditional

---

Where:
cast=type, one of a restricted type set.
ConstCExpr=INT, an Aux Pixel Register number.
This instruction multiplies the Pixel Accumulator by an aux Pixel register. The multiplication is 2's complement 32 bit and gives a 64 bit result. The least significant 32 bit word is put into the Pixel Accumulator by default. A output dynamic range parameter can be used to select the where the 32 bit field comes from in the 64 bit result.

---

Divide
Syntax:
    pa /= [(cast)]p[ConstCExpr]       // unconditional
    [ca] ? pa /= [(cast)]p[ConstCExpr]  // conditional
Where:
    cast = type, one of a restricted type set.
    ConstCExpr = INT, an Aux Pixel Register number.
Constraints: This instruction makes no sense outside a stencil and may well be made illegal there. Semantics: Divide the Pixel Accumulator by an Aux Pixel Register.
    Mod
Syntax:
    pa %= [(cast)]p[ConstCExpr]      // unconditional
    [ca] ? pa %= [(cast)]p[ConstCExpr]  // conditional
Where:
    cast = type, one of a restricted type set.
    ConstCExpr = INT, an Aux Pixel Register number.
This instruction calculates the value of the Pixel Accumulator MOD by an Aux Pixel Register.

```
    Logical Operations with Shifts
Syntax:
    pa ShiftEq (rot) shift LogicOp p[ConstCExpr] [LogicOp mask]
    [ca] ? pa ShiftEq (rot) shift LogicOp p[ConstCExpr] [LogicOp mask]
Where:
    shift = INT, Rotates the pa register before the boolean op.
    ConstCExpr = INT, an Aux Pixel Register number.
    mask = INT, mask in binary form (See below).
This instruction combines three items - the Pixel Accumulator, a PREG, and a mask, which
is constrained to a certain combination of zeros and ones. Any logical operation can be
done between the three, and pre-rotation can be done on the pixel accumulator. It is, of
course, possible to construct the basic pa &= p[N] instructions from the above, but the
user doesn't want all this trouble - hence these instructions exist.
    Logical AND
    Syntax:
        pa &= p[ConstCExpr]                                 // unconditional
        [ca] ? pa &= p[ConstCExpr]                          // conditional
Where: cast = type, one of restricted type set. ConstCExpr = INT, an Aux Pixel Register
number. This instruction calculates the value of the Pixel Accumulator logically ANDED
with a Pixel Register.
    Logical ORS
    Syntax:
        pa |= p[ConstCExpr]                                 // unconditional
        [ca] ? pa |= p[ConstCExpr]                          // conditional
Where:
    cast = type, one of a restricted type set. ConstCExpr = INT, an Aux Pixel
Register number. This instruction calculates the value of the Pixel Accumulator logically
ORED with a Pixel Register.
    Logical XOR
    Syntax:
        pa ^= p[ConstCExpr]                                 // unconditional[ca]
        ? pa -= p[ConstCExpr]                               // conditional
Where:
    cast = type, one of a restricted type set.
    ConstCExpr = INT, an Aux Pixel Register number.
This instruction calculates the value of the Pixel Accumulator logically XORED with a Pixel
Register.
    Diadic Arithmetic and Logic Operations with Expressions
    In just the same way as it is possible to perform conditional and unconditional
additions, subtractions, ORs, ANDs, etc, between the Pixel Accumulator and the PREG's, all
of which leave the result in the Accumulator, so it is possible to do similar operations
between the Accumulator and Values of C Expressions. These have exactly the same
functionality, restraints etc, and so rather than go into full details at present, a single
example is given rather than the whole set.
    Add
    Syntax:
        pa += CExpr                                         // unconditional
        [ca] ? pa += CExpr                                  // conditional
This instruction adds the value of a C Expression to the Pixel Accumulator.
    Example:
crackle
{
    region(ca = rect2D(---------))
    {
        ? pa += 17.
    }
}
    Coordinate Assignments
    Syntax:
        pa = Xcoord|Ycoord|Zcoord                           // unconditional
        [ca] ? pa = Xcoord|Ycoord|Zcoord                    // conditional
```

Constraints: This instruction makes no sense outside a stencil and may well be made illegal there. Also note that currently it is not possible to perform operations such as "+=" with pa and xcoord, ycoord, etc, although it may be in the future. Semantics: This instruction conditionally or unconditionally assigns the value of the x, y, or z address of the current pixel to the Pixel Accumulator. Note that the values in the Pixel Accumulator after the instruction will be in "address format" (i.e. fixed point 16.16). This means that if the user wants to do any manipulation with the integer parts of the coordinates then they will have to be explicitly shifted. Note that the coordinate value assigned to the Pixel Accumulator will include the value of any translator. If the value without the translator is required then it can easily be calculated outside the translator and stored in a register.
Example:

```
crackle
{
    region(ca = line2D(xstart,y1,xend,y2,1))
    {
        pa = Xcoord;          // get fixed point x coord
        pa -= xstart;         // how far along line
        pa >>= 16;            // integer how far along
        pa &= 0xff;           // for repeat pattern
        pa = pram[pa];        // get pattern at this point
```

-continued

```
        is(id,conf) = pa;              // write it to image store
    }
}
```

The above portion of code draws a patterned line in the first octant. Note that the pattern has already been stored in PRAM. If it is desired to extend the code to 360 degrees then it could be done with a switch statement in C and several pieces of Crackle, or by using more a single more elaborate Crackle statement. Note: It may also be possible to provide expressions involving Xcoord etc; for example pa=2*Xcoord+N*Ycoord. However, this alternative may or may not be included in the presently preferred embodiment.

Global Register Instructions

There is a set of global registers, denoted by g[0] to g[N-1], each of which occurs only once; i.e. they do not occur on a per-pixel basis. These are of tremendous use for passing data between stencils. Essentially there are three instructions, the set, collate, and broadcast:

```
Set
Syntax:
    g[ConstCexpr] = Cexpr
```

This instruction assigns a value to a global register. Example: This instruction will be used in the collate.

```
Collate
Syntax:
    g[ConstCexpr] EqArithLogicOp pa
```

This instruction sums together (assuming the EqArithLogicOp is "+=") the value that exists in the global register together with all those in the Pixel Accumulators across the processors. Example:

```
crackle
{                              // Sum the pixels in two shapes
    g[0] = 0;
    region(ca = rect2D(-------))
    {
        pa = is(-----);
        g[0] += pa;
    }
    region(ca = line2D(------))
    {
        pa = is(----);
        g[0] += pa;
    }
}
Broadcast
Syntax:
    pa = g[ConstCexpr]
    ? pa = g[ConstCexpr]
```

This instruction assigns a value to a global register.

Format Converters

As Pipre supports different data and addressing types, in a mixture of hardware and software, it is necessary to provide adequate conversion facilities between them. Some conversions are implemented in microcode and so have direct instructions in Crackle. Others will be supported as macros in an include file called "convert. h". All conversions are of the form;conv (type1) (register list) to (type2)(register list) Where: type1=Data type, source type. type2=Data type, destination type. register List=List of registers to convert from/to. Examples: Conversion from Fractional Address to Packed Address. X, Y, Z components of Fractional address are in pa, p[0] and p[1]. Destination is the pa. conv (FADDR)(pa,p[0],p[1]) to (PACK)(pa); List of conversions has yet to be formed.

IEEE Floating-Point

The initial series of Pipre engines do not have IEEE floating point facilities. As IEEE is a popular real number format, it is proposed to provide a suite of Crackle instructions, implemented in code, which will allow conversion to internal floating point format. It is anticipated that standard FP operations will be done by expanded macros that make use of the following operations. In the text below, where PRAM registers are specified, the most general case is given. However, if instead of three registers spread throughout memory it makes the microcode quicker to stick them together then this is advised, and either the syntax can be changed, or extra restrictions can be added to make sure that a legal case is used.

Conversion Instructions

This section details the IEEE utility instructions.

```
FP Mult Split
Syntax:
    fpmultsplit(operB,mantoperB,SymExps)
```

Where:

operB=PRAM register operand B is in at the start mantoperB=Where mantissa of operand B goes SumExps=which PRAM register the sum of the exponents goes into. Constraints: This instruction makes no sense outside a stencil and may well be made illegal there. Semantics: Operand A starts off in the Pixel Accumulator and operand B starts off in PREG "operB". This operation puts the mantissa of operand A in the accumulator, the mantissa of operand B in one of the PRAM registers (mantoperB), and the sum of the exponents of operands A and B in another register (SumExps).

```
FP Normalize
Syntax:
    fpnorm(AdjMant)
```

Where: AdjMant=PREG to put adjusted mantissa in (see below). Constraints: This instruction makes no sense outside a stencil and may well be made illegal there. Semantics: This is used because the mantissa of a number may not be correctly positioned within the word. This operation places the adjusted mantissa (previously in the accumulator) in one of the PRAM registers and places the number of shifts necessary to accomplish this in the accumulator.

```
FP Merge 1
Syntax:
    fpmerge1(MantSouce)
```

Where: MantSource=PREG that holds mantissa (see below). Constraints: This instruction makes no sense outside a stencil and may well be made illegal there. Semantics: This operation merges the final exponent value (from the accumulator) with the final mantissa value (from one of the PRAM registers) into the final result (i.e. glues the exponent and mantissa together) into the accumulator.

FP Add Split
Syntax:
    fpaddsplit(OperB,SmallMant,LargeExp,LargeMant)

Where:
  OperB=Source PREG of operand B.
  SmallMant=Which PREG the smaller Mantissa is put into
  LargeExp=Which PREG the larger Exponent is put into
  LargeMant=Which PREG the larger Mantissa is put into.
Constraints: This instruction makes no sense outside a stencil and may well be made illegal there. Semantics: At the start, operand A is in the accumulator and operand B is in register OperB. This operation leaves the smallest mantissa, the largest exponent, and the largest mantissa in three PRAM registers, and the negative of the absolute value of the difference between the two exponents in the accumulator!!

Data Driven Shift
Syntax:
    datadrivenshift(operand)

Where: operand=PREG that is to be shifted. Constraints: This instruction makes no sense outside a stencil and may well be made illegal there. Semantics: Take the value in the accumulator and use it as the number of shifts to perform upon the value in one of the PRAM registers (indicated by operand), and dump the result back into the accumulator.

Adjust For Carry.
Syntax:
    adjforcarry(Exponent)

Where:
  Exponent=PREG where the exponent (see below) is stored.
Constraints: This instruction makes no sense outside a stencil and may well be made illegal there. Semantics: This checks the value in the accumulator to see if the mantissa has overflowed its fields, and if it has, it shifts it down by one bit, and increases the value of the related exponent (in a PRAM register-Exponent) by one.

FP Merge 2
Syntax

*fp*merge2(ExpoSource)

Where: ExpoSource=Which PREG the exponent is assumed in at the start. Constraints: This instruction makes no sense outside a stencil and may well be made illegal there. Semantics: This does the same as fp_merge_1 only the exponent and mantissa start off the other way around (i.e. the mantissa in the accumulator and the exponent in a PRAM register). If adj_for_carry output its results the other way around then fp_merge_1 could be used again. This would probably be just as quick.

Variables

The notion of variables at the assembly language of Pipre has up-until-now been thought unnecessary, but since the instruction set of the Renderer is becoming relatively rich, it would be a worthy addition. The following describes a method of implementing variables of different scopes and discusses the additional code which would be necessary.

Variable Scope

The scoping rules for variables in Crackle follow that of "C" variables very closely. The following code segment illustrates the declaration of Crackle variables and their respective scopes.

```
                                              // Crackle Scope Examples
main( )
{
    static INT32 rdata[ ] = { . . . };
    INT a,b,c;
    crackle
    {
        word a,b;                 // Over-rules "C" vars "a" & "b"
        a = (INT)10;
        pa = a;                   // pa now contains 10
        region(ca = rect2D(rdata,1))
        is(id,conf) = pa;
        region(ca = rect2D(rdata,1))
        {                         // Over-rules "C" and Crackle
            var "b" word b;
            b = (INT)22;
            pa = b;
            is(id,conf) = pa;     // End of local "b" scope
        }                         // End of Crackle "a" & "b" scope.
    }                             // End of "C" vars "a", "b", & "c" scope.
}
```

Variable Type

When declaring variables in Crackle, a type is not automatically bound to the identifier name. The variable is simply a multiple of the word size. Their type is administrated by the casting information specified with any instruction using the variable. The proposed syntax for a declaration is:

word name; //Suitable for *INT* and other 32 bit types.

Whether arrays should be catered for is subject to discussion. The storage class specifier "global" can be used to declare variables which are available throughout the scope of the application. They should be found at the beginning of an application. For example;

```
main( )
{
    crackle
    {
        global word seed, mode;
        global word[2] a,b;
    }
Rest of main . . .
}
```

Variable Storage

Variables are stored in different ways depending on there scope. The following sections address the major scope categories.

Application Global

Variables which are available at any part of the application are stored in image store. A page (more if necessary) of image store is reserved for use by high persistence variables. An example of such a variable is a seed for a random number generator. As this page will be in very high demand it would be kept in virtual image memory all (or most) of the time. Information concerning global Crackle variables would be kept alongside instruction profile information and handled by the front end to the system linker. The front end would collate all global variables from all application source file and bind them to a place in a special image.

Function Local

Probably the most commonly used variable will be that whose scope is over a single Crackle function. These variables are stored in PRAM which is treated as a heap. A pointer exists which gives the next available location in PRAM for each renderer task. Words of PRAM are allocated in much the same way as code primitives store state information. Two code primitives could be provided, one to advance the PRAM pointer and one to retreat it.

Stencil/Translator Loop Local

This scope of variables is useful for temporary values which may be required in stencil or translator loops. They are allocated space in exactly the same manner as Function Local variables.

Miscellaneous Instructions

This section is dedicated to instructions which do not fit into any of the previous categories.

NOP

Syntax nop

Most microprocessors have a No Operation instruction and there will be times that this will also be useful in Crackle. NOP changes no state in the machine, excepting of course that the program counter will increment.

Flow Control Instructions

It is becoming more apparent that some flow control for Crackle would be a valuable mechanism in providing support for higher software layers, i.e., Pixel "C". Discussions are now being made towards a solution that provides adequate flow control using the Remote Procedure Call principle. This method would utilise the on-aboard RISC processor (a 60MIPS Intel 960) with its 2 MB of RAM to send Crackle machine code to the AP/GRID using the dynamic FIFO switching mechanism.

System Calls

System calls are used by two types of task: The system task which creates tasks in the first place; and All other tasks which use system calls for synchronization and communication.

Host Communication

Message communication between host and renderer will be necessary because both machines may be working on different part of a single task. When the time comes to combine results obtained from each device, massaging will be required for synchronization.

Sync

Syntax sync

This flushes all buffers and waits for an acknowledge from the Renderer, at which point processing on the Host may continue. This means that a piece of microcode must be unvoiced to generate the acknowledge. This can be inserted when the "sync" is spotted by the Assembler; there is no need for a special "acknowledge" instruction in the Crackle Source language.

Invoking Alien Microcode

Even with relatively high performance of Pipre, it will be necessary for some users to write microcode primitives which must be possible to call from Crackle. Instructions may be microcoded because they cannot be expressed easily in standard Crackle or they would not be efficient.

Exec

Syntax exec primitive (data)

Where: primitive symbolic, a link to the entry point of the microcoded primitive. data=Any type data laid in format expected by Code. The "exec" command may also be used to "call" read and writes to Futurebus+address space.

Host/Renderer Transfer of Data

From time to time it will become necessary to transfer data either from the Host down onto the Renderer (perhaps loading an image into the Image Store) or back the other way. These instructions need some more work done on them.

Upload
Syntax:
CVAR = is(id,conf,data)

where
CVAR=A C(++) variable.
id=identity of image.
conf=configuration data.
data=x and y minima and maxima Download
Syntax:
is(id,conf,data) = CVAR where
id=identity of image
conf=configuration
data=x and y position that will be the destination
CVAR=a C(++) variable, The two commands above work in a similar fashion—a source area is needed—this is specified by x and y minimum and maxima, and a destination must be stated which will be the minimum x and y position (in an image OR array according to which way the copy is being done). The most interesting part to consider is "CVAR". To enable interest transfers to be done formats such as is(------)=a[100:200][50][200:300]; are permitted—this copies a slice from the array "a" between 100 and 200 for the first coordinate, 200 and 300 for the third, and a fixed value of 50 for the second Note: although the descriptions above only contain i and y, there is no reason not to have higher or lower dimensions involved. The Crackle Assembler should be able to detect what dimensions it is dealing with where in order to gather the correct number of parameters and to generate the correct code. Full syntax for "CVAR":

CVAR→identifier dimension→[range]dimension|NULLrange→
single [: single]single→constant|ordinary Cexpression Note that nothing is specified about just how the data is downloaded.

Video Processor Communication

For the sake of avoiding messy bits all over the screen when drawing directly to it, it is necessary to have some sort of synchronization between the Video Processor and the Renderer. Thus the following form of "sync" has been introduced.

Syntax:
syncVP( earliest, latest )

where:
earliest=earliest line at which rendering may commence.
latest=latest line at which rendering may commence.

If the VP does not lie within the specified range then it waits until it is and then sends hack an acknowledge, at which point the Renderer may start to render. Example:

```
crackle
{
    ...
    syncVP( 100, 200 );
    ...
}
```

Host/GRID I/O Format

Data can be up/down-loaded from the host by use of the Raster2D stencil in conjunction with Host Load and Host Save. The Raster stencil only uses the bottom row of processors to traverse the rectangular area from bottom-left to top-right. The Host Load & Save instructions return pixel values in sequential order. The order returned to the host will also be left to right and bottom to top.

Optimising Instructions

Optimisations are provided by combining instructions which are commonly bound together. Additional code is written to handle these instructions which can then make better use of pipelines and hence increase system performance. Note that instruction optimisation will be performed by a post assembly phase and will only bind pairs of instructions. Larger bindings are obtained by combing and optimised instruction with a normal one. For example if instructions 1, 2 & 3 can be optimises, there must also be an optimisation for 1 & 2. The bound ½ will then be combined with 3.

Read IS & Compare

Combination:

1) pa=is(id,conf)

2) ca=((pa−p[N]) RelOp 0)) [LogicOp [~] ca]

Where: id=INT, ID of the image to be compared. conf=INT, Selects the required field and sign extends Function: Compares the image Store with a Pixel Register.

Stencil & Load IS (Direct)

Combination:

1) region (ca=rect2D(*data++,num)

2) pa=is(id,conf)

Where: data=COORD *, Pointer to shape describing parameters; num=INT, Number of rectangles. id=INT, ID of the image to be compared; conf=INT, Selects the requited field and sign extends. Function: An instruction which combines the most commonly used stencil loops (eg rect2D) and a Read of image store in direct addressing mode.

Pack & Read (Indirect)

Combination:

1) conv (FADDR)(pa, . . . ) to (PACK?D)(pa)

2) pa=is(id,conf)[pa]

Where:

data=COORD*, Pointer to shape describing parameters num=INT, Number of rectangles.

id=INT, ID of the image to be compared.

conf=INT, Selects the required field and sign extends.

Constraints: This instruction makes no sense outside a stencil and may well be made illegal there. Semantics: This instruction optimises by virtue that the indirect addressing modes of image store read and write operation uses packed addresses (PACK?D). As most other instructions use fractional addresses (FADDR) is will be common to find a conversion follow by and indirect image store access. The optimising instruction will perform both operations in a single code primitive.

What is claimed is:

1. A computer system, comprising:

a display providing a large number of selectably visible pixels;

at least one central processing unit which manipulates graphical objects in an image space containing at least as many pixels as the number of pixels in said display;

an image memory, containing at least as many addressable pixel data locations as the number of pixels in said display;

a display driver, which can access said pixel data locations in said image memory and drive said display, in accordance therewith, to produce a viewable image corresponding to the data stored in at least some pixel data locations in said image memory; and a pixel processing unit, connected to receive data which defines positions of graphical objects from said central processing unit, and accordingly to write pixel data into said image memory;

wherein said pixel processing unit is connected for parallel access to said image memory, such that said pixel processing unit normally reads or writes data for a plurality of pixel locations, corresponding to a patch of pixels which are contiguous in said image space, in each single access to said image memory;

and wherein said central processing unit is operable to command a line to be drawn between two specified endpoints, and in response thereto said pixel processing unit;

incrementally selects the appropriate pixel patches for manipulation, by a method wherein a cumulative error term is carried forward from one patch to the next;

accesses locations in said image memory corresponding to successively selected patches of pixels, and performs an interpolation operation to determine which pixels of each respective patch are part of said line, and selectively writes corresponding data, for the thus-determined pixels of said respective patch, into said image memory;

wherein any two sequentially selected ones of said patches of pixels adjoin, in said image space, along an entire side of each patch;

and wherein said display driver produces an image on said display which at least partially includes the pixels rendered by said pixel processing unit.

2. The system of claim 1, wherein said pixel processing unit is integrated together with said central processing unit in a shared hermetically sealed package.

3. The system of claim 1, wherein said image memory contains a number of pixel locations which is greater than the number of viewable pixels in said display.

4. The system of claim 1, wherein said pixel processing unit includes at least 4 separate subprocessors which are operable in parallel on separate respective pixels.

5. The system of claim 1, further comprising means for storing at least part of the contents of said image memory in a portable nonvolatile medium, and means for retrieving stored information from said nonvolatile medium to be displayed by said display driver.

6. The system of claim 1, further comprising means for encoding and transmitting at least part of the contents of said image memory over a communications channel, and means for receiving and decoding signals from said communications channel to be displayed by said display driver.

7. The system of claim 1, wherein said pixel processing unit comprises at least one address processor, and a plurality of pixel data processors; said pixel data processors being configured and connected to be operable in parallel, in response to a common instruction stream, upon respective data bits corresponding to respective pixels of a common patch of pixels selected by said address processor.

8. The system of claim 1, wherein said image space includes more than $2^{30}$ pixels.

9. A computer system, comprising:

a display providing a large number of selectably visible pixels;

at least one central processing unit which manipulates graphical objects in an image space containing at least as many pixels as the number of pixels in said display;

an image memory, containing at least as many addressable pixel data locations as the number of pixels in said display;

a display driver, which can access said pixel data locations in said image memory and drive said display, in accordance therewith, to produce a viewable image corresponding to the data stored in at least some pixel data locations in said image memory; and a pixel processing unit, connected to receive data which defines positions of graphical objects from said central processing unit, and accordingly to write pixel data into said image memory;

wherein said pixel processing unit is connected for parallel access to said image memory, such that said pixel processing unit normally reads or writes data for a plurality of pixel locations, corresponding to a patch of pixels which are contiguous in said image space, in each single access to said image memory;

and wherein said central processing unit is operable to command a line to be drawn between two specified endpoints, and in response thereto said pixel processing unit;

incrementally selects the appropriate pixel patches for manipulation, by a method wherein a cumulative error term is carried forward from one patch to the next;

accesses locations in said image memory corresponding to successively selected patches of pixels, and performs an interpolation operation to determine which pixels of each respective patch are part of said line, and selectively writes corresponding data, for the thus-determined pixels of said respective patch, into said image memory;

wherein any two sequentially selected ones of said patches of pixels adjoin, in said image space, along an entire side of each patch;

wherein said display driver produces an image on said display which at least partially includes the pixels rendered by said pixel processing unit; and wherein said pixel processing unit, prior to accessing data for a first one of said patches of pixels, selects first and second orthogonal directions, in accordance with the slope of said line, such that the positional offset of each said subsequent patch in said second direction cannot be greater than the positional offset thereof in said first direction.

10. A computer system, comprising:

a display providing a large number of selectably visible pixels;

at least one central processing unit which manipulates graphical objects in an image space containing at least as many pixels as the number of pixels in said display;

an image memory, containing at least as many addressable pixel data locations as the number of pixels in said display;

a display driver, which can access said pixel data locations in said image memory and drive said display, in accordance therewith, to produce a viewable image corresponding to the data stored in at least some pixel data locations in said image memory; and a pixel processing unit, connected to receive data which defines positions of graphical objects from said central processing unit, and accordingly to write pixel data into said image memory;

wherein said pixel processing unit is connected for parallel access to said image memory, such that said pixel processing unit normally reads or writes data for a plurality of pixel locations, corresponding to a patch of pixels which are contiguous in said image space, in each single access to said image memory;

and wherein said central processing unit is operable to command said pixel processing unit to write pixel data corresponding to all pixels covered by a polygon, and in response thereto said pixel processing traverses portions of said image space by scanning portions of one row of patches of pixels at a time, and for at least one of said patches, testing only the pixels at the leading edge of the patch in the direction of scanning;

and wherein said pixel processing unit accordingly renders pixels into said image memory, and said display driver produces an image on said display which at least partially includes the pixels rendered by said pixel processing unit.

11. The system of claim 10, wherein, whenever said pixel processing unit finds that the sequence of said test pixels defines a path which is leading away from the interior of said polygon, without any of said test pixels having been confirmed as falling in the interior of said polygon, said pixel processing unit identifies the presence of a portion of said polygon.

12. A computer system, comprising:

a display providing a large number of selectably visible pixels;

at least one central processing unit which manipulates graphical objects in an image space containing at least as many pixels as the number of pixels in said display;

an image memory, containing at least as many addressable pixel data locations as the number of pixels in said display;

a display driver, which can access said pixel data locations in said image memory and drive said display, in accordance therewith, to produce a viewable image corresponding to the data stored in at least some pixel data locations in said image memory; and a pixel processing unit, comprising multiple subprocessors, connected to receive data which defines positions of graphical objects from said central processing unit, and accordingly to write pixel data into said image memory;

wherein said pixel processing unit is connected for parallel access to said image memory, such that said pixel processing unit normally reads or writes data for a plurality of pixel locations, corresponding to a patch of pixels which are contiguous in said image space, in each single access to said image memory;

and wherein said central processing unit is operable to command said pixel processing unit to set the value of every pixel in the interior of one or more given polygons which are each defined by a plurality of boundary lines, and in response thereto said pixel processing unit performs a sequence of multiple parallel XOR operations, such that each said XOR operation inverts the data values stored at locations corresponding to pixels within a respective shape which is at least partially bounded by a respective one of said boundary lines and which is also bounded by at least one other line which is parallel to one of the principal axes of said image space, and each said XOR operation is performed in parallel, on multiple pixels, by said multiple subprocessors of said pixel processing unit:

and wherein said pixel processing unit accordingly renders pixels into said image memory, and said display driver produces an image on said display which at least partially includes the pixels rendered by said pixel processing unit.

13. The system of claim 12, wherein all said boundary lines are straight line segments.

14. The system of claim 12, wherein some of said boundary lines may include curves.

15. A computer system, comprising:

a display providing a large number of selectably visible pixels;

at least one central processing unit which manipulates graphical objects in an image space containing at least as many pixels as the number of pixels in said display;

an image memory, containing at least as many addressable pixel data locations as the number of pixels in said display;

a display driver, which can access said pixel data locations in said image memory and drive said display, in accordance therewith, to produce a viewable image corresponding to the data stored in at least some pixel data locations in said image memory; and a pixel processing unit, comprising multiple subprocessors, connected to receive data which defines positions of graphical objects from said central processing unit, and accordingly to write pixel data into said image memory;

wherein said pixel processing unit is connected for parallel access to said image memory, such that said pixel processing unit normally reads or writes data for a plurality of pixel locations, corresponding to a patch of pixels which are contiguous in said image space, in each single access to said image memory;

and wherein said central processing unit is operable to command said pixel processing unit to set the value of every pixel in the interior of a given polygonal shape, which is defined by a plurality of boundary lines, and in response thereto said pixel processing unit performs a sequence of multiple parallel binary additions, wherein each said binary addition modifies the data values stored at locations corresponding to pixels within a respective shape which is at least partially bounded by a respective one of said boundary lines and which is also bounded by at least one other line which is parallel to one of the principal axes of said image space, each said binary addition is performed in parallel, on multiple pixels, by said multiple subprocessors of said pixel processing unit:

and wherein said pixel processing unit accordingly renders pixels into said image memory, and said display driver produces an image on said display which at least partially includes the pixels rendered by said pixel processing unit.

16. A computer system, comprising:

a display providing a large number of selectably visible pixels; program and data memory;

an image memory, containing at least as many addressable pixel data locations as the number of pixels in said display;

a display driver, which can access said pixel data locations in said image memory and drive said display, in accordance therewith, to produce a viewable image corresponding to the data stored in at least some pixel data locations in said image memory; and a pixel processing unit, operatively connected to receive data and program instructions from said program and data memory, and operatively connected to write pixel data into said image memory, wherein said pixel processing unit comprises multiple subprocessors executing a substantially common instruction stream in parallel;

wherein said pixel processing unit is connected for parallel access to said image memory, such that said pixel processing unit normally reads or writes data for a plurality of pixel locations, corresponding to a patch of pixels which are contiguous in said image space, in each single access to said image memory;

and wherein said pixel processing unit is operable to be commanded to render the outline of a given set of points, corresponding to every point resulting from translation of any element of a given set of points by at least one of, but less than all of, a given set of offset vectors, and in response thereto said multiple subprocessors of said pixel processing unit operate in parallel, on each pixel of said set of points, to increment a respective count value for each pixel which corresponds to said respective point translated by any one of said set of offsets;

and said pixel processing unit renders, into said image memory, all pixels for which said respective count value has been incremented at least once and less times than the number of said offsets;

and wherein said display driver produces an image on said display which at least partially includes the pixels rendered by said pixel processing unit.

17. The system of claim 16, wherein said set of points is defined to said pixel processing unit as a graphical primitive.

18. The system of claim 16, wherein said pixel processing unit renders only those pixels which are sought to be accessed, by subprocessors of said pixel processing unit, less than a predetermined maximum number of times.

19. The system of claim 16, wherein said pixel processing unit renders only those pixels which are sought to be accessed, by subprocessors of said pixel processing unit, less than a maximum number of times which is dependent on the number of points in said second set of points.

20. A computer system, comprising:

a display providing a large number of selectably visible pixels;

at least one central processing unit which manipulates graphical objects in an image space containing at least as many pixels as the number of pixels in said display;

an image memory, containing at least as many addressible pixel data locations as the number of pixels in said display;

a display driver, which can access said pixel data locations in said image memory and drive said display, in accordance therewith, to produce a viewable image corresponding to the data stored in at least some pixel data locations in said image memory; and a pixel processing unit, connected to receive data which defines positions of graphical objects from said central processing unit, and accordingly to write pixel data into said image memory;

wherein said pixel processing unit is connected for parallel access to said image memory, such that said pixel processing unit normally reads or writes data for a plurality of pixel locations, corresponding to a patch of pixels which are contiguous in said image space, in each single access to said image memory;

and wherein said pixel processing unit and said CPU are operatively connected to a program memory space, and are configured and connected together to execute various programmed sequences of commands, ones of which are decoded so that after a Stencil command is received, with an argument indicating a first envelope set of pixels, at least some further operations by said pixel processing unit are confined to pixels defined by said stencil command;

when a Translator command is received after a Stencil command is received, with an argument indicating at least one set-mapping operation, at least some further operations by said pixel processing unit are not confined only to said first envelope set of pixels, but are confined to a second envelope set which includes said first envelope set as modified by said set-mapping operation;

when a Clipper command is received, said pixel processing unit selects or deselects a contiguous set of pixels from the current envelope set, wherein multiple Clipper commands can be performed successively on a single envelope set, to effect cumulative selection of pixels;

when any one of a plurality of possible Pixel-Attribute Modification commands is received, said pixel processing unit performs the respective pixel-attribute modification on only those pixels which were selected by a preceding clipper commands; and wherein, in response to at least some ones of said Pixel-Attribute Modification commands, said pixel processing unit renders pixels and writes pixel data into said image memory accordingly;

and wherein said display driver produces an image on said display which at least partially includes the pixels rendered by said pixel processing unit.

21. The system of claim 20, wherein none of said pixel-attribute modification commands requires any count or list of the number of pixels to be modified as a command argument.

22. A computer system, comprising:

a display providing a large number of selectably visible pixels;

at least one central processing unit which manipulates graphical objects in an image space containing at least as many pixels as the number of pixels in said display;

an image memory, containing at least as many addressable pixel data locations as the number of pixels in said display;

a display driver, which can access said pixel data locations in said image memory and drive said display, in accordance therewith, to produce a viewable image corresponding to the data stored in at least some pixel data locations in said image memory; and a pixel pressing unit, connected to receive data which defines positions of graphical objects from said central processing unit, and accordingly to write pixel data into said image memory;

wherein said pixel processing unit is connected for parallel access to said image memory, such that said pixel processing unit normally reads or writes data for a plurality of pixel locations, corresponding to a patch of pixels which are contiguous in said image space, in each single access to said image memory;

and wherein said central processing unit is operable to command said pixel processing unit to write pixel data corresponding to all pixels covered by a line, and in response thereto said pixel processing unit traverses portions of said image space by repeatedly:

a) accessing data for a first patch of pixels, and rendering pixels at all locations therein intersected by said line, and then b) accessing data for a subsequent patch of pixels which, in said image space, is adjacent to the previously selected patch of pixels in a first direction, and does not overlap said previously selected patch of pixels, and has positional offset, in a second direction orthogonal to said first direction, which is selected so that said line intersects said subsequent patch of pixels precisely between a predetermined first pixel position thereof and a predetermined second pixel position thereof; and then c) rendering pixels at all pixel locations, in said respective patch, which are covered by said line; and then repeating steps b) and c) as needed;

and wherein said pixel processing unit accordingly renders pixels into said image memory, and said display driver produces an image on said display which at least partially includes the pixels rendered by said pixel processing unit.

23. The system of claim 22, wherein said pixel processing unit, prior to retrieving data corresponding to said first patch of pixels, selects said first and second directions, in accordance with the slope of said line, such that the positional offset of each subsequent patch in said second direction cannot be greater than the positional offset of said respective patch in said first direction.

24. The system of claim 22, wherein said line is required to be a straight line.

25. The system of claim 22, wherein said line is allowed to be curved.

* * * * *